(12) United States Patent
Monroe et al.

(10) Patent No.: US 11,643,698 B2
(45) Date of Patent: *May 9, 2023

(54) CONTROLLED THERMAL COEFFICIENT PRODUCT SYSTEM AND METHOD

(71) Applicant: The Texas A&M University System, College Station, TX (US)

(72) Inventors: James Alan Monroe, Syracuse, NY (US); Ibrahim Karaman, College Station, TX (US); Raymundo Arroyave, College Station, TX (US)

(*) Notice: Subject to any disclaimer, the term of this patent is extended or adjusted under 35 U.S.C. 154(b) by 313 days.

This patent is subject to a terminal disclaimer.

(21) Appl. No.: 17/026,880

(22) Filed: Sep. 21, 2020

(65) Prior Publication Data
US 2021/0002739 A1  Jan. 7, 2021

Related U.S. Application Data

(60) Division of application No. 15/217,594, filed on Jul. 22, 2016, now Pat. No. 10,822,670, which is a (Continued)

(51) Int. Cl.
*C21D 9/00* (2006.01)
*B23K 26/38* (2014.01)
(Continued)

(52) U.S. Cl.
CPC .......... *C21D 9/0068* (2013.01); *B21D 35/002* (2013.01); *B23K 26/0643* (2013.01); *B23K 26/0648* (2013.01); *B23K 26/14* (2013.01); *B23K 26/1476* (2013.01); *B23K 26/38* (2013.01); *C21D 1/785* (2013.01);
(Continued)

(58) Field of Classification Search
None
See application file for complete search history.

(56) References Cited

U.S. PATENT DOCUMENTS 5,066,886 A * 11/1991 Harner ............... G12B 1/00
　　　　　　　　　　　　　　　　　　　313/406
6,221,183 B1 * 4/2001 Sato ................. C22C 38/52
　　　　　　　　　　　　　　　　　　　420/95
(Continued)

*Primary Examiner* — George Wyszomierski
(74) *Attorney, Agent, or Firm* — Kevin Mark Klughart

(57) ABSTRACT

A controlled thermal coefficient product manufacturing system and method is disclosed. The disclosed product relates to the manufacture of metallic material product (MMP) having a thermal expansion coefficient (TEC) in a predetermined range. The disclosed system and method provides for a first material deformation (FMD) of the MMP that comprises at least some of a first material phase (FMP) wherein the FMP comprises martensite randomly oriented and a first thermal expansion coefficient (FTC). In response to the FMD at least some of the FMP is oriented in at least one predetermined orientation. Subsequent to deformation, the MMP comprises a second thermal expansion coefficient (STC) that is within a predetermined range and wherein the thermal expansion of the MMP is in at least one predetermined direction. The MMP may be comprised of a second material phase (SMP) that may or may not transform to the FMP in response to the FMD.

4 Claims, 128 Drawing Sheets

Related U.S. Application Data continuation-in-part of application No. 14/897,904, filed as application No. PCT/US2014/042105 on Jun. 12, 2014, now Pat. No. 10,557,182.

(60) Provisional application No. 62/195,575, filed on Jul. 22, 2015, provisional application No. 61/835,289, filed on Jun. 14, 2013.

(51) Int. Cl.

| | |
|---|---|
| *C22F 1/08* | (2006.01) |
| *C22F 1/10* | (2006.01) |
| *C22F 1/18* | (2006.01) |
| *C21D 8/00* | (2006.01) |
| *F27D 11/06* | (2006.01) |
| *F27D 7/06* | (2006.01) |
| *C21D 1/78* | (2006.01) |
| *B21D 35/00* | (2006.01) |
| *B23K 26/06* | (2014.01) |
| *B23K 26/14* | (2014.01) |
| *B21D 22/20* | (2006.01) |
| *B23K 103/04* | (2006.01) |
| *B23K 101/16* | (2006.01) |

(52) U.S. Cl.
CPC ............... *C21D 8/005* (2013.01); *C22F 1/08* (2013.01); *C22F 1/10* (2013.01); *C22F 1/183* (2013.01); *F27D 7/06* (2013.01); *F27D 11/06* (2013.01); *B21D 22/20* (2013.01); *B23K 2101/16* (2018.08); *B23K 2103/04* (2018.08); *F27D 2007/066* (2013.01)

(56) References Cited

U.S. PATENT DOCUMENTS 10,557,182 B2 * 2/2020 Monroe .................... C22F 1/10
11,286,549 B2 * 3/2022 Monroe .................... C21D 8/06

* cited by examiner

| Direction, Angle | $\alpha^M \left(10^{-6} \frac{1}{K}\right)$ | Austenite $l^A$ (Å) | Martensite $l^M$ (Å) | $R^{A \to M} l^A - l^M$ $\beta^A - \beta^M$ |
|---|---|---|---|---|
| Co₄₉Ni₂₁Ga₃₀ | 4K-285K | | | |
| [100] | $5.181 + 0.243T$ | 5.743 | 5.422 | 2.700 |
| [010] | $5.181 + 0.243T$ | - | 5.422 | 2.700 |
| [001] | $-5.444 - 0.328T$ | - | 6.401 | -0.658 |
| Ni₁₉.₅Ti₅₀.₆Pd₃₀ | 303K - 433K | | | |
| [100] | $51.33$ | 3.091 | 2.784 | 0.307 |
| [010] | $-3.17$ | - | 4.450 | -0.079 |
| [001] | $-34.51$ | - | 4.697 | -0.326 |
| Ti₇₈Nb₂₂ | 303K - 475K | | | |
| [100] | $48.82 + 0.656T$ | 3.305 | 3.217 | 0.088 |
| [010] | $-25.94 - 0.579T$ | - | 4.772 | -0.098 |
| [001] | $-4.31 + 0.247T$ | - | 4.652 | -0.021 |
| NiTi [13] | 300K - 400K | | | |
| [100] | $-47.2$ | 3.015 | 4.67 | -0.366 |
| [010] | $43.8$ | - | 4.14 | 0.124 |
| [001] | $22.7$ | - | 2.91 | 0.105 |
| $\beta$ | $29.0$ | 90° | 97.55° | 7.550 |
| U [14] | 50K - 923K | | | |
| [100] | $24.22 - 9.83 \times 10^{-3}T + 46.02 \times 10^{-6}T^2$ | 3.542 | 2.8535 | 0.689 |
| [010] | $3.07 + 3.47 \times 10^{-3}T - 38.45 \times 10^{-6}T^2$ | - | 5.8648 | -0.856 |
| [001] | $8.72 + 37.04 \times 10^{-3}T + 9.08 \times 10^{-6}T^2$ | - | 4.9543 | 0.055 |
| PbTiO₃ [10] | 273K - 763K | | | |
| [100] | $\alpha_{11} = 12.85 + 0.029T$ | 3.958 | 3.892 | 1.705 |
| [010] | $\alpha_{22} = 12.85 + 0.029T$ | - | 3.892 | 1.705 |
| [001] | $\alpha_{33} = -24.73 - 0.083T$ | - | 4.144 | -0.186 |

| Material | Rotation Matrix $R^{A \to M}$ |
|---|---|
| CoNiGa NiTiPd NiTi PbTiO$_3$ | $\begin{bmatrix} \frac{\sqrt{2}}{2} & -\frac{\sqrt{2}}{2} & 0 \\ \frac{\sqrt{2}}{2} & \frac{\sqrt{2}}{2} & 0 \\ 0 & 0 & 1 \end{bmatrix}$ |
| TiNb U | $\begin{bmatrix} 1 & 0 & 0 \\ 0 & \frac{\sqrt{2}}{2} & -\frac{\sqrt{2}}{2} \\ 0 & \frac{\sqrt{2}}{2} & \frac{\sqrt{2}}{2} \end{bmatrix}$ |

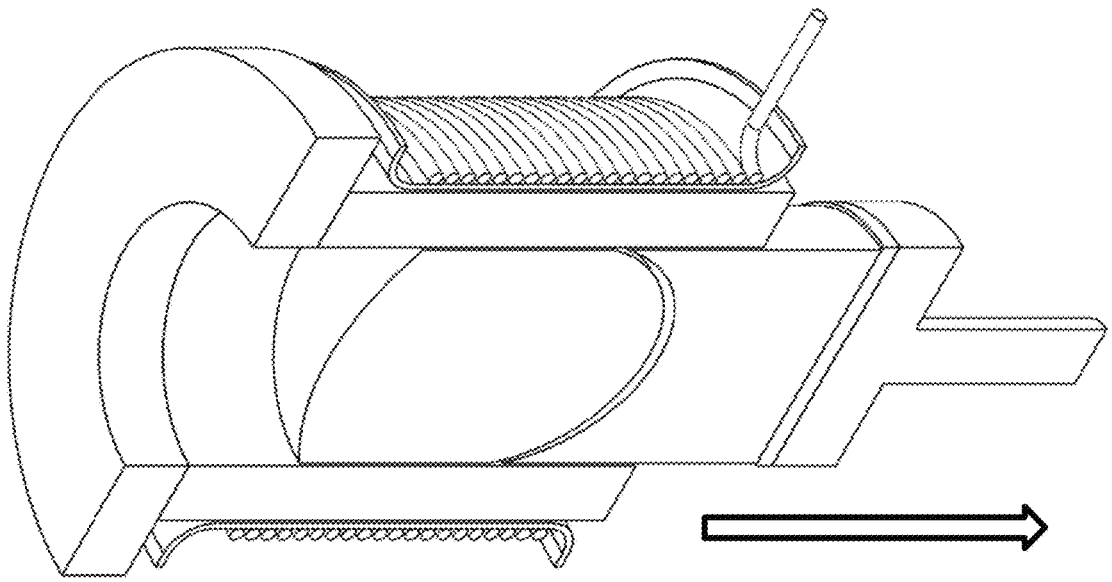
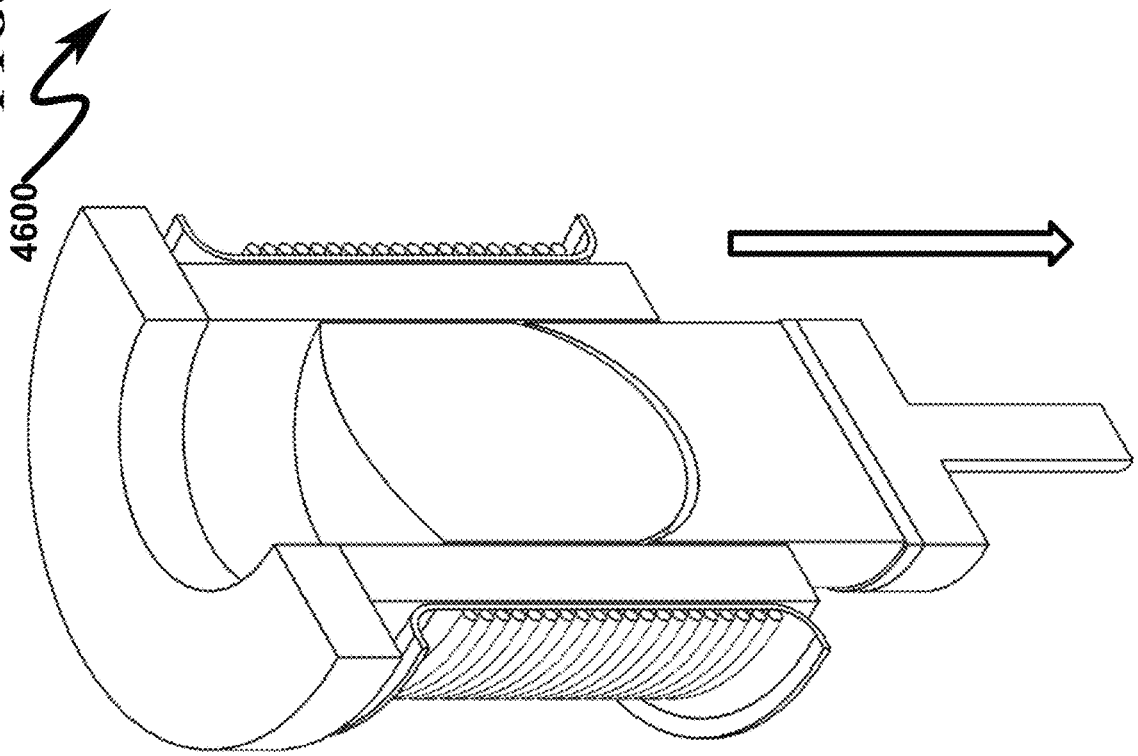
FIG. 46

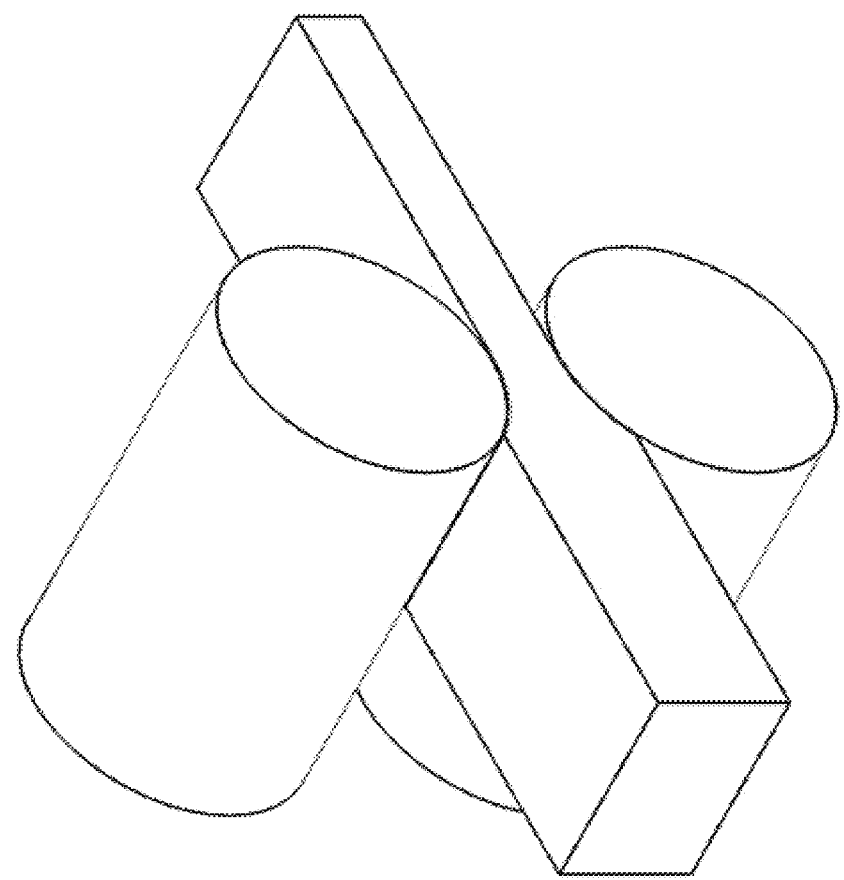
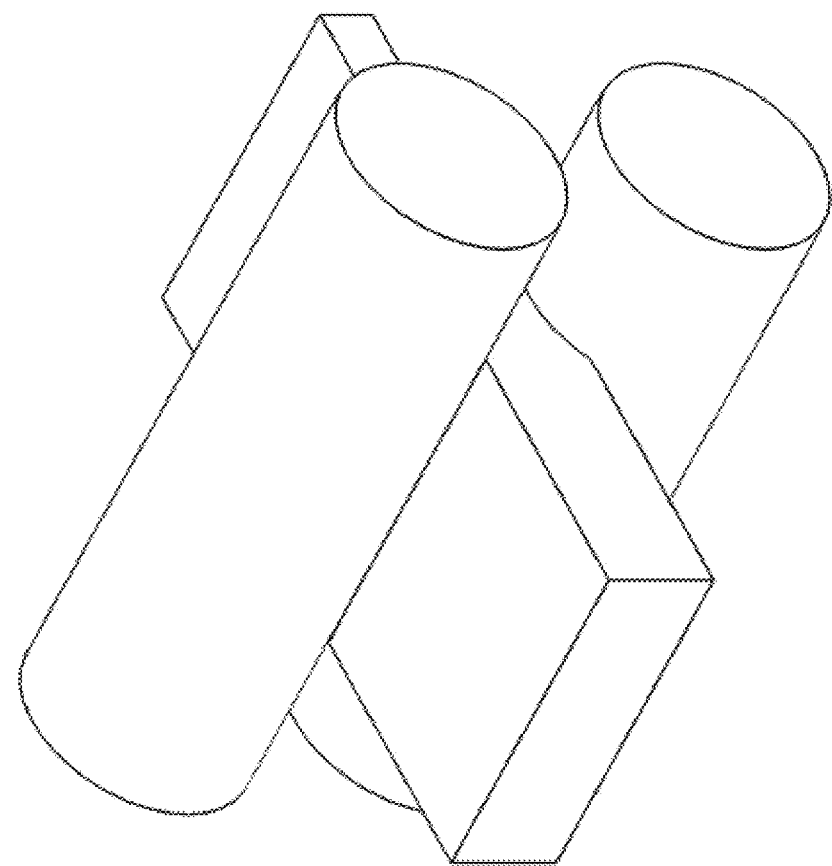
FIG. 63

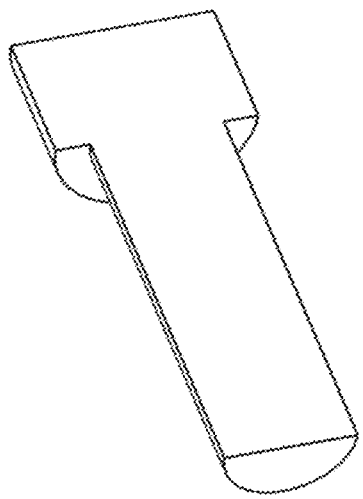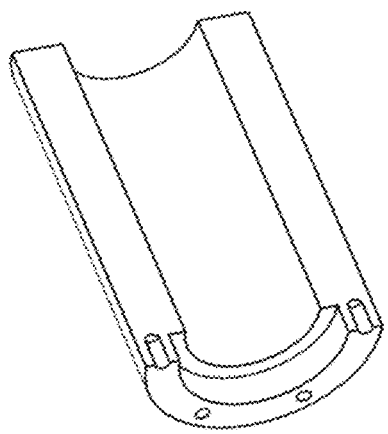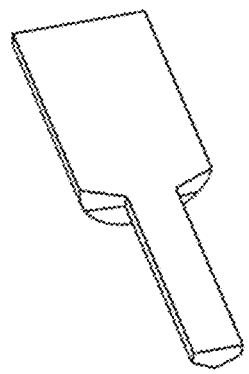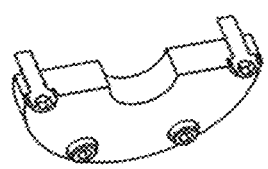
FIG. 70

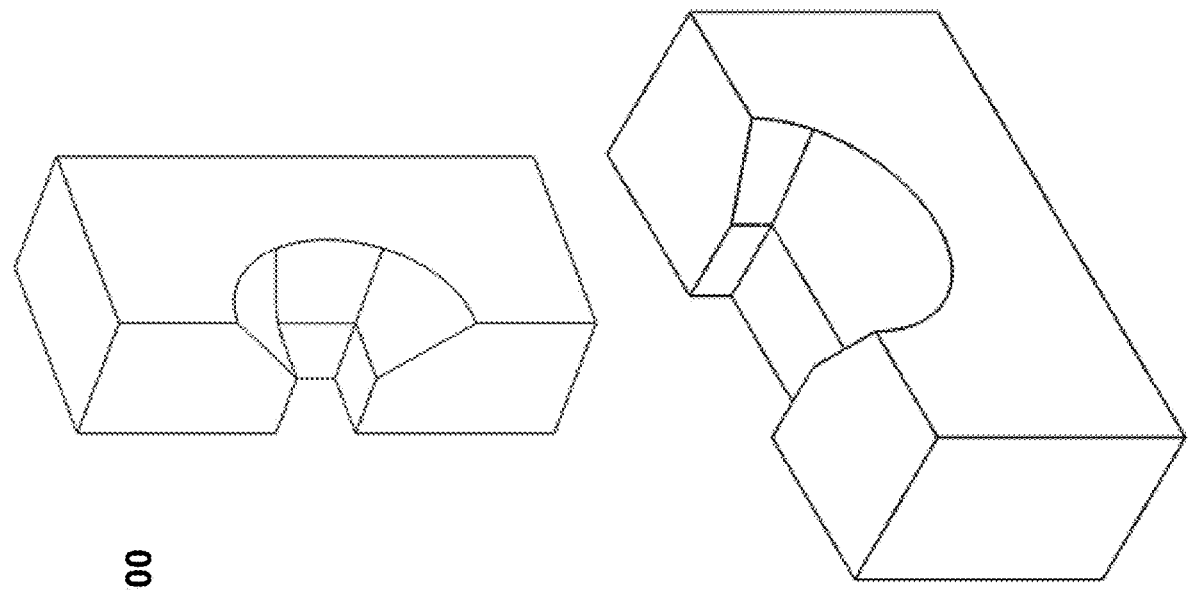
FIG. 87 — 8700
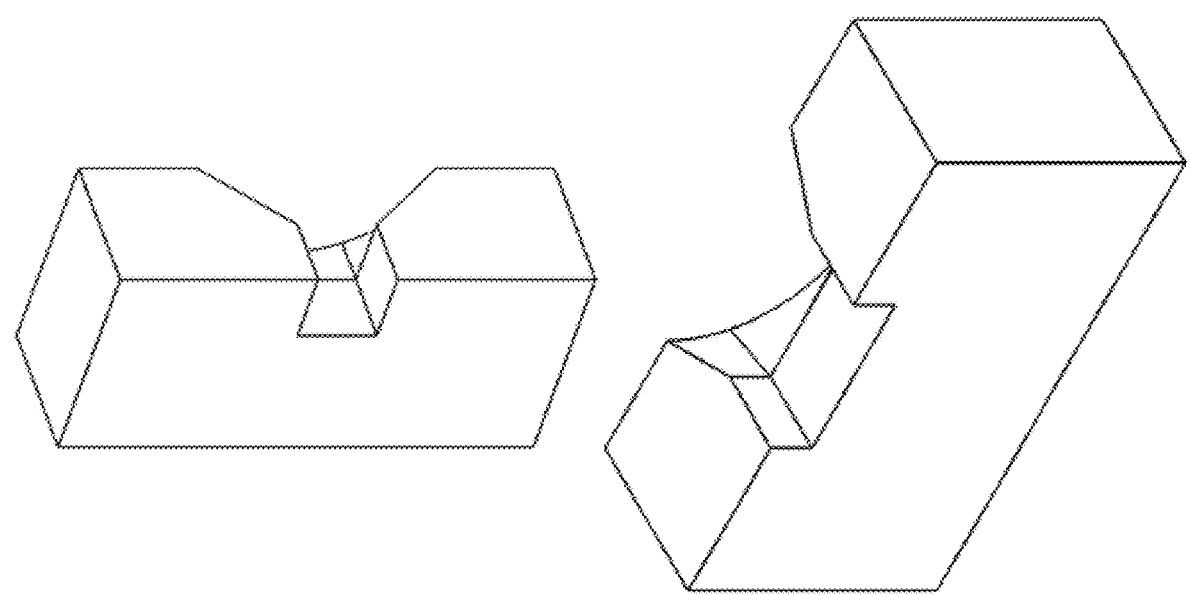

9100

9200

9300

9500

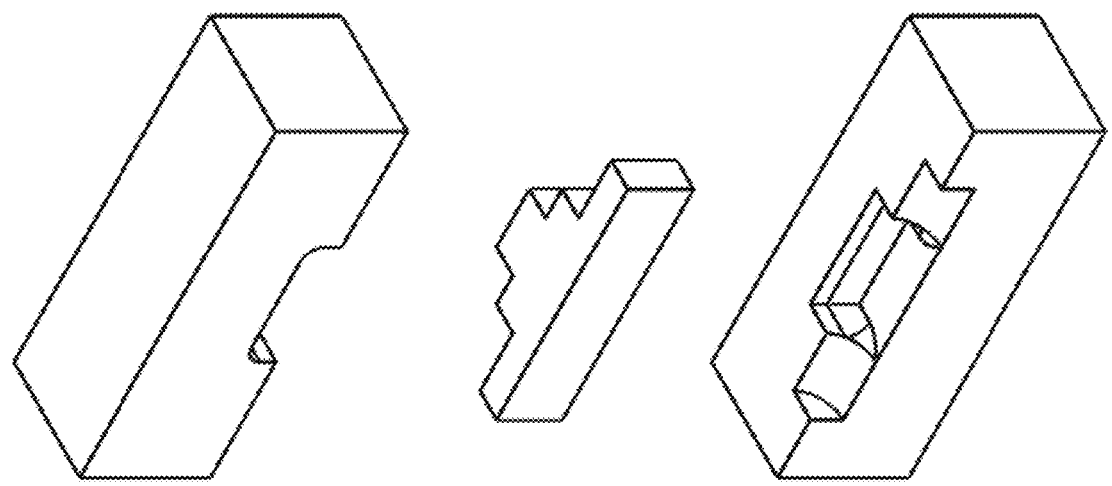
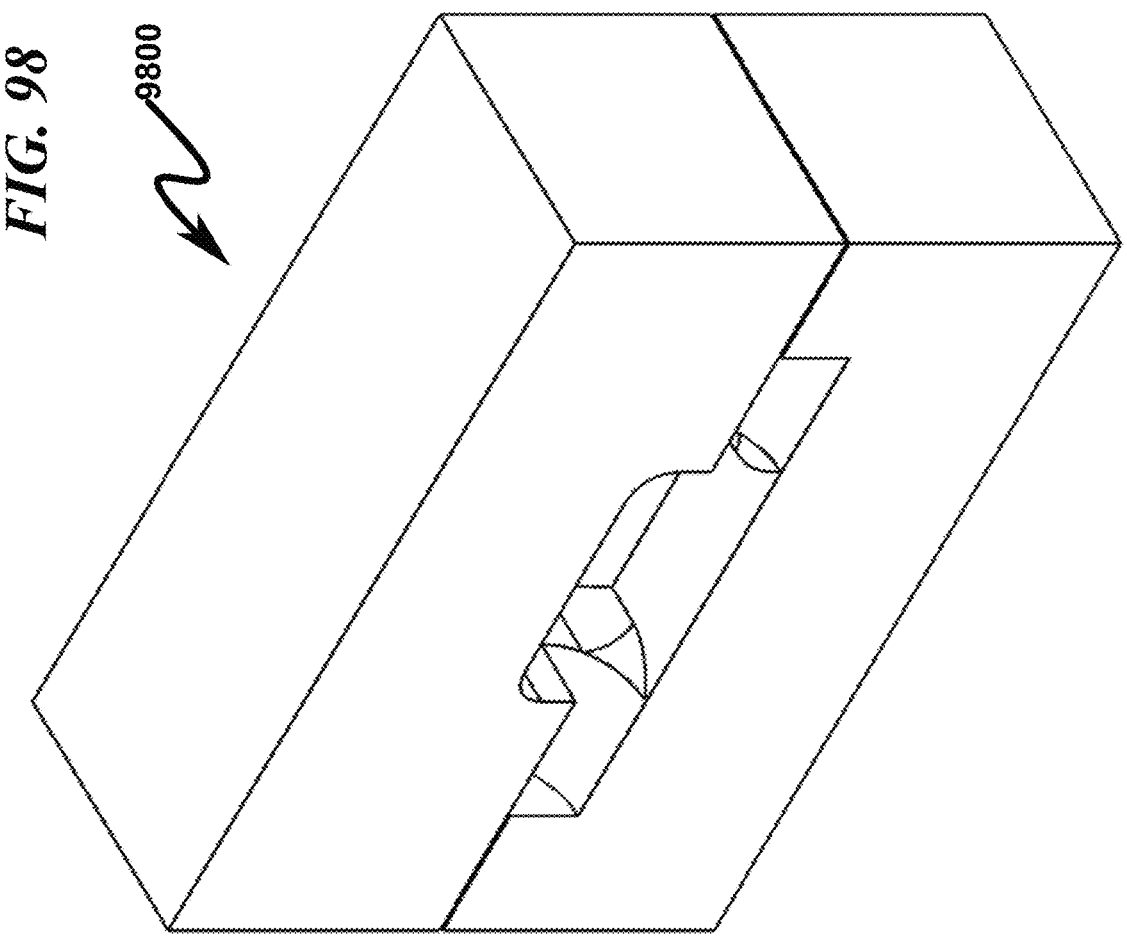
FIG. 98

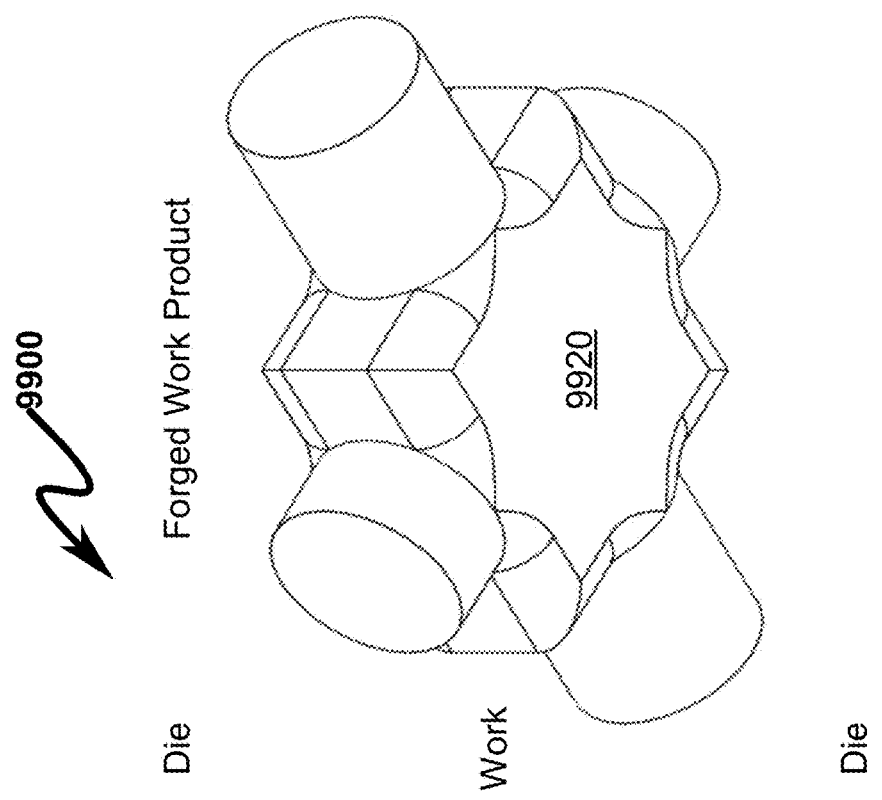
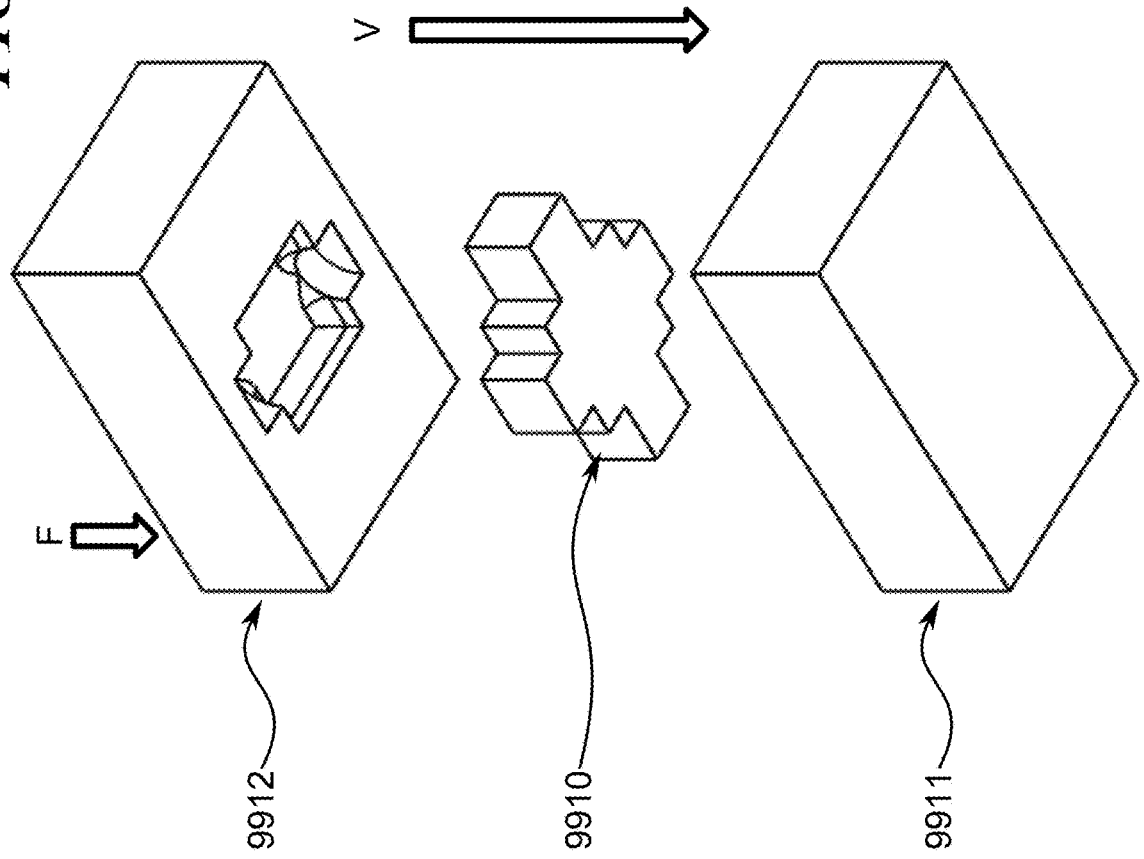
FIG. 99

For a beam of length $L$,

After deformation, the length of the neutral surface remains $L$. At other sections, $$L' = (\rho - y)\theta$$

$$\delta = L - L' = (\rho - y)\theta - \rho\theta = -y\theta$$

$$\varepsilon_x = \frac{\delta}{L} = -\frac{y\theta}{\rho\theta} = -\frac{y}{\rho} \quad \text{(strain varies linearly)}$$

$$\varepsilon_m = \frac{c}{\rho} \quad \text{or} \quad \rho = \frac{c}{\varepsilon_m}$$

$$\varepsilon_x = -\frac{y}{c}\varepsilon_m$$

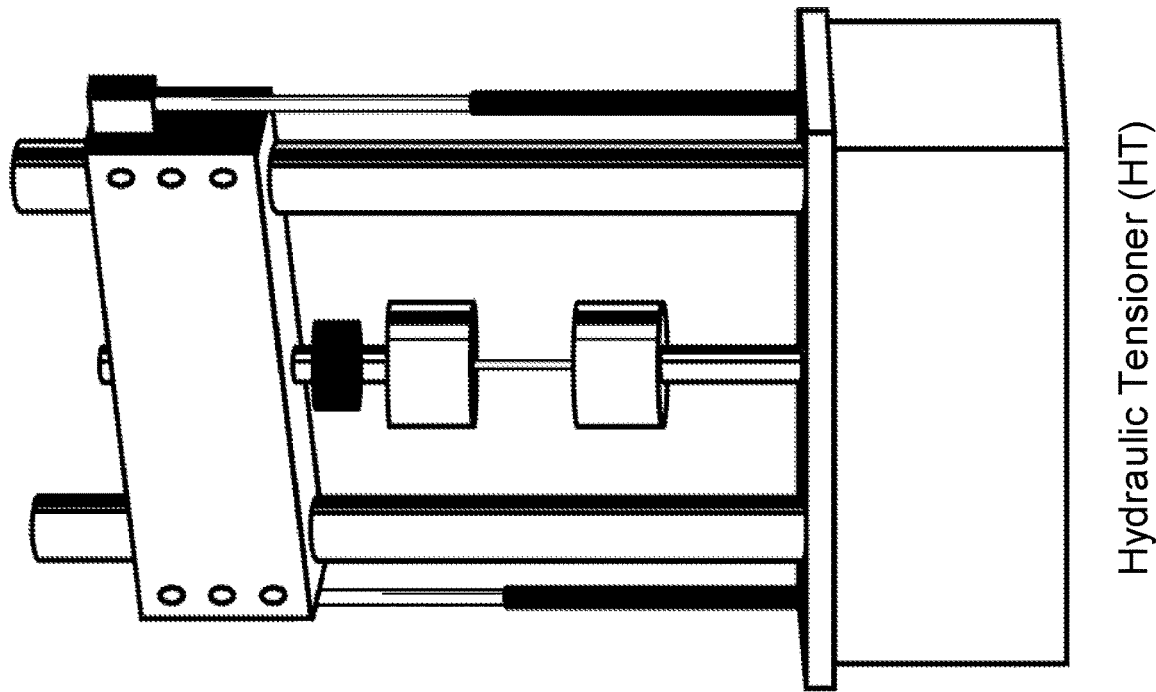
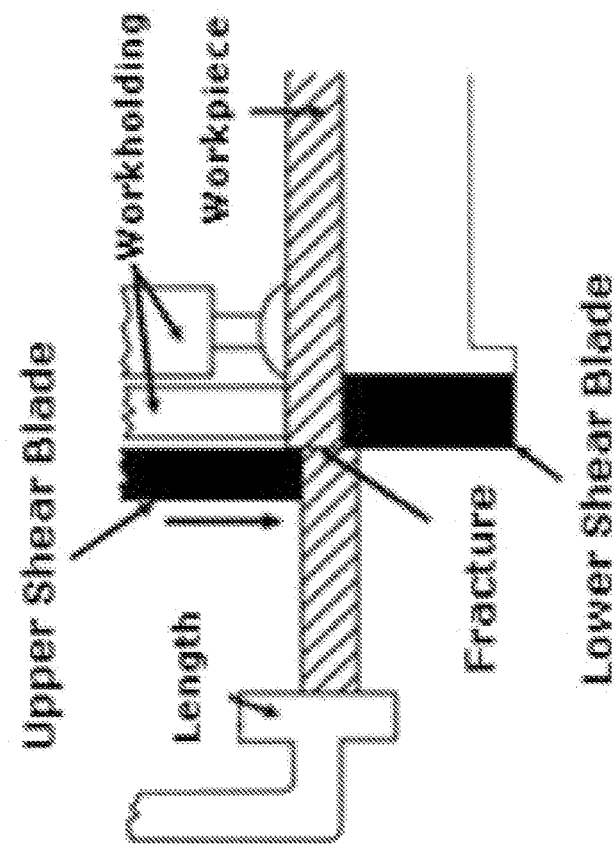
FIG. 125

12700

CONTROLLED THERMAL COEFFICIENT PRODUCT SYSTEM AND METHOD

CROSS REFERENCE TO RELATED APPLICATIONS

U.S Parent Applications

This application is a divisional patent application of and incorporates by reference U.S. Utility patent application for CONTROLLED THERMAL COEFFICIENT PRODUCT SYSTEM AND METHOD by inventors James Alan Monroe, Ibrahim Karaman, and Raymundo Arroyave, filed with the USPTO on Jul. 22, 2016, with EFSID 26434102, Ser. No. 15/217,594, issued as U.S. Pat. No. 10,822,670 on Nov. 3, 2020.

U.S Patent Applications

U.S. Utility patent application for CONTROLLED THERMAL COEFFICIENT PRODUCT SYSTEM AND METHOD by inventors James Alan Monroe, Ibrahim Karaman, and Raymundo Arroyave, filed with the USPTO on Jul. 22, 2016, with EFSID 26434102, Ser. No. 15/217,594, is a Continuation-In-Part (CIP) patent application of and incorporates by reference U.S. Utility patent application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, issued as U.S. Pat. No. 10,557,182 on Feb. 11, 2020 and published on May 12, 2016 as US20160130677A1.

This application claims benefit under 35 U.S.C. § 120 and incorporates by reference U.S. Utility patent application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1.

PCT Patent Applications

U.S. Utility patent application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1 is a national stage U.S. Utility patent application of and incorporates by reference PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2.

U.S. Utility patent application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1 claims benefit under 35 U.S.C. § 120 and incorporates by reference PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2.

Provisional Patent Applications

PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2 claims benefit under 35 U.S.C. § 119 and incorporates by reference United States Provisional Patent Application for CONTROLLED THERMAL COEFFICIENT PRODUCT SYSTEM AND METHOD by inventor James A. Monroe, filed with the USPTO on Jul. 22, 2015, with Ser. No. 62/195,575, EFS ID 22993562, confirmation number 5403.

U.S. Utility patent application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1 claims benefit under 35 U.S.C. § 119 and incorporates by reference United States Provisional Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 14, 2013, with Ser. No. 61/835,289.

STATEMENT REGARDING FEDERALLY SPONSORED RESEARCH OR DEVELOPMENT

Portions of this research were sponsored by U.S. National Science Foundation, Division of Materials Research, Metals and Metallic Nanostructures Program, Grant No. 0909170 and Division of Materials Research, Office of Specific Programs, International Materials Institute Program, Grant DMR 08-44082.

Portions of this research were supported by National Science Foundation, Division of Materials Research, Metals and Metallic Nanostructures Program, Grant No. 0909170, and additional support was received from the National Science Foundation under Grant No. DMR 08-44082, which supports the International Materials Institute for Multifunctional Materials for Energy Conversion (IIMEC) at Texas A&M University. The work has also benefited from the use of the Lujan Neutron Scattering Center at LANSCE, funded by the U.S. Department of Energy's Office of Basic Energy Sciences. Los Alamos National Laboratory is operated by Los Alamos National Security LLC under U.S. DOE Contract DE-AC52-06NA25396.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

REFERENCE TO A MICROFICHE APPENDIX

Not Applicable

FIELD OF THE INVENTION

The present invention relate to the product of and systems and methods for the manufacture of metallic and non-metallic materials having a thermal expansion coefficient (TEC) that is controlled in a predetermined range.

Prior Art and Background of the Invention

The disclosure relates generally to the expansion and contraction of materials in response to changes in temperature. More particularly, the disclosure relates to systems and methods for tailoring the coefficients of thermal expansion of metallic materials, and the directionality of thermal expansion and contraction of metallic materials, in response to changes in temperature.

Matter has a tendency to change volume in response to changes in temperature, a phenomenon often referred to as thermal expansion. Most materials respond to a decrease in temperature by contracting (a reduction in volume) and respond to an increase in temperature by expanding (an increase in volume). The degree of thermal expansion of a material is typically characterized by the material's coefficient of thermal expansion, which may be influenced by a variety of factors such as the temperature applied, deformation applied, material composition, as well as any previous processing of that material. Since thermal expansion affects the dimensions of materials subjected to variations in temperature, it can be a significant factor in selecting materials for use in structures and devices.

Deficiencies in the Prior Art

Prior art materials typically suffer from the following characteristic deficiencies:
Prior art materials have a coefficient of thermal expansion (CTE) that cannot accurately be controlled.
Prior art materials have a coefficient of thermal expansion (CTE) that cannot be controlled across one or more axes of expansion.
Prior art materials have a coefficient of thermal expansion (CTE) that cannot be tailored to provide a customized expansion coefficient across one or more axes of expansion.
Prior art materials cannot provide a zero coefficient of thermal expansion (CTE) over one or more axes of expansion.

To date the prior art has not fully addressed these deficiencies.

OBJECTIVES OF THE INVENTION

Accordingly, the objectives of the present invention are (among others) to circumvent the deficiencies in the prior art and affect the following objectives:
(1) Provide for a controlled thermal coefficient material and system/method for producing same that have a coefficient of thermal expansion (CTE) that can accurately be controlled
(2) Provide for a controlled thermal coefficient material and system/method for producing same in which the coefficient of thermal expansion (CTE) can be controlled across one or more axes of expansion.
(3) Provide for a controlled thermal coefficient material and system/method for producing same in which the coefficient of thermal expansion (CTE) can be tailored to provide a customized expansion coefficient across one or more axes of expansion.
(4) Provide for a controlled thermal coefficient material and system/method for producing same that can produce a zero coefficient of thermal expansion (CTE) across one or more axes of expansion.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Invention Methodology

The present invention generally addresses the need for manufacturing products having a known Coefficient of Thermal Expansion (CTE) in the following manner. Product requirements for CTE are first determined and from this and other product requirements a potential group of alloys or other materials is selected for processing. From this potential group of materials ingots are prepared. After ingot preparation is complete, the ingots are processed using a variety of thermal and/or mechanical processes to produce a target material having the desired CTE with respect to X-Y-Z axis coordinates. The processed ingots are then put through a product manufacturing cycle to produce the final manufactured product. This final manufactured product conforms to the CTE requirements as first determined above.

Exemplary Embodiment

In an embodiment, a method of manufacturing a metallic material with a thermal expansion coefficient in a predetermined range, comprising: deforming a metallic material comprising a first phase and a first thermal expansion coefficient; transforming, in response to the deforming, at least some of the first phase into a second phase, wherein the second phase comprises martensite; and orienting the metallic material in at least one predetermined orientation, wherein the metallic material, subsequent to deformation, comprises a second thermal expansion coefficient, wherein the second thermal expansion coefficient is within a predetermined range, and wherein the thermal expansion is in at least one predetermined direction.

In an alternate embodiment, a method of manufacturing a metallic material with a thermal expansion coefficient in a predetermined range, comprising: deforming a metallic material by applying tension in a first direction, wherein the metallic material substantially comprises a first phase, and wherein applying the tension transforms at least some of the first phase into a second phase; and wherein, subsequent to deformation, the metallic material comprises a negative coefficient of thermal expansion within a predetermined range, wherein the negative thermal expansion is in at least the first direction.

In an alternate embodiment, method of manufacturing a metallic material with a thermal expansion coefficient in a predetermined range comprising: deforming a metallic material, wherein the metallic material prior to deforming substantially comprises a first phase, and wherein deforming the metallic material transforms at least some of the first phase into a second phase using a compressive force in a first direction; wherein, subsequent to deformation, the metallic material comprises a negative coefficient of thermal expansion within a predetermined range; and wherein, subsequent to deformation, the negative thermal expansion of the metallic material is in at least a second direction, wherein the second direction is perpendicular to the first direction.

In an alternate embodiment, a method of manufacturing a metallic material with a thermal expansion coefficient in a predetermined range, comprising: deforming a metallic material comprising a first thermal expansion coefficient, wherein the metallic material comprises a martensitic phase, wherein the metallic material is oriented in at least one predetermined orientation in response to the deforming; wherein the metallic material, subsequent to deformation, comprises a second thermal expansion coefficient, wherein the second thermal expansion coefficient is within a predetermined range, and wherein the thermal expansion is in at least one predetermined direction.

Embodiment Summary

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

While preferred embodiments will be shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

BRIEF DESCRIPTION OF THE DRAWINGS

For a fuller understanding of the advantages provided by the invention, reference should be made to the following detailed description together with the accompanying drawings wherein:

FIG. 27 illustrates a table depicting thermal expansion, austenite and martensite lattice parameters, and lattice parameter comparison (the negative thermal expansion (NTE) criteria $l^A$-$l^M$ and $\beta^A$-$\beta^M$ are given in A and degrees, respectively; the high symmetry, austenite (A), and low symmetry, martensite (M), states' lattice parameters for CoNiGa, TiNb, NiTiPd, $U^{14}$ and $PbTiO_3^{10}$ taken 10° C. above and below their respective martensitic transformation temperatures; the $NiTi^{13}$ martensite's lattice parameters were taken at room temperature);

FIG. 46 illustrates top front and top right sectional perspective views of a directional solidification furnace (DSF) useful in many preferred invention embodiments depicting extension and removal of a cast ingot;

FIG. 63 illustrates a top left front perspective and top left perspective sectional views depicting a typical rolling deformation process;

FIG. 70 illustrates a top left front perspective front section assembly view of a direct extrusion system useful in some preferred invention embodiments;

FIG. 87 illustrates various section perspective views of a die from a drawing system useful in some preferred invention embodiments;

FIG. 98 illustrates a top right front perspective front section view of a forging system useful in some preferred invention embodiments;

FIG. 99 illustrates a bottom right front perspective view of a forging system and resulting exemplary work product useful in some preferred invention embodiments;

FIG. 114 illustrates equations relating to the bending deformation depicted in FIG. 113;

FIG. 119 illustrates various effects that bending causes non-uniform deformation along the bending radius of a material;

FIG. 120 illustrates various stress and strain effects of bending on a material;

FIG. 121 illustrates a block diagram of a preferred exemplary invention system as applied to a manufacturing system configured to produce a material having a controlled thermal expansion coefficient;

FIG. 122 illustrates a flowchart of a preferred exemplary invention method as applied to a manufacturing system configured to produce a material having a controlled thermal expansion coefficient;

FIG. 123 illustrates a schematic of an exemplary vacuum induction melting furnace (VMF) useful in some invention embodiments;

FIG. 124 illustrates a schematic of an exemplary rolling mill (RM) useful in some invention embodiments;

FIG. 125 illustrates a schematic of an exemplary shear press and an exemplary hydraulic tensioner (HT) useful in some invention embodiments;

FIG. 126 illustrates a schematic of an exemplary hydraulic tensioner (HT) useful in some invention embodiments;

FIG. 127 illustrates a depiction of an exemplary CNC mill (CCM) useful in some invention embodiments; and FIG. 128 illustrates a schematic of an exemplary laser cutter (LC) head useful in some invention embodiments.

DESCRIPTION OF THE PRESENTLY PREFERRED EXEMPLARY EMBODIMENTS

Figure 1:
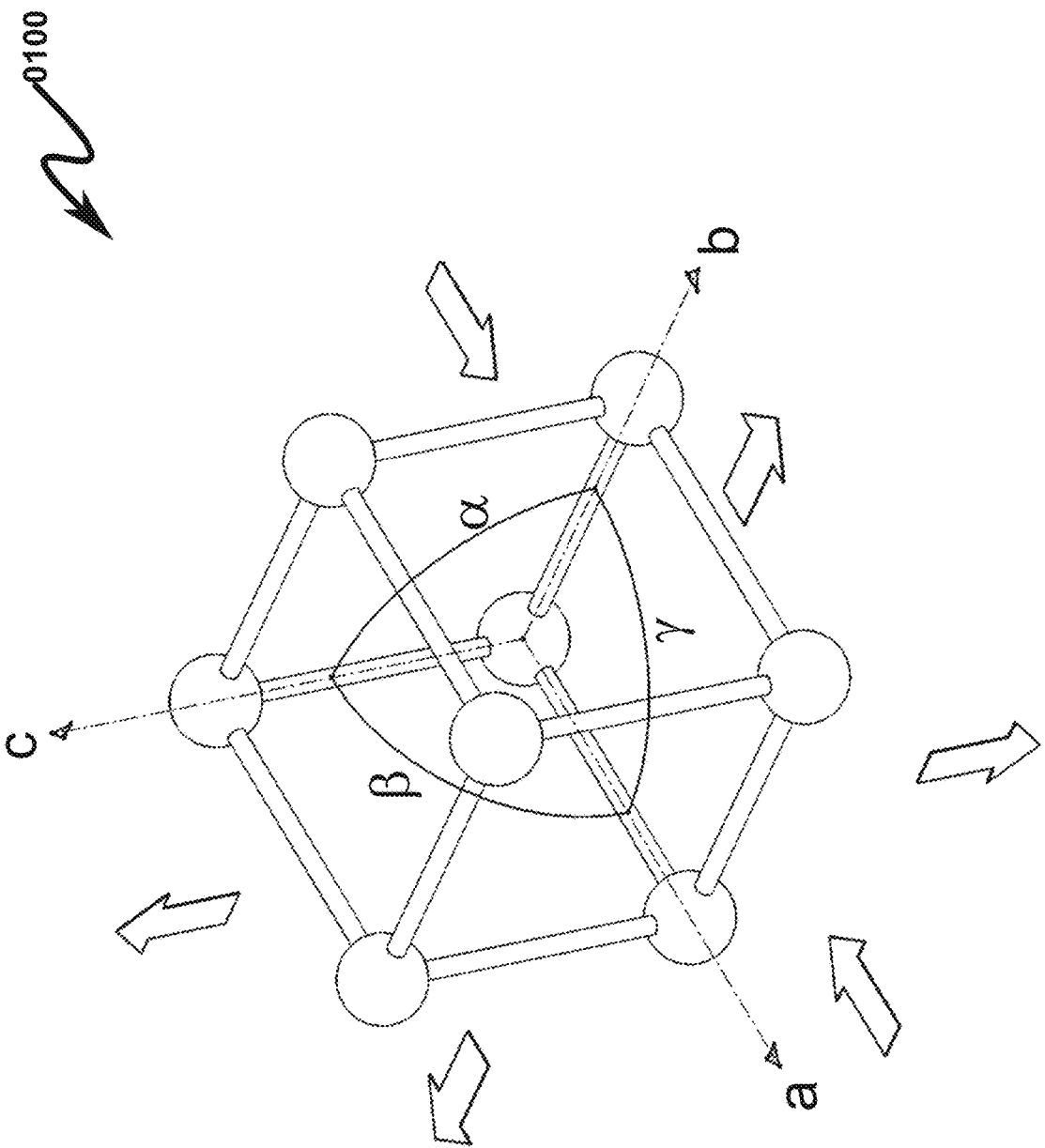
FIG. 1 illustrates a schematic three-dimensional view illustrating the thermal expansion of monoclinic lattice structures according to embodiments of the disclosure.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a CONTROLLED THERMAL COEFFICIENT PRODUCT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Nomenclature Interpretation

The following discussion is directed to various exemplary embodiments. However, one skilled in the art will understand that the examples disclosed herein have broad applications, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

The term 'martensite', named after the German metallurgist Adolf Martens (1850-1914), will herein generally refer to a very hard form of steel crystalline structure, but it may also refer to any crystal structure that is formed by diffusionless transformation. It includes a class of hard minerals occurring as lath- or plate-shaped crystal grains. When viewed in cross section, lenticular (lens-shaped) crystal grains are generally observed.

Introduction

Materials with negative thermal expansion (NTE) provide interesting technological applications where compensation of positive thermal expansion (PTE) materials is desired and/or required. Unfortunately, most materials exhibiting NTE have low thermal conductivity and fracture toughness (e.g., ceramics), or the NTE response is only linear over a very small temperature range (e.g., Invar alloys). As discussed in more detail below, a large NTE or PTE response may occur along different crystallographic directions in the martensitic state of NiTi, NiTiPd, and NiMnGa SMAs as well as other materials capable of undergoing a martensitic transformation. This has sparked our interest into the unique thermal-mechanical properties of these materials. Manipulating the martensite's texture in these alloys can result in macroscopic NTE materials that are strong, ductile, and thermally/electrically conductive. This may be referred to as "tailored" thermal expansion since the embodiments of systems and methods disclosed herein can be used to manufacture materials with a thermal expansion coefficient within a predetermined range, at a target, or at a target with a tolerance, and further, can be used to manufacture materials with thermal expansion in a predetermined direction(s) or within a predetermined ranges of degrees relative to a direction.

While most materials contract with decreasing temperature and expand with an increase in thermal temperature, some materials contract with increasing temperature. However, this behavior is usually limited to a certain temperature range or to materials that may not be suitable for a wide range of applications. This contraction upon heating is termed negative thermal expansion (NTE), whereas expansion upon heating is termed positive thermal expansion (PTE). In general, the sign of the coefficient of thermal expansion, positive or negative, indicates whether the thermal expansion is negative or positive, respectively. The terms coefficient of thermal expansion and negative thermal expansion may be used interchangeably herein, it being understood that negative thermal expansion means that the material has a negative coefficient of thermal expansion. Conventionally, a low thermal expansion material such as Invar alloy ($Fe_{64}Ni_{36}$) may be used when negative thermal expansion properties are desired for a particular application. Invar, also known generically as $FeNi_{36}$ ($_{64}FeNi$ in the U.S.), is a nickel-iron alloy notable for its uniquely low coefficient of thermal expansion (CTE or $\alpha$). The name Invar comes from the word invariable, referring to its relative lack of expansion or contraction with temperature changes. Various grades of Invar may have negative thermal expansion properties near room temperature; $<2\times10^{-6}$ $K^{-1}$ as compared to other metallic materials which are closer to $10\text{-}20\times10^{-6}$ $K^{-1}$. However, this negative thermal expansion only occurs over a relatively small temperature range, and further, Invar may have a propensity to creep. Conventionally, ceramic materials may be used if negative thermal expansion is desired for an application. However, these materials typically cannot be used in applications with tension and compression stresses comparable to what a metallic material can withstand, nor in the same extreme conditions as a metallic material.

Embodiments of systems and methods described herein are used to produce metallic materials that, alone or as part of a composite, have tailored thermal expansion properties. More specifically, the material type, composition, phase, processing, or combinations thereof are considered and used in concert to produce a metallic material having a predetermined coefficient of thermal expansion that can be negative or positive. In addition, the direction (in three dimensional space) and extent (degree) of the positive or negative coefficient of thermal expansion are tailored. Although negative thermal expansion is predominantly discussed herein, embodiments of the systems and methods disclosed herein can also be used to tailor positive thermal expansion.

Present Invention Thermal Characteristics

In embodiments described herein, variable thermal expansion properties are obtained from various metallic alloys through processing techniques such as cold rolling, wire drawing, extrusion, tensile loading and several other thermo-mechanical processing techniques. The mechanism responsible for these unique linear thermal expansion properties is different from traditional Invar alloys and can be tailored to a specific application. In general, the linear thermal expansion properties can be varied between extremely negative and extremely positive values, for example, anywhere between $-150\times10^{-6}$ $K^{-1}$ and $+500\times10^{-6}$ $K^{-1}$, by selecting the suitable alloy composition and processing route. By comparison, mild steel has a thermal expansion of $+12\times10^{6}K^{-1}$.

Product-By-Process Material Exemplary Applications

The unique materials and processing routes disclosed herein allow for new solutions to various engineering problems such as thermal mismatch between silicon chips and packaging in the electronics industry, interconnect failures, mitigation of thermal sagging in overhead power transmission lines, solar panel failures, pipes, plumbing, chemical processing hardware, and thermal expansion valves in various applications including aerospace. In addition, the methods disclosed herein can be used to tailor the coefficient of thermal expansion to be 0 or negative for support cabling as well as pipe couplings and seals for aero, oil and gas, other extreme environments, satellite applications, electronics where there are interconnects, solar panels, power transmission lines, and switches.

Material Application Contexts

In general, embodiments described herein can be applied to alloys that undergo a martensitic transformation such as Fe-, Cu-, Ni-, Ti-, Pd-, Pt-, Mn-, Au-, and Co-based alloys, which have various densities and magnetic, thermal, mechanical, and electrical properties. This allows extreme flexibility in developing tailored thermal expansion alloys for a specific application and at a reduced cost. The alloys processed in accordance with embodiments described herein to tailor their thermal expansion properties are commercially available, or can easily be fabricated with classical metallurgical techniques, as are the processing techniques with respect to the hot and cold-forming deformation discussed herein. It should also be appreciated that methods described herein can also be used to recover/repurpose secondary material, which may have conventionally been sold at a reduced price or even at a loss to the manufacturer. In one embodiment, shape-memory alloys (SMAs) can be processed as described herein to exhibit negative thermal expansion properties.

The present invention techniques described herein, which enable the tailored thermal expansion properties, is believed to occur in all martensitic SMAs, and has been demonstrated and verified in a variety of metallic materials including NiTi, NiTiPd, NiTiPt, NiMnGa, NiCoMnIn, CoNiGa and FeNiCoAlTa SMAs. These materials represent a variety of element types and crystal structures, which indicates that this is a universal principle of materials that undergo martensitic transformation. Listed below are a variety of materials that undergo martensitic transformation and materials that show martensitic transformation that are considered to have anisotropic thermal expansion properties: $Ti_{100-A}X_A$ (X=at least one of Ni, Nb, Mo, Ta, Pd, Pt, or combinations thereof) (A=0 to 75 atomic percent composition), $Ti_{100-A-B}Ni_AX_B$ (X=at least one of Pd, Hf, Zr, Al, Pt, Au, Fe, Co, Cr, Mo, V, O or combinations thereof) (A=0 to 55 atomic percent composition and B=0 to 75 atomic percent composition such that A+B<100), $Ti_{100-A-B}Nb_AX_B$ (X=at least one of Al, Sn, Ta, Hf, Zr, Al, Au, Pt, Fe, Co, Cr, Mo, V, O, or combinations thereof) (A=0 to 55 atomic percent composition and B=0 to 75 atomic percent composition such that A+B<100), $Ti_{100-A-B}Ta_AX_B$ (X=at least one of Al, Sn, Nb, Zr, Mo, Al, Au, Pt, Fe, Co, Cr, Hf, V, O, or combinations thereof) (A=0 to 55 atomic percent composition and B=0 to 75 atomic percent composition such that A+B<100), $Ni_{100-A-B}Mn_AX_B$ (X=at least one of Ga, In, Sn, Al, Sb, Co, or combinations thereof) (A=0 to 50 atomic percent composition and B=0 to 50 atomic percent composition such that A+B<100), $Ni_{100-A-B-C}Mn_ACo_BX_C$ (X=at least one of Ga, In, Sn, Al, Sb, or combinations thereof) (A=0 to 50 atomic percent composition, B=0 to 50 atomic percent composition, and C=0 to 50 atomic percent composition such that A+B+C<100), $Ni_{100-A-B}Fe_AGa_B$ (A=0 to 50 atomic percent composition and B=0 to 50 atomic percent composition such that A+B<100), $Cu_{100-A}X_A$ (X=at least one of Zn, Ni, Mn, Al, Be, or combinations thereof) (A=0 to 75 atomic percent composition), $Cu_{100-A-B}Al_AX_B$ (X=at least one of Zn, Ni, Mn, Be, or combinations thereof) (A=0 to 50 atomic percent composition and B=0 to 50 atomic percent composition such that A+B<100), $Cu_{100-A-B-C}Mn_AAl_BX_C$ (X=at least one of Zn, Ni, Be, or combinations thereof) (A=0 to 50 atomic percent composition, B=0 to 50 atomic percent composition, and C=0 to 50 atomic percent composition such that A+B+C<100), $Co_{100-A-B}Ni_AX_B$ (X=at least one of Al, Ga, Sn, Sb, In, or combinations thereof) (A=0 to 50 atomic percent composition and B=0 to 50 atomic percent composition such that A+B<100), $Fe_{100-A-B}Mn_AX_B$ (X=at least one of Ga, Ni, Co, Al, Ta, Si, or combinations thereof) (A=0 to 50 atomic percent composition and B=0 to 50 atomic percent composition such that A+B<100), $Fe_{100-A-B}Ni_AX_B$ (X=at least one of Ga, Mn, Co, Al, Ta, Si, or combinations thereof) (A=0 to 50 atomic percent composition and B=0 to 50 atomic percent composition such that A+B<100), $Fe_{100-A-B-C}Ni_ACo_BAl_CX_D$ (X=at least one of Ti, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), $Fe_{100-A-B-C}Ni_ACo_BTi_CX_D$ (X=at least one of Al, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100) and combinations thereof.

Exemplary Thermal Coefficient Values

Embodiments of systems and methods disclosed herein utilize some conventional equipment and techniques but in such a way to tailor and expand the range of temperature where tailored and negative thermal expansion occurs in metallic materials other than Invar. Such negative (or positive) thermal expansion properties can be customized and tailored to a predetermined range, target, tolerance target, and direction(s) based upon the method of deformation used and, in some cases, the type of alloy or composite used. This range may be extremely negative, for example, as low as $-150\times10^{-6}$ $K^{-1}$, zero, at or about zero, or extremely positive, for example, as high as $500\times10^{-6}$ $K^{-1}$. In one embodiment, for some applications where two dissimilar materials are structurally connected, it may be desirable to tailor the thermal expansion of one to match the other, even though CTE can be still high positive. It may be desirable to mitigate thermal expansion mismatch by tailoring TE instead of having zero or negative thermal expansion. The temperature range of negative TE, zero TE and tailorable TE may be determined by the austenite to martensite phase transformation temperature of any given material. If this transformation temperature is for example 500° C., then negative TE, zero TE and tailorable TE could be observed from this temperature down to very low temperatures below zero.

Tailoring Composite Materials

As discussed herein, a composite material is one where at least one material capable of a martensitic transformation is embedded in another metal that may or may not be capable of the martensitic transformation, or a ceramic, or a polymer. This mechanism used for tailoring thermal expansion may be explained in a variety of ways as discussed below, including that the martensitic transformation may have previously been difficult to achieve because that mechanism was in competition with dislocation plasticity in the first phase. However, in the systems and methods disclosed herein, the transformation may be more easily achieved if the alloy is strengthened against dislocation plasticity through classical strengthening mechanisms including precipitation hardening, solid solution hardening, dispersion hardening, and grain size refinement. As discussed herein, a composite material may also be a material where at least one material capable of a martensitic transformation, a metal that may or may not be capable of the martensitic transformation, a ceramic, or a polymer, is embedded in a material that has tailored thermal expansion and/or is capable of undergoing a martensitic transformation whether or not it has undergone that transformation when the second material is embedded.

As such, a composite material may broadly be defined as one where at least one of the materials is a metal capable of tailored thermal expansion via martensitic transformation or textured martensite. The goal of this configuration is to impose tailored thermal expansion characteristics to on materials that are incapable of tailored thermal expansion.

Directional Thermal Coefficient Tailoring

By varying the tailored thermal expansion directions, one can obtain very large, very small or zero thermal expansion is specific directions. It is also possible to create composite materials that deform in a pre-determined fashion, such as bending and rotation, by combining PTE and NTE materials in a specific configuration. In one example, the resulting actuators formed from this material would work in a similar fashion to bi-metallic strips that bend when heated due to varying positive thermal expansion coefficients, but the range of deformation possible with our materials would be much larger due to the very large range between PTE and NTE that can be obtained in our materials.

Tailoring Processes

Several processing routes are disclosed to obtain tailored thermal expansion properties in bulk materials, but each generally relies on the fundamental principle of texturing (also referred to as orientating, re-orienting, and de-twinning) the martensitic phase in at least one direction. The bulk material will then have an anisotropic thermal expansion response that is the sum of the various oriented crystallites. The processing techniques include, without limitation:
 rolling;
 wire drawing;
 conventional extrusion;
 equal channel angular extrusion;
 precipitation heat treatments under stress;
 monotonic tension/compression processing;
 cyclic thermal training under stress (subsequently referred to as SMA training);
as well as other thermo-mechanical methods of deformation. Deformation techniques may also include:
 hot-rolling;
 cold-rolling;
 plain strain compression;
 bi-axial tension;
 conform processing;
 bending;
 drawing;
 swaging;
 annealing;
 sintering;
 monotonic tension processing;
 monotonic compression processing;
 monotonic torsion processing;
 cyclic thermal training under stress; and
 combinations thereof.

Phase Transformations

While in some embodiments, a first phase, such as austenite, is transformed in whole or in part to martensite, and therefore materials capable of this transformation would be selected for deformation to achieve a tailored thermal expansion coefficient and direction. In other embodiments, the material is already in a martensitic phase, and thus, no austenite to martensite transformation occurs.

Formation Techniques

By applying these processing techniques at various temperatures, one can obtain desired macroscopic thermal expansion properties. Rolling, wire drawing, and conventional extrusion are very common techniques for metal forming. They rely on plastic deformation by forcing the material through consecutively smaller gaps which usually result in highly textured materials. For example, a very strong [111] texture can be created by extruding or wire drawing a BCC alloy. While known deformation methods may be discussed herein, the use of those methods/techniques to orient/texture martensite variants purely for the purpose of obtaining a pre-determined (tailored) negative thermal expansion is new.

Less common techniques that can be used to texture martensite through plastic deformation are equal-channel-angular extrusion and monotonic tension/compression. For equal-channel-angular extrusion, a metal billet is forced through a 90 degree bend which aligns martensite grains. The advantage to this technique is the material's cross-sectional area is not changed after processing. Monotonic tension or compression involves applying tension or compression forces in a single direction to orient martensite variants SMA training forces an oriented martensite structure to be formed upon transformation, and involves holding a sample under constant load and heating/cooling across the martensitic transformation temperatures. This forces small amounts of plastic deformation that favor martensite orientation and can produce a tailored thermal expansion.

In precipitation heat treatments, a material under a load is heated to temperatures sufficient to precipitate small secondary phases that stress the material after cooling. The load orients the precipitates while they are forming. They will in turn orient martensite with the oriented stresses created during cooling.

Thermal Expansion (0100)-(0300)

Figure 3:
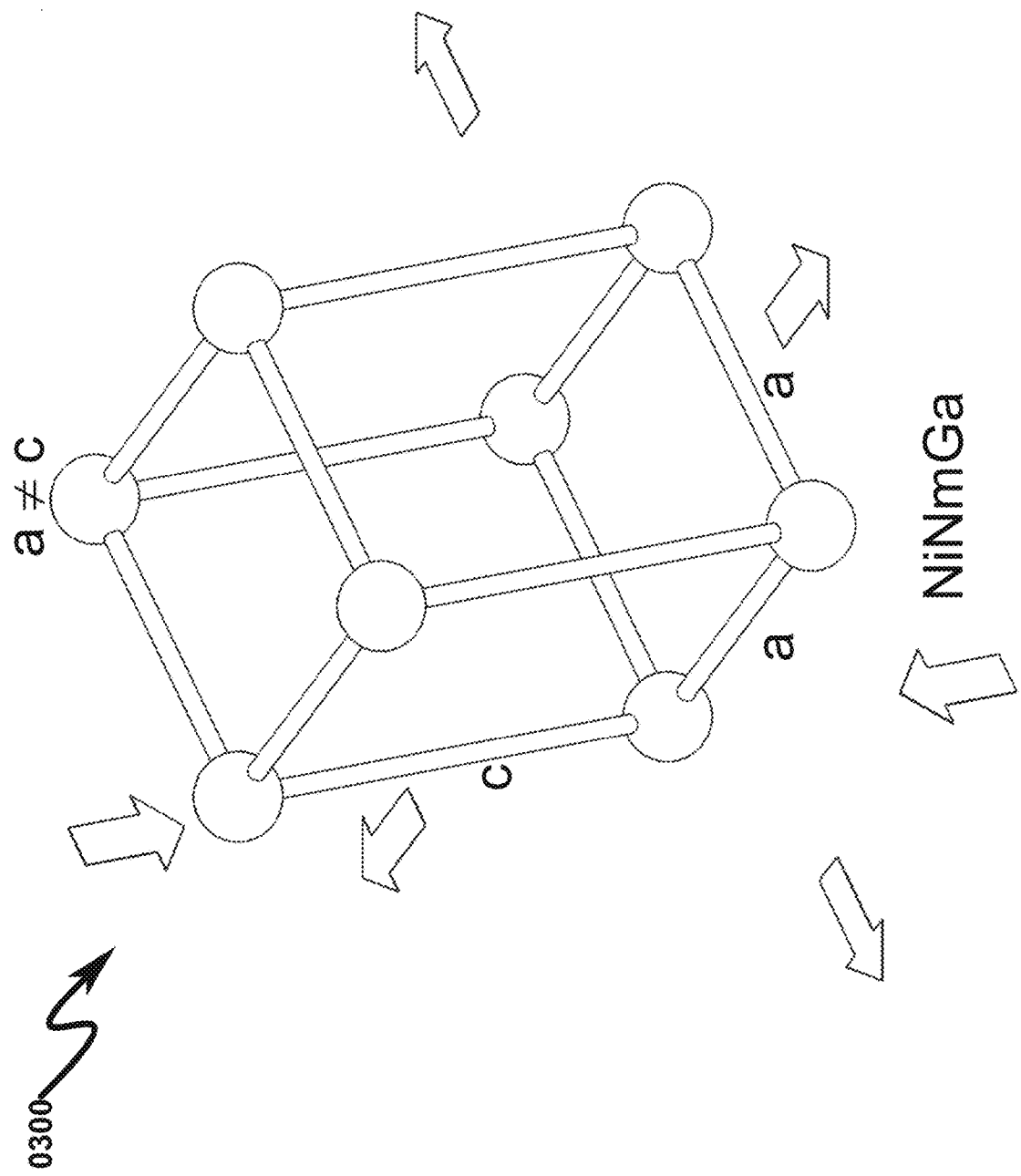
FIG. 3 illustrates a schematic three-dimensional view illustrating the thermal expansion of tetragonal lattice structures according to embodiments of the disclosure.

FIG. 1 (0100)-FIG. 3 (0300) depict the thermal expansion for different lattice structures. FIG. 1 (0100)-FIG. 3 (0300) are schematic three-dimensional views illustrating the thermal expansion in the martensite of different monoclinic NiTi, orthorhombic NiTiPd and tetragonal CoNiGa. FIG. 1 (0100) displays the thermal expansion directions along the martensite's different crystallographic directions determined from neutron diffraction for NiTi. FIG. 1 (0100) illustrates three sides of the structure a, b, and c which also indicate and may be referred to as directions a, b, and c. The arrows show that thermal expansion occurs along the b and c directions while contraction occurs along the a-direction. The underlying mechanism for this anisotropy was not previously understood, but an anisotropic statistical thermodynamics based model can predict these directions for various shape memory alloys.

The traditional SMA NiTi has also shown that the low symmetry monoclinic martensitic phase has a large linear NTE along the a-axis and positive thermal expansion (PTE) along the b-axis and c-axis in a 40 K range from known neutron diffraction data that directly examine the plane spacing of the B19' (monoclinic) structure. The thermal expansion tensor determined from this is:

$$\varepsilon = \begin{bmatrix} -47.2 & 0 & 29 \\ 0 & 43.8 & 0 \\ 29 & 0 & 22.7 \end{bmatrix} \times 10^{-6} \frac{1}{K} \quad (1)$$

This result shows that NTE and PTE anisotropy is not limited only to alpha Uranium in metals. It is also important to note the large magnitude of these thermal expansion values. In comparison, mild steel has a thermal expansion coefficient ~$12 \times 10^{-6}$ $K^{-1}$ in the same temperature range. FIG. 1 (0100) gives a graphic representation of the strain directions during heating as they relate to the martensite's monoclinic unit cell as determined from known neutron diffraction data. By taking the Eigen values and vectors of the thermal expansion matrix, the principle expansion magnitudes and directions can be obtained:

$$\text{eigen\_value}(\varepsilon) = \begin{bmatrix} -57.7 & 0 & 0 \\ 0 & 43.8 & 0 \\ 0 & 0 & 33.2 \end{bmatrix} \times 10^{-6} \frac{1}{K} \quad (2)$$

$$\text{eigen\_vector}(\varepsilon) = \begin{bmatrix} -0.94 & 0 & -0.34 \\ 0 & 1 & 0 \\ 0.34 & 0 & -0.94 \end{bmatrix} \quad (3)$$

This shows that the maximum linear NTE that can be obtained in martensitic NiTi is $-57.7 \times 10^{-6}$ $K^{-1}$ and the maximum PTE is $43.8 \times 10^{-6}$ $K^{-1}$. By taking the trace of the Eigen thermal expansion tensor, a positive volumetric expansion of $19.3 \times 10^{-6}$ $K^{-1}$ was obtained which shows that while there is contraction in one direction, there is an overall volumetric expansion of the martensite with increasing temperature. The Eigen vectors show that only a small counter clockwise rotation about the b axis is required to obtain the principle thermal expansions.

While the thermal expansion anisotropy provides the potential for NTE materials, randomly oriented variants do not provide macroscopic NTE. To observe this behavior, the trace of the principle thermal expansion tensor must be negative. This behavior has not been observed in any of the alloys explored in this work. As a result, special processing is necessary to observe tailored thermal expansion properties at the macroscopic level.

Alloy Variants

The methods and systems disclosed herein may be utilized on alloys including Fe- and Co-based alloys, Ni-based alloy, shape-memory alloys, and pure materials such as pure Uranium. While in the low temperature martensite phase, the high temperature austenite phase is constantly sampled by random thermal fluctuations. This is similar to the well-established idea that a liquid phase will sample its crystalline form due to random thermal fluctuations, but this sample is quickly destroyed by other random thermal fluctuations. The sampling rate is dependent upon the free energy difference between the two phases and the temperature at which the sampling is taking place. The free energy difference can be thought of the activation energy for sampling while heat is the energy available for sampling. The sampling will then be a random process that can be described by a probability function:

$$f^A = Be^{\frac{-\Delta G^{M \to A}}{RT}} \quad (4)$$

where $f^A$ is the probability of sampling austenite while in the low temperature martensite state where B is a scaling factor, R is the ideal gas constant, T is temperature and $\Delta G^{M \to A}$ is the temperature dependent difference in free energy between the martensite and austenite phases.

The statistical thermodynamic model for anisotropic material is derived from a conventional thermodynamic model for isotropic behavior that describes isotropic negative thermal expansion. However, instead of isotropic volume and generic phases that may or may not be austenite and martensite, the proposed model uses a lattice parameter tensor, $a_{ij}$, and austenite and martensite crystal lattices as described below to understand the anisotropic nature of the thermal expansion. Stated differently, the formula conventionally applied to isotropic materials is applied to anisotropic material:

$$\varepsilon_{ij} a_{ij}(T) = \varepsilon_{ij}^M a_{ij}^M(T) + f^A [R_{ij}^{A \to M} \varepsilon_{ij}^A a_{ij}^A(T) - \varepsilon_{ij}^A a_{ij}^A(T)] + \\ \frac{\partial f^A}{\partial T} [R_{ij}^{A \to M} \varepsilon_{ij}^A a_{ij}^A(T) - \varepsilon_{ij}^A a_{ij}^A(T)] \quad (5)$$

where M designates martensite, A designates austenite, $f^A$ is the probability function defined as above, $\varepsilon_{ij}$ is the tensor describing lattice parameters, is the thermal expansion tensor and $R_{ij}^{A \to M}$ is a rotation matrix that maps vectors from the austenite to the martensite lattice. The function $f^A$ is the probability of sampling austenite while in the low temperature martensite state where B is a scaling factor, R is the ideal gas constant, T is temperature, and $\Delta G^{M \to A}$ is the temperature dependent difference in free energy between the martensite and austenite phases. As such, this thermodynamic model has been expanded from the previous work to include anisotropy. This model states that deviation from the martensite phase's thermal response, $\varepsilon_{ij}^M a_{ij}^M(T)$, can be obtained by sampling the high temperature phase with a probability of $f^A$. NTE is obtained along crystallographic directions where the austenite lattice is shorter than the martensite lattice and vice versa. This framework has successfully predicted the thermal expansion anisotropy of six SMAs and pure Uranium by comparing austenite and martensite lattice parameters.

Figure 2:
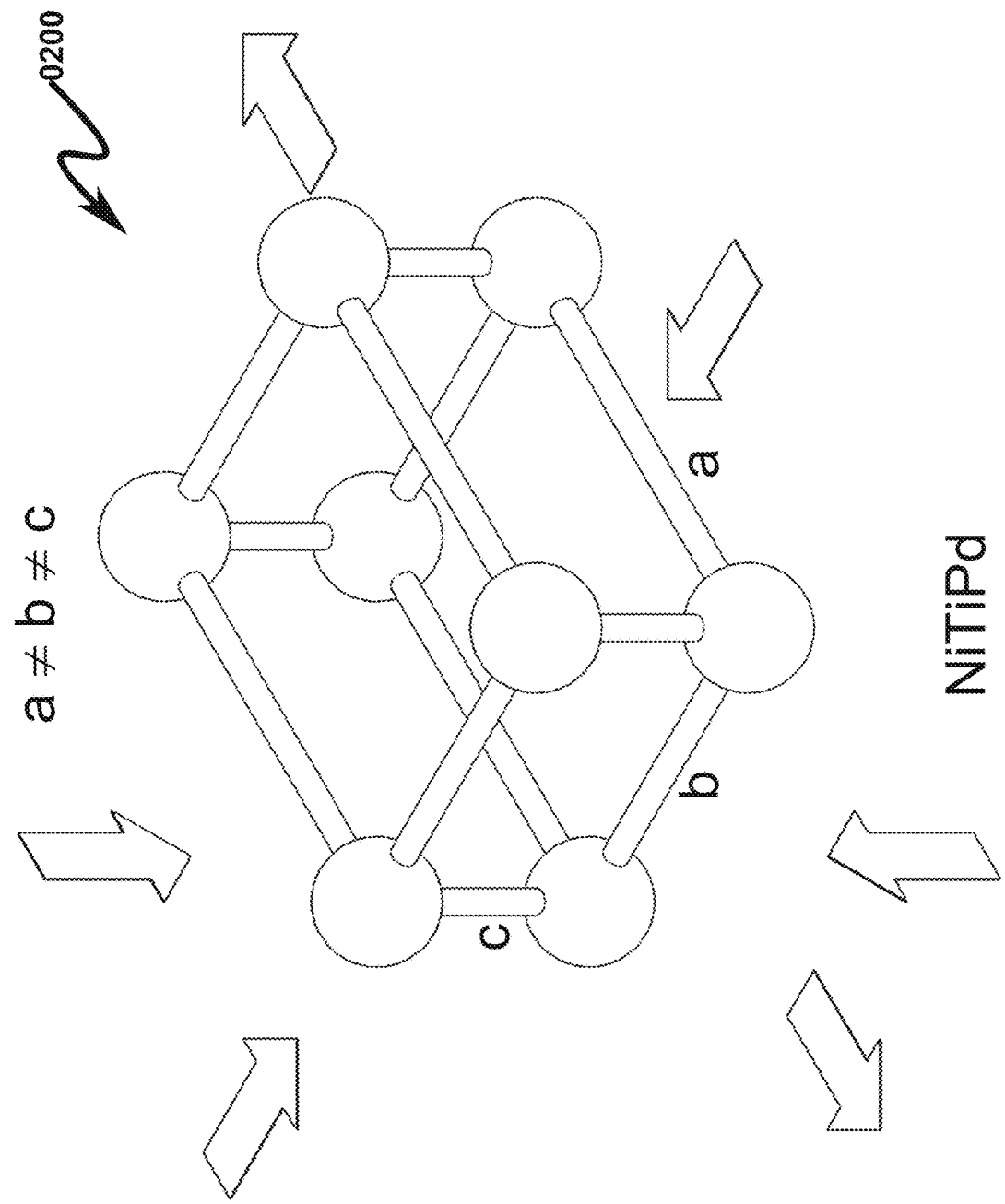
FIG. 2 illustrates a schematic three-dimensional view illustrating the thermal expansion of orthorhombic lattice structures according to embodiments of the disclosure.

FIG. 2 (0200) illustrates the direction of thermal expansion in NiTiPd where the crystal structure has three sides (a, b, and c). As such, the thermal expansion in the directions a, b, and c are not equal.

FIG. 3 (0300) illustrates the CoNiGa structure which has two equal sides (a and b) which are not equal to side c, and the resultant directions of thermal expansion may follow accordingly. Previously, as discussed above, this type of anisotropy had only been found in Uranium and NiTi. Using the systems and methods disclosed herein, anisotropy may also be seen in a plurality of metallic materials that undergo a martensitic transformation.

Martensitic Phase (0400)

The martensitic phase may be oriented or texturized to have an anisotropic thermal expansion response that is the sum of the various oriented crystals. Depending upon the material used, this texturizing may be in various directions and may be in whole or in part. In various embodiments, the textured direction may be, for example, [111], [001], or [010].

Figure 4:
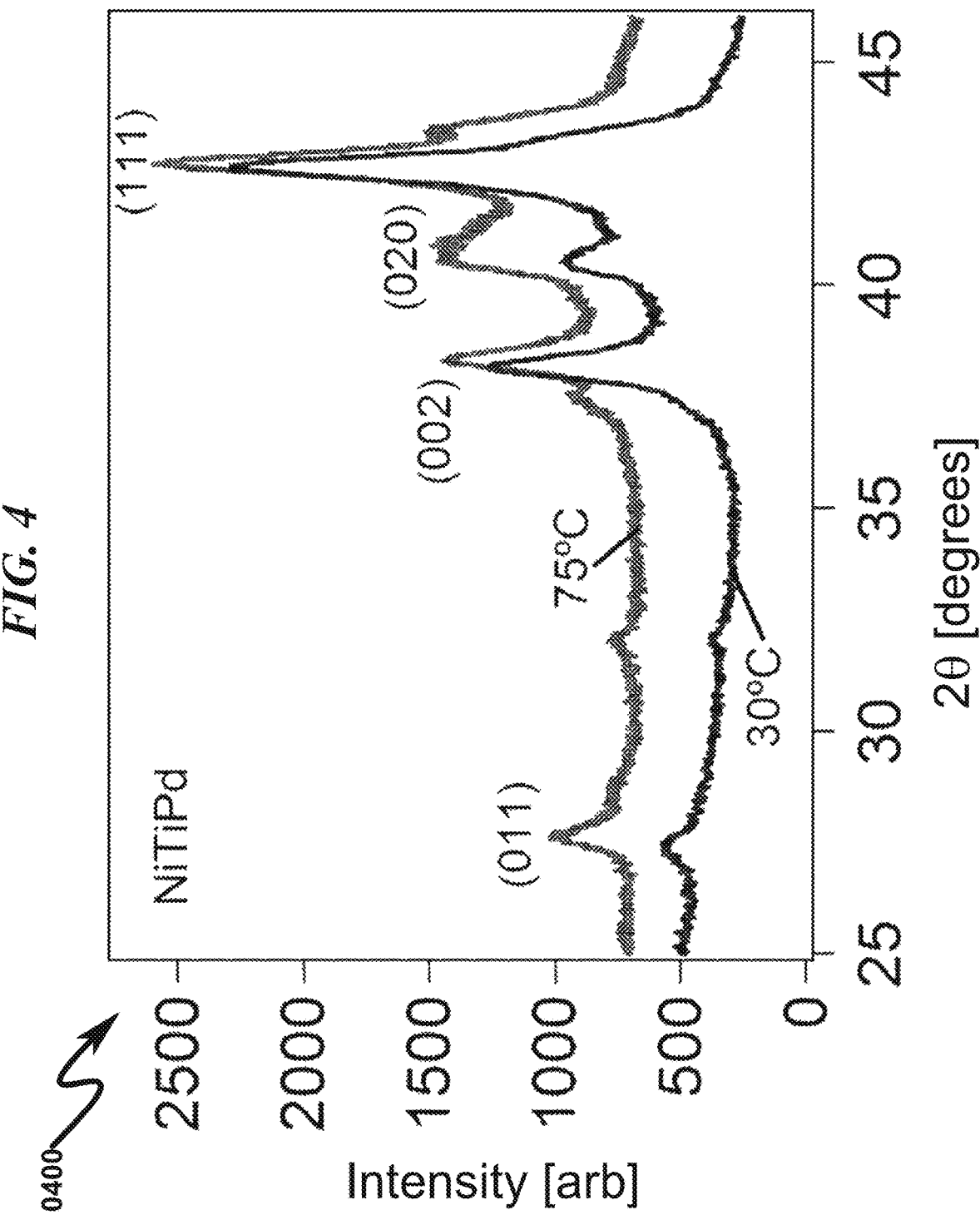
FIG. 4 illustrates a graphical illustration of an x-ray diffraction patterns of an alloy system in a martensitic phase taken at various temperatures according to embodiments of the disclosure.

FIG. 4 (0400) depicts a graphical illustration of x-ray diffraction patterns take at 30° C. and 75° C. of the NiTiPd alloy system in a martensitic phase. FIG. 4 (0400) displays diffraction data for a sample of material that is in the martensitic phase, taken from an X-Ray diffractometer using Cu K-a radiation with a constant wavelength λ=1.5418 Å. Each peak in intensity signifies a lattice plane in the martensitic NiTiPd specimen. The peak locations (2θ) allow determination of the lattice spacing using Bragg's law as defined by the equation:

$$d = \frac{n\lambda}{2\sin\theta} \quad (6)$$

where d is the lattice spacing, λ is the radiation wavelength, θ is the angle between the radiation source and the lattice planes (taken from the peak location in FIG. 4 (0400)), and n is an integer. It is important to note that the angle θ and thus the d value does not depend on the sample's orientation in 3-D space. The peak locations shift with temperature, and thus, the thermal expansion coefficients can be calculated from these diffraction results. This is true for all diffraction techniques, such as high energy x-ray, electron and neutron diffraction, that measure lattice spacing.

While the peak locations indicate the lattice planar spacing, the peak intensity, or height, indicates the number of planes oriented in a particular direction within the sample. This intensity is then used to determine texture; the orientation of martensite variants, or crystallites, within the sample.

Calculating Coefficients of Thermal Expansion (0500)-(0600)

To determine the thermal expansion along different crystallographic directions, diffraction patterns were taken between 30° C. and 100° C., as an example, and the lattice strain defined as:

$$\varepsilon_{lattice} = \frac{d_{T>30° C.} - d_{T=30° C.}}{d_{T=30° C.}} \quad (7)$$

where $d_{T>30° C.}$ is the lattice spacing at temperatures above 30° C., $d_{T=30° C.}$ is the original lattice spacing at 30° C. It should be noted that these diffraction test were conducted under 0 MPa.

Figure 5:
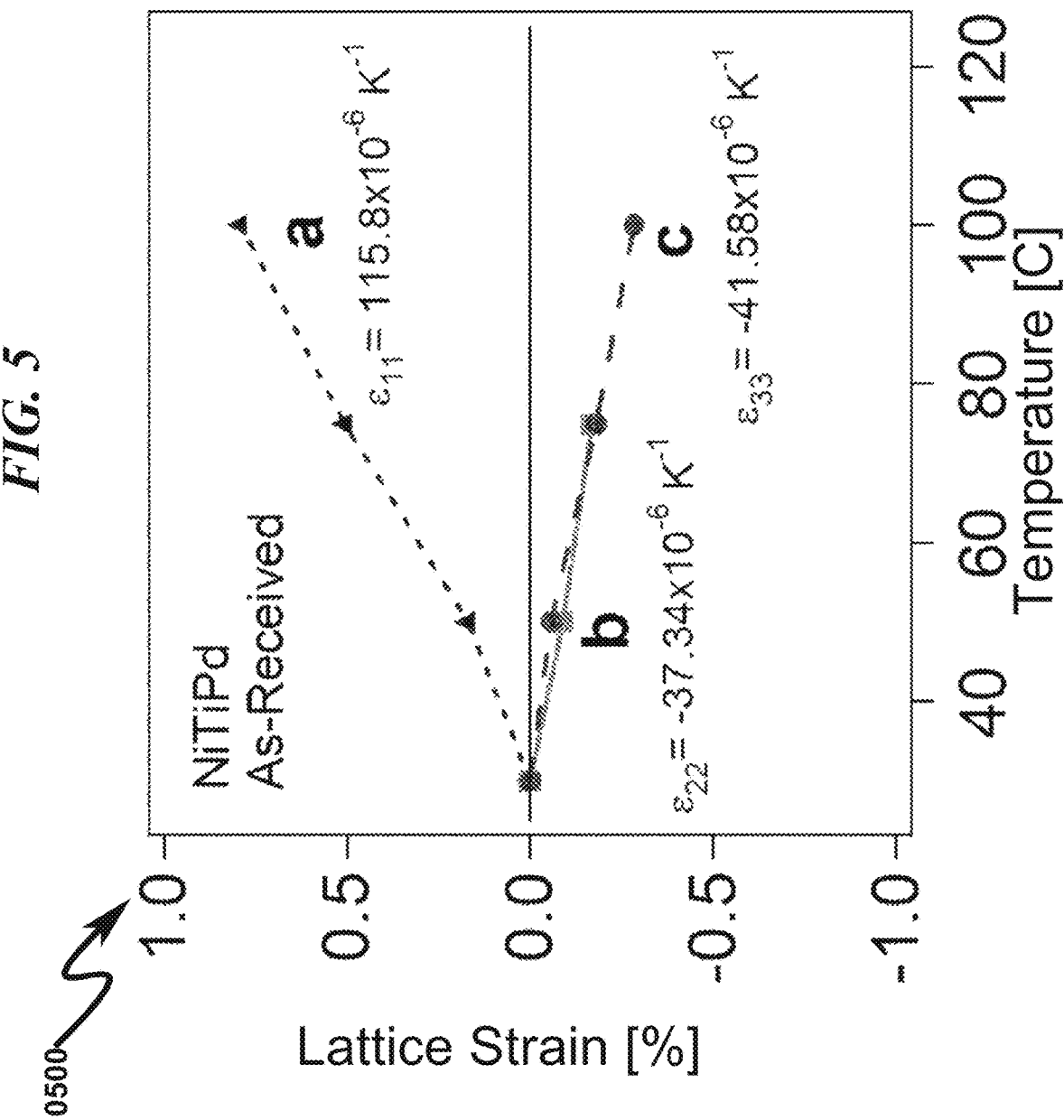
FIG. 5 illustrates the thermally induced lattice strain calculated using x-ray diffraction under 0 MPa according to embodiments of the disclosure.

FIG. 5 (0500) shows the thermally induced lattice strain calculated using x-ray diffraction under 0 MPa. More specifically, FIG. 5 (0500) shows the thermally induced lattice strain of the NiTiPd calculated using x-ray diffraction similar to FIG. 4 (0400) under 0 MPa.

FIG. 5 (0500) displays a lattice strain vs. temperature plot for martensite lattice parameters a, b and c and austenite lattice parameter ao calculated using the lattice spacing determined from diffraction results. Please note that the a, b and c lattice parameters correspond to the [100], [010] and [001] crystallographic directions in the crystal lattice of martensite, respectively. It is clearly evident that the [100] (a) direction expands greatly while the [010] and [001] (b) and (c) directions contract showing the thermal expansion anisotropy of this material. The thermal expansion matrix $(e_{ij})$ for the material between 30° C. and 100° C. is given by:

$$(e_{ij})_{NiTiPd} = \begin{bmatrix} \varepsilon_a & 0 & 0 \\ 0 & \varepsilon_b & 0 \\ 0 & 0 & \varepsilon_c \end{bmatrix} \quad (8)$$

$$= \begin{bmatrix} 115.8 & 0 & 0 \\ 0 & -37.34 & 0 \\ 0 & 0 & -41.58 \end{bmatrix} \times 10^{-6} \frac{1}{K}$$

where $\varepsilon_a$, $\varepsilon_b$, and $\varepsilon_c$ are the thermal expansion coefficients for the [100], [010] and [001] directions, respectively. Note the negative thermal expansion in the two directions.

Figure 6:
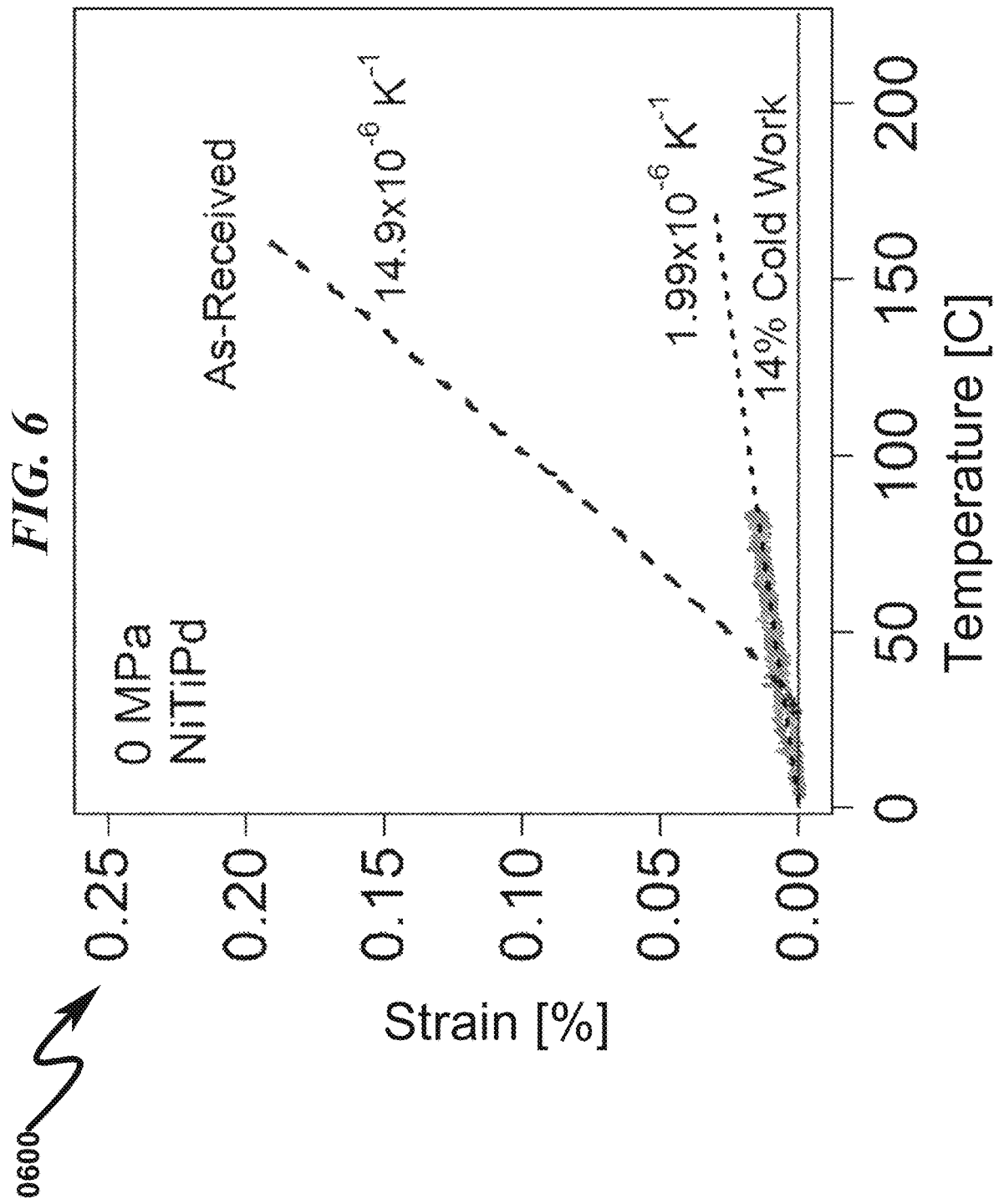
FIG. 6 illustrates a graphical illustration of macroscopic strain vs temperature and the corresponding thermal expansion of an unprocessed, 14% cold rolled, SMA trained and 200 MPa loaded NiTiPd material according to embodiments of the disclosure.

FIG. 6 (0600) is a graphical illustration of macroscopic strain vs. temperature and the corresponding thermal expansion of an unprocessed, 14% cold rolled, SMA trained, and 200 MPa loaded NiTiPd material. Interestingly, the unprocessed (as-received) thermal expansion is positive at 14.9× $10^{-6}$ $K^{-1}$ (also expressed as 1/K) which is similar to the ~12×$10^{-6}$ $K^{-1}$ thermal expansion shown by mild steel. It is appreciated that "as-received material" as used herein refers to material that has been formed but not further thermo-mechanically processed. This is explained by a randomly oriented martensite crystal structure. When the material is loaded to 200 MPa, the load orients martensite and a −4.69×$10^{-6}$ $K^{-1}$ NTE is observed. This proves that a tailored thermal expansion can be sustained under external loads. After 200 SMA training cycles, the material exhibits a −7.3×$10^{-6}$ $K^{-1}$ NTE when tested under 0 MPa showing the NTE stability after a biased load is removed. Rolling to 14% did not produce a negative thermal expansion, but a drastic reduction to 1.99×$10^{-6}$ $K^{-1}$ was achieved. It is appreciated that this response is better than super Invar alloy which has a thermal expansion coefficient of 2.3×$10^{-6}$ $K^{-1}$.

To perform texture analysis, one may focus on a single peak and see how its intensity changes as the sample is rotated in three dimensions. Since the sample is at room temperature during the analysis, the peak location does not change. FIG. 4 (0400) displays the as-received texture of the NiTiPd sample using the [111] and [002] peaks. It is important to collect data on at least two peaks in order to successfully check the orientation of the crystal lattice inside the sample. The hotter colors in the image correspond to greater peak intensity. This data suggests that the [111] planes and [002] planes are perpendicularly spread between the transverse direction (TD) and normal direction (ND). The ND is not labeled but is the direction coming out of the page. While tension and compression as well as an embedded matrix embodiment are discussed herein, a variety of thermo-mechanical processes can be used alone or in combination to generate the phase transformation to martensite, or that material already in the martensitic phase may be textured (oriented) in order to generate the tailored thermal expansion coefficient and the directionality of that thermal expansion.

Monotonic Tension Processing (0700)-(0900)

Figure 7:
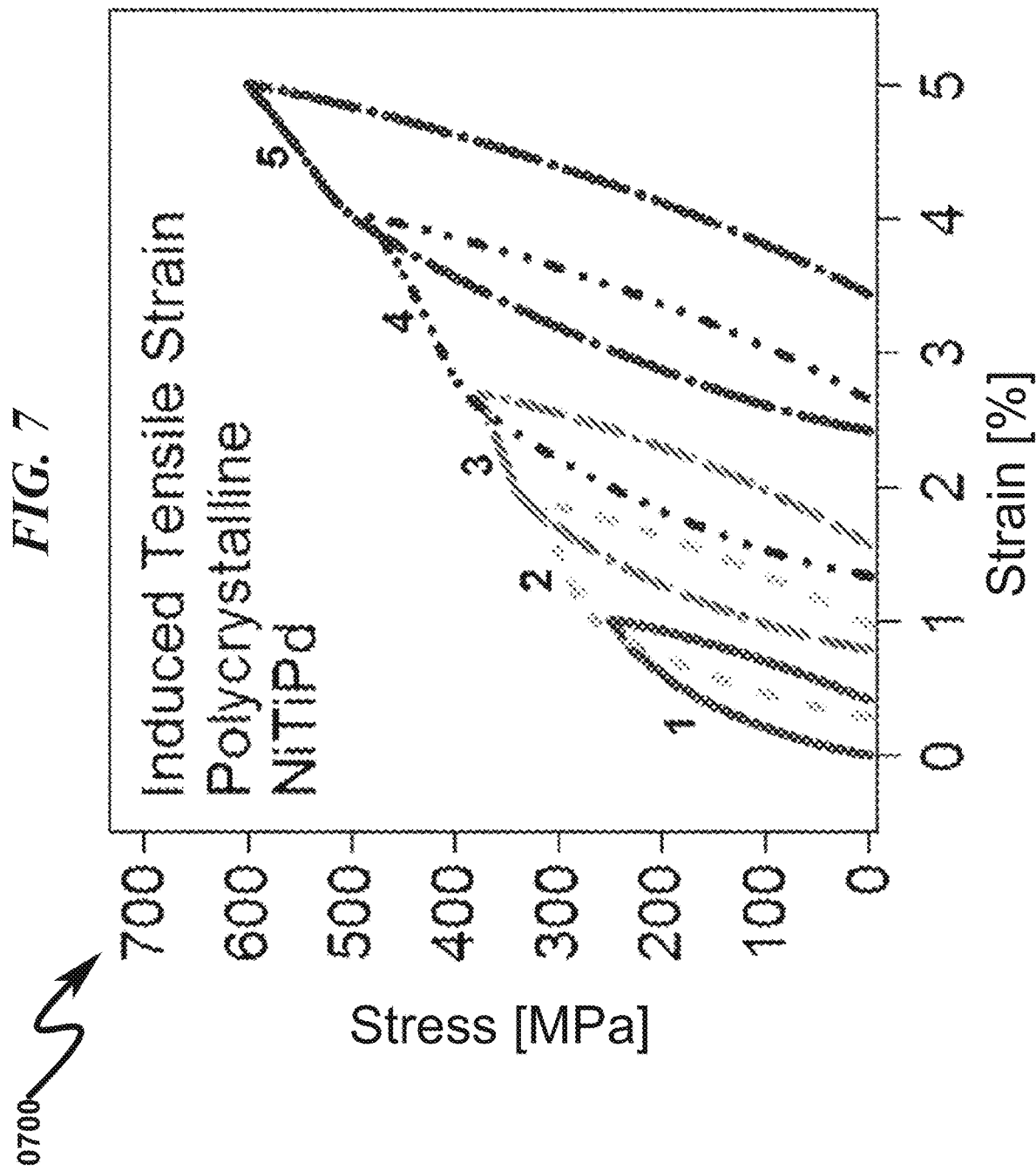
FIG. 7 illustrates a graphical illustration of a monotonic tension processing scheme for NiTiPd according to embodiments of the disclosure.
Figure 8:
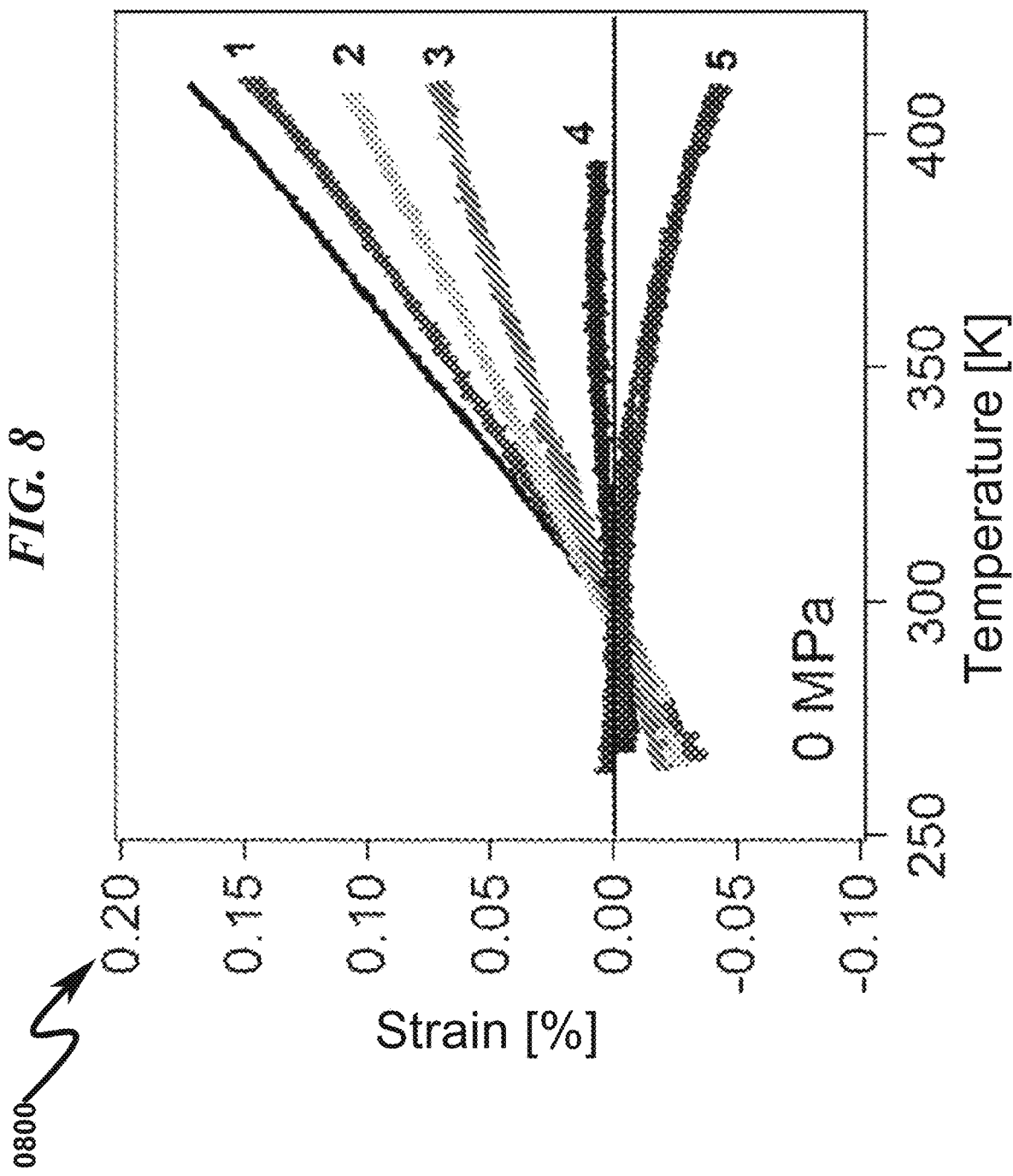
FIG. 8 illustrates a graphical illustration of a monotonic tension processing scheme for NiTiPd according to embodiments of the disclosure.
Figure 9:
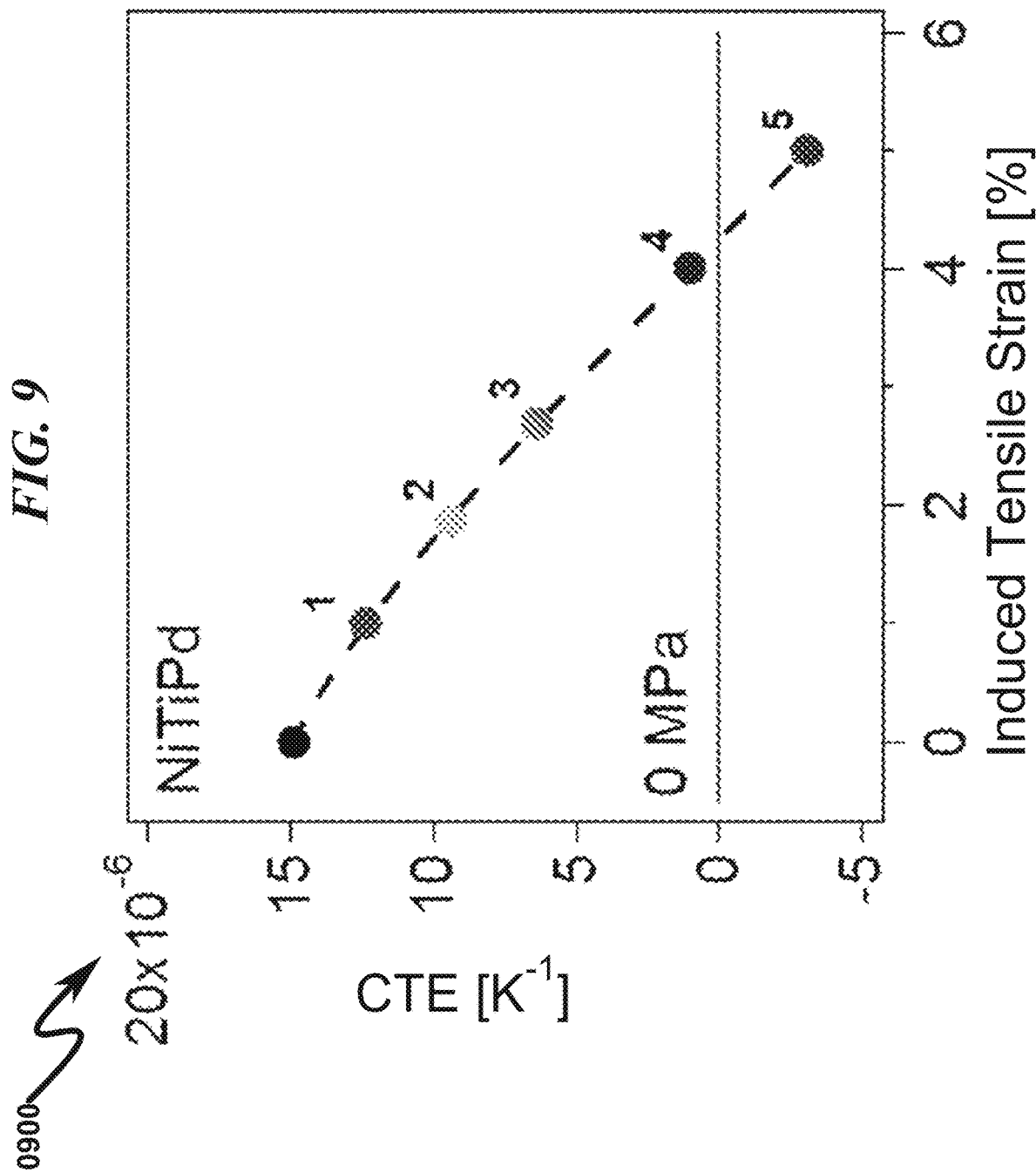
FIG. 9 illustrates a graphical illustration of a resulting thermal expansion responses for NiTiPd according to embodiments of the disclosure.

FIG. 7 (0700)-FIG. 9 (0900) illustrate the results of a monotonic tension processing scheme and resulting thermal expansion responses. It is appreciated that these figures are provided for illustration as to the mechanism is not limited to the martensitic NiTiPd alloy used in the illustrations. FIG. 7 (0700)-FIG. 9 (0900) illustrate the mechanism as it occurs under tension, the mechanism as it occurs under cold-rolling is discussed below in FIG. 10 (1000)-FIG. 13 (1300). FIG. 7 (0700) illustrates the stress-strain curve for incrementally tensile-processed sample where the sample was put under a tensile load that was incrementally increased. FIG. 8 (0800) illustrates the heating-cooling response at 0 MPa after the load was removed subsequent to the incremental tensile processing. The sample was heated and cooled under 0 MPa, FIG. 4B after being subjected to the incremental strains shown in FIG. 7 (0700). FIG. 8 (0800) illustrates that a tailored thermal expansion coefficient can be obtained by varying the degree of initial strain and that a negative thermal expansion can ultimately be reached. In one example using NiTiPd, this wide temperature range of at least up to 150° C. of linear thermal expansion is larger than that of super Invar alloys; which is limited to between 0° C. and 100° C. In other examples, this range may be larger. FIG. 9 (0900) shows the thermal expansion coefficient vs. the maximum applied tensile strain. This figure illustrates that the macroscopic thermal expansion coefficient is linearly related to the amount of induced strain and the crossover from positive to negative thermal expansion occurs just above 4% strain.

Cold Working Process (1000)-(1300)

Figure 10:
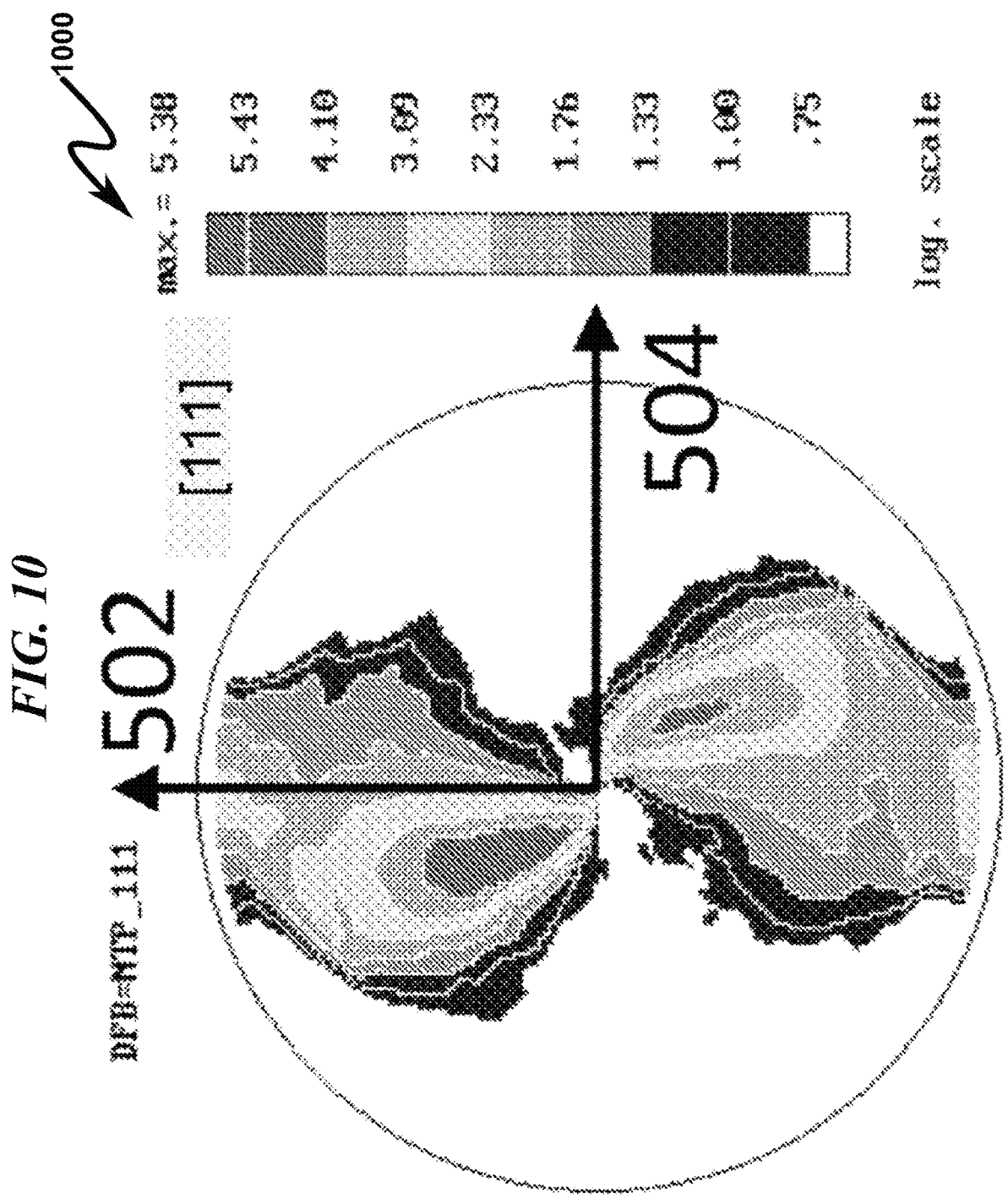
FIG. 10 illustrates a graphical illustration of pole figures before and after cold-working an exemplary material according to embodiments of the disclosure (part 1/4)
Figure 13:
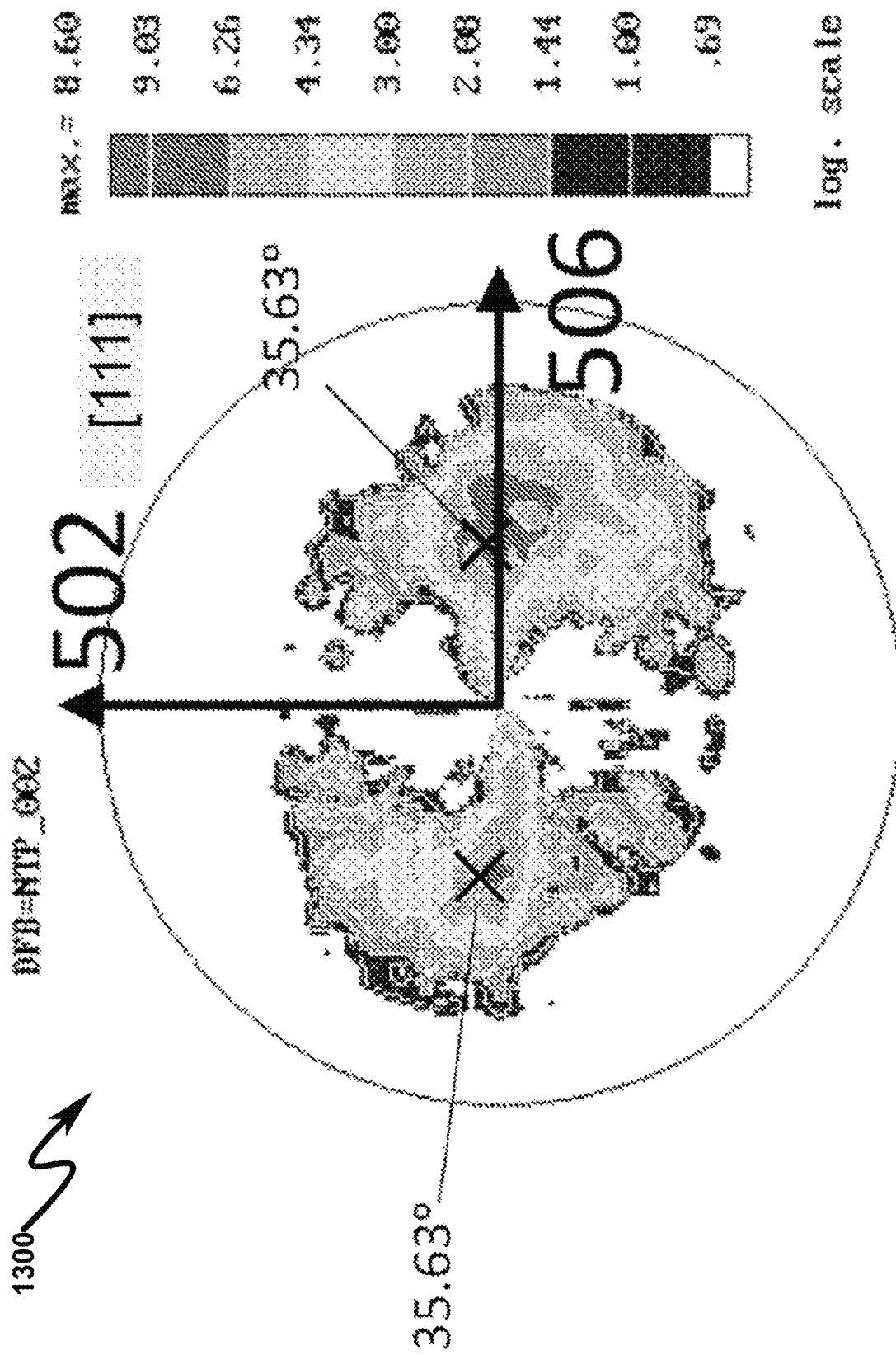
FIG. 13 illustrates a graphical illustration of pole figures before and after cold-working an exemplary material according to embodiments of the disclosure (part 4/4)

FIG. 10 (1000)-FIG. 13 (1300) are illustrations of pole figures before and after cold-working the material. More specifically, FIG. 10 (1000)-FIG. 13 (1300) are graphical illustrations of pole figures before and after cold-working an exemplary material where 502 is the transverse direction, 504 is the extrusion direction and 506 is the rolling direction.

Figure 11:
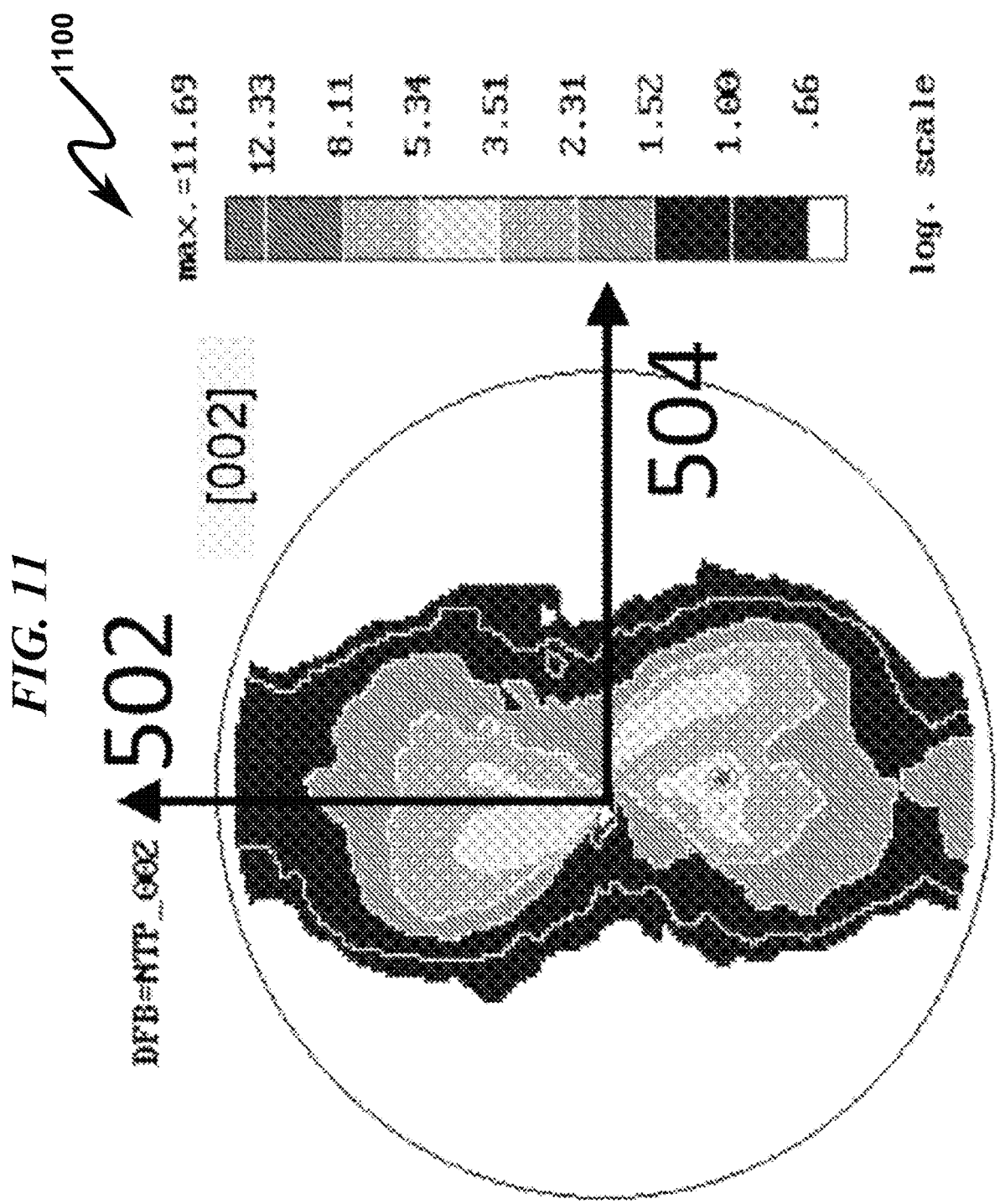
FIG. 11 illustrates a graphical illustration of pole figures before and after cold-working an exemplary material according to embodiments of the disclosure (part 2/4)

In addition to tension and other thermo-mechanical deformation techniques discussed above, a tailored thermal expansion may also be achieved via cold rolling (or compression). FIG. 10 (1000)-FIG. 11 (1100) are pole figures which display the [111] and [002] for orthorhombic martensite in the as-received material condition. As-received condition in this particular case is hot-extruded condition, where the material was hot extruded at 900° C. The extrusion direction 504 (ED) and transverse direction 502 (TD) correspond to the hot extruded directions performed prior to cutting the samples. It is evident that the [111] in FIG. 10 (1000) and [002] planes in FIG. 11 (1100) are not oriented along the extruded direction 504 and are instead they are oriented between the transverse direction 502 and the center of the pole figure.

Figure 12:
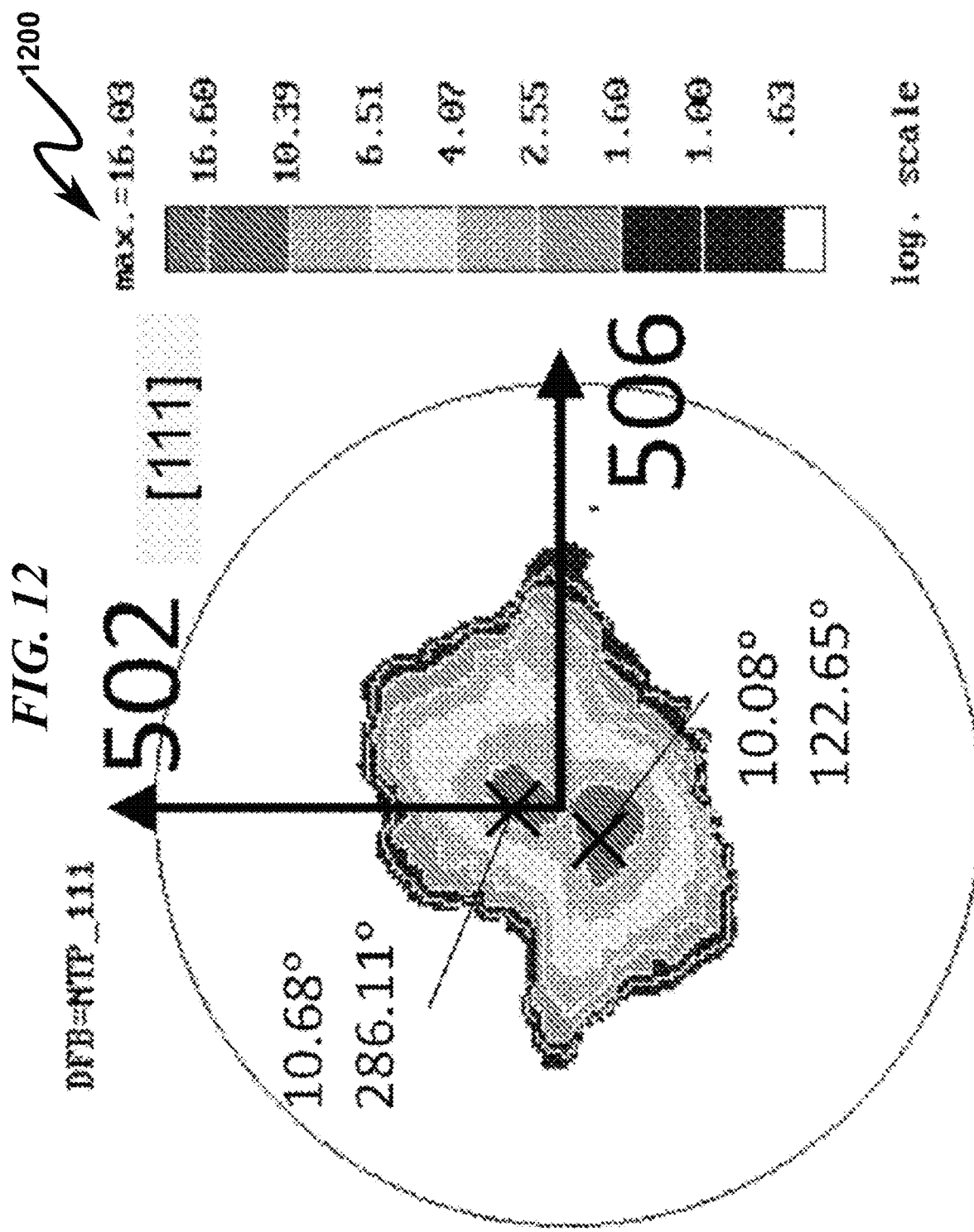
FIG. 12 illustrates a graphical illustration of pole figures before and after cold-working an exemplary material according to embodiments of the disclosure (part 3/4)

FIG. 12 (1200)-FIG. 13 (1300) show the poles after cold-rolling. After cold-rolling, the sample's texture is change. It should be noted that the rolling direction (RD) 506 is in the same direction as the 504 ED for the as-received material. The cold rolling produced significant [111] texturing along the normal direction (ND) while orienting the [002] planes along the RD 506. A distinct 180° rotational symmetry along the rolling direction axis is evident and may be a result of the original texture.

Comparison of the thermal expansion is displayed in FIG. 6 (0600). The initial thermal expansion is $14.9 \times 10^{-6}$ $K^{-1}$ which changes drastically to $1.99 \times 10^{-6}$ $K^{-1}$ with only 14% cold work. This is a lower thermal expansion coefficient than super Invar alloy at $2.5 \times 10^{-6}$ $K^{-1}$ in the same temperature range. Interestingly, the thermal expansion properties were isotropic in the rolling plane. This is thought to occur due to the fan-like texture observed for the [002] plane after rolling (FIG. 13 (1300)). The strong [111] texture aligns the positive thermal expansion direction, [010], mostly along the ND and aligns the NTE directions, [100] and [001], mostly along the RD 506 and TD 502.

Exemplary Composite with Tailorable CTE (1400)-(1500)

Figure 14:
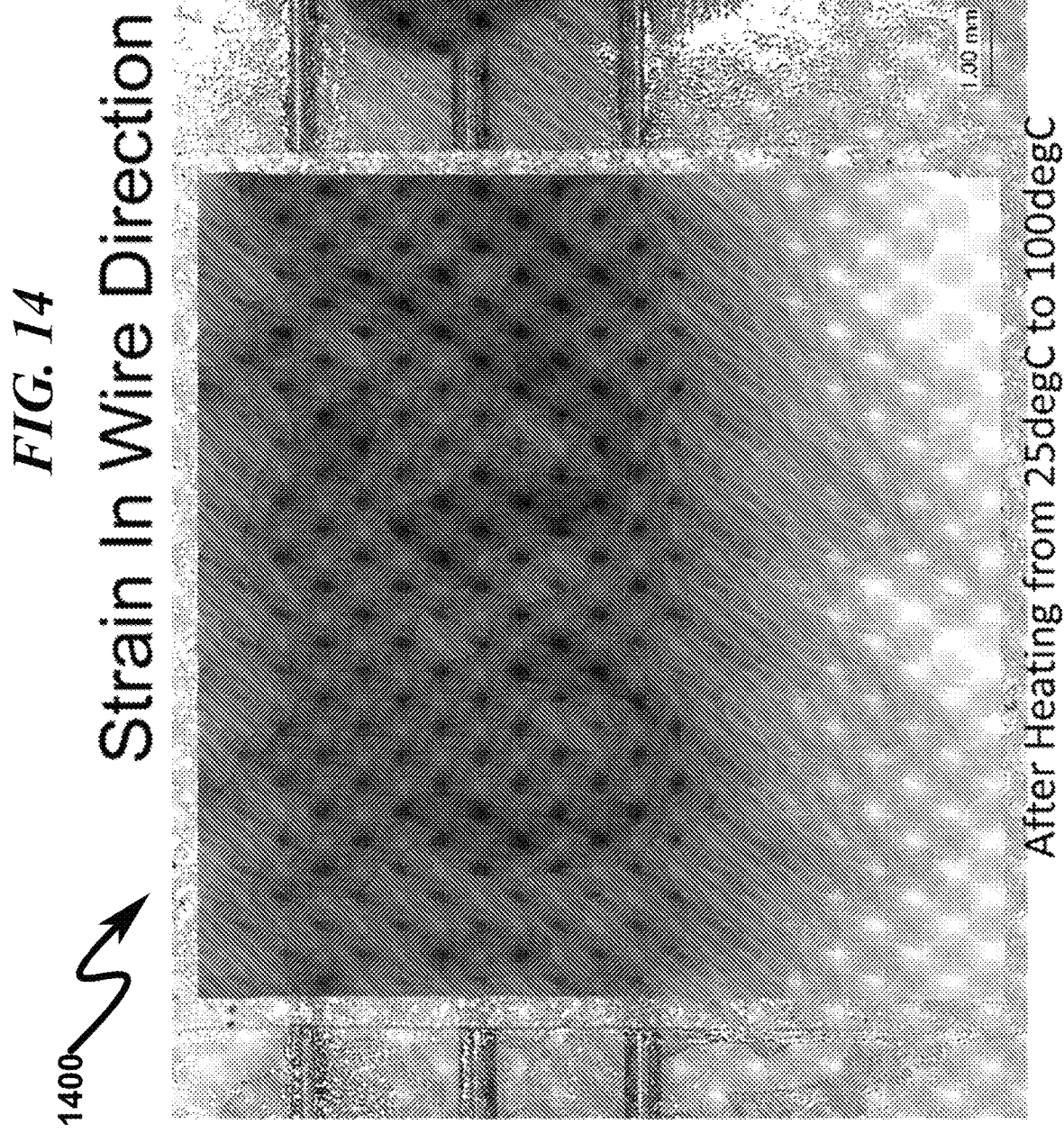
FIG. 14 illustrates a composite material with tailored thermal expansion according to embodiments of the disclosure.
Figure 15:
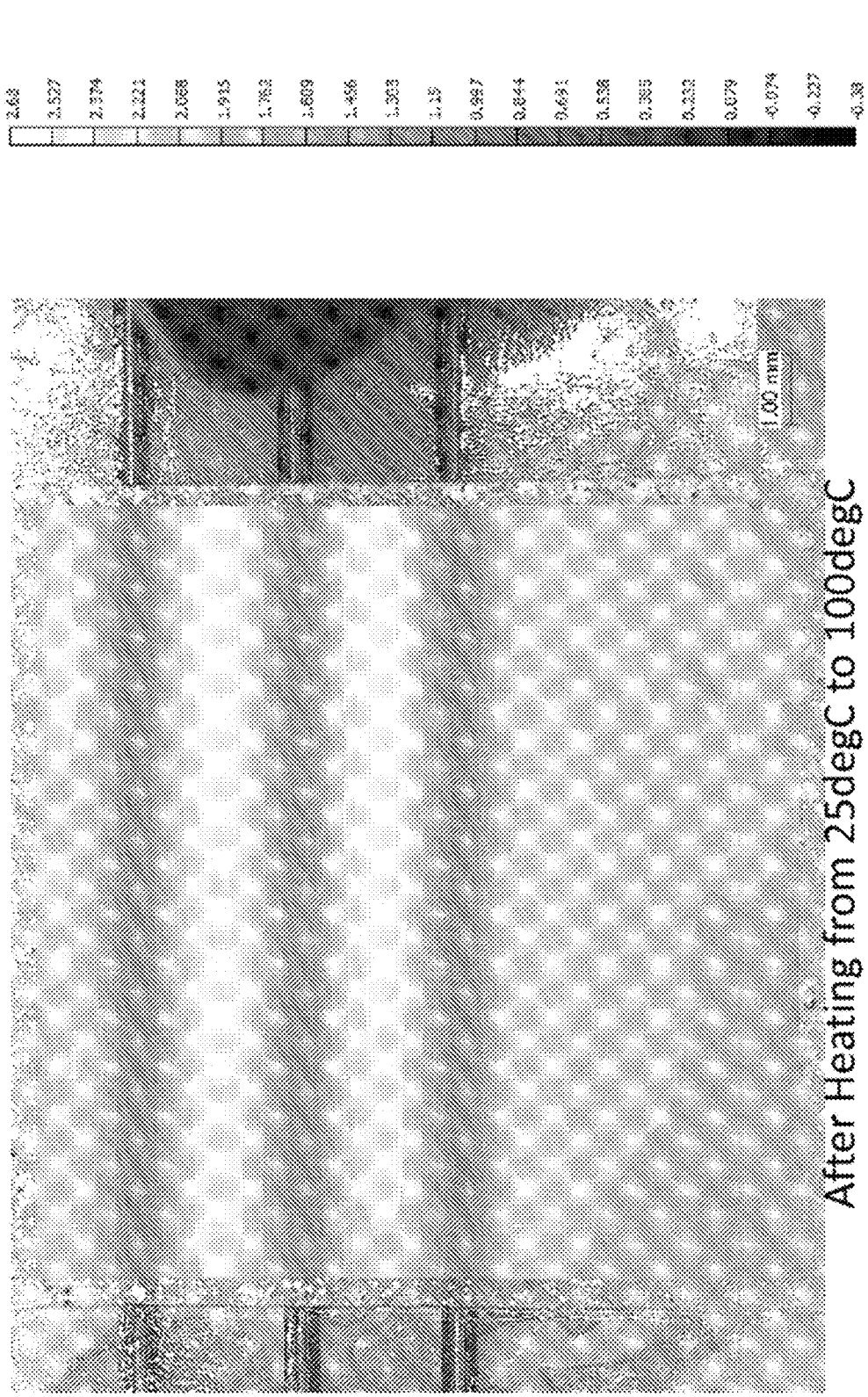
FIG. 15 illustrates a composite material with tailored thermal expansion according to embodiments of the disclosure.

FIG. 14 (1400)-FIG. 15 (1500) demonstrate a composite with tailorable thermal expansion according to embodiments disclosed herein. In FIG. 14 (1400)-FIG. 15 (1500), a wire was first hot extruded and may not have had a desired texture in martensite initially. Subsequently, the wire was thermo-mechanically trained, segmented, and embedded in epoxy to form a composite material. The temperature was then increased incrementally and images were taken to track the strain on the surface to demonstrate the behavior of the composite. FIG. 14 (1400) tracks $\varepsilon_{xx}$ and illustrates the strain along the wire direction which is the direction along which the wire was trained under tension. FIG. 15 (1500) illustrates the strain in the direction of $\varepsilon_{yy}$ which is the direction perpendicular to the direction of the wire-drawing. Both FIG. 14 (1400)-FIG. 15 (1500) show heating from 25° C. to 100° C., and show no change in length in FIG. 14 (1400), and FIG. 15 (1500) shows that there is only strain in the perpendicular direction along the wire.

While FIG. 14 (1400)-FIG. 15 (1500) illustrate a material that has undergone martensite texturing (reorienting) embedded in a polymer to form a composite material, either a material that has undergone a martensitic transformation or a material that has been texturized while in the martensitic phase may be used to form a composite material. The composite material may be formed using polymer, ceramics, other metals, and/or other metals capable of undergoing a martensitic transformation, and combinations thereof as appropriate for a particular application and/or end use.

Exemplary Summary Methods (1600)

Figure 16:
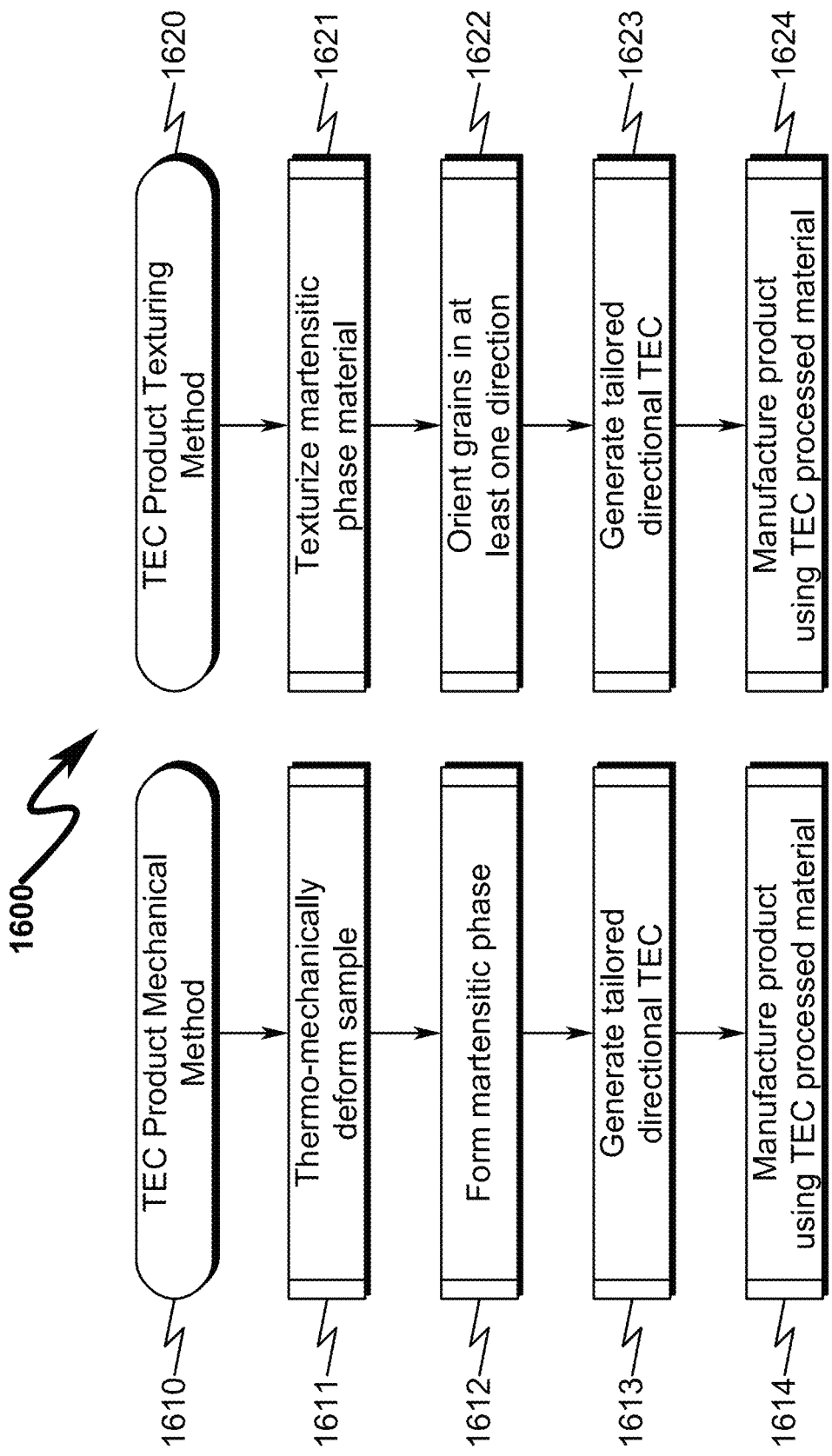
FIG. 16 illustrates two embodiment summaries of methods for tailoring thermal expansion according to embodiments of the disclosure.

FIG. 16 (1600) illustrates two summary methods (1610) and (1620) for tailoring the thermal expansion properties of a material. In method (1610), a metallic material such as a shape-memory alloy or other alloy capable of undergoing a martensitic transformation is thermo-mechanically deformed at block (1611) in order to obtain a tailored thermal expansion coefficient and direction at block (1613). In one example, NiTiPt wire was used. The term "tailored" as discussed herein refers to the ability of the methods and systems disclosed herein to produce a thermal expansion coefficient within a predetermined range or to a particular value, or to a particular value with a tolerance. In addition, the term "tailored" may be used to refer to the direction of the thermal expansion. Depending upon the type of thermo-mechanical deformation used at block (1611) as discussed below, the thermal expansion coefficient may be highly positive or very negative, for example, from about $-150 \times 10^{-6}$ $K^{-1}$ to about $500 \times 10^{-6}$ $K^{-1}$. As used herein, the term "about" means variation in results/properties that may result from manufacturing conditions, where the "about" values are values that are desirable and obtained from the process disclosed herein, and are values that are appropriate for the end application. In an embodiment, the metallic material may comprise one or more phases and the deformation at block (1611) transforms substantially all of the metallic material undergoes a transformation to the martensitic phase at block (1612). The method of thermo-mechanical deformation used may depend on the direction and value of the thermal expansion coefficient desired, as well as what material and material composition are used. At block (1613), in response to the formation of the martensitic phase at block (1612), the material exhibits a tailored coefficient of thermal expansion which may also, as discussed above, be described as falling into a predetermined range, a target, or a target with a tolerance. The tailored coefficient of thermal expansion may also be in a predetermined direction or directions which, as discussed above, may be related to the direction or directions of thermo-mechanical deformation in block (1611).

As discussed above, the metallic material may comprise any material capable of undergoing a martensitic transformation including but not limited to: $Ti_{100-A}X_A$ (X=at least one of Ni, Nb, Mo, Ta, Pd, Pt, or combinations thereof) (A=0 to 75 atomic percent composition), $Ti_{100-A-B}Ni_AX_B$ (X=at least one of Pd, Hf, Zr, Al, Pt, Au, Fe, Co, Cr, Mo, V, O or combinations thereof) (A=0 to 55 atomic percent composition and B=0 to 75 atomic percent composition such that A+B<100), $Ti_{100-A-B}Nb_AX_B$ (X=at least one of Al, Sn, Ta, Hf, Zr, Al, Au, Pt, Fe, Co, Cr, Mo, V, O, or combinations thereof) (A=0 to 55 atomic percent composition and B=0 to 75 atomic percent composition such that A+B<100), $Ti_{100-A-B}Ta_AX_B$ (X=at least one of Al, Sn, Nb, Zr, Mo, Al, Au, Pt, Fe, Co, Cr, Hf, V, O, or combinations thereof) (A=0 to 55 atomic percent composition and B=0 to 75 atomic percent composition such that A+B<100), $Ni_{100-A-B}Mn_AX_B$ (X=at least one of Ga, In, Sn, Al, Sb, Co, or combinations thereof) (A=0 to 50 atomic percent composition and B=0 to 50 atomic percent composition such that A+B<100), $Ni_{100-A-B-C}Mn_ACo_BX_C$ (X=at least one of Ga, In, Sn, Al, Sb, or combinations thereof) (A=0 to 50 atomic percent composition, B=0 to 50 atomic percent composition, and C=0 to 50 atomic percent composition such that A+B+C<100), $Ni_{100-A-B}Fe_AGa_B$ (A=0 to 50 atomic percent composition and B=0 to 50 atomic percent composition such that A+B<100), $Cu_{100-A}X_A$ (X=at least one of Zn, Ni, Mn, Al, Be, or combinations thereof) (A=0 to 75 atomic percent composition), $Cu_{100-A-B}Al_AX_B$ (X=at least one of Zn, Ni, Mn, Be, or combinations thereof) (A=0 to 50 atomic percent composition and B=0 to 50 atomic percent composition such that A+B<100), $Cu_{100-A-B-C}Mn_AAl_BX_C$ (X=at least one of Zn, Ni, Be, or combinations thereof) (A=0 to 50 atomic percent composition, B=0 to 50 atomic percent composition, and C=0 to 50 atomic percent composition such that A+B+C<100), $Co_{100-A-B}Ni_AX_B$ (X=at least one of Al, Ga, Sn, Sb, In, or combinations thereof) (A=0 to 50 atomic percent composition and B=0 to 50 atomic percent composition such that A+B<100), $Fe_{100-A-B}Mn_AX_B$ (X=at least one of Ga, Ni, Co, Al, Ta, Si, or combinations thereof) (A=0 to 50 atomic percent composition and B=0 to 50 atomic percent composition such that A+B<100), $Fe_{100-A-B}Ni_AX_B$ (X=at least one of Ga, Mn, Co, Al, Ta, Si, or combinations thereof) (A=0 to 50 atomic percent composition and B=0 to 50 atomic percent composition such that A+B<100), $Fe_{100-A-B-C}Ni_ACo_BAl_CX_D$ (X=at least one of Ti, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), $Fe_{100-A-B-C}Ni_ACo_BTi_CX_D$ (X=at least one of Al, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), as well as derivations and combinations thereof.

Turning to method (1620), method (1620) in FIG. 16 (1600) begins at block (1621) where the metallic material substantially comprises a martensitic phase. At block (1622), substantially all or part of the metallic material is oriented in at least one predetermined direction. The predetermined direction may be [001], [111], [010], or other directions depending upon the material and the method of thermo-mechanical deformation used to orient the material. It is appreciated that the orientation at block (1622) may also be described as texturizing, texturing, or de-twinning the material. At block (1623), in response to the orientation at block (1622), the metallic material has a tailored coefficient of thermal expansion and may be in a direction as discussed above with respect to block (1613) in method (1610).

The thermo-mechanical deformation technique employed at block (1612) for the martensitic transformation and/or at block (1622) for grain orientation may be a single technique or may be a combination of techniques. These techniques may include but are not limited to: hot-rolling, cold-rolling, wire drawing, plain strain compression, bi-axial tension, conform processing, bending, drawing, swaging, conventional extrusion, equal channel angular extrusion, precipitation heat treatment under stress, tempering, annealing, sintering, monotonic tension processing, monotonic compression processing, monotonic torsion processing, cyclic thermal training under stress, and combinations thereof.

Theory of Operation

Overview

Current approaches to tailoring the thermal expansion coefficient of materials or finding materials with negative thermal expansion rely on careful manipulation of either the material's composition and/or the complex/expensive fabrication of composites. The present invention, by contrast, utilizes a newly discovered principle that enables the precise control of the thermal expansion coefficient of bulk materials via texture manipulation. Through simple thermo-mechanical processing, it has been found that it is possible to tailor the thermal expansion coefficient of a single material (i.e., without manipulating its composition) over a wide range of (positive and negative) values. The present invention demonstrate this principle with an exemplary application by gradually tuning the macroscopic Coefficient of Thermal Expansion (CTE) in a model NiTiPd alloy specimen between a positive ($+14.90\times10^{-6}K^{-1}$) and a negative ($-3.06\times10^{-6}K^{-1}$) value, simply by incrementally increasing tensile plastic deformation in the martensite phase of this alloy. This surprising response is linked to the large positive ($+51.33\times10^{-6}K^{-1}$) and negative ($-32.51\times10^{-6}K^{-1}$) CTE anisotropy along the NiTiPd's different crystal directions in the martensite phase. Similar CTE anisotropy is also shown experimentally here in martensitically transforming CoNiGa and TiNb alloys. In a model TiNb alloy, giant CTEs of ($+181\times10^{-6}K^{-1}$) and ($-142\times10^{-6}K^{-1}$) are measured. A connection between the CTE anisotropy and the martensitic transformation in these and other materials systems such as NiTi, pure uranium, and PbTiO3 is later made. The present invention observations and analyses suggest that the tunability of the macroscopic CTE through deformation is universal in materials (both ceramic and metals) that undergo martensitic transformations.

Introduction

Control of thermal expansion mismatch is a critical goal of engineering design in a wide range of applications, particularly in cases where system components are small, are subject to large changes (gradients) in temperatures, or require extreme dimensional stability over a wide range of temperatures. Thermal expansion compensation often requires materials with either negative or (close to) zero thermal expansion (NTE or ZTE, respectively). The most widely known mechanisms that yield negative thermal expansion (NTE) include the magneto-volume effect, atomic radius contraction upon electronic transitions and flexible networks (see K. Takenaka, Negative thermal expansion materials: technological key for control of thermal expansion. Sci. Technol. Adv. Mat. 13 (2012)). The magneto-volume effect, first discovered in 1897 (see K. Takenaka, Negative thermal expansion materials: technological key for control of thermal expansion. Sci. Technol. Adv. Mat. 13 (2012)), is found in FeNi-based Invar alloys that are widely used for thermal expansion compensation due to its high strength and ductility. Invar's low thermal expansion originates from instabilities between different magnetic configurations that at the same time result in significant magnetostriction effects (see R. J. Weiss, The Origin of the 'Invar' Effect. P. Phys. Soc. 82 (1963) 281; E. F. Wassermann, The Invar problem. J. Magn. Magn. Mater. 100 (1991) 346-362). Recently, clear links have been made between the magneto-volume effect and the martensitic phase transformations exhibited by FeNi alloys (see E. F. Wassermann, The Invar Problem. J. Magn. Magn. Mater. 100 (1991) 346-362; P. Entel, E. Hoffmann, P. Mohn, K. Schwarz, V. L. Moruzzi, First-Principles Calculations Of The Instability Leading To The Invar Effect. Phys. Rev. B 47 (1993) 8706-8720). In these systems, only compositional changes that affect magnetic ordering and unit cell volume can tailor Invar's thermal expansion characteristics.

Another mechanism for NTE is encountered in $Sm_{2.75}C_{60}$, one of the materials with the largest known NTE. In this case, the observed NTE arises from atomic radius contraction due to valence electron exchange. Unfortunately, this effect only occurs below 32 K (see J. Arvanitidis, K. Papagelis, S. Margadonna, K. Prassides, A. N. Fitch, Temperature-induced valence transition and associated lattice collapse in samarium fulleride. Nature 425 (2003) 599-602) and is therefore of limited technological value. Other material systems exhibit NTE through atomic rotations and transverse atomic vibrations in flexible networks that occupy different atomic configurations with increasing temperature. For example, the $ZrW_2O_8$ (see J. S. O. Evans, T. A. Mary, T. Vogt, M. A. Subramanian, A. W. Sleight, Negative Thermal Expansion in $ZrW_2O_8$ and $HfW_2O_8$. Chem. Mater. 8 (1996) 2809-2823; T. A. Mary, J. S. O. Evans, T. Vogt, A. W. Sleight, Negative Thermal Expansion from 0.3 to 1050 Kelvin in $ZrW_2O_8$. Science 272 (1996) 90-92; A. W. Sleight, Thermal contraction. Nature 389 (1997) 923-924) and $ReO_3$ families of ceramics show isotropic NTE via octahedral site rotations that cause uniform contraction in the cubic unit cell. Transverse atomic vibrations in non-cubic crystalline metal oxides (such as $Mg_2Al_4Si_5O_{18}$ cordierite (see A. W. Sleight, Thermal Contraction. Endeavour 19 (1995) 64-68; A. W. Sleight, Compounds That Contract On Heating. Inorg. Chem. 37 (1998) 2854-2860), $LiAlSiO_4$ β-eucriptite (see A. W. Sleight, Thermal Contraction. Endeavour 19 (1995) 64-68; A. W. Sleight, Compounds That Contract On Heating. Inorg. Chem. 37 (1998) 2854-2860), $NaZr_2P_3O_{12}$ (see A. W. Sleight, Thermal Contraction. Endeavour 19 (1995) 64-68; A. W. Sleight, Compounds That Contract On Heating. Inorg. Chem. 37 (1998) 2854-2860) and $PbTiO_3$ perovskite (see A. W. Sleight, Compounds That Contract On Heating. Inorg. Chem. 37 (1998) 2854-2860)) and carbon structures (see P. K. Schelling, P. Keblinski, Thermal Expansion Of Carbon Structures. Phys. Rev. B 68 (2003) 035425) (such as graphite, carbon fibers and nano-tubes) result in NTE in certain material directions and positive thermal expansion (PTE) in others. Unfortunately, the application potential of NTE ceramics is limited due to their low fracture toughness (see V. Srikanth, E. C. Subbarao, D. K. Agrawal, C.-Y. Huang, R. Roy, G. V. Rao, Thermal-Expansion Anisotropy And Acosutic-Emission Of $NaZr_2P_3O_{12}$ Family Ceramics. J. Am. Ceram. Soc. 74 (1991) 365-368), low thermal conductivity, and the need for chemical composition changes to tailor their coefficient of thermal expansion (CTE). While carbon reinforced composites are a more attractive alternative for tailored thermal expansion compensation, harnessing carbon's low CTE requires complex and expensive composite fabrication techniques.

In this work, a new method for easily tailoring the thermal expansion coefficient of alloys that exhibit martensitic transformation by harnessing their giant NTE and PTE associated with different crystallographic directions is presented. Interestingly, the NTE and PTE directions are not solely related to the martensite's crystal symmetry, but can be predicted by comparing the high temperature austenite phase's lattice parameters with the low temperature martensite's lattice parameters. While the fundamental nature of this anisotropic thermal expansion is currently not understood, this simple correspondence successfully predicts the PTE and NTE directions of not only martensitic metals and alloys such as NiTiPd, TiNb, CoNiGa, NiTi (see S. Qiu, V. B. Krishnan, S. A. Padula II, R. D. Noebe, D. W. Brown, B. Clausen, R. Vaidyanathan, Measurement of the lattice plane strain and phase fraction evolution during heating and cooling in shape memory NiTi. Appl. Phys. Lett. 95 (2009)), and α-Uranium (see L. T. Lloyd, C. S. Barrett, C. S. Thermal Expansion Of Alpha Uranium. J. Nucl. Mater. 18 (1966) 55), but also functional ceramics such as $PbTiO_3$ that undergo martensitic transformation. These different materials represent various crystallographic symmetries, composition, chemical ordering, and bonding types while sharing martensitic transformation and thermal expansion anisotropy. The ability to tailor an alloy's CTE using simple mechanical deformation promises exceptional control over thermal expansion compensation design in the automotive, aerospace, marine, electronic, power generation and transmission, and scientific instrumentation industries. Within this context the mechanical deformation permits an adjustable tradeoff to occur between macroscopic thermal expansion mismatch and grain scale mismatch. In order to tailor the CTE it is possible to mix grain orientations with very different CTE's in the right proportion. This means on a grain scale it is possible to have neighbors with very different CTE's resulting in intergranular stresses. Some study of this behavior has been performed with beryllium (D. W. Brown, T. A. Sisneros, B. Clausen, S. Abeln, M. A. M. Bourke, B. G. Smith, M. L. Steinzig, C. N. Tome, S. C. Vogel, Acta. Mat., 57 (2009) 972-979).

Experimental Procedures (1700)-(1900)

Figure 17:
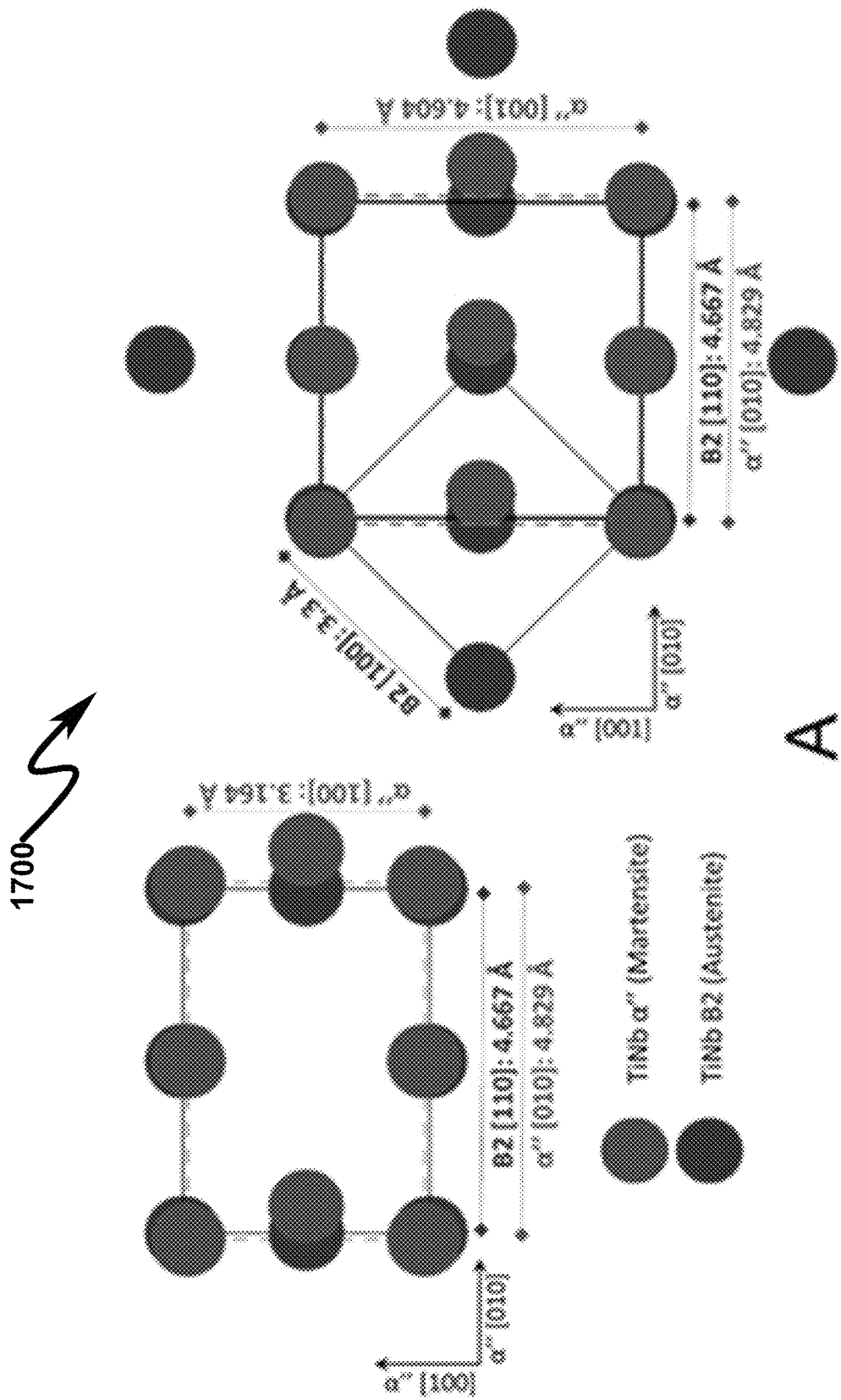
FIG. 17 illustrates crystallographic relationships between cubic austenite, disordered BCC TiNb and ordered B2 NiTiPd and CoNiGa, and martensite, disordered orthorhombic TiNb; ordered B19 NiTiPd and ordered $L1_0$ CoNiGa.
Figure 18:
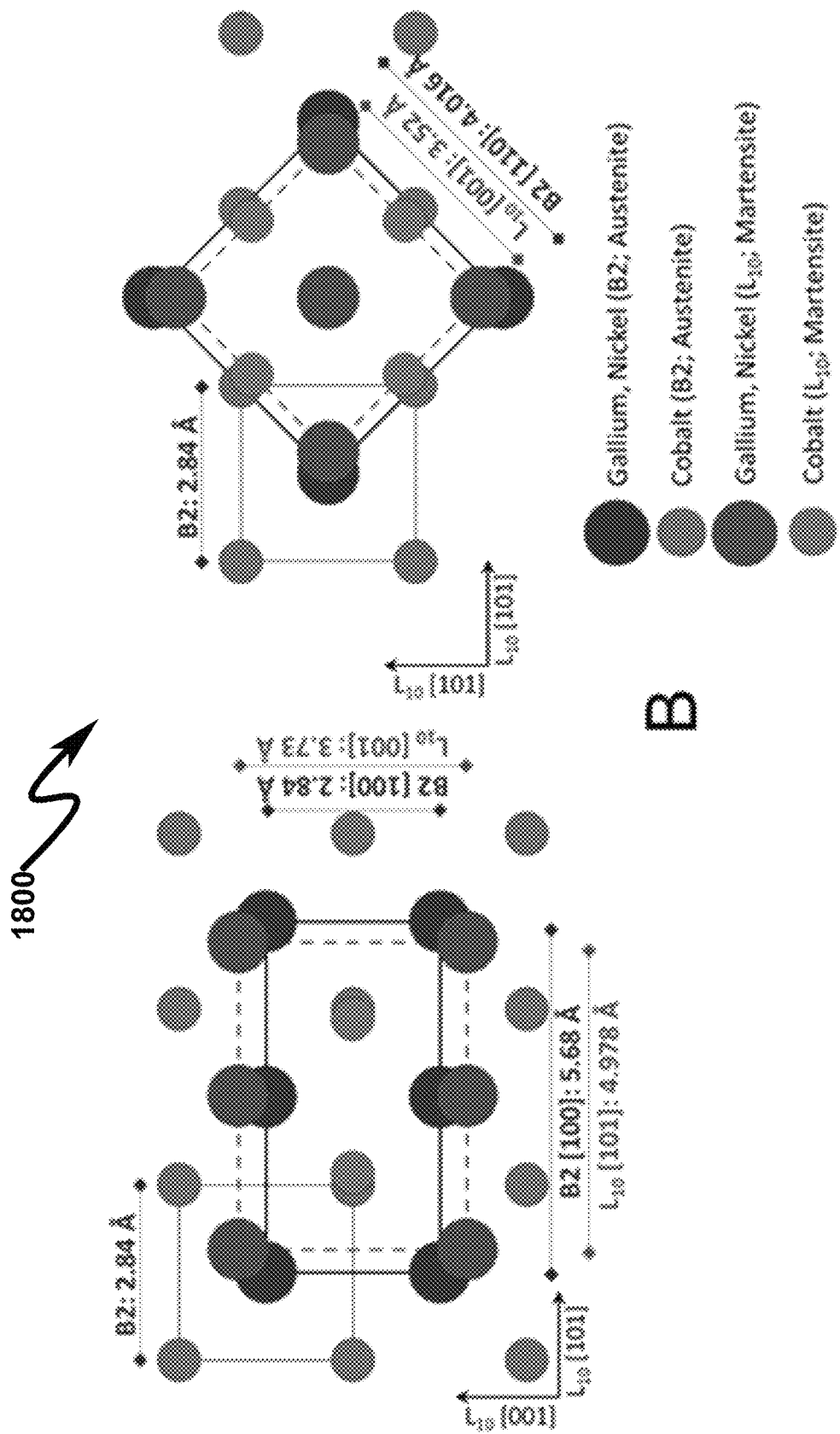
FIG. 18 illustrates crystallographic relationships between cubic austenite, disordered BCC TiNb and ordered B2 NiTiPd and CoNiGa, and martensite, disordered orthorhombic TiNb; ordered B19 NiTiPd and ordered $L1_0$ CoNiGa.
Figure 19:
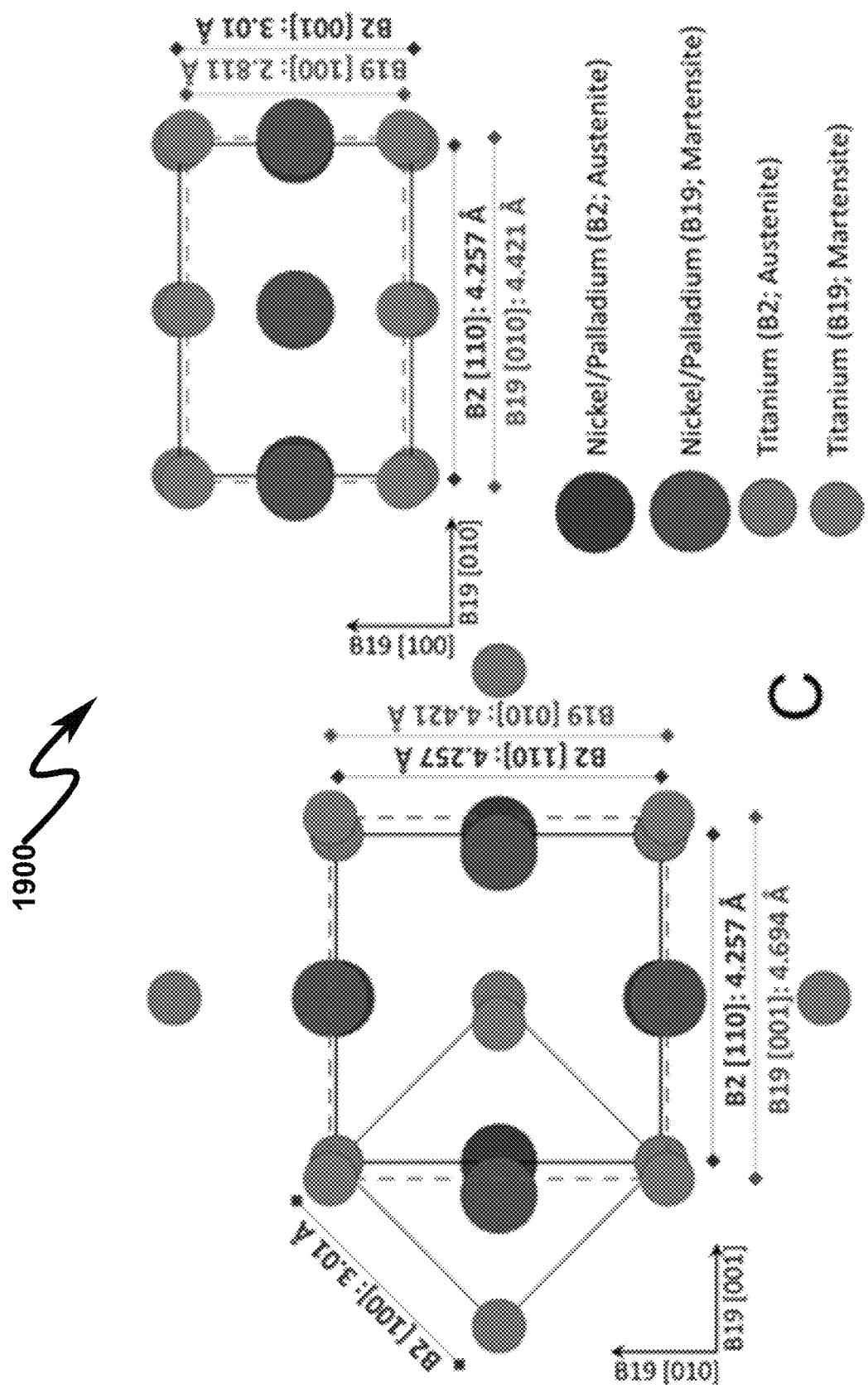
FIG. 19 illustrates crystallographic relationships between cubic austenite, disordered BCC TiNb and ordered B2 NiTiPd and CoNiGa, and martensite, disordered orthorhombic TiNb; ordered B19 NiTiPd and ordered $L1_0$ CoNiGa.

Experimental procedures associated with development of the present invention selected three different alloy systems exhibiting martensitic transformation in order to demonstrate the CTE anisotropy of martensitic alloys regardless of the crystal structure of martensite, or whether the alloy is ordered or not. In addition, the present invention shows that different, but simple thermo-mechanical processing methods can be used to tailor the CTE of these alloys between large positive and large negative values, by crystallographically texturing martensite through martensite reorientation/detwinning mechanisms. These alloy systems are NiTiPd in polycrystalline form, CoNiGa as single crystals, and TiNb in polycrystalline form. FIG. 17 (1700)-FIG. 19 (1900) displays the comparison between the austenite and martensite phases for these three alloys. The three alloys were selected as representative systems to illustrate the universal nature of the CTE anisotropy and tailorable CTE in martensitic materials. Using FIG. 17 (1700)-FIG. 19 (1900), the lattice parameter correspondence between austenite and martensite will be shown to correlate with the observed thermal expansion anisotropy below.

CoNiGa single crystal samples were grown in a He environment using the Bridgman technique. 4×4×8 mm samples were wire electro-discharge machined (EDMed) from the larger single crystals and etched to remove the EDM recast layer. The samples were then homogenized at 1473K for 4 hrs, followed by water quenching (WQ) under ultra-high purity (UHP) argon in quartz ampules. These samples were mostly used for neutron diffraction experiments in order to demonstrate the CTE anisotropy in an example tetragonal (L1$_0$) martensite system. For the NiTiPd alloy, the ingots with the composition of NiTiPd were vacuum induction melted in a graphite crucible and cast into a water cooled copper mold. The ingots were homogenized and encased in a steel can prior to 900° C. extrusion with a 7 to 1 reduction in area. Dog-bone tension samples were then wire EDMed from the extruded rods for tensile processing. Elemental Ti and Nb were arc melted under argon gas to obtain samples with the composition of TiNb. The ingot was then sealed in a quartz tube under UHP argon and heat treated at 1273K for 24 hrs. 0.5 mm thick NiTiPd and TiNb samples were wire EDM cut and polished to a mirror finish prior to the diffraction experiments.

Lattice parameters at discrete temperatures for NiTiPd and TiNb were determined using x-ray diffraction (XRD), while CoNiGa was characterized using neutron diffraction. All samples were cooled to the lowest diffraction temperature and heated to each subsequent temperature. XRD was conducted using Cu K-α radiation on a Bruker AXS X-Ray Diffractometer with a hot stage fitted with a platinum heating strip. Temperature was controlled and measured using a thermocouple fixed to the sample's surface. The lattice parameters were determined using TOPAZ software by fitting a pseudo-Voigt function to individual XRD peaks and using Bragg's law to calculate the atomic plane spacing. Texture analysis was also performed on the 0%, 25% and 50% rolled TiNb samples. A three axis goniometer stage in the Bruker AXS Diffractometer was used to rotate the sample. Inverse pole figures were created from the texture data using MTEX data analysis code.

For thermal expansion tensor calculation, the Lagrangian or engineering thermal expansion ($\alpha$) along any unit vector ($n_i$) in a solid is given by:

$$\alpha \equiv \frac{1}{l_o}\frac{\partial l}{\partial T} \quad (9)$$

$$= \frac{\partial \varepsilon}{\partial T}$$

$$= \alpha_{ij} n_i n_j$$

where $l_o$ is the original material length along $n_i$, $l$ is the temperature dependent material length along $n_i$, $\varepsilon$ is the thermally induced lattice strain along $n_i$, and $\alpha_{ij}$ is the thermal expansion tensor. $\alpha_{ij}$ is anisotropic in crystalline structures with their respective forms as given by reference (see J. L. Schlenker, G. V. Gibbs, M. B. Boisen, Thermal-Expansion Coefficients For Monoclinic Crystals—Phenomenological Approach. Am. Mineral. 60 (1975) 828-833). By setting $n_i$ parallel to the plane normals and $l$ equal to the planar spacing, the temperature dependent lattice spacing can be used to calculate $\alpha$ along different crystallographic directions. The best way to determine lattice spacing is through x-ray or neutron diffraction experiments where each diffraction peak represents the distance between crystallographic planes. While the minimum number of diffraction peaks required to determine the complete thermal expansion tensor is equal to the number of independent thermal expansion components of $\alpha$, a least squares refinement of several peaks is preferred (see S. Qiu, V. B. Krishnan, S. A. Padula II, R. D. Noebe, D. W. Brown, B. Clausen, R. Vaidyanathan, Measurement Of The Lattice Plane Strain And Phase Fraction Evolution During Heating And Cooling In Shape Memory NiTi. Appl. Phys. Lett. 95 (2009)) to increase accuracy. Second order polynomial fits of the CoNiGa and TiNb strain data and linear fits of the NiTiPd strain data, solid lines in FIG. 21 (2100), were used to determine the components of the thermal expansion tensor.

Neutron diffraction was conducted using the Spectrometer for Materials Research at Temperature and Stress (SMARTS) Instrument (see M. A. M. Bourke, D. C. Dunand, E. Ustundag, SMARTS—A Spectrometer For Strain Measurement In Engineering Materials. Appl. Phys. A 74 (2002) s1707-s1709) and the High Intensity Powder Diffractometer (HIPD) at the Lujan Neutron Scattering Center at the Los Alamos Neutron Science Center (LANSCE). The Lujan Center is a pulsed spallation source of a "white" neutron beam. SMARTs and HIPD operate on a 10° C. water moderator providing useful neutrons in the range of 0.5 to 4 Å. Sample cooling on SMARTS was achieved under vacuum using a helium closed-cycle refrigerator (CCR) capable of reaching temperatures down to 50K. Sample cooling on HIPD was achieved down to 4K using a similar closed cycle refrigerator with He exchange gas. Time of flight (TOF) data was collected on stationary detector banks comprised of $^3$He fill aluminum tubes. Lattice spacing was determined by single peak fits of the TOF data using the rawplot subroutine (see B. Clausen, Los Alamos National Lab LA-UR 04-6581, 2004, Los Alamos, N. Mex.) of the General Structure Analysis System (GSAS) software developed at Los Alamos (see R. B. Vondreele, J. D. Jorgensen, C. G. Windsor, J. App. Crys., 15 (1982) 581-589). The materials d-spacing at various temperatures was used to calculate the thermal lattice strain along specific crystal orientations and determine the thermal expansion anisotropy.

Processing to achieve tailored thermal expansion was conducted on NiTiPd by pulling in tension and TiNb by room temperature rolling. Tensile processing was achieved by incremental strain tests on a servo-hydraulic MTS test frame and the thermal expansion response was measured at each deformation increment. Displacement was measured using an MTS high temperature extensometer fitted with ceramic extension rods in direct contact with the sample. Heating and cooling was achieved by conduction through the grips. Copper coils were wrapped around the grips to flow liquid nitrogen for cooling and band heaters around the coils for heating. The homogenized TiNb ingot was wire EDM cut into 4 mm thick coins and subsequently rolled to 20%, 50% and 80% thickness reduction at room temperature. 5 mm long compression samples were wire EDM cut along the rolling and transverse sample directions for thermal expansion measurement on a TA Instruments Thermo-Mechanical Analyzer (TMA).

Experimental Results (2000)-(2400)
Thermal Expansion Anisotropy

Figure 20:
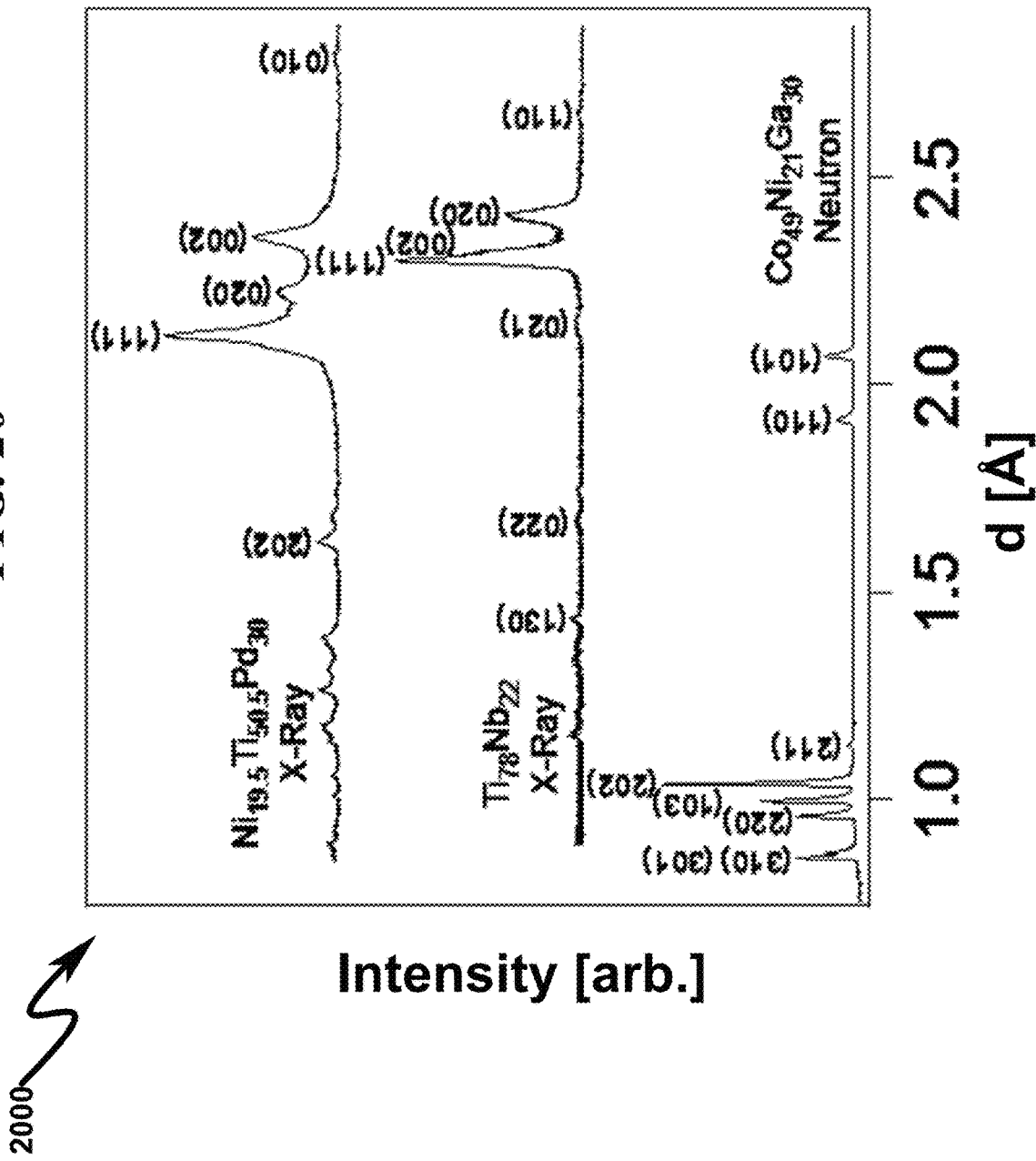
FIG. 20 illustrates Indexed diffraction patterns for NiTiPd and TiNb at 300K and CoNiGa at 4K.
Figure 21:
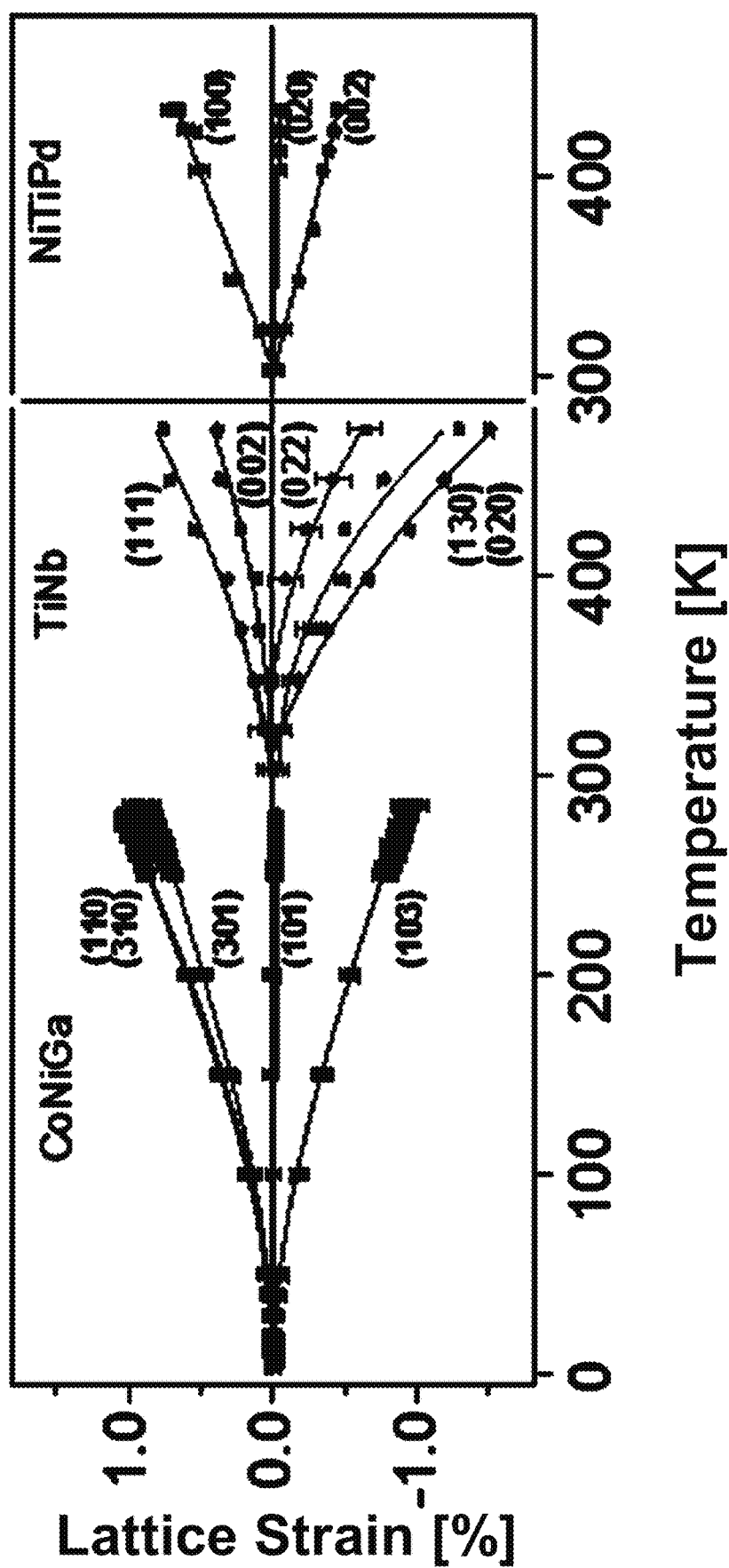
FIG. 21 illustrates thermal expansion along different crystallographic planes, depicting lattice strain between different crystallographic planes for martensitic CoNiGa between 4K-285K, TiNb between 303K-473K, and NiTiPd between 303K-433K.

The thermal expansion of the respective martensitic crystal structures of the NiTiPd, TiNb and CoNiGa alloys was determined by measuring the lattice spacing at various temperatures using x-ray and neutron diffraction measurements. FIG. 20 (2000) displays the diffraction patterns of NiTiPd at 300K, TiNb at 300K, and CoNiGa at 4K highlighting reflections for the orthorhombic B19, orthorhombic disordered and tetragonal L1$_0$ martensites, respectively. The strains $$\varepsilon(T) = \frac{l(T) - l_o}{l_0}$$

between different lattice planes for CoNiGa, TiNb and NiTiPd are displayed in FIG. 21 (2100) with $l_o$ taken from the diffraction patterns in FIG. 20 (2000). The markers correspond to the data points taken from several planar spacing reflections. All the experimental temperatures are below the martensitic transformation finish temperature for each material, i.e. 316K for CoNiGa (see E. Dogan, I. Karaman, N. Singh, A. Chivukula, H. S. Thawabi, R. Arroyave, The Effect Of Electronic And Magnetic Valences On The Martensitic Transformation Of CoNiGa Shape Memory Alloys. Acta Mater. 60 (2012) 3545-3558), 500K for TiNb (see H. Y. Kim, Y. Ikehara, J. I. Kim, H. Hosoda, S. Miyazaki, Martensitic Transformation, Shape Memory Effect And Superelasticity Of Ti—Nb Binary Alloys. Acta Mater. 54 (2006) 2419-2429) and 500K for NiTiPd (see J. A. Monroe, I. Karaman, D. C. Lagoudas, G. Bigelow, R. D. Noebe, S. Padula II, Determining Recoverable And Irrecoverable Contributions To Accumulated Strain In A NiTiPd High-Temperature Shape Memory Alloy During Thermomechanical Cycling. Scripta Mater. 65 (2011) 123-126). The NiTiPd response is linear within the measurement uncertainty in the studied temperature range with expansion between the (100) planes and contraction between the (020) and (002) planes. The distances between the (110), (310) and (301) CoNiGa planes increase while those between the (103) planes decreases and the distance between the (101) planes does not change. The TiNb's (020), (130), (021) and (022) planes contract while the (002) and (111) planes expand with increasing temperature.

Figure 22:
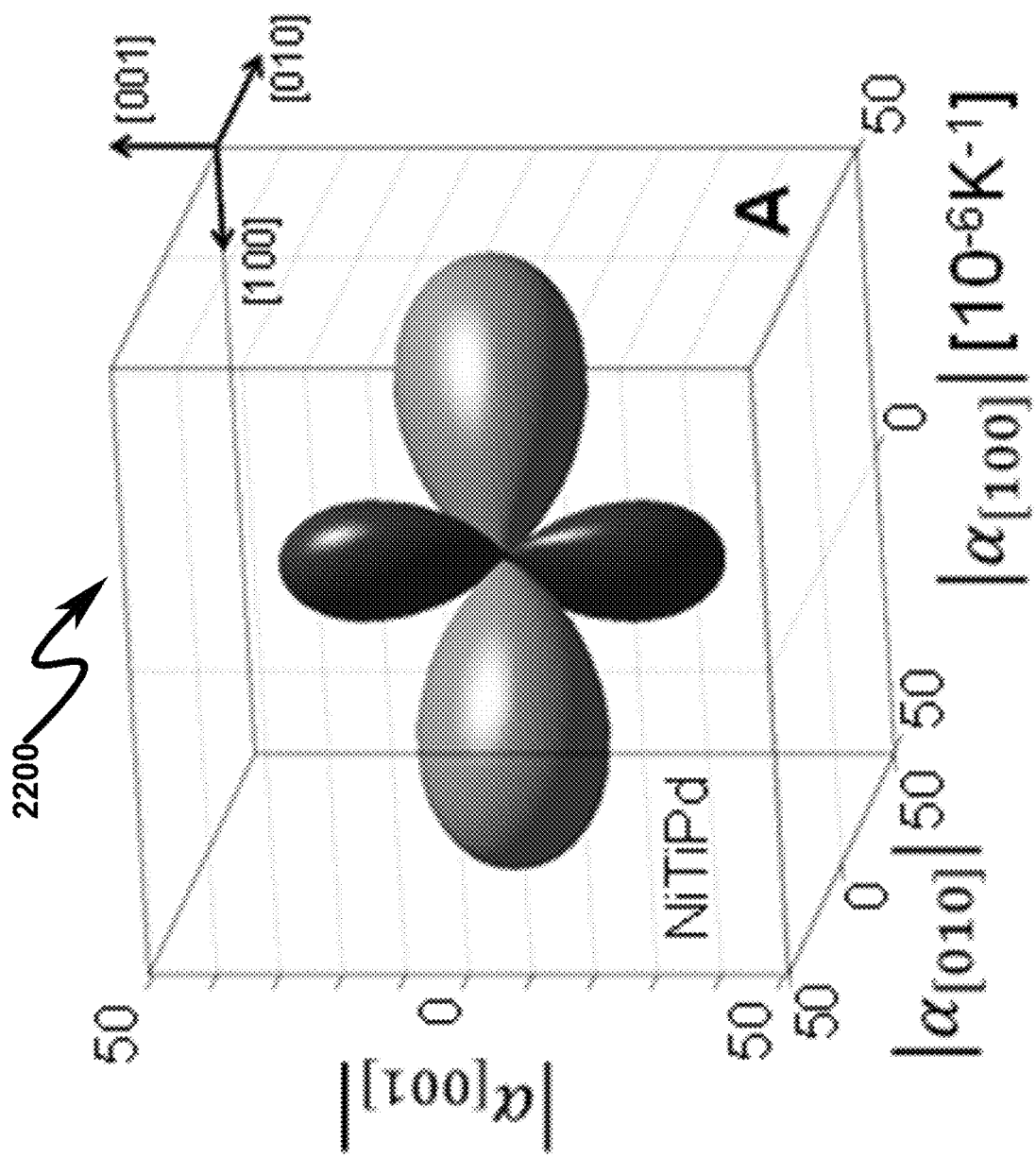
FIG. 22 illustrates graphic thermal expansion magnitudes for NiTiPd depicting three dimensional ellipsoids showing the positive and negative thermal expansion magnitudes along different crystallographic directions for orthorhombic NiTiPd across all experimental temperatures shown in FIG. 20 (2000), tetragonal CoNiGa at 260K and orthorhombic TiNb at 473K (these figures were created using Coefficient of Thermal Expansion Analysis Suite (CTEAS) software)
Figure 23:
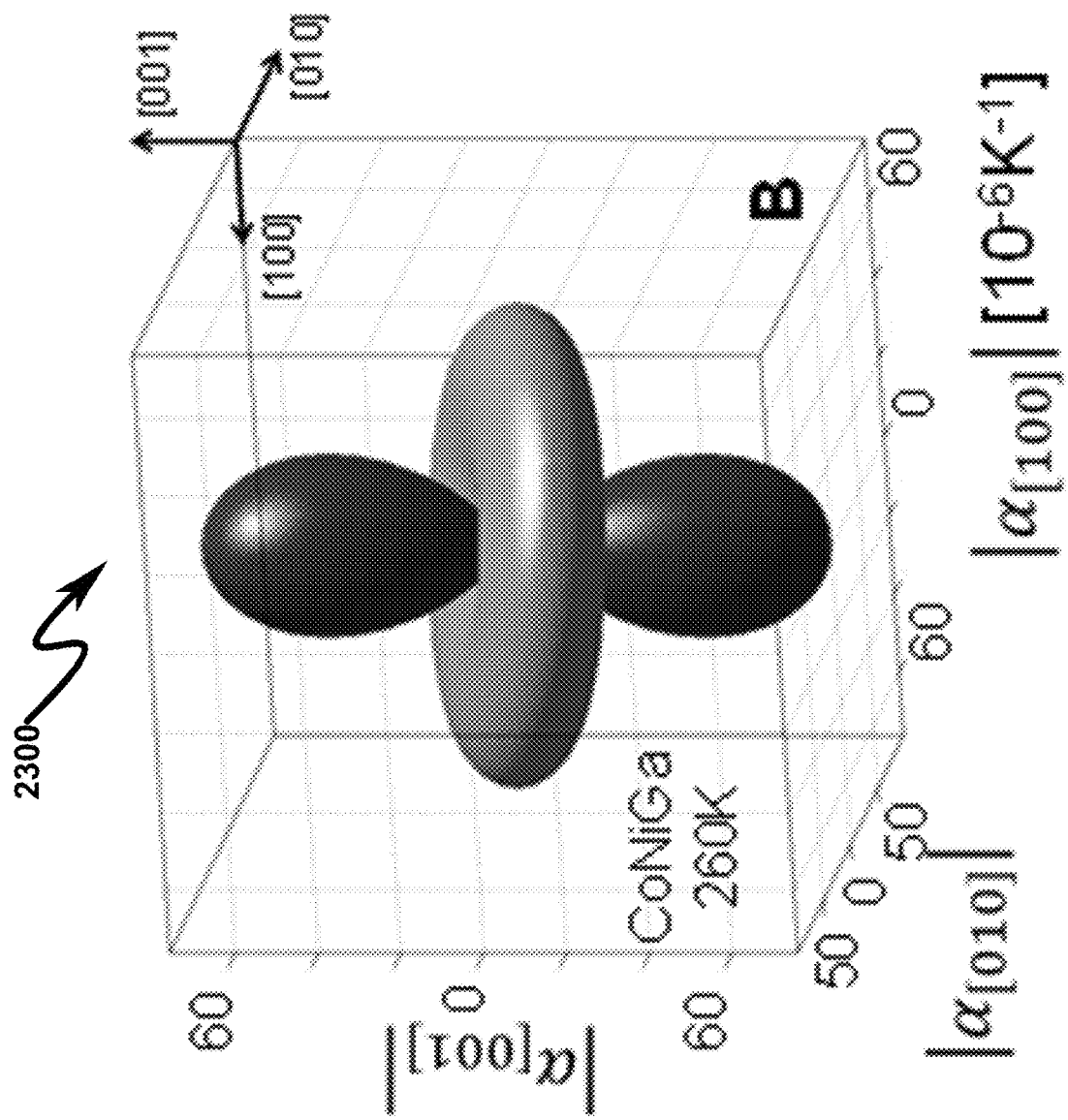
FIG. 23 illustrates graphic thermal expansion magnitudes for CoNiGa depicting three dimensional ellipsoids showing the positive and negative thermal expansion magnitudes along different crystallographic directions for orthorhombic NiTiPd across all experimental temperatures shown in FIG. 20 (2000), tetragonal CoNiGa at 260K and orthorhombic TiNb at 473K (these figures were created using Coefficient of Thermal Expansion Analysis Suite (CTEAS) software)
Figure 24:
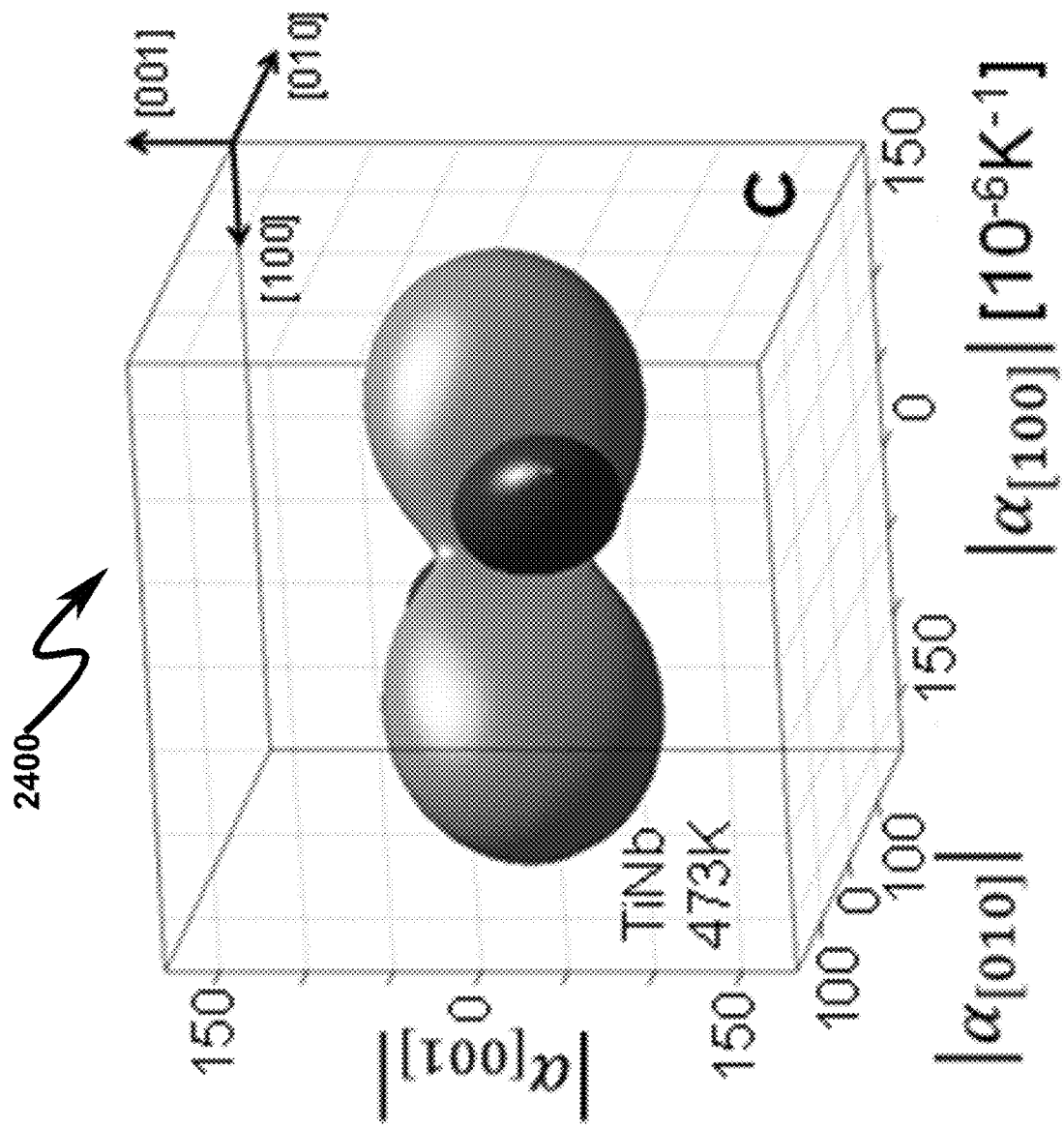
FIG. 24 illustrates graphic thermal expansion magnitudes for TiNb depicting are three dimensional ellipsoids showing the positive and negative thermal expansion magnitudes along different crystallographic directions for orthorhombic NiTiPd across all experimental temperatures shown in FIG. 20 (2000), tetragonal CoNiGa at 260K and orthorhombic TiNb at 473K (these figures were created using Coefficient of Thermal Expansion Analysis Suite (CTEAS) software)

FIG. 22 (2200)-FIG. 24 (2400) displays the experimentally measured thermal expansion coefficients along martensite's principal crystallographic directions of [100], [010] and [001], corresponding to martensite's $\alpha_{11}$, $\alpha_{22}$ and $\alpha_{33}$, respectively.

FIG. 22 (2200)-FIG. 24 (2400) display the CTE magnitudes for (a) NiTiPd, (b) CoNiGa at 260K, and (c) TiNb at 473K determined from the thermal expansion measurements displayed in FIG. 21 (2100). The ellipsoids correspond to positive and negative thermal expansion values, respectively. The orthorhombic NiTiPd alloy exhibits positive thermal expansion along the [100] direction and negative thermal expansion along the [001] direction. NiTiPd's [010] direction has a very small negative thermal expansion. The tetragonal CoNiGa alloy exhibits uniform positive thermal expansion along the [100] and [010] directions and negative thermal expansion along the [001] direction. While TiNb shares its orthorhombic crystal symmetry with NiTiPd, it only shows contraction along the [010] axis and expansion along the [100] and [001] axes. This indicates that the crystal symmetry is not the only factor that influences the thermal expansion anisotropy in these martensitic alloys. While they may have different values, the thermal expansion values inherit the symmetry of the crystal phase with the orthorhombic TiNb and NiTiPd having different values in each crystallographic direction and the tetragonal CoNiGa being isotropic in the [100]-[010] plane. The largest magnitudes of positive and negative thermal expansion are TiNb's giant +181 10$^{-6}$K$^{-1}$ and −142 10$^{-6}$K$^{-1}$ at 473K. Somewhere (may be it is to come) you need to discuss the effect of one sample being single crystal and the others polycrystals. In a polycrystal, the grains are mechanically constrained by their neighbors, thus you are likely not measuring the same lattice strain (CTE) as you would in a single crystal (again see our Be paper). This could be a small effect, but I am not sure. In a polycrystal, the observed extreme values of the CTE are necessarily smaller than they would be in a single crystal because of the constraint of the neighborhood.

Tailored Thermal Expansion (2500)-(2800)

Figure 25:
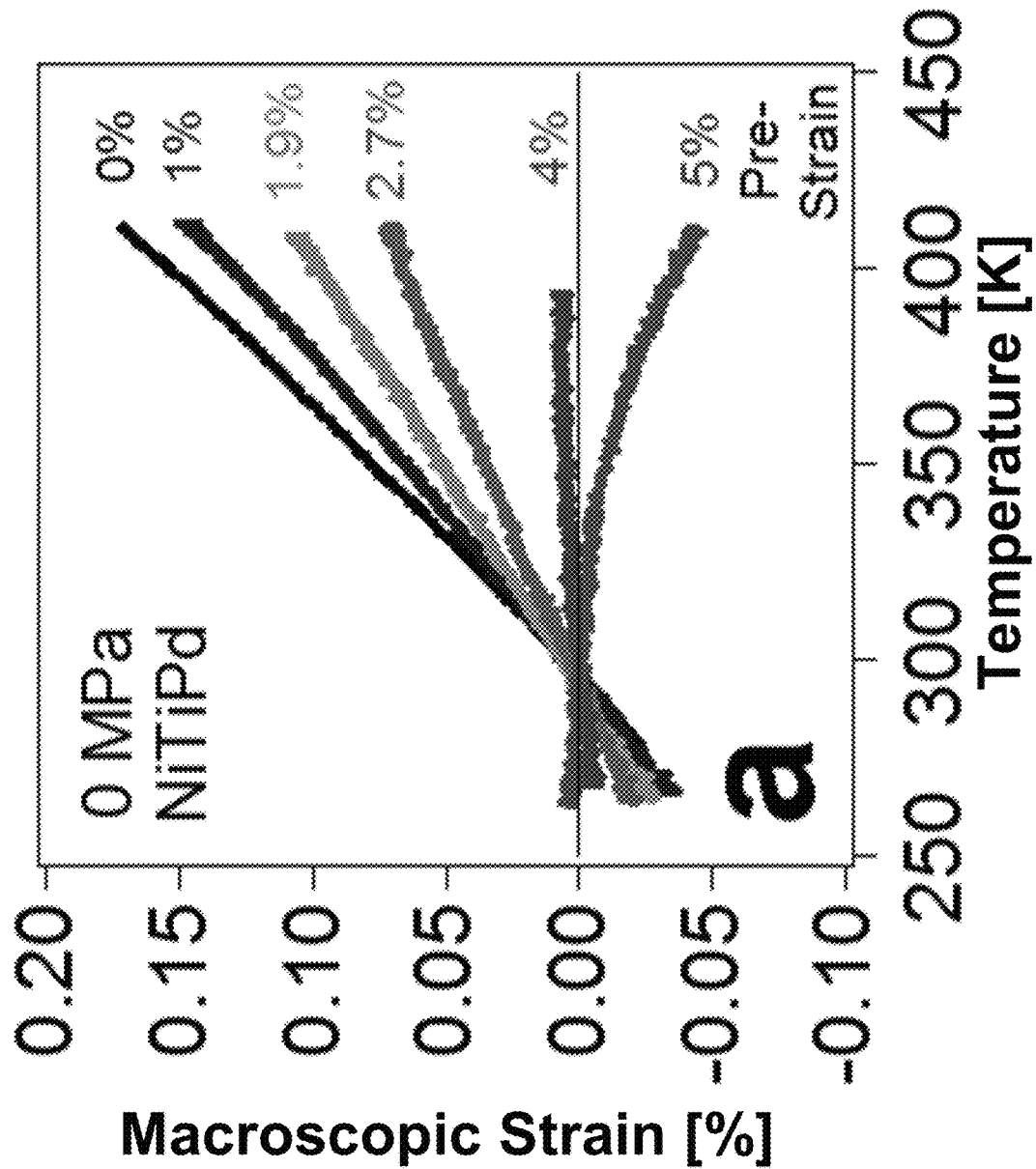
FIG. 25 illustrates macroscopic strain vs temperature response of tensile pre-strained NiTiPd before and after deformation.
Figure 26:
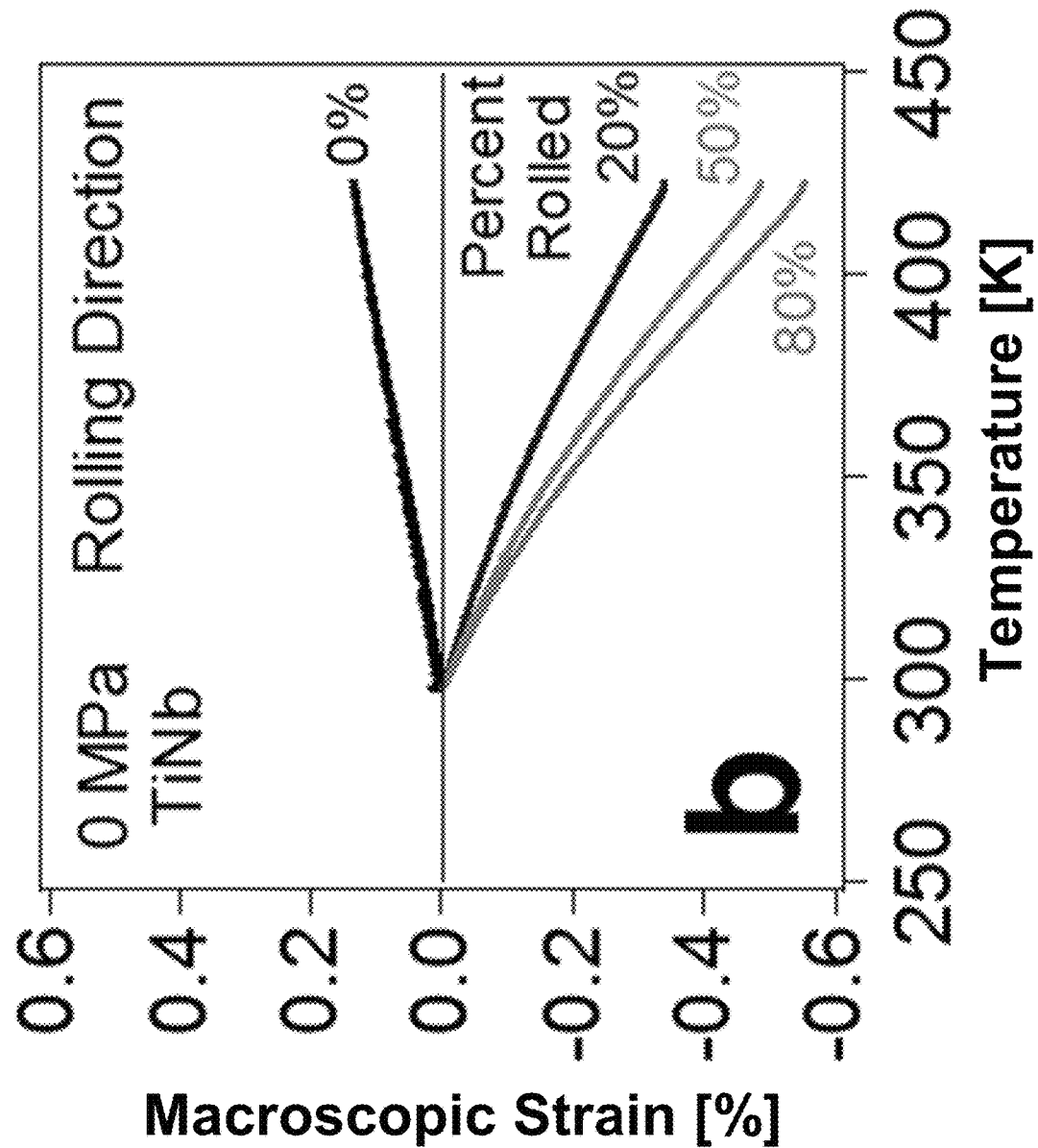
FIG. 26 illustrates macroscopic strain vs temperature response of cold rolled TiNb before and after deformation.

The giant thermal expansion anisotropy observed at the atomic level can be leveraged to tune the alloys' macroscopic thermal expansion through control of the crystallographic texture via thermo-mechanical deformation. FIG. 25 (2500) shows the stress-strain response of NiTiPd as the sample is loaded, unloaded, and loaded again, under tension, at room temperature. In between each incremental loading-unloading cycle, the sample was thermally cycled within the martensitic phase under zero stress to obtain the bulk samples' macroscopic thermal expansion characteristics. FIG. 26 (2600) displays the macroscopic strain vs. temperature response for the polycrystalline NiTiPd strained incrementally between 0% and 5% tensile strain in FIG. 25 (2500). The 0% strained condition expands with increasing temperature as expected from traditional alloys. Increasing the pre-strain from 1% to 4% strain decreases the material's dependence on temperature as the CTE approaches zero. At 5% strain, the response crosses from positive thermal expansion to negative thermal expansion at the macroscopic scale. A similar decrease in CTE is observed for cold rolled TiNb along the rolling direction as displayed in FIG. 26 (2600). The 0% rolled sample has a normal positive thermal expansion response while increasing deformation percent from 20% to 80% decreases the thermal expansion values to large negative magnitudes.

Figure 28:
FIG. 28 illustrates rotation matrices that map the austenite to the martensite basis.

The resulting thermal expansion coefficients vs. induced deformation percent are shown in FIG. 27 (2700) for NiTiPd and FIG. 28 (2800) for TiNb. The NiTiPd linear CTE decreases with increasing imposed strain and ultimately exhibits negative thermal expansion at the macroscopic scale. The thermal expansion along the rolling, transverse and normal sample directions are displayed for TiNb. The rolling direction's CTE decreases asymptotically from 9×10$^{-6}$ K$^{-1}$ to −40×10$^{-6}$ K$^{-1}$. The transverse and normal directions both increase with increasing deformation with the normal direction changing the most from 9×10$^{-6}$ K$^{-1}$ to $50 \times 10^{-6}$ K$^{-1}$. It should be noted that the reason for the apparent decrease in CTE with the 80% rolled sample measurement along the normal direction is not known. However, it might be due to error from the thin sample size. This may require inclusion of uncertainties either in the text or on the figure.

Discussion of Results/Exemplary Performance (2900)-(3200)

In addition to NiTiPd, TiNb and CoNiGa material systems presented above, some other material systems known to exhibit NTE and PTE anisotropic thermal expansion below their martensitic transformation temperatures are thermoelastic alloys and ceramics, such as NiTi (see S. Qiu, V. B. Krishnan, S. A. Padula II, R. D. Noebe, D. W. Brown, B. Clausen, R. Vaidyanathan, Measurement Of The Lattice Plane Strain And Phase Fraction Evolution During Heating And Cooling In Shape Memory NiTi. Appl. Phys. Lett. 95 (2009)) and PbTiO$_3$ (see A. W. Sleight, Compounds That Contract On Heating Norg. Chem. 37 (1998) 2854-2860), and non-thermoelastic α-Uranium (see L. T. Lloyd, C. S. Barrett, C. S. Thermal Expansion Of Alpha Uranium. J. Nucl. Mater. 18 (1966) 55). These and the materials studied in this work represent pure metals (U), disordered alloys (TiNb), B2 ordered alloys (NiTi and NiTiPd), Heusler alloys (CoNiGa), and ceramics (PbTiO$_3$). Table 1 lists the experimentally determined thermal expansion along martensite's crystallographic directions from diffraction experiments with NTE values highlighted in red. The two tetragonal crystal structures, CoNiGa and PbTiO$_3$, exhibit contraction along the [001] direction and expansion along the [100] and [010] directions while the monoclinic material, NiTi, exhibits NTE only along the [100] direction. The three orthorhombic materials show different behavior from each other with NiTiPd contracting along the [100] and [010] directions while U and TiNb contract only along [010].

Aside from PTE and NTE anisotropy, a common thread between these various materials is the martensitic transformation. A martensitic transformation is a diffusionless solid-solid phase transformation between a high temperature austenite phase and a low temperature martensite phase. The austenite phase in all these materials has cubic symmetry that exhibits PTE in all crystallographic directions while the martensite phase has lower symmetry, such as tetragonal; orthorhombic; or monoclinic, and exhibits PTE and NTE anisotropy along different crystallographic directions. The correspondence between these two crystal phases (i.e., austenite and martensite) can be determined using a simple rotation matrix, $R^{A \to M}$ presented in Table 2, that maps distances from austenite's to martensite's principal coordinate system. These rotation matrices will be used to compare austenite and martensite lattice parameters below.

The lattice parameters for the high temperature austenite, $l^A$, and low temperature martensite, $l^M$, phases of these five different materials are presented in Table 1 along with a lattice parameter comparison $R^{A \to M} l^A - l^M$ along the given crystallographic directions. For all materials presented, the martensite's crystallographic NTE directions correspond to the crystallographic directions that are smaller in austenite than martensite (i.e., where $R^{A \to M} l^A < l^M$) and PTE directions correspond to directions that are larger in austenite than martensite (i.e., where $R^{A \to M} l^A > l^M$). This criteria can be observed graphically by comparing the austenite-martensite lattice schematics for CoNiGa, NiTiPd and TiNb displayed in FIG. 17 (1700)-FIG. 19 (1900). The difference in angle, $\beta^A - \beta^M$, was also determined for monoclinic NiTi. The directions with negative values of $R^{A \to M} l^A < l^M$ (shown in red) are those that experimentally exhibit NTE and vice versa. The existence of positive and negative thermal expansion anisotropy in this wide variety of material systems and its connection to the austenite-martensite lattice parameter correspondence points to a mechanism potentially linked to the martensitic transformation. This observation also suggests that the Invar effect recently discovered in cold rolled Ti$_{23}$Nb$_{0.7}$Ta$_2$Zr$_{1.2}$O alloys may be a result of stress induced martensite in addition to the strain glass transition as described in reference (see Y. Wang, J. Gao, H. Wu, S. Yang, X. Ding, D. Wang, X. Ren, Y. Wang, X. Song, J. Gao, Strain Glass Transition In A Multifunctional β-type Ti Alloy. Sci. Rep. 4 (2014)).

Figure 29:
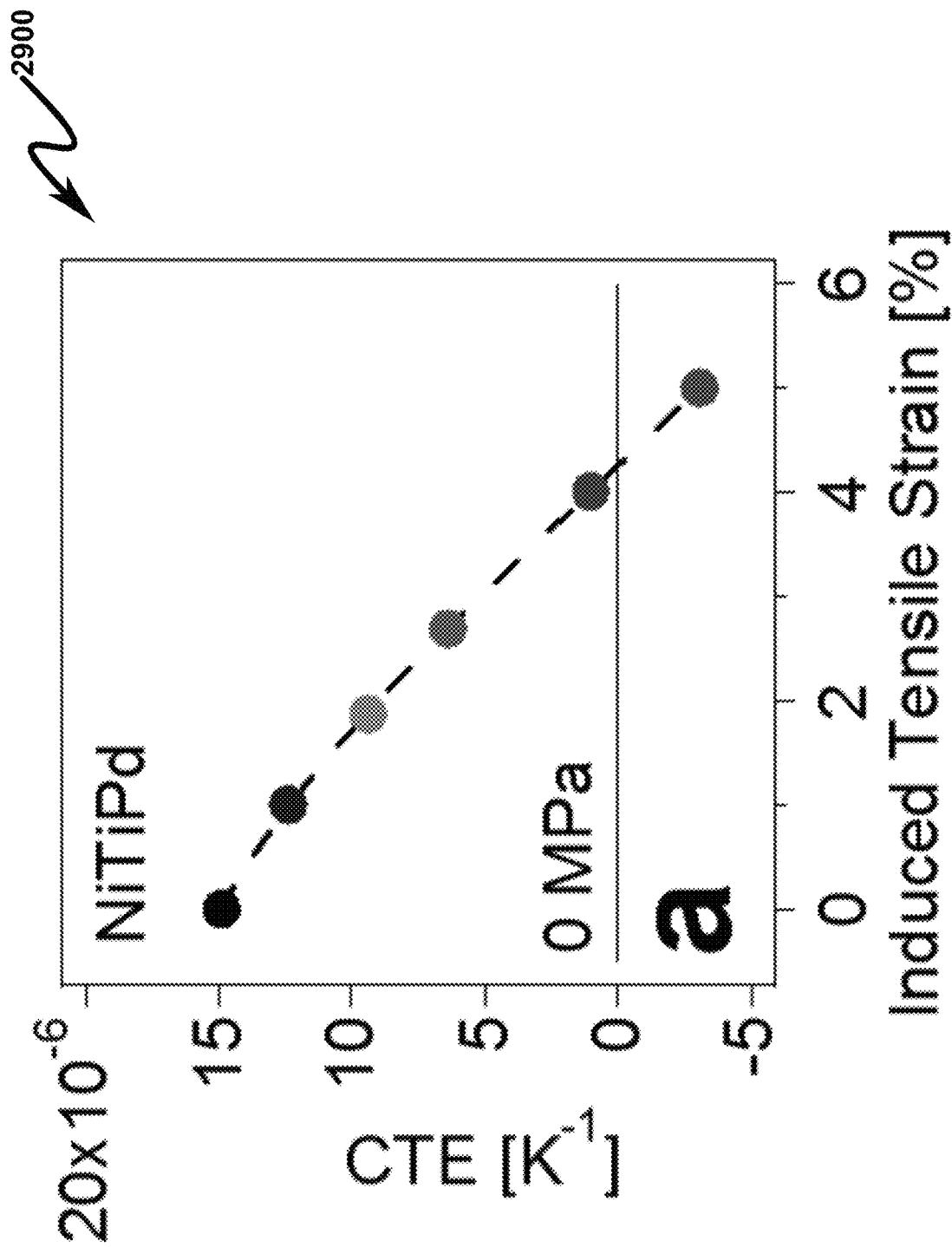
FIG. 29 illustrates macroscopic coefficients of thermal expansion vs. deformation percent for bulk NiTiPd alloys.
Figure 30:
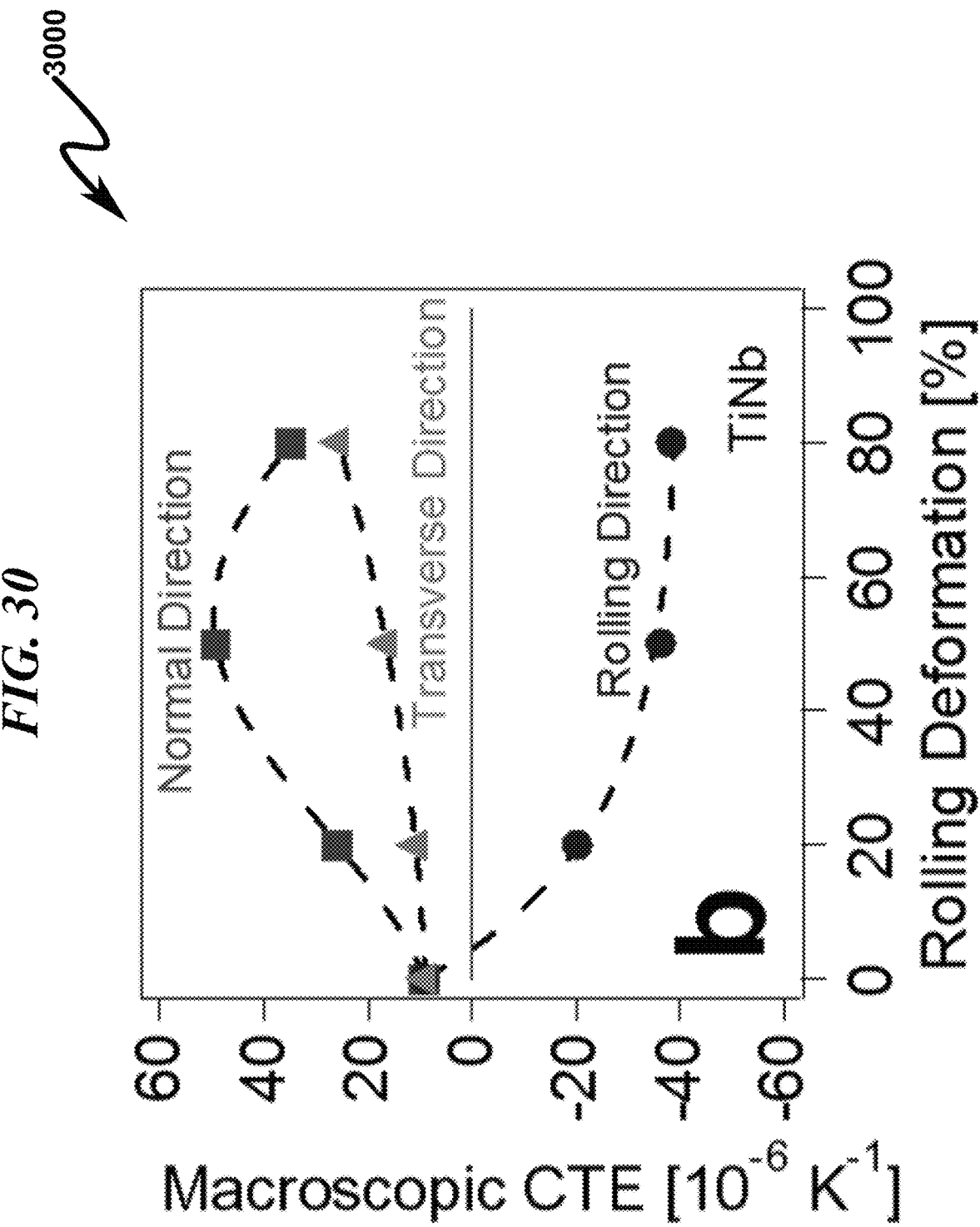
FIG. 30 illustrates macroscopic coefficients of thermal expansion vs. deformation percent for bulk TiNb alloys.
Figure 31:
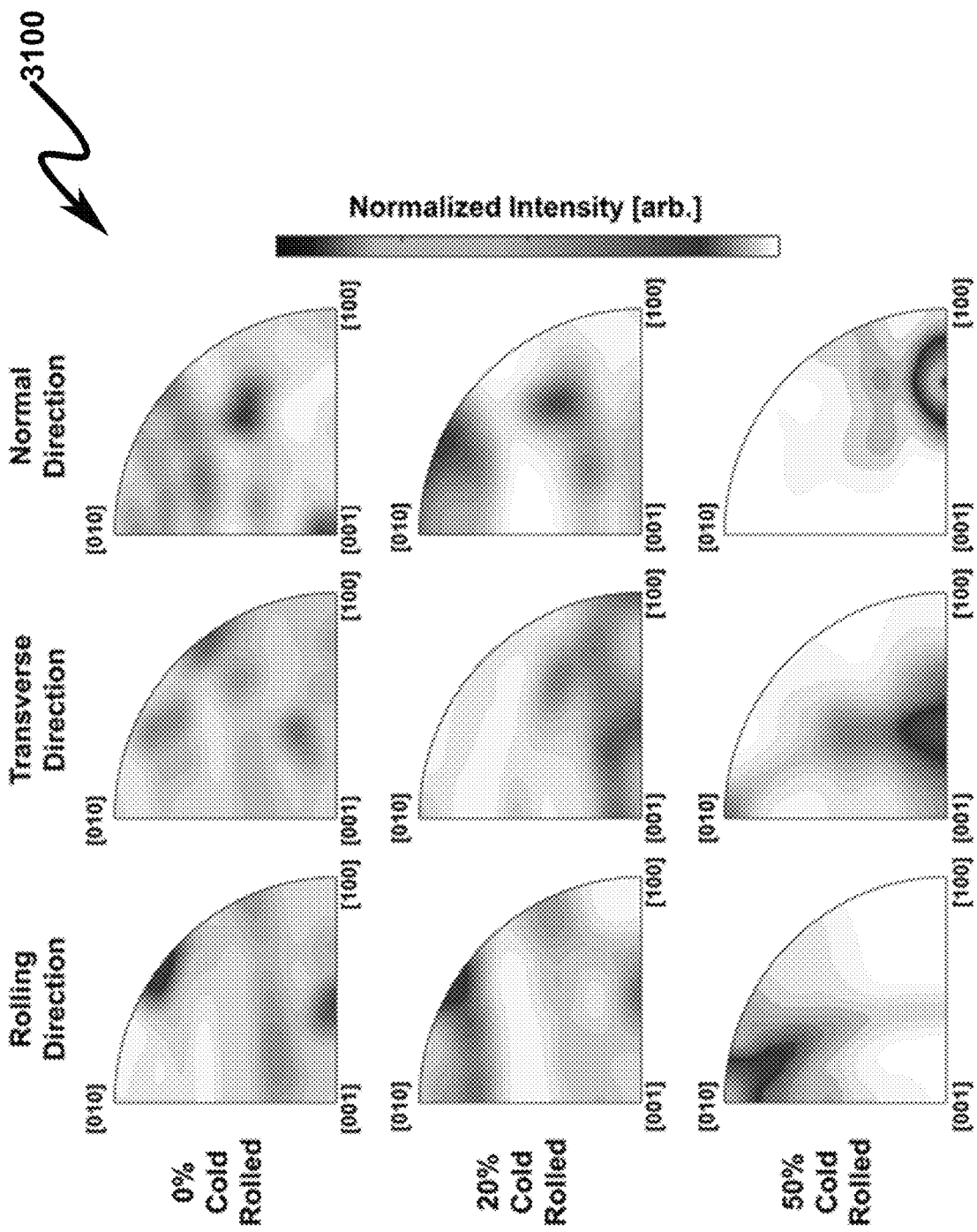
FIG. 31 illustrates TiNb inverse pole figures showing the texture evolution from 0%, 20% and 50% cold rolling.

Regardless of the microscopic mechanism responsible for the CTE anisotropy at the crystal lattice level, these tailored directional macroscopic CTE responses are achieved by orienting the martensite variants along the sample directions via thermo-mechanical deformation. FIG. 31 (3100) displays inverse pole figures along the rolling, transverse and normal directions of TiNb at 0%, 20% and 50% rolling deformation. The 0% rolled material shows nearly random weak texture with martensite variants mostly randomly oriented within the sample. This is corroborated by the isotropic macroscopic CTE exhibited by the 0% rolled condition in FIG. 29 (2900)-FIG. 30 (3000). The 50% rolled condition on the other hand exhibits strong (010) texture along the rolling direction, (307) texture in the transverse direction and (101) texture along the normal direction. The TiNb crystal's largest negative thermal expansion direction is [010], as shown in FIG. 24 (2400), which is parallel to the [010] plane normal in the orthorhombic martensite. The [010] texture along the sample's rolling direction increases with higher rolling reduction. Therefore, the lattice level negative thermal expansion in FIG. 27 (2700) and FIG. 21 (2100), creates the negative thermal expansion observed at the macroscopic scale, FIG. 26 (2600). The [307] and [101] plane normals exhibit positive thermal expansion. This correlates strongly with the textures observed in the transverse and normal sample directions, respectively. The transverse and normal directions exhibit positive thermal expansion at all rolling deformation levels. The transverse direction's CTE increases with increasing deformation, but remains smaller in magnitude than the normal direction's CTE. As a result of the texturing process, the macroscopic thermal expansion of this material is "programmed" or tuned by the rolling deformation.

Figure 32:
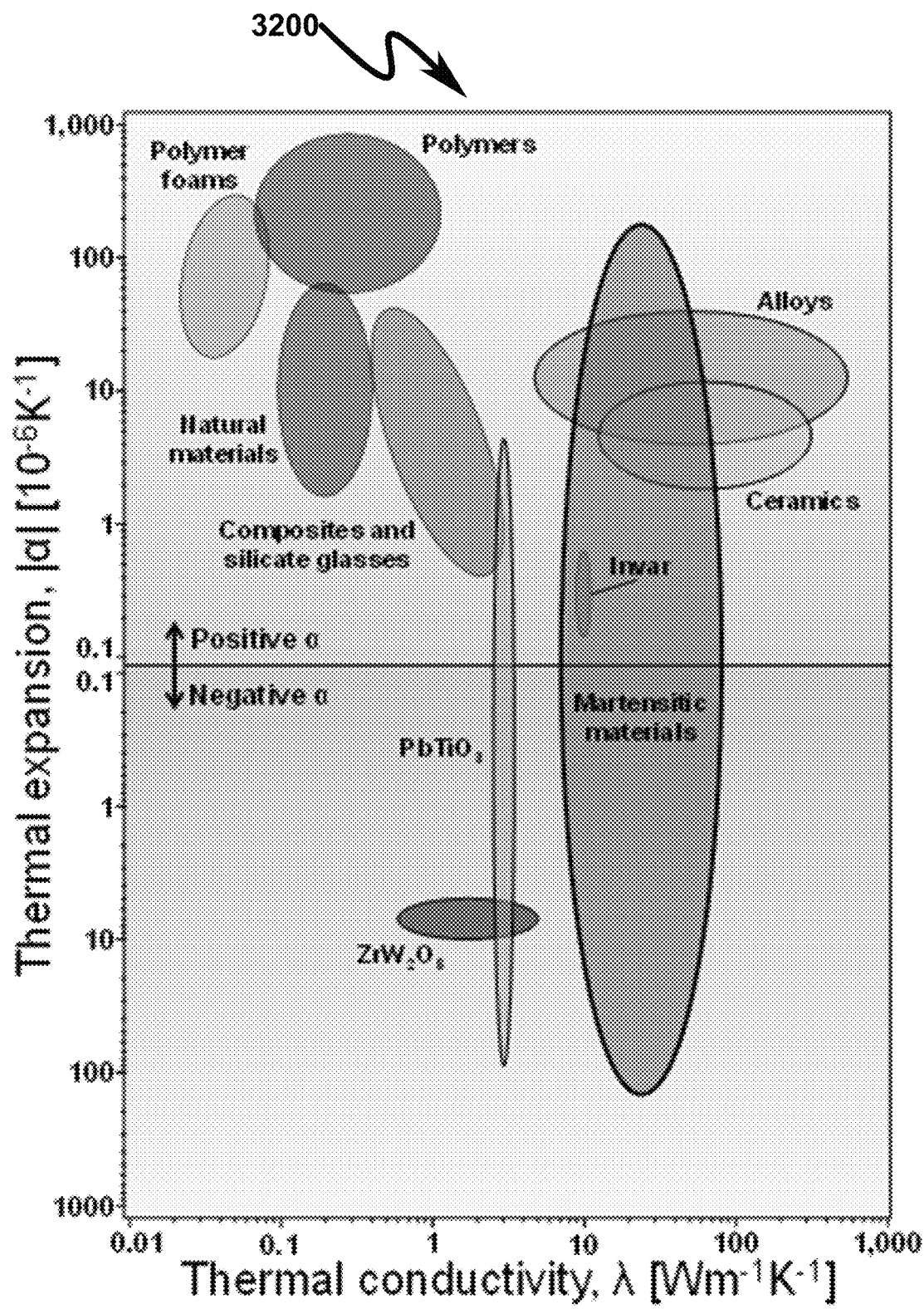
FIG. 32 illustrates Thermal expansion vs. thermal conductivity for various materials (this chart compares the thermal expansion and conductivity of negative thermal expansion $PbTiO_3$, $ZrW_2O_8$ and martensitic materials to traditional positive thermal expansion materials in the Granta Design CES materials database)

FIG. 32 (3200) displays the linear thermal expansion coefficient vs. thermal conductivity for various material types. Highlighted in purple is the current thermal expansion region that a single crystal martensitic material could potentially exhibit. The thermal expansion characteristics for this new class of tailored thermal expansion alloys can match those of polymers, ceramics and other metals over a much wider range than composite materials. The thermal expansion anisotropy is key to obtaining a tailored thermal expansion coefficient in a single material without changing the chemical composition. This is a response that materials exhibiting isotropic thermal expansion characteristics, such as Invar and ZrW$_2$O$_8$, cannot achieve. This newly discovered technique for tailoring CTEs in bulk materials can provide the means to tightly control a metal's thermal expansion coefficient beyond any currently known material, without the tradeoffs associated with changing material composition or complex composite fabrication. More importantly, the de-coupling between composition and macroscopic CTE dramatically increases the materials design space as composition could potentially be adjusted to meet specific functional requirements not necessarily related to the need to compensate thermal expansion.

Conclusions

In conclusion, the reorientation of thermoelastic domains can be used to tailor the thermal expansion response a martensitic material through simple thermo-mechanical processing. In principle, any texturing method could be used to tune the macroscopic thermal expansion coefficient of these materials. This ability to control the CTE of these materials through texture is associated with the highly anisotropic nature of the thermal expansion tensor in the martensite phase. It was also shown that NTE or PTE crystallographic directions were connected to the crystallographic relationship between the austenite and martensite lattices, pointing to a possible mechanism linked to the martensitic transformation shared by these materials. It is believed that these criteria can be applied to a much wider range of materials that undergo martensitic transformation, although there is still much to be understood about the fundamental physical basis for the observed phenomenon. The degree of control over the macroscopic thermal expansion response of the materials presented in this work suggests a revolutionary and inexpensive approach to tune the CTE of materials for use in applications that are sensitive to temperature changes or gradients.

Method Overview (3300)

Figure 33:
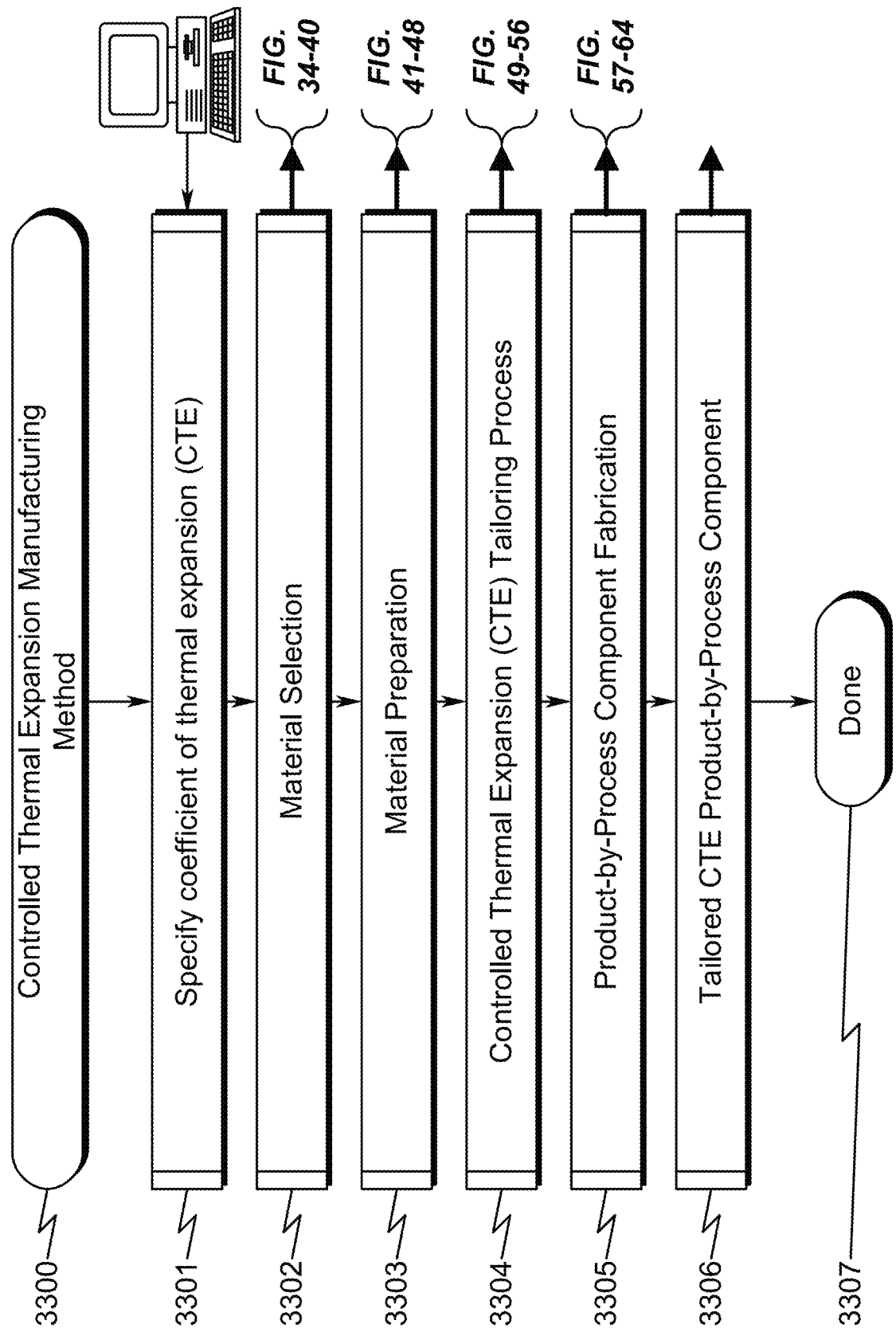
FIG. 33 illustrates an overview flowchart depicting a preferred exemplary controlled thermal expansion manufacturing method useful in some preferred invention embodiments.

In conjunction with the above-described invention system, a present invention method may implement controlled thermal coefficient product with advantageous characteristics. The present invention method may be understood by viewing the flowchart depicted in FIG. 33 (3300) and broadly generalized as a controlled thermal coefficient product method comprising:

(1) Specifying the coefficient of thermal expansion (CTE) for the resulting CTE product (3301);
(2) Selection of a CTE material for the resulting CTE product (3302);
(3) Preparing the CTE material for the resulting CTE product (3303);
(4) Tailoring the CTE material (3304); and
(5) Fabricating the resulting CTE product using the tailored CTE material (3305).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Figure 34:
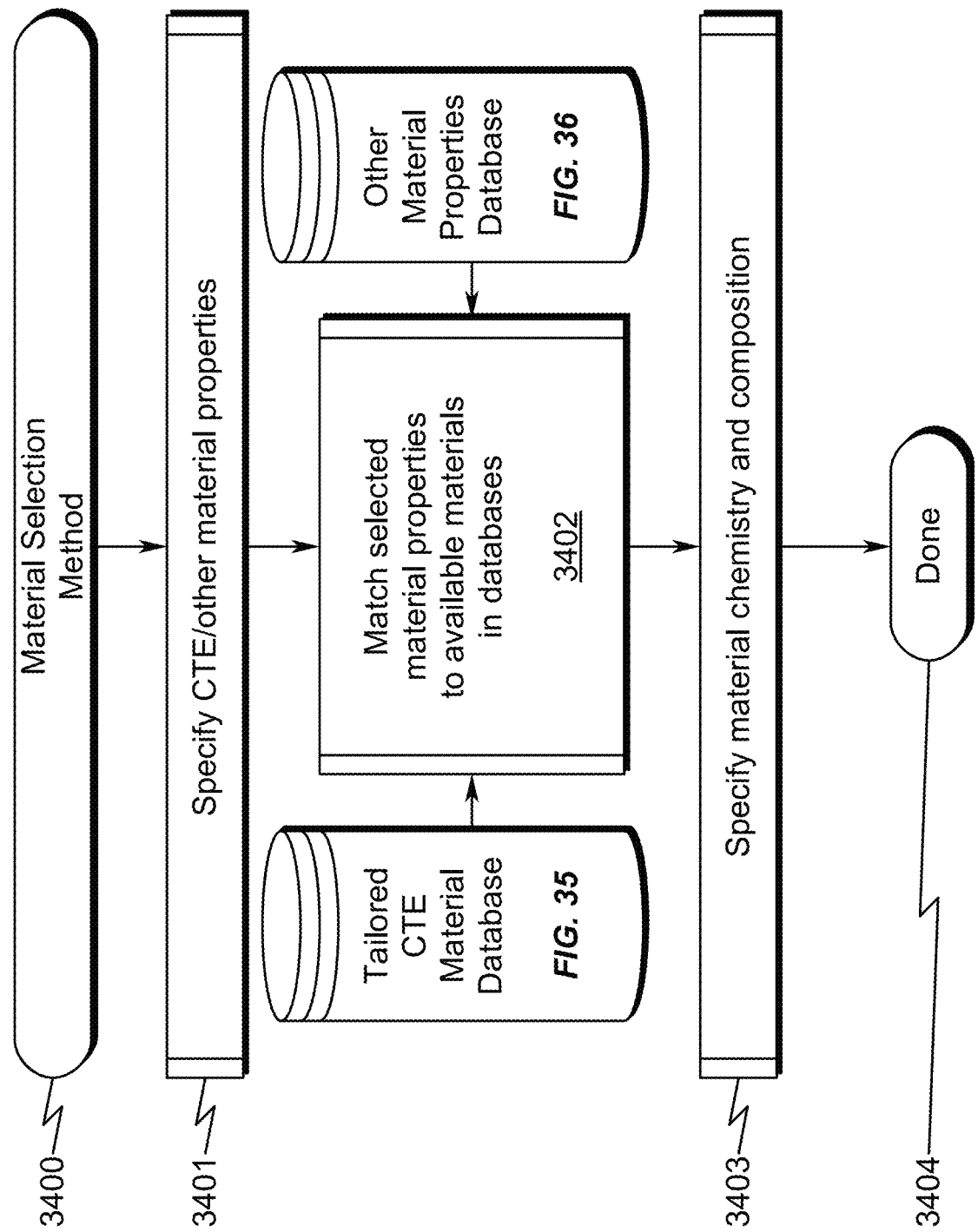
FIG. 34 illustrates a flowchart depicting a preferred exemplary material selection overview method useful in some preferred invention embodiments (1/3)
Figure 35:
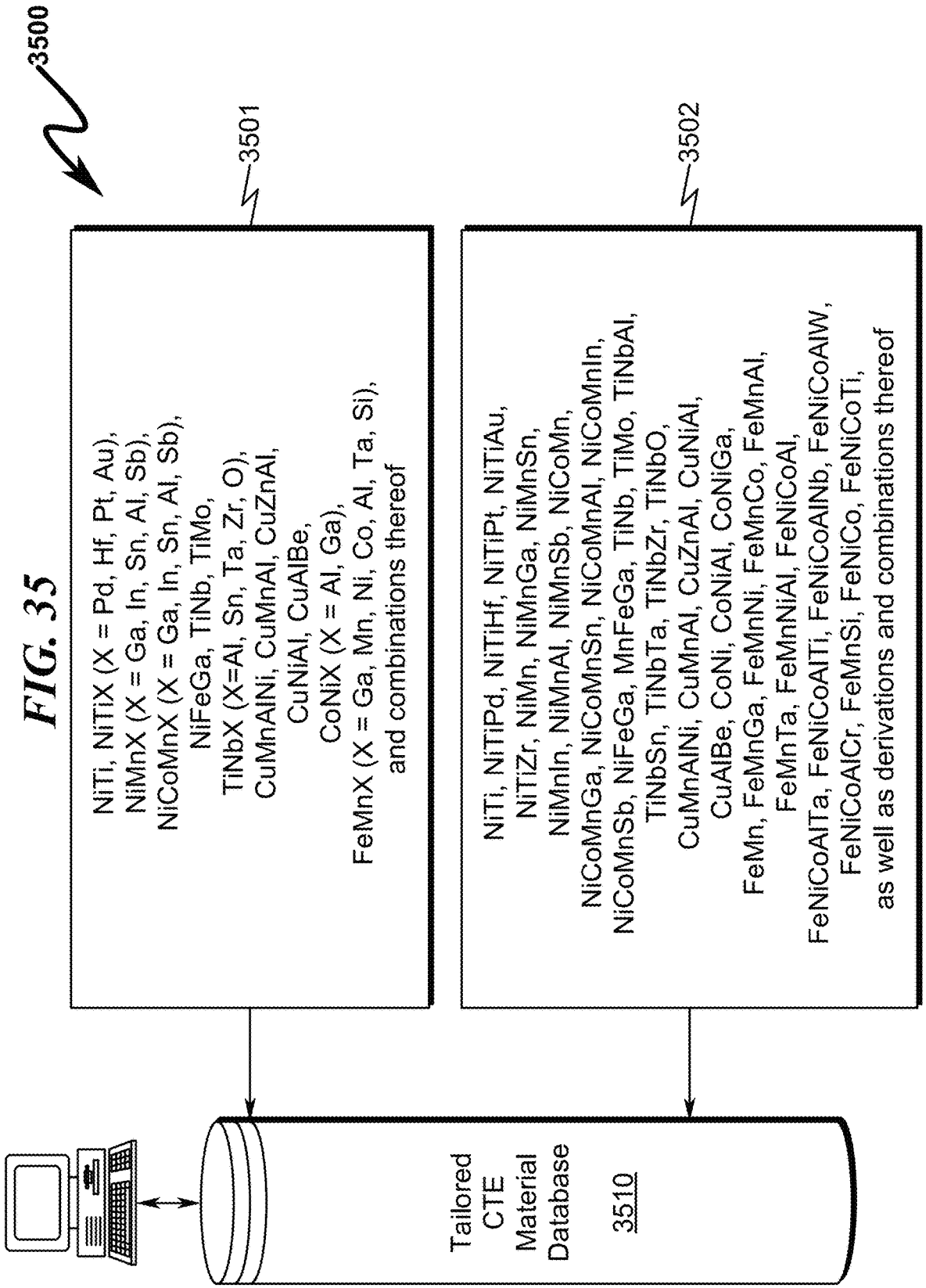
FIG. 35 illustrates a flowchart depicting a preferred exemplary material selection overview method useful in some preferred invention embodiments (2/3)
Figure 60:
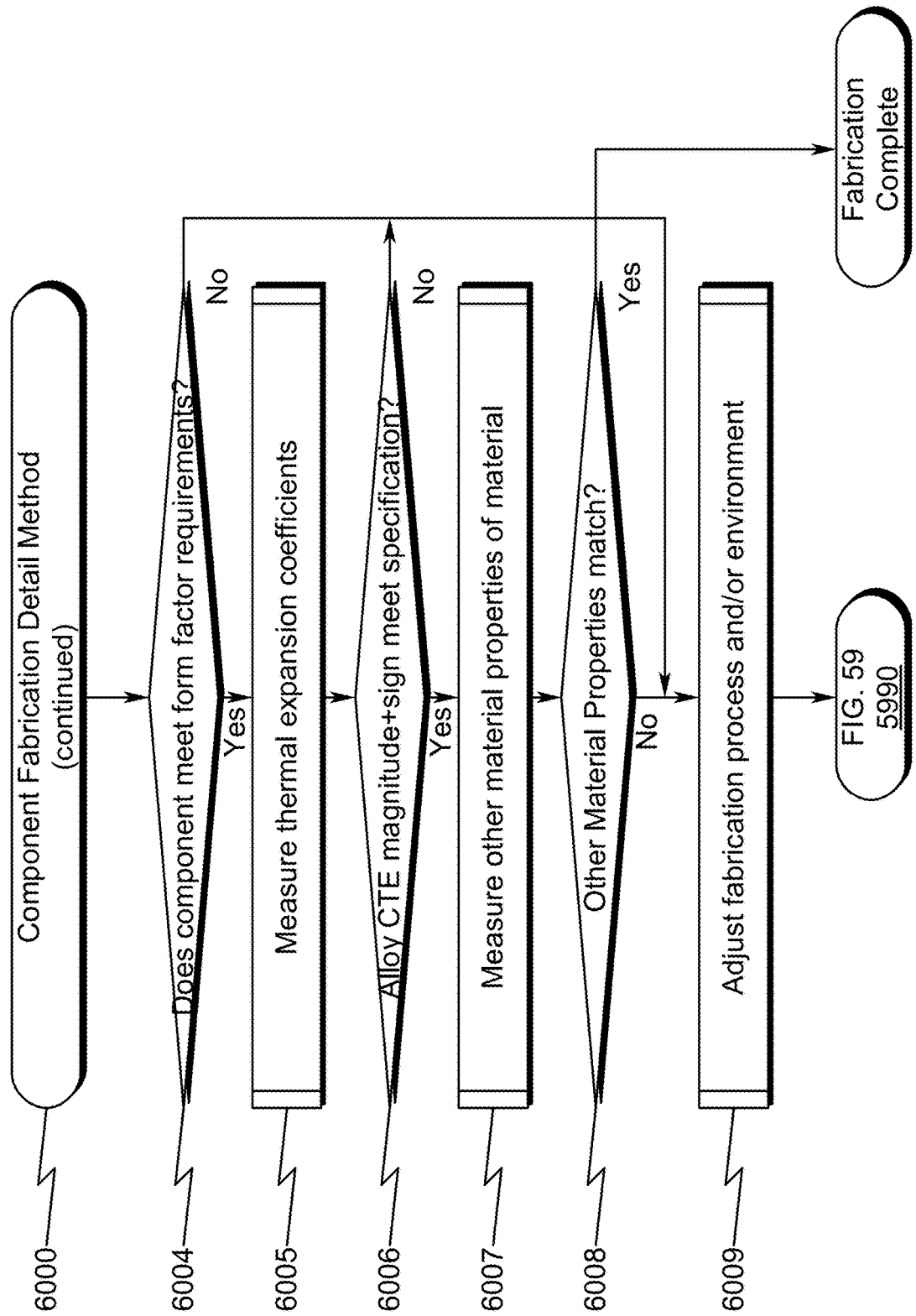
FIG. 60 illustrates a flowchart depicting a preferred exemplary component fabrication detail method useful in some preferred invention embodiments (2/2)

FIG. 34 (3400)-FIG. 60 (6000) provide additional detail supporting the individual steps of this generalized CTC product method.

Material Selection (3400)-(3700)

Method Overview

Figure 36:
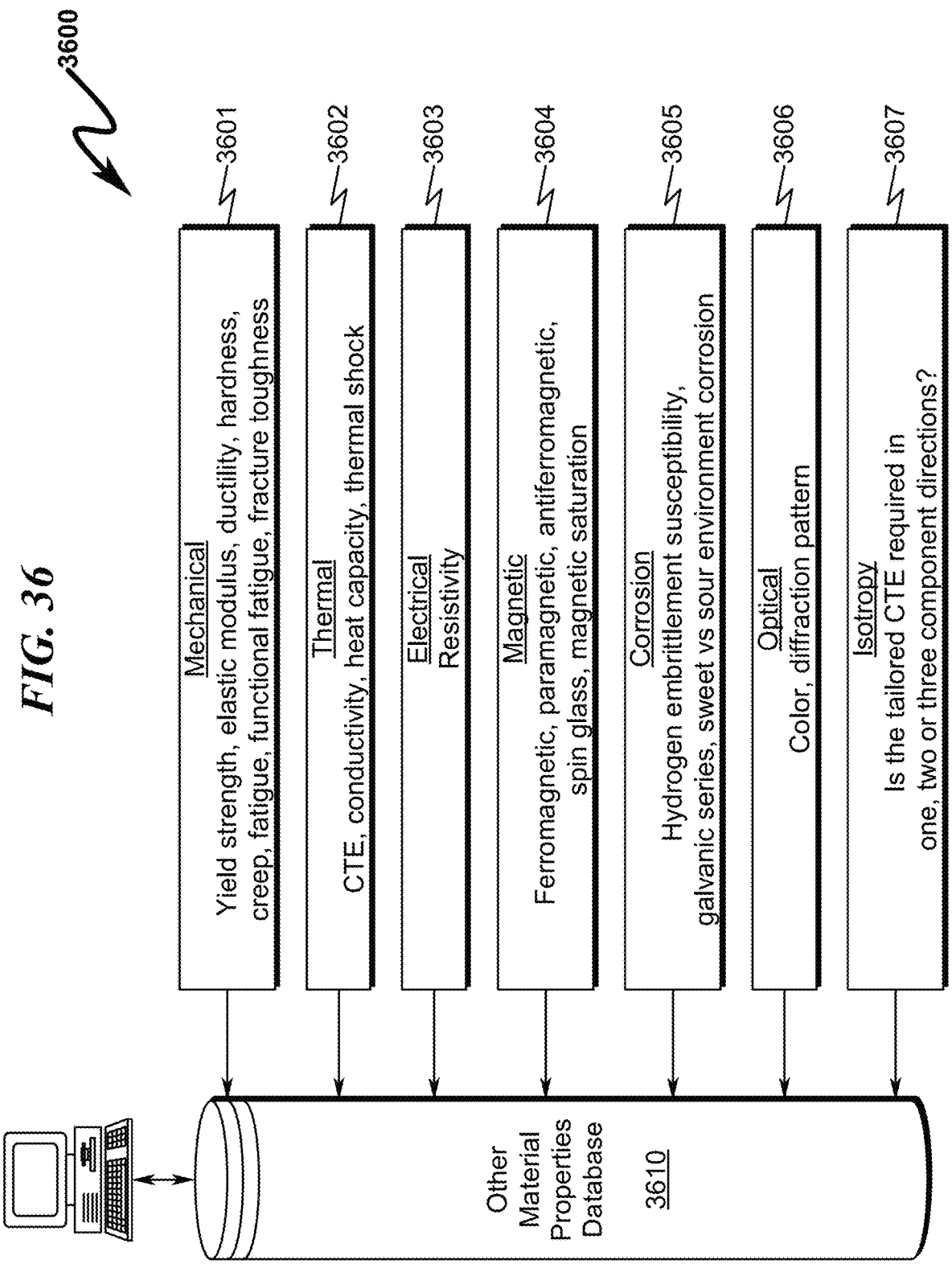
FIG. 36 illustrates a flowchart depicting a preferred exemplary material selection overview method useful in some preferred invention embodiments (3/3)
Figure 37:
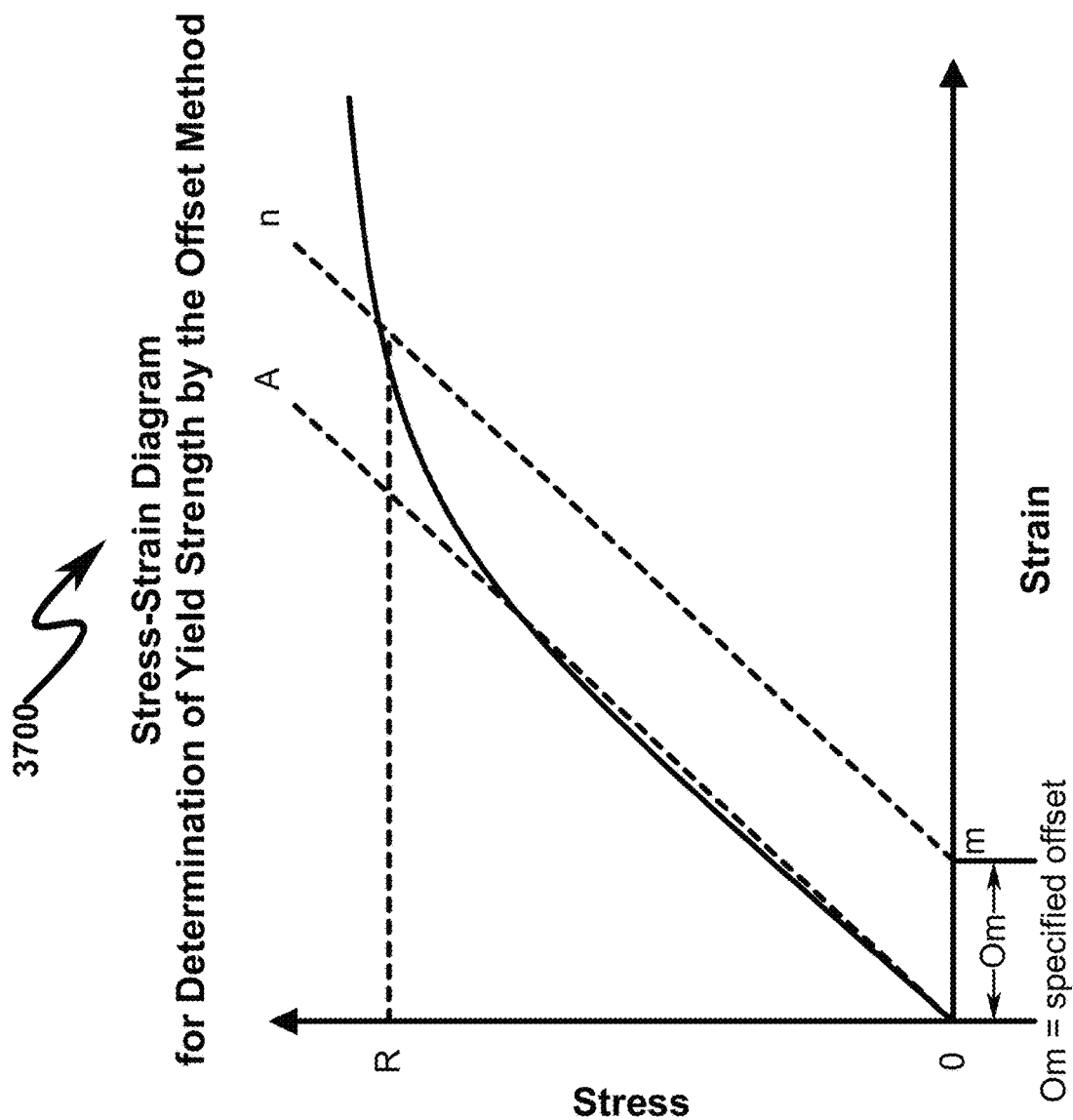
FIG. 37 illustrates a stress-strain graph for determination of yield strength by the offset method.

Additional detail of the material selection process is provided in the flowcharts depicted in FIG. 34 (3400)-FIG. 36 (3600) and the graph depicted in FIG. 37 (3700). Material selection generally comprises:

(1) Specifying the CTE and other material properties (3401);
(2) Matching selected material properties to available materials databases using either a tailored CTE material database (3500, 3510) and/or other materials database (3600, 3610) (3402); and
(3) Specifying the material chemistry and composition of the CTE material (3403).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Specifying CTE Material Properties

The three CTE specifications required are the magnitude, sign, and isotropy requirements determined by the final material/product requirements:

Magnitude—The specified magnitudes can range between 0 and $120 \times 10^{-6} K^{-1}$ and represent the material macroscopic or bulk thermal expansion coefficient in a specific material direction. The thermal expansion magnitude will determine the rate the material changes shape with temperature. It is initially specified to a predetermined value that is required for a specific application or component. The thermal expansion magnitude is related to the amount of mechanical deformation induced in the tailorable material. This input is used to select material composition and chemistry and determine the deformation amount required to produce the desired thermal expansion magnitude.

Sign—The sign of the thermal expansion magnitude is specified as positive (+) or negative (−) or perfectly zero (0). This input is used to select material composition and chemistry and determine the mechanical deformation type required to produce the desired thermal expansion sign.

Isotropy—Isotropy is specified as (1) three dimensional anisotropy, (2) two dimensional isotropy or (3) internal material location dependent. Isotropy traditionally refers to the materials ability to have varying material properties in different physical directions. This input is required to determine the deformation type and processing parameters to produce the desired isotropy in the thermal expansion magnitudes and signs.

Specifying Other Material Properties

Other material specifications are required to ensure material meets end use requirements. These specifications are property dependent and have been well defined by ASTM standard testing techniques and definitions. It is important to specify whether the final material or component requires material properties that are greater than, equal to or less than the values specified. The following represent a non-exclusive list of other material properties:

Mechanical Properties

Tensile Properties from a stress-strain diagram (ASTM E8): Yield Strength (YS) in MPa or ksi, Ultimate Tensile Strength in MPa or ksi, Elastic Modulus (ASTM E111) in GPa or ksi, Ductility in percent.

Compressive Properties from a stress-strain diagram (ASTM E9): Yield Strength in MPa or ksi, Elastic Modulus (ASTM E111) in GPa or ksi, Compressive Strength in MPa or ksi, as generally depicted in FIG. 37 (3700).

Hardness from an indention (ASTM A833) specified as Vickers or Brinnel.

Fatigue from mechanical cycling (ASTM E606 and E647) specified as fatigue limit or cycles till failure or fatigue crack growth rate.

Fracture Toughness from a fracture (ASTM E399) specified as critical stress concentration factor $K_{IC}$.

Creep Resistance from a strain-time test (ASTM E139) specified as maximum time and temperature limits.

Thermal

Conductivity (ASTM E457, E1125, C518) specified as W/(m-K).

Heat Capacity (ASTM E1269) specified as J/K.

Electrical

Electrical Resistivity (ASTM B193) specified as Ohm/cm.

Magnetic

Coercively (ASTM A977/A977M) specified as Oersted (Oe).

Permeability (ASTM A342/A342M) specified as Henries per meter (H/m) or Newtons per Amp squared (N/A^2).

Magnetic Saturation specified as Oe.

Corrosive

Open Circuit Potential (ASTM XX) specified as Volts (V).

Galvanic Series (ASTM G82 and C192) specified in Volts (V).

Other

Density specified in g/cc

Isotropy in any of the "Other Material Properties Specified."

Selecting a Potential Alloy

The CTE Magnitude, CTE Sign, and Other Material Properties Specified are inputs that influence the material selection process. This allows selection of the material from a material property database. This material property database may include the following data elements:

Thermal Expansion Magnitudes and Sign

Each candidate material needs to be a crystal that exhibits thermal expansion anisotropy (i.e., different thermal expansion values in different crystal directions at the atomic level). Each individual material and chemistry will have different thermal expansion magnitudes exhibited in different directions at the atomic scale. These magnitudes are the limiting factors for the achievable macroscopic thermal expansion coefficients that can be achieved in a bulk material. All materials that exhibit martensitic transformation, including metals and ceramics, are candidate materials. The material properties may or may not be readily available in the material property database. If the material properties are not available, they can be collected from candidate material samples.

Materials List

The candidate material may be selected from a list of materials that have been discovered to exhibit the required CTE when combined as indicated below:

$Ti_{100-A}X_A$ (X=at least one of Ni, Nb, Mo, Ta, Pd, Pt, or combinations thereof) (A=0 to 75 atomic percent composition), $Ti_{100-A-B}Ni_AX_B$ (X=at least one of Pd, Hf, Zr, Al, Pt, Au, Fe, Co, Cr, Mo, V, O or combinations thereof) (A=0 to 55 atomic percent composition and B=0 to 75 atomic percent composition such that A+B<100), $Ti_{100-A-B}Nb_AX_B$ (X=at least one of Al, Sn, Ta, Hf, Zr, Al, Au, Pt, Fe, Co, Cr, Mo, V, O, or combinations thereof) (A=0 to 55 atomic percent composition and B=0 to 75 atomic percent composition such that A+B<100), $Ti_{100-A-B}Ta_AX_B$ (X=at least one of Al, Sn, Nb, Zr, Mo, Al, Au, Pt, Fe, Co, Cr, Hf, V, O, or combinations thereof) (A=0 to 55 atomic percent composition and B=0 to 75 atomic percent composition such that A+B<100), $Ni_{100-A-B}Mn_AX_B$ (X=at least one of Ga, In, Sn, Al, Sb, Co, or combinations thereof) (A=0 to 50 atomic percent composition and B=0 to 50 atomic percent composition such that A+B<100), $Ni_{100-A-B-C}Mn_ACo_BX_C$ (X=at least one of Ga, In, Sn, Al, Sb, or combinations thereof) (A=0 to 50 atomic percent composition, B=0 to 50 atomic percent composition, and C=0 to 50 atomic percent composition such that A+B+C<100), $Ni_{100-A-B}Fe_AGa_B$ (A=0 to 50 atomic percent composition and B=0 to 50 atomic percent composition such that A+B<100), $Cu_{100-A}X_A$ (X=at least one of Zn, Ni, Mn, Al, Be, or combinations thereof) (A=0 to 75 atomic percent composition), $Cu_{100-A-B}Al_AX_B$ (X=at least one of Zn, Ni, Mn, Be, or combinations thereof) (A=0 to 50 atomic percent composition and B=0 to 50 atomic percent composition such that A+B<100), $Cu_{100-A-B-C}Mn_AAl_BX_C$ (X=at least one of Zn, Ni, Be, or combinations thereof) (A=0 to 50 atomic percent composition, B=0 to 50 atomic percent composition, and C=0 to 50 atomic percent composition such that A+B+C<100), $Co_{100-A-B}Ni_AX_B$ (X=at least one of Al, Ga, Sn, Sb, In, or combinations thereof) (A=0 to 50 atomic percent composition and B=0 to 50 atomic percent composition such that A+B<100), $Fe_{100-A-B}Mn_AX_B$ (X=at least one of Ga, Ni, Co, Al, Ta, Si, or combinations thereof) (A=0 to 50 atomic percent composition and B=0 to 50 atomic percent composition such that A+B<100), $Fe_{100-A-B}Ni_AX_B$ (X=at least one of Ga, Mn, Co, Al, Ta, Si, or combinations thereof) (A=0 to 50 atomic percent composition and B=0 to 50 atomic percent composition such that A+B<100), $Fe_{100-A-B-C}Ni_ACo_BAl_CX_D$ (X=at least one of Ti, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), $Fe_{100-A-B-C}Ni_ACo_BTi_CX_D$ (X=at least one of Al, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), and combinations thereof that exhibit martensitic transformation.

NiTi, NiTiPd, NiTiHf, NiTiPt, NiTiAu, NiTiZr, NiMn, NiMnGa, NiMnSn, NiMnIn, NiMnAl, NiMnSb, NiCoMn, NiCoMnGa, NiCoMnSn, NiCoMnAl, NiCoMnIn, NiCoMnSb, NiFeGa, MnFeGa, TiNb, TiMo, TiNbAl, TiNbSn, TiNbTa, TiNbZr, TiNbO, CuMnAlNi, CuMnAl, CuZnAl, CuNiAl, CuAlBe, CoNi, CoNiAl, CoNiGa, FeMn, FeMnGa, FeMnNi, FeMnCo, FeMnAl, FeMnTa, FeMnNiAl, FeNiCoAl, FeNiCoAlTa, FeNiCoAlTi, FeNiCoAlNb, FeNiCoAlW, FeNiCoAlCr, FeMnSi, FeNiCo, FeNiCoTi, as well as derivations and combinations thereof that exhibit martensitic transformation.

Methods that are anticipated to be used to determine the CTE magnitude include diffraction (XRD, neutron, synchrotron) or mechanical measurement.

Other Material Properties

Other Material Properties—Other material properties are collected using the ASTM standards specified in the "Other Material Properties Specified" section above. Alternatively, these material properties can be retrieved from material property databases that readily available. These materials properties are specified to meet specific criteria in a system or application. These may include:

Mechanical
Thermal
Electrical
Magnetic
Corrosive

Selection Process

A general material selection process may incorporate the following steps:

(1) Selecting a Candidate Alloy based on CTE requirements using input from selection descriptions above. A list of candidate materials is initially selected from the material database based on material chemistries that undergo martensitic transformation and CTE magnitude and sign requirements. The thermal expansion magnitudes of a candidate material at the atomic scale must be greater than or equal to the magnitudes specified above and the sign must be the same as indicated above.

(2) Comparing the selected material to other material property requirements by using a process of elimination, wherein materials and chemistries are removed from the initial list of materials. To pass, the material must exhibit properties greater than, equal to or less than the values specified in above.

(3) Recursive Material Selection—The selection list is recursively refined to obtain a specific material and chemistry that can achieve the specified thermal expansion coefficient and specified other material properties. Even if the thermal expansion coefficients and/or other material properties are not previously known and stored in the database, rapid material selection can be achieved by fabricating materials with changes to material composition.

(4) Changes to Composition can be achieved by varying the composition (i.e., changing the proportion of one element while maintaining the same type of elements) of a base material chemistry change the thermal expansion magnitudes and sign. These variations will also change other material properties.

(5) Changes to Base Chemistry can be achieved by using a different element or adding additional alloying elements) of a base material chemistry change the thermal expansion magnitudes and sign. These variations will also change other material properties.

The resulting unique material has a chemistry with:

Tailorable CTE potential; and
Specified other material properties.

Method Detail (3800)-(4000)

Figure 38:
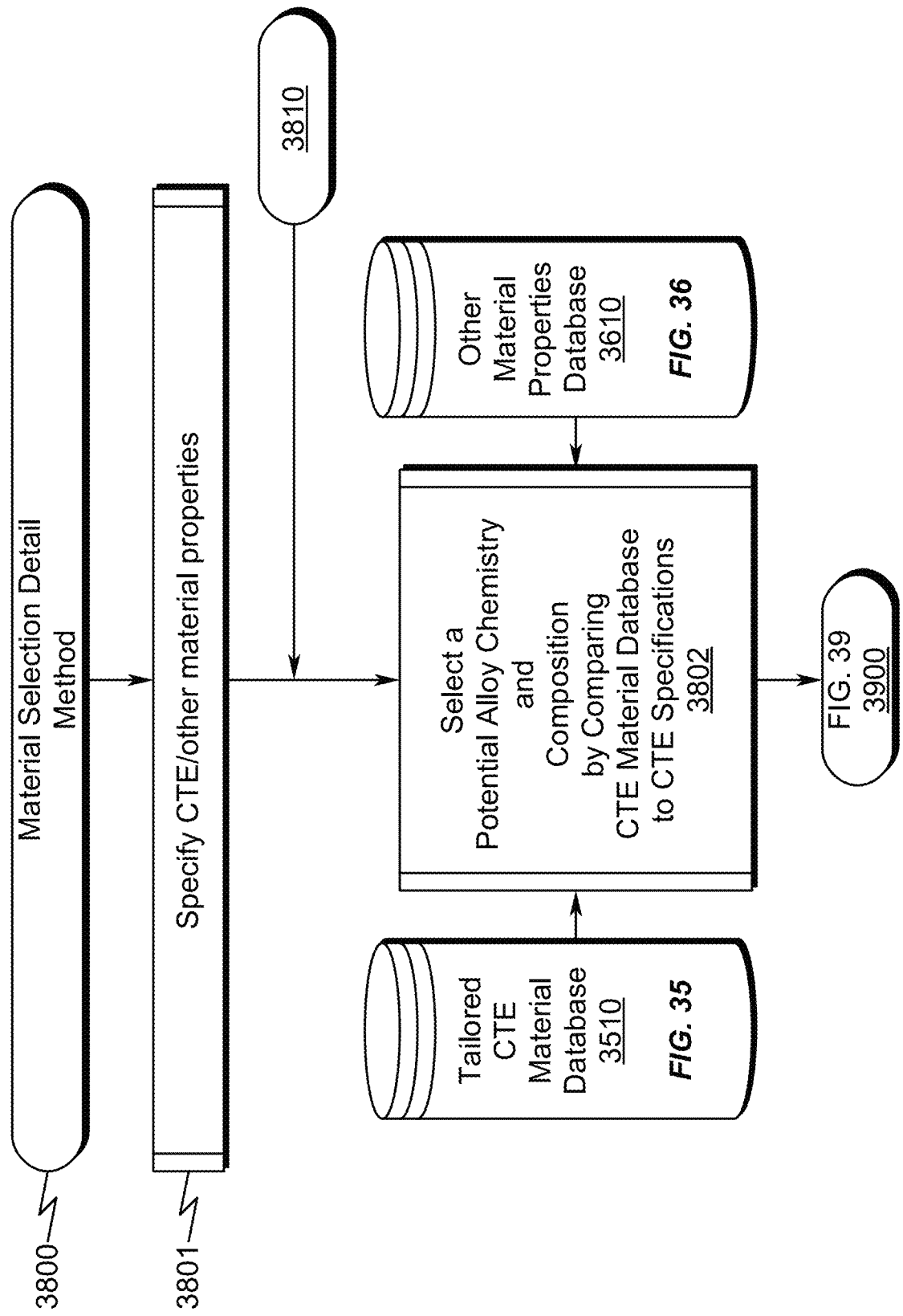
FIG. 38 illustrates a flowchart depicting a preferred exemplary material selection detail method useful in some preferred invention embodiments (1/3)
Figure 39:
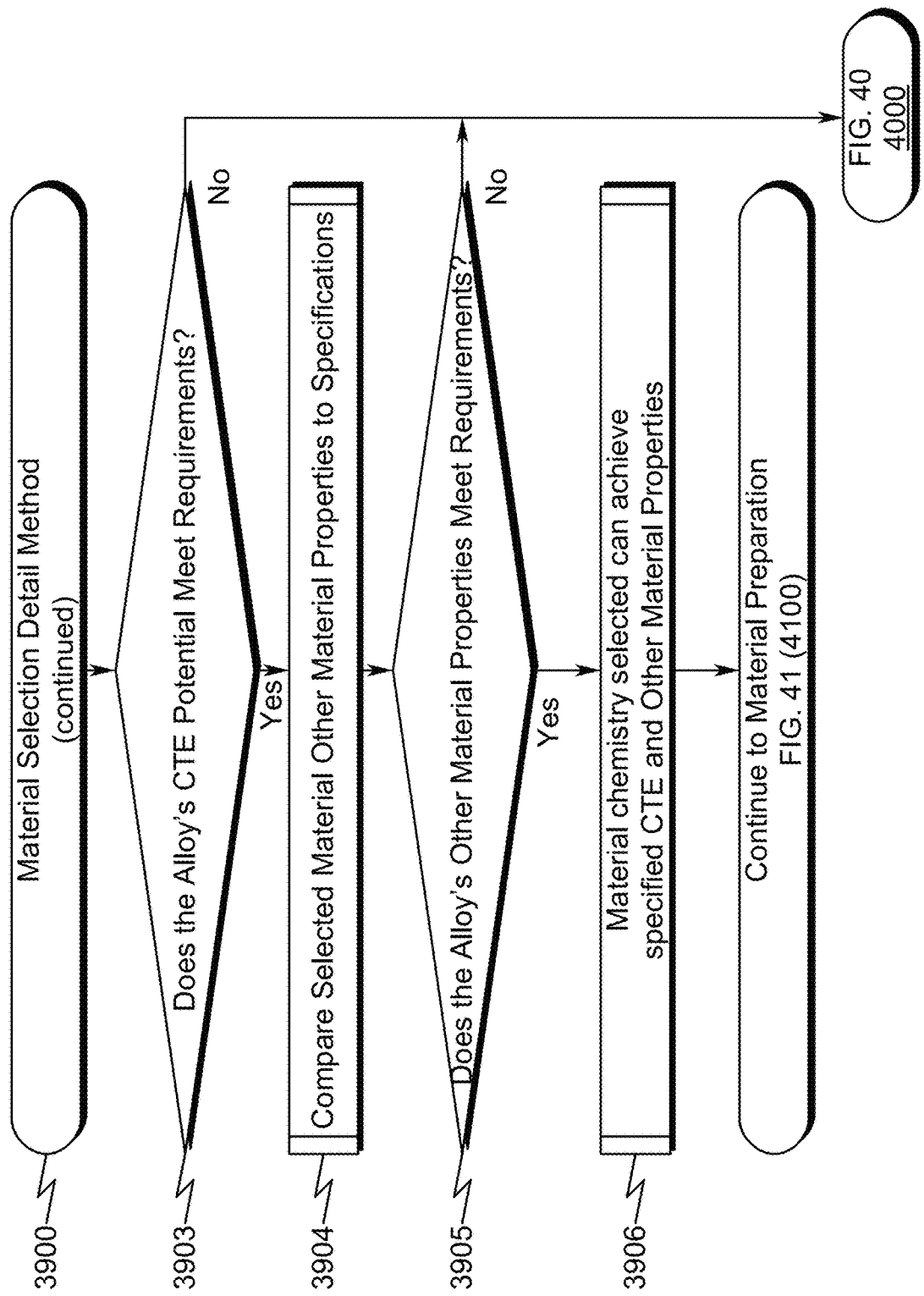
FIG. 39 illustrates a flowchart depicting a preferred exemplary material selection detail method useful in some preferred invention embodiments (2/3)
Figure 40:
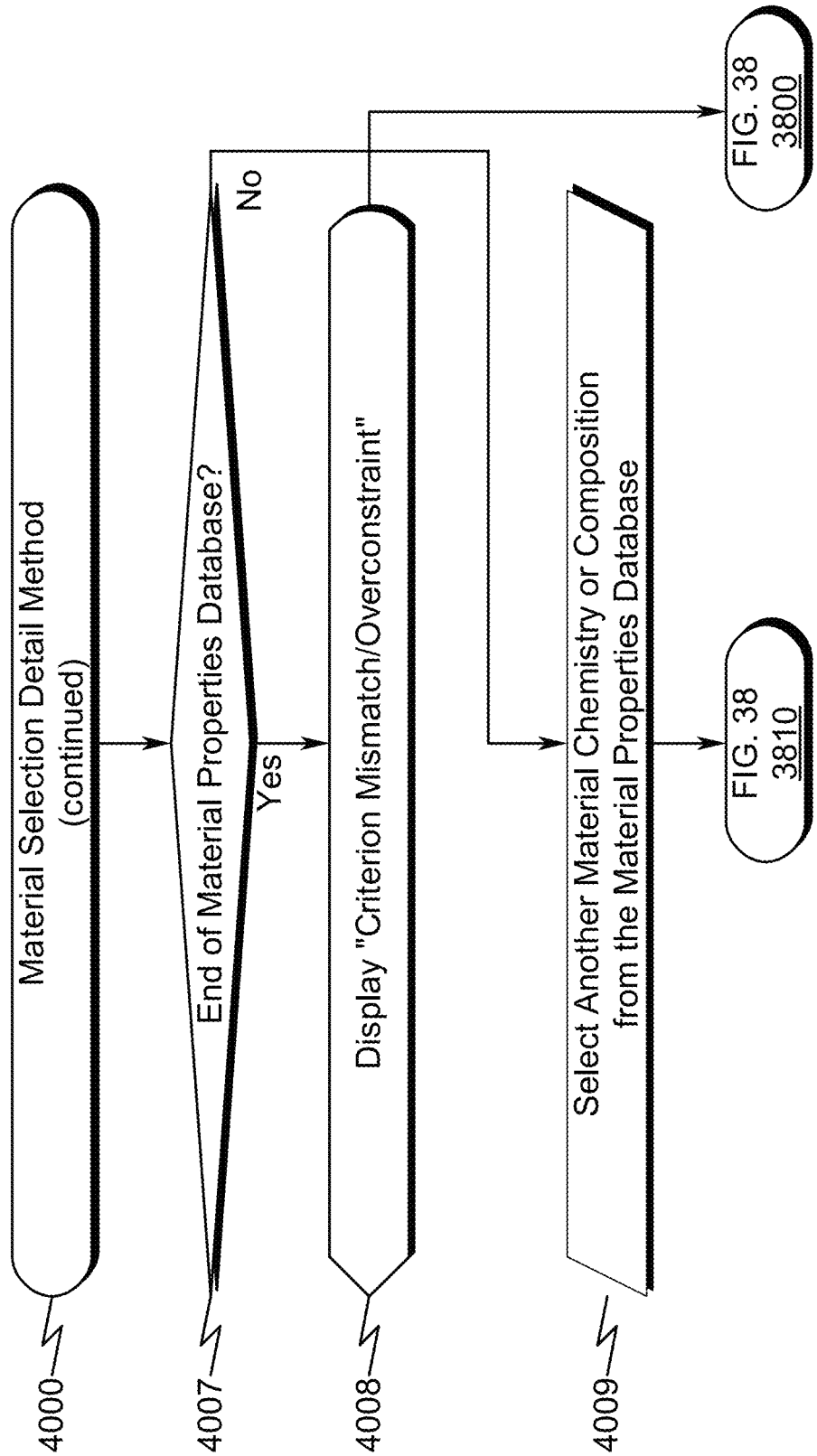
FIG. 40 illustrates a flowchart depicting a preferred exemplary material selection detail method useful in some preferred invention embodiments (3/3)

A more detailed description of the material selection method is generally depicted in FIG. 38 (3800)-FIG. 40 (4000). This detailed method generally comprises the following steps:

(1) Specify CTE and Other Material Properties as indicated above (3801);

(2) Select a potential alloy chemistry and composition by comparing CTE Material Database (Tailored CTE Material Database (3510) or Other Material Properties Database (3610)) to CTE Specifications (3802);

(3) Determining if the potential alloy CTE meet the desired CTE requirements, and if not, proceeding to step (7) (3903);

(4) Comparing the selected material other material properties to the desired target object properties (3904);

(5) Determining if the selected alloy other material properties meet the target object properties, and if not, proceeding to step (7) (3905);

(6) Verifying that the material chemistry selected can achieve the specified CTE and other material properties, and proceeding to material preparation (3906);

(7) Determining if all information has been scanned in the material properties database for matching CTE/other material properties criterion, and if not, proceeding to step (9) (4007);

(8) Displaying an informational message indicating that a CTE criterion mismatch has occurred or that the desired product characteristics are over-constrained and proceeding to step (1) (4008);

(9) Selecting another material chemistry or composition from the material properties database and proceeding to step (2) (4009).

As can be seen from this flowchart, the material selection process may incorporate a recursive component that allows a variety of materials to be selected for a given product application based on changing CTE and other material characteristics. This material selection, when used in conjunction with subsequent customized material preparation can generate end-products having advantageous CTE properties that are not available when using materials or alloys in their raw state.

Material Preparation (4100)-(4800)

Method Overview

Figure 41:
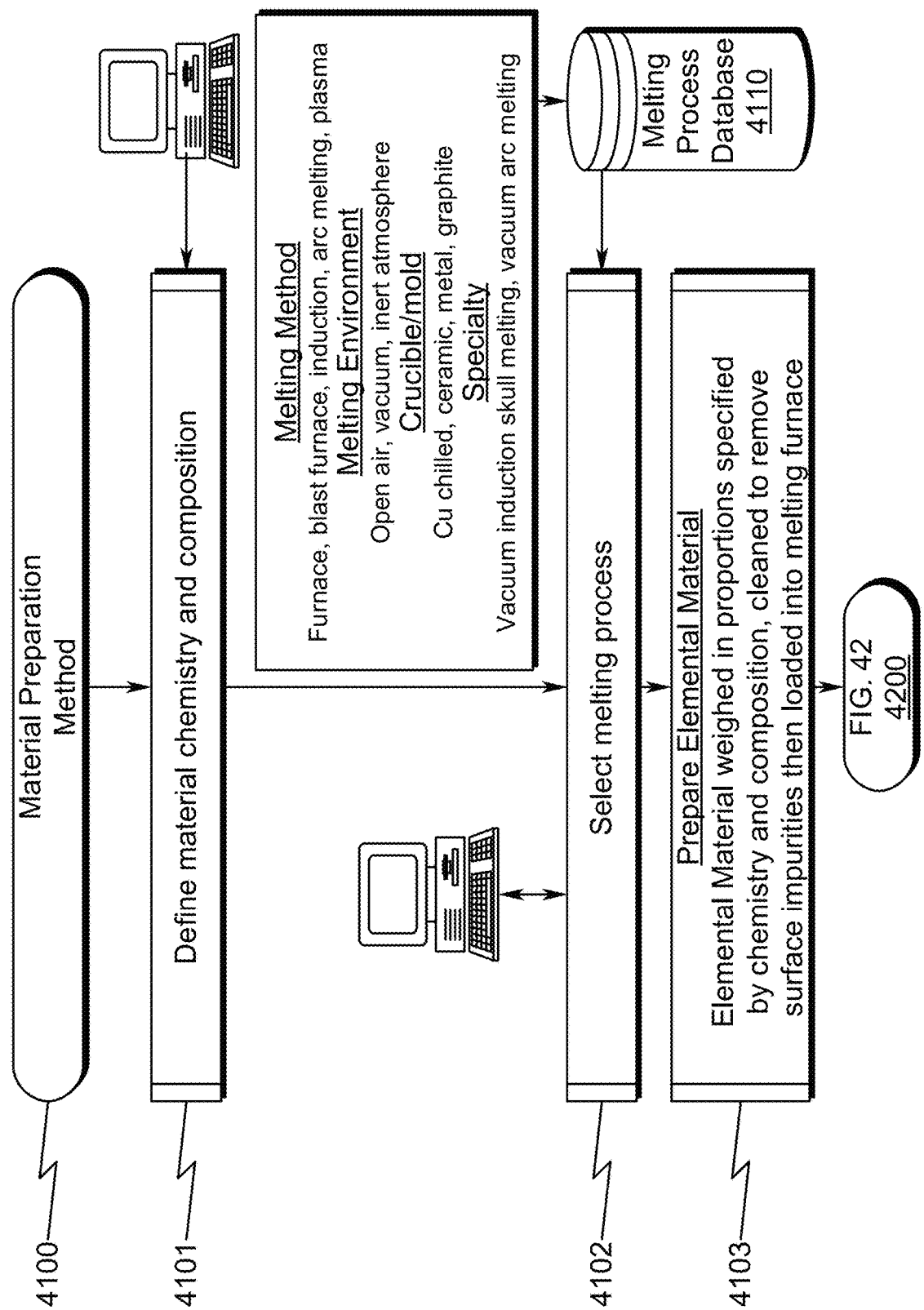
FIG. 41 illustrates a flowchart depicting a preferred exemplary material preparation overview method useful in some preferred invention embodiments (1/3)
Figure 42:
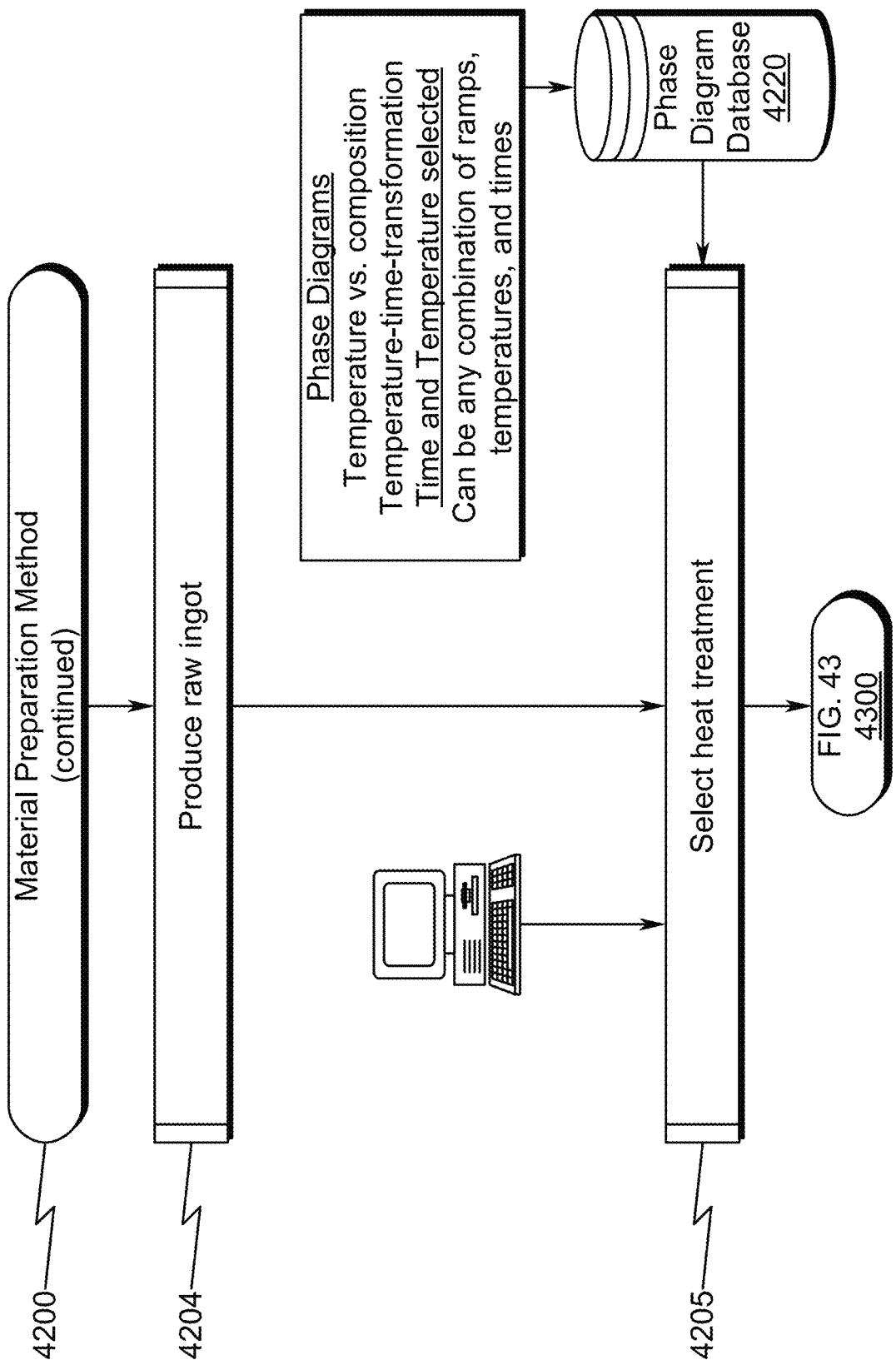
FIG. 42 illustrates a flowchart depicting a preferred exemplary material preparation overview method useful in some preferred invention embodiments (2/3)
Figure 43:
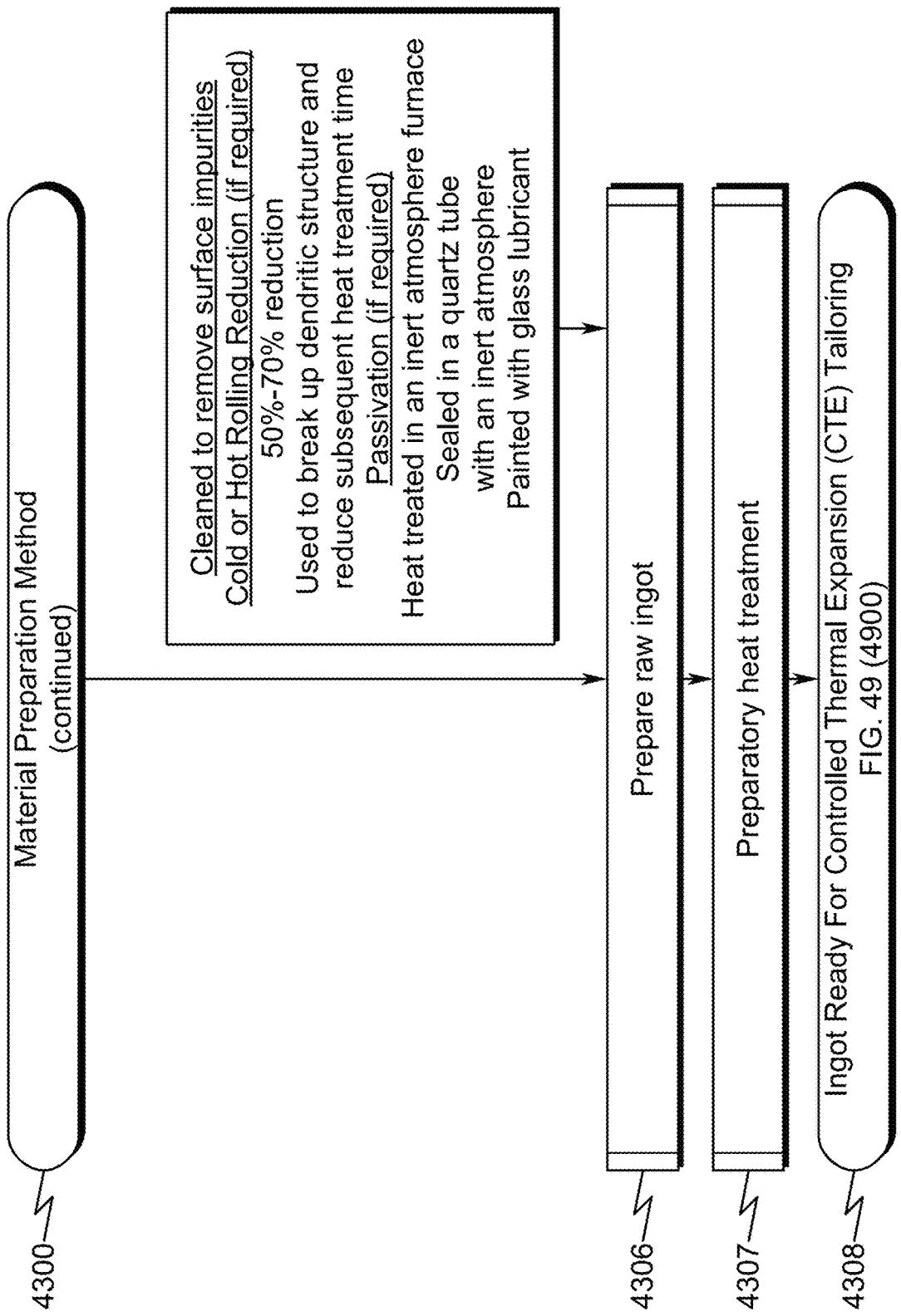
FIG. 43 illustrates a flowchart depicting a preferred exemplary material preparation overview method useful in some preferred invention embodiments (3/3)
Figure 48:
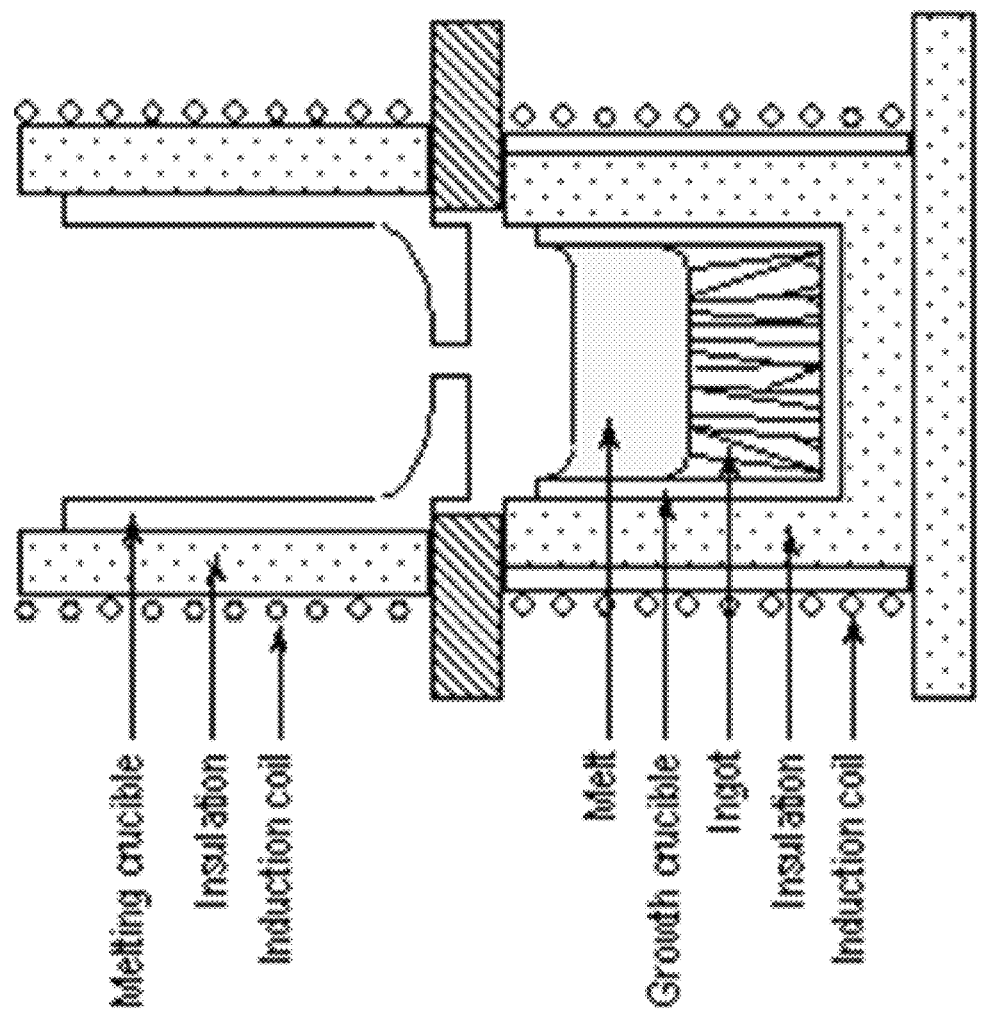
FIG. 48 illustrates a side sectional view of a directional furnace useful in some preferred invention embodiments.
Figure 49:
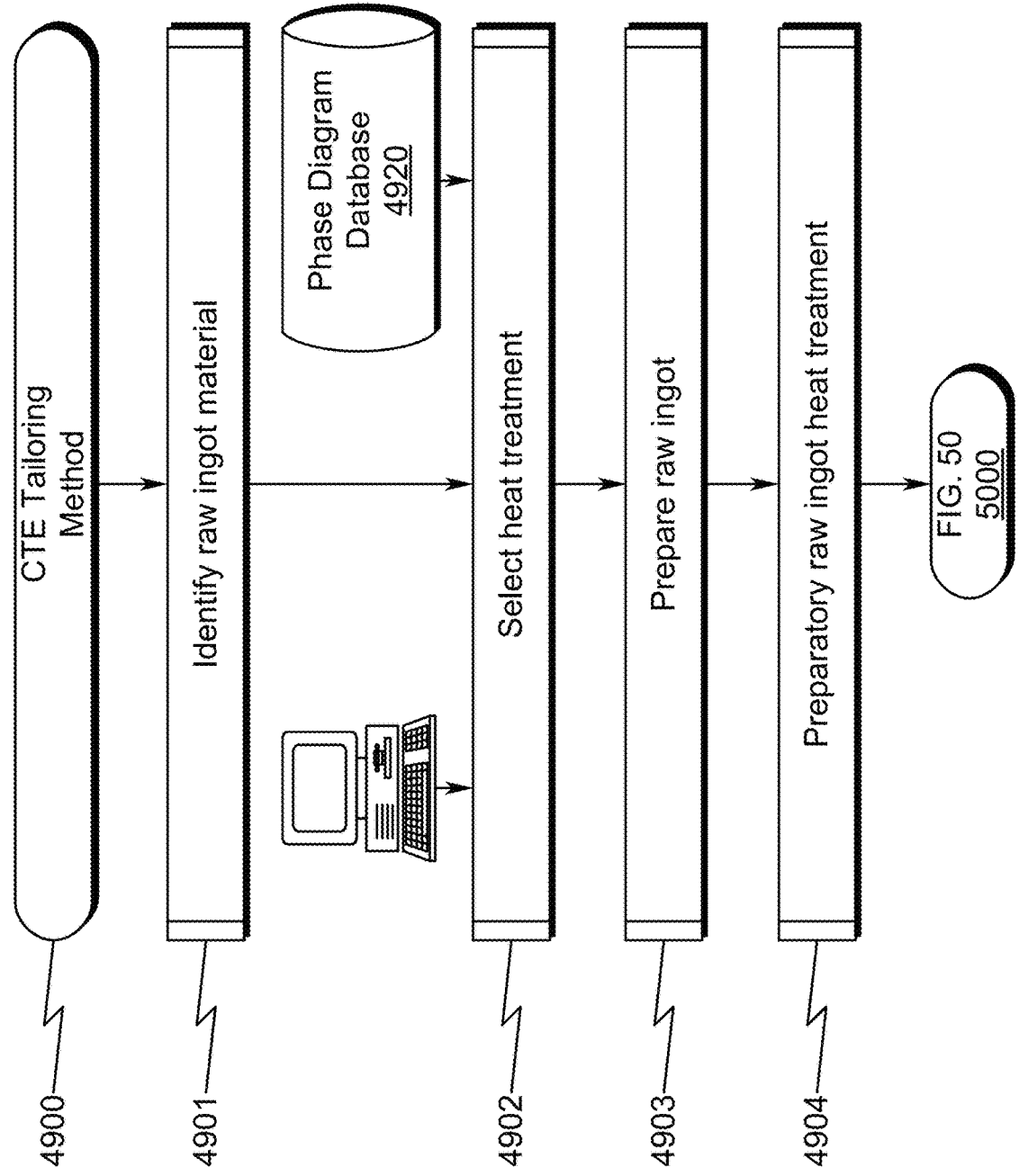
FIG. 49 illustrates a flowchart depicting a preferred exemplary CTE tailoring overview method useful in some preferred invention embodiments (1/3)
Figure 50:
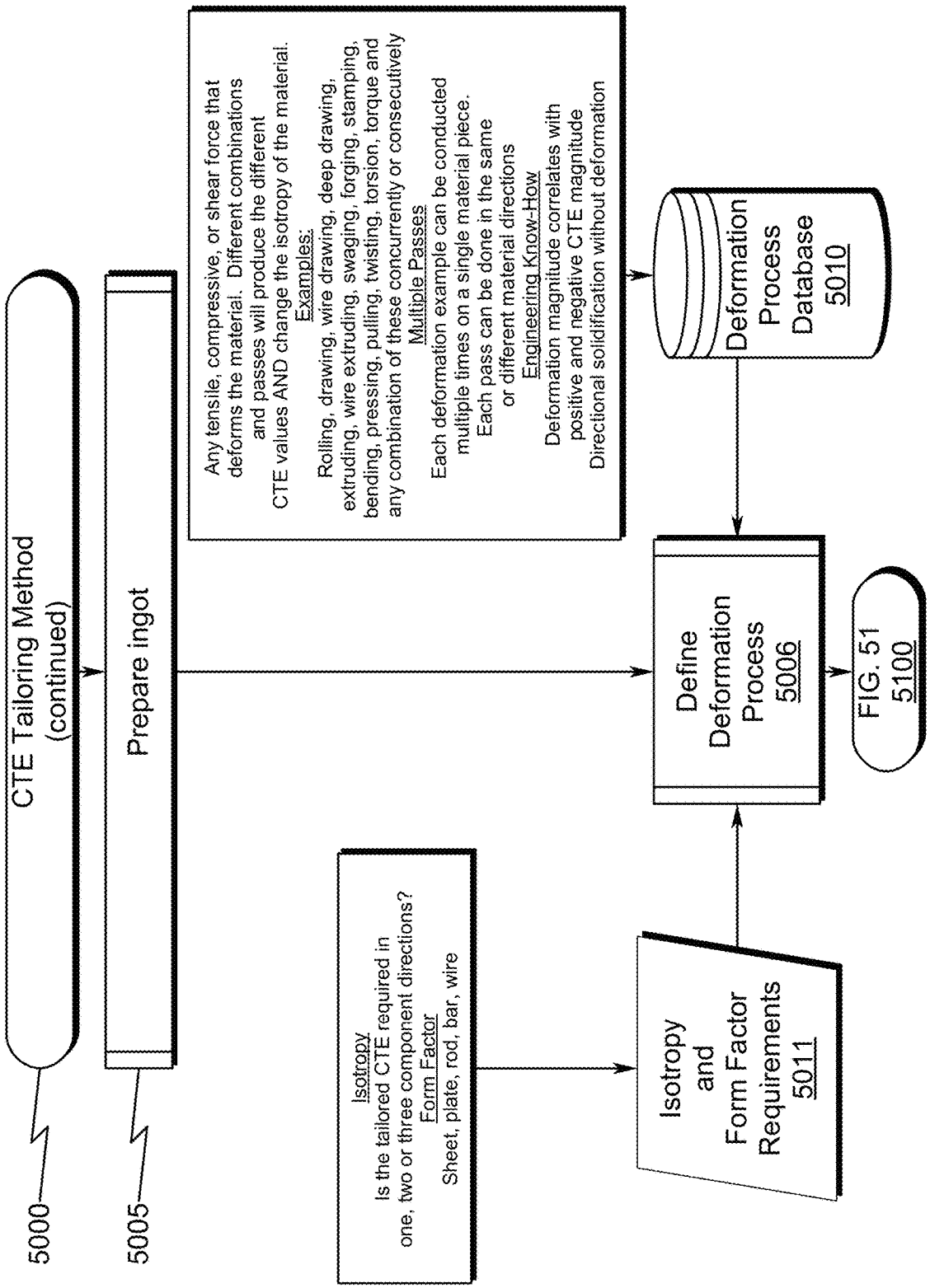
FIG. 50 illustrates a flowchart depicting a preferred exemplary CTE tailoring overview method useful in some preferred invention embodiments (2/3)
Figure 51:
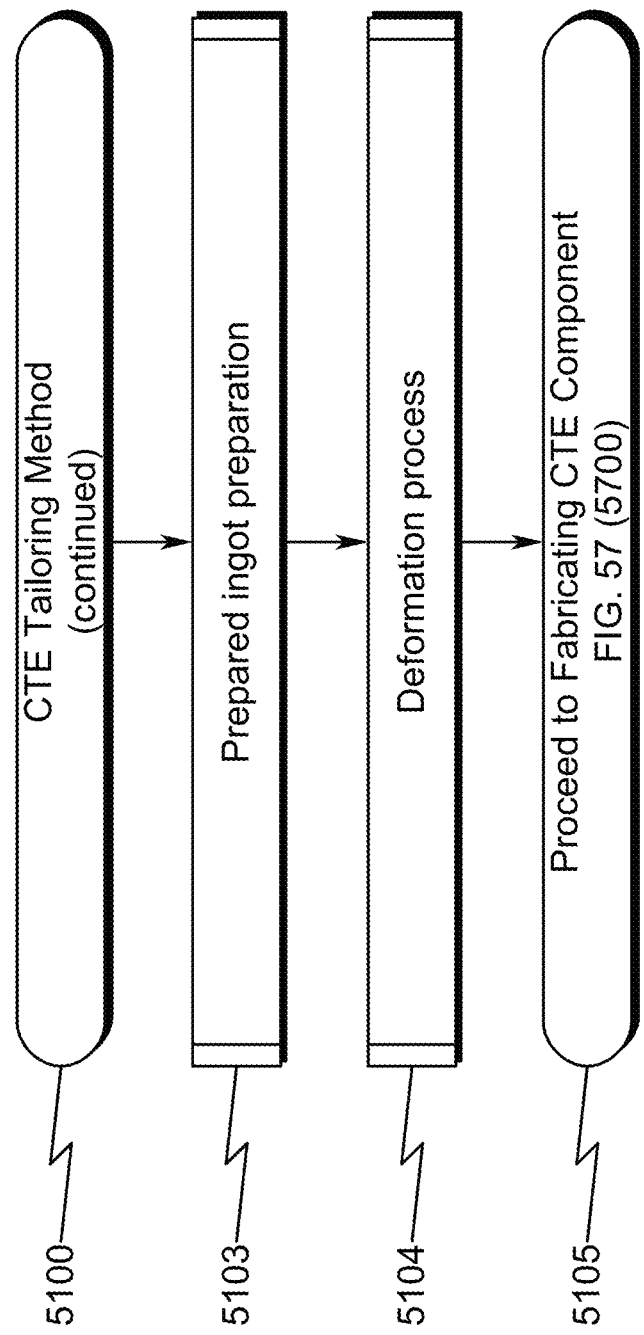
FIG. 51 illustrates a flowchart depicting a preferred exemplary CTE tailoring overview method useful in some preferred invention embodiments (3/3)
Figure 52:
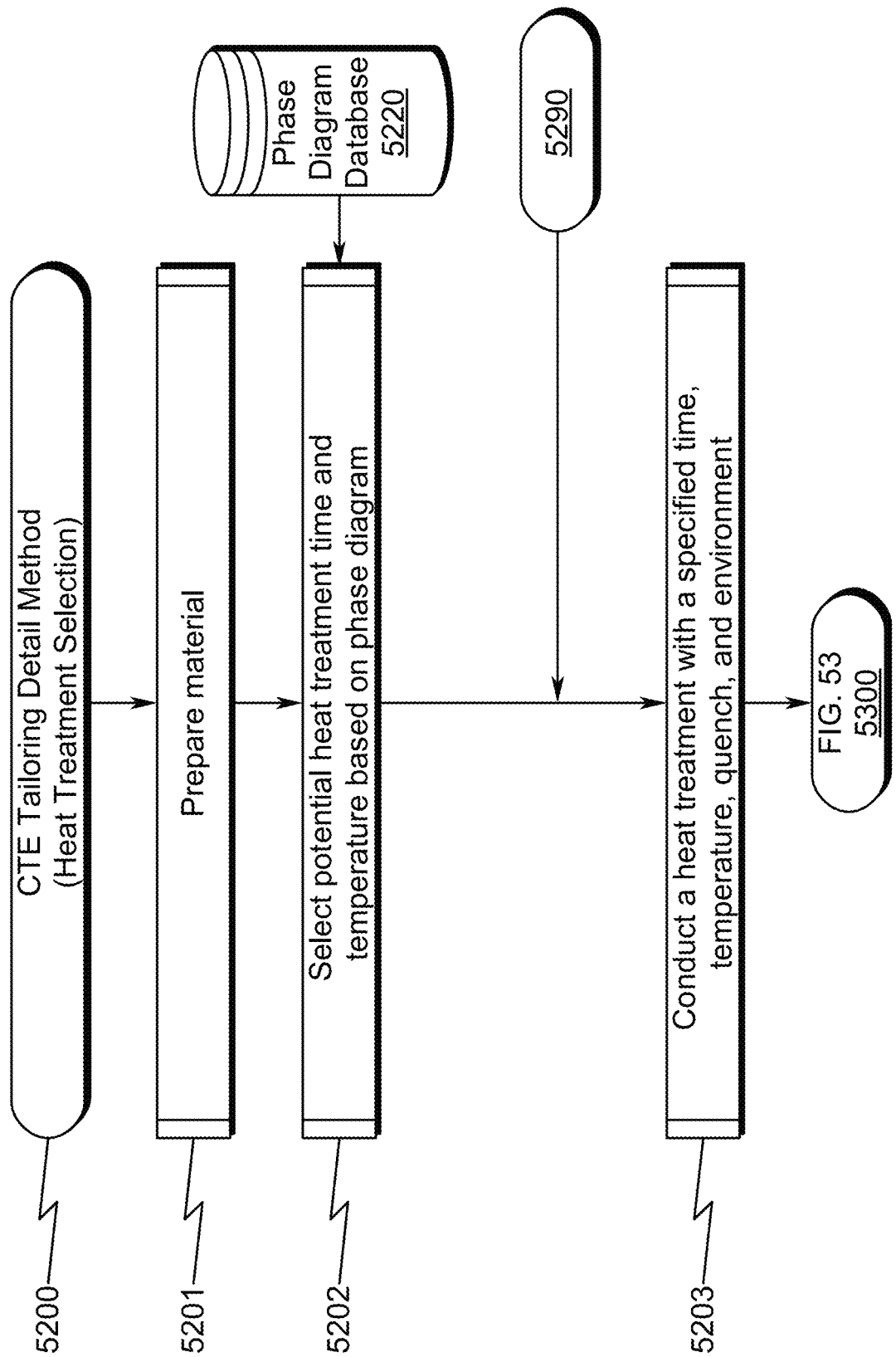
FIG. 52 illustrates a flowchart depicting a preferred exemplary CTE tailoring heat treatment selection detail method useful in some preferred invention embodiments (1/2)
Figure 53:
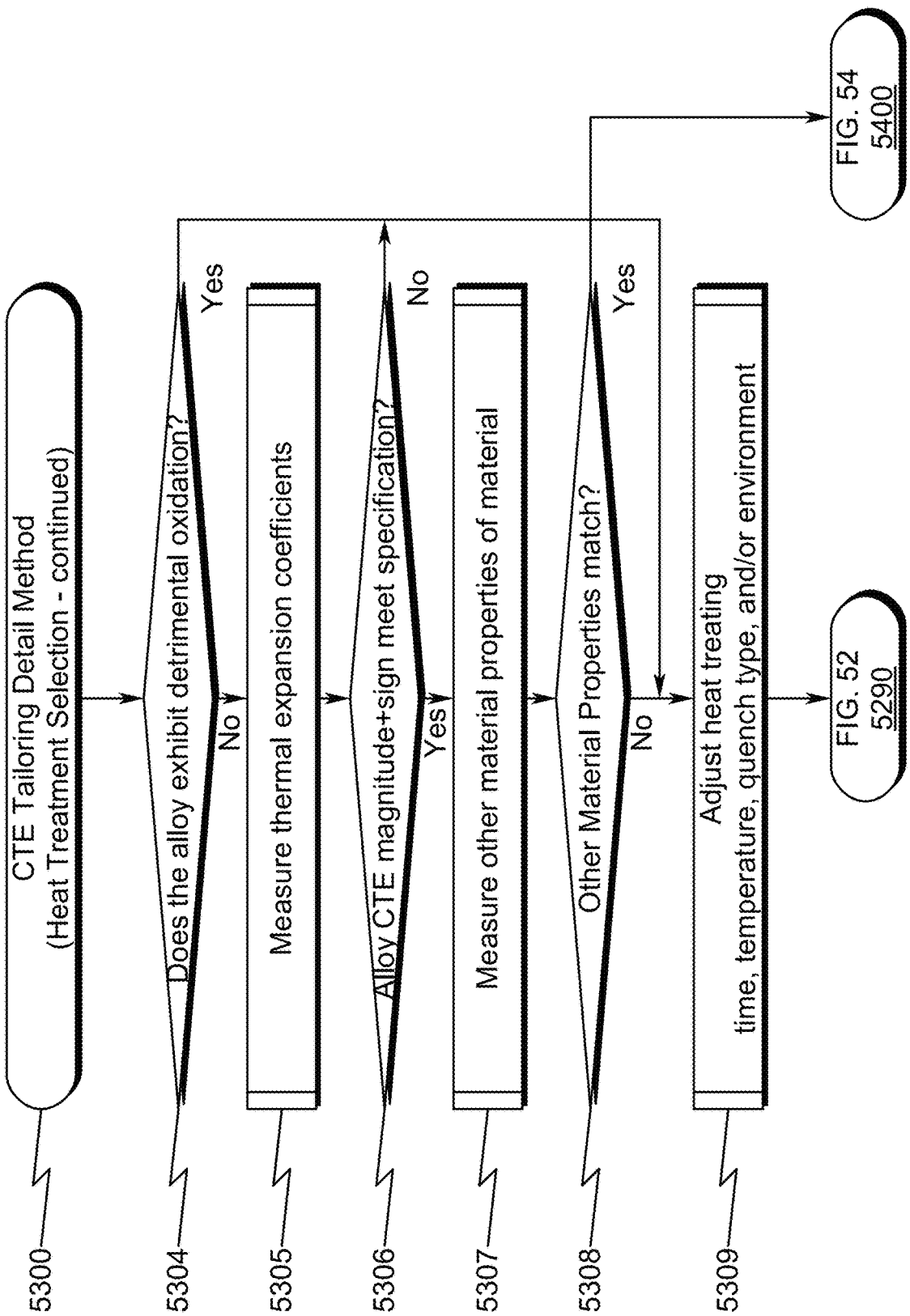
FIG. 53 illustrates a flowchart depicting a preferred exemplary CTE tailoring heat treatment selection detail method useful in some preferred invention embodiments (2/2)
Figure 54:
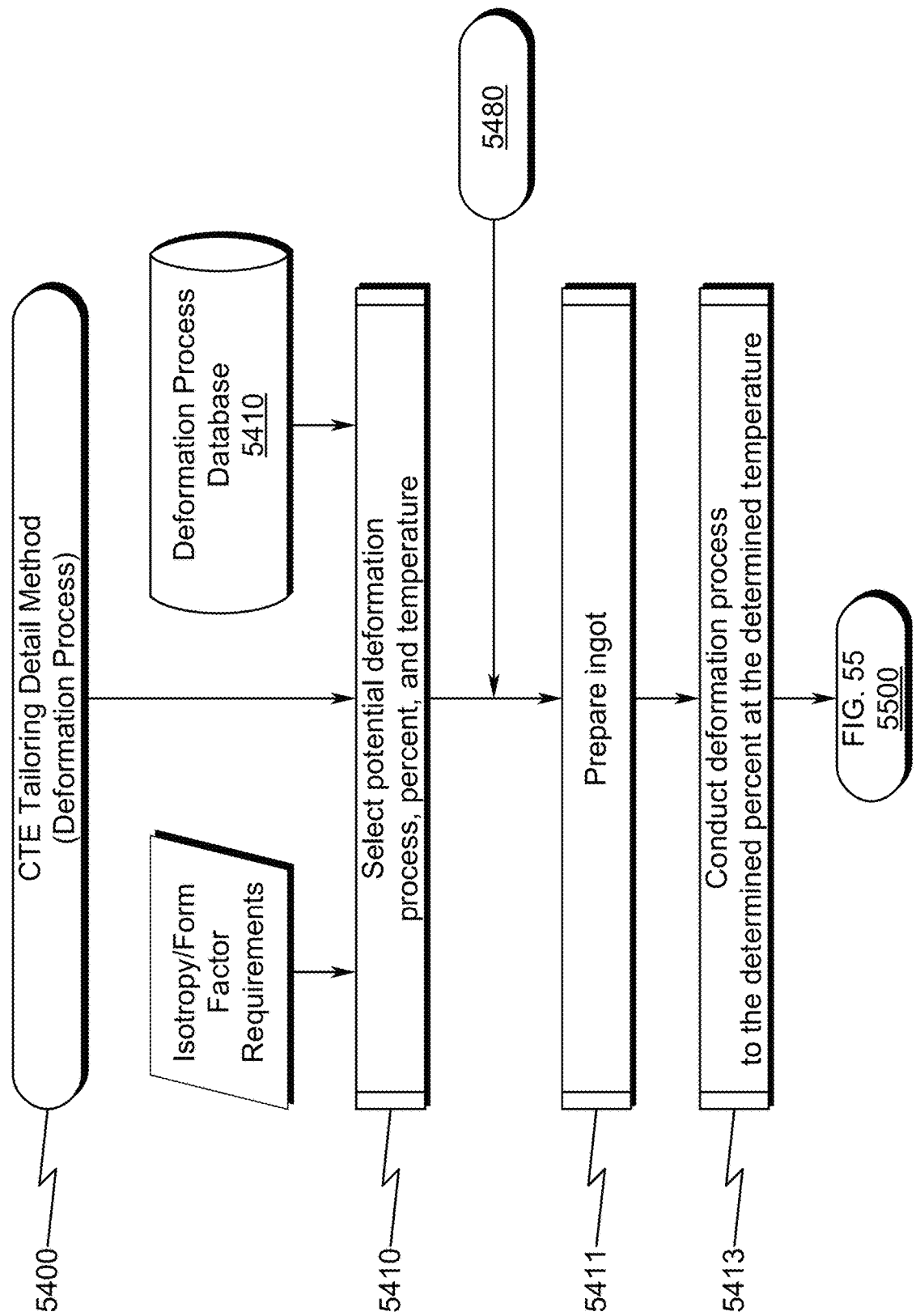
FIG. 54 illustrates a flowchart depicting a preferred exemplary CTE tailoring deformation process detail method useful in some preferred invention embodiments (1/3)
Figure 55:
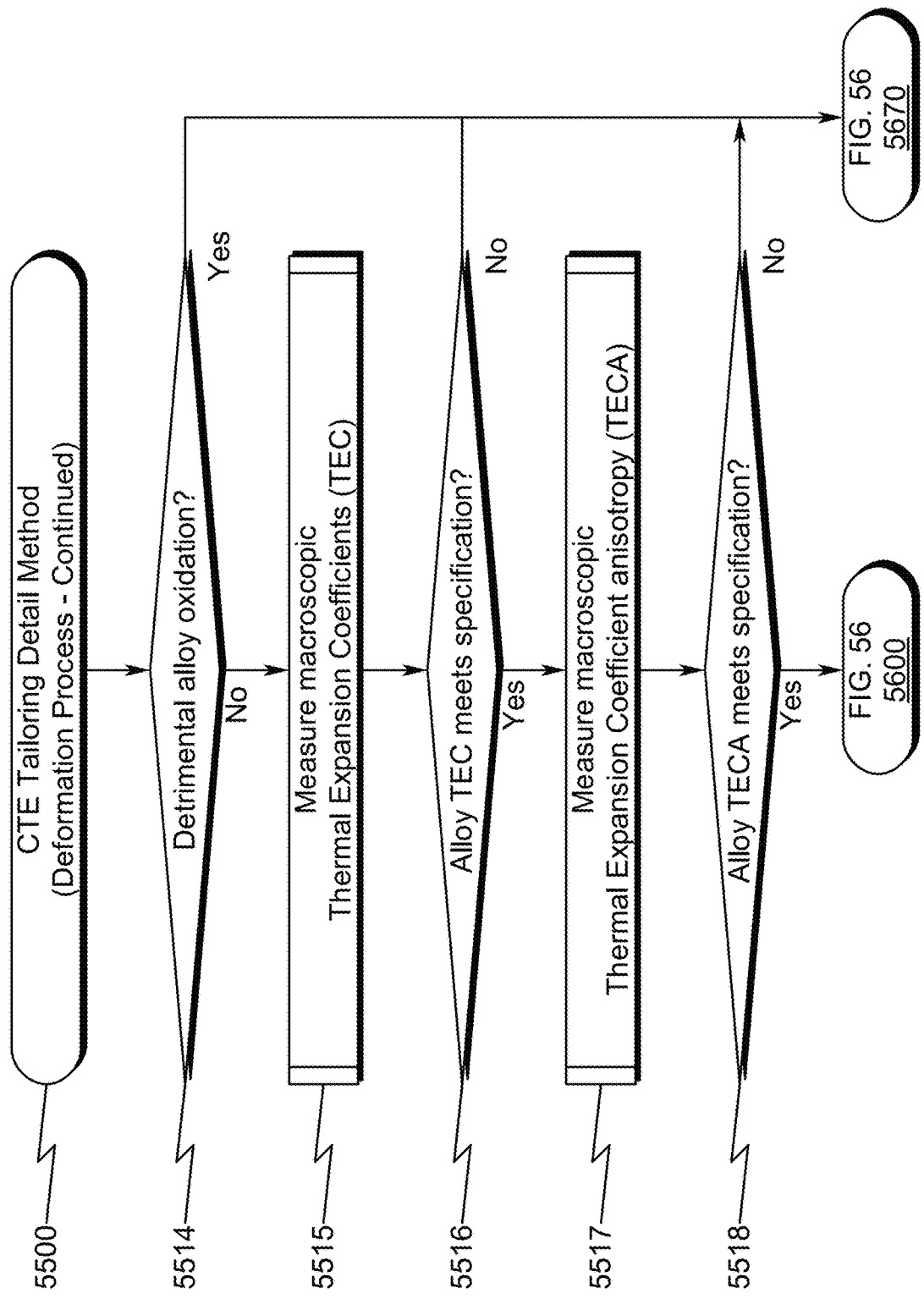
FIG. 55 illustrates a flowchart depicting a preferred exemplary CTE tailoring deformation process detail method useful in some preferred invention embodiments (2/3)
Figure 56:
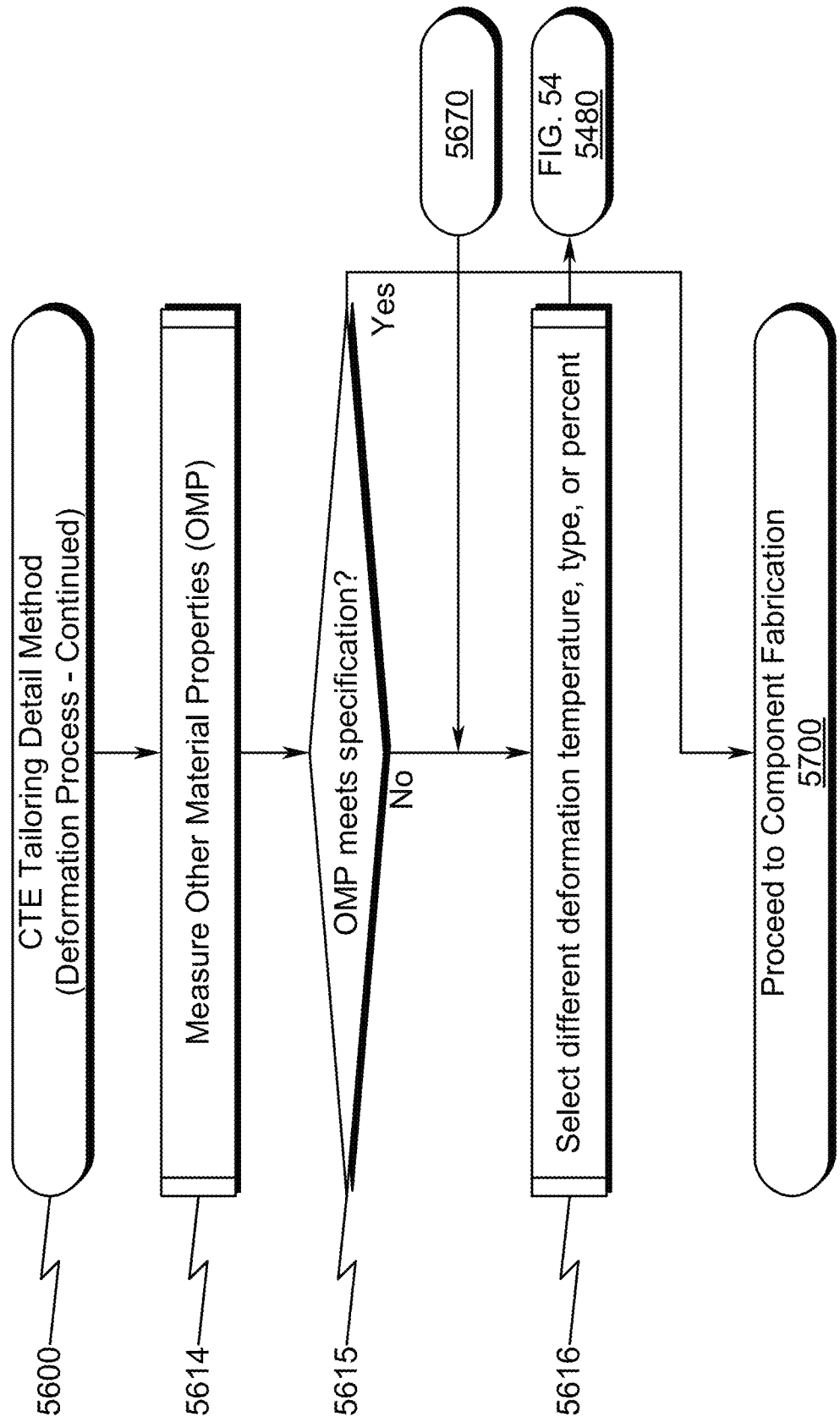
FIG. 56 illustrates a flowchart depicting a preferred exemplary CTE tailoring deformation process detail method useful in some preferred invention embodiments (3/3)
Figure 57:
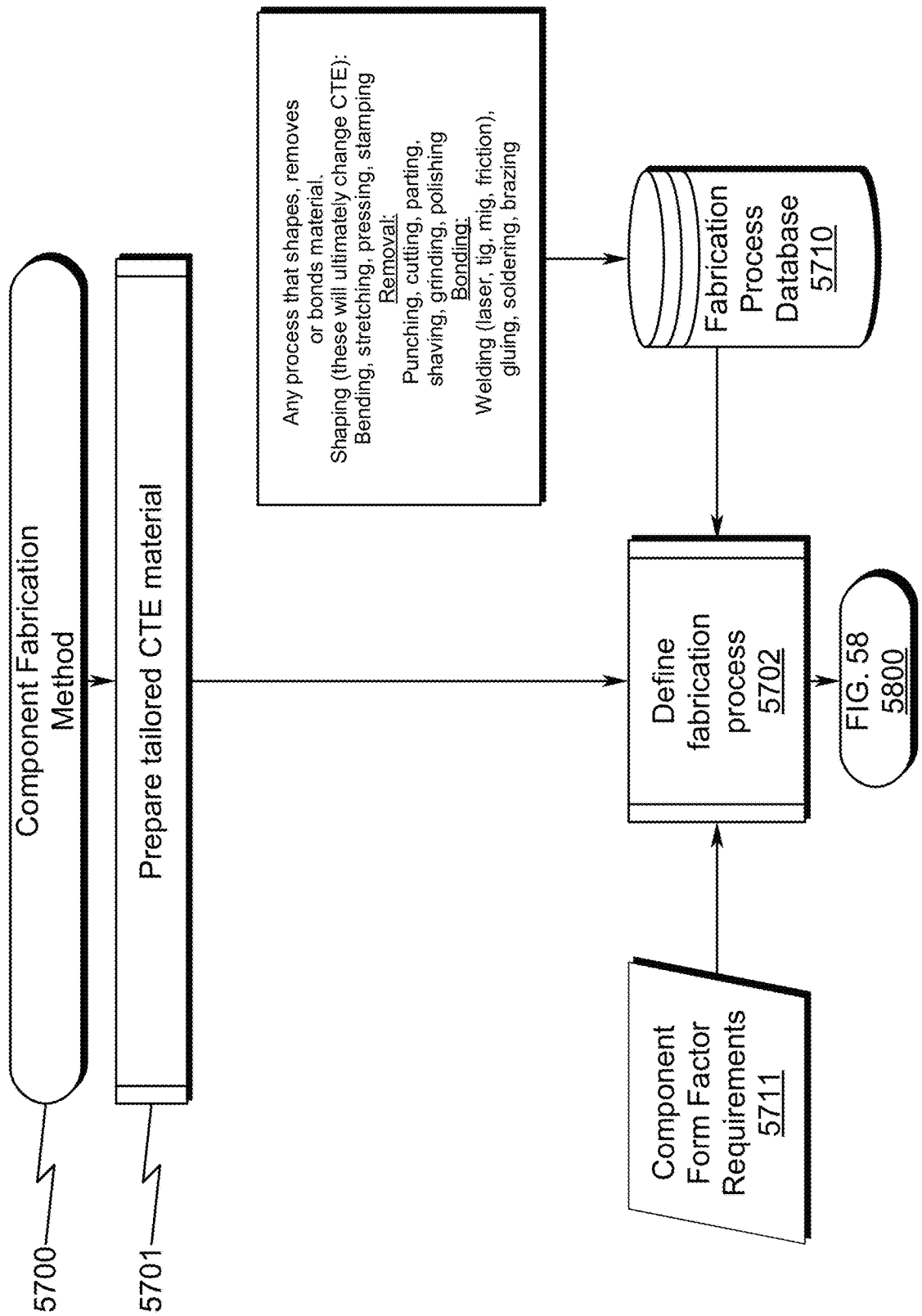
FIG. 57 illustrates a flowchart depicting a preferred exemplary component fabrication overview method useful in some preferred invention embodiments (1/2)
Figure 58:
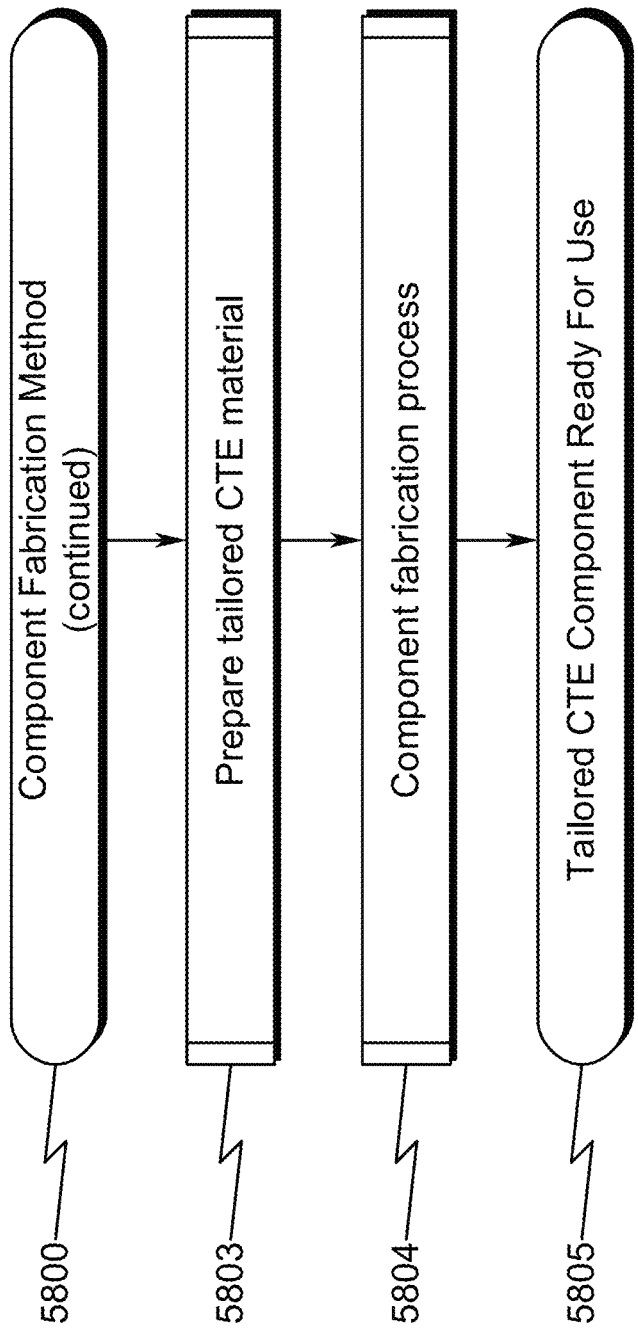
FIG. 58 illustrates a flowchart depicting a preferred exemplary component fabrication overview method useful in some preferred invention embodiments (2/2)
Figure 59:
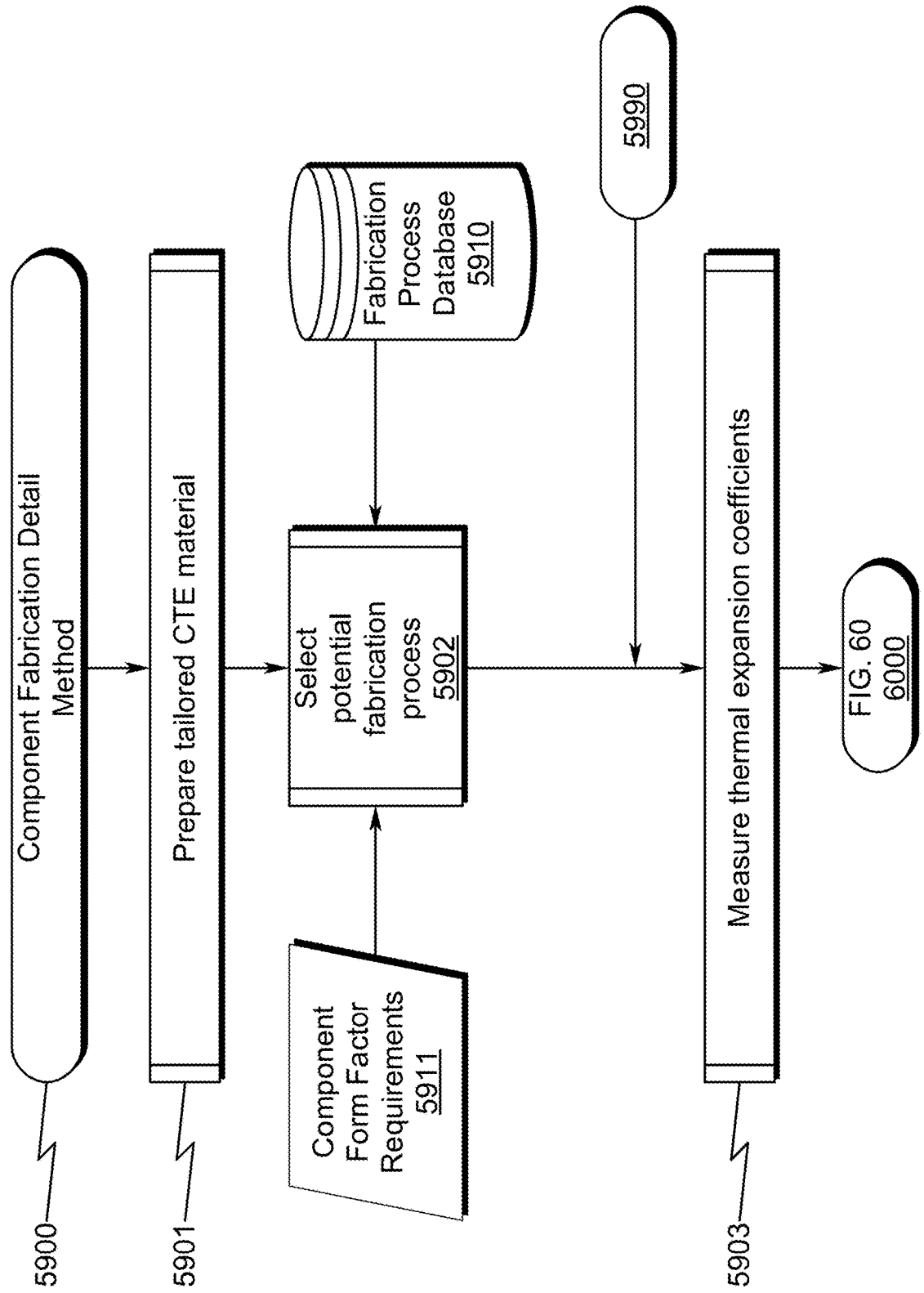
FIG. 59 illustrates a flowchart depicting a preferred exemplary component fabrication detail method useful in some preferred invention embodiments (1/2)

Additional detail of the material preparation process is detailed in FIG. 41 (4100)-FIG. 48 (4800). An overview of the method associated with a typical material preparation is provided in the flowcharts depicted in FIG. 41 (4100)-FIG. 43 (4300). Material preparation generally comprises:

(1) Defining the material chemistry and composition (4101);

(2) Selecting a melting process (4102) using a melting process database (4110) (this may include selection of a melting method, melting environment, crucible/mold, and specialty processing as indicated) (4102);

(3) Preparing the elemental material, including weighing the material in proportions specified by the desired chemistry and composition and cleaning the elemental material to remove surface impurities before loading the material into the melting furnace (4103);

(4) Producing a raw ingot of the elemental material composition (4204);

(5) Selecting heat treatment for the raw ingot from a phase diagram database (4220) which may include the use of phase diagrams and time/temperature selections as required (4205);

(6) Preparing the raw ingot for the selected heat treatment by surface cleaning and/or passivation (4306);

(7) Heat treating the ingot to produce a prepared material ingot (4307) ready for CTE tailoring (4308).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Melting Process Selection

The melting process may be selected using the following criterion:

Oxidation/Purity Level Specified

The oxidation and purity level should be specified in atomic % or weight % and depends on the initial purity of the elemental materials, the melting process type, the melting atmosphere and the mold type.

Composition Variation Specified

The composition variation should be specified in atomic % or weight % and depends on the initial purity of the elemental materials, the accuracy of initial weights and the melting process type.

Melting Process Database

Each melting and casting process is made up of a combination of the melting process, atmosphere and mold/crucible type.

- Melting Process—Resistance Furnace, Blast Furnace, Arc Melting, Induction Melting, Induction Scull Melting, Plasma Arc Furnace, Directional Solidification Furnace, Microwave Furnace
- Atmosphere—Open Air, Nitrogen, Argon, Vacuum
- Mold/Crucible Type—Ceramic (graphite, alumina, mullite, zerconia), Metal (tungsten, tantalum)

Elemental Material Preparation

Elemental material preparation may incorporate cleaning that generally involves removing an existing oxide layer or passivation layer (oil or polymer) using acid etching, mechanical grinding, organic solvents or any combination of these three prior to melting.

Raw Ingot Production

Figure 44:
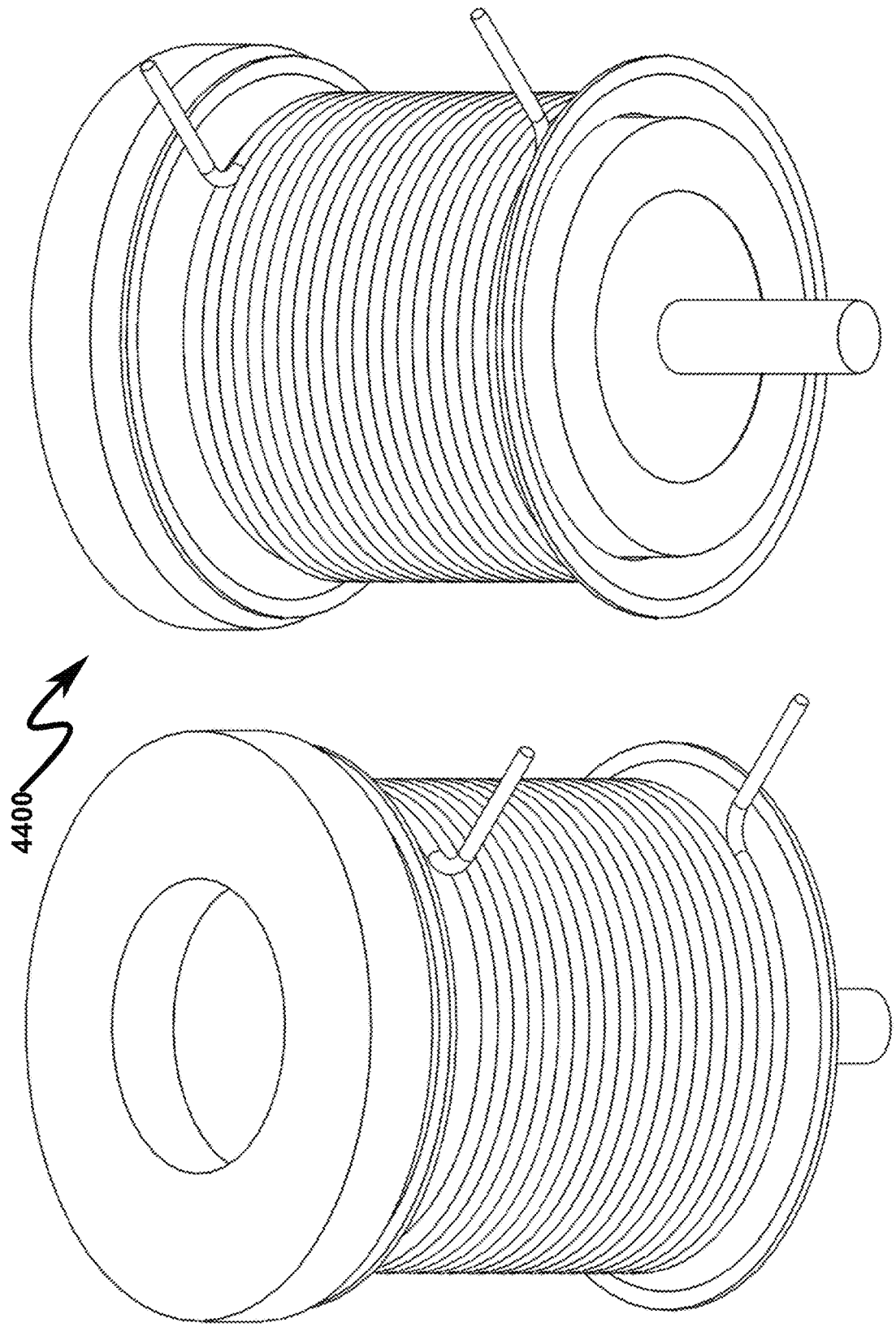
FIG. 44 illustrates top and bottom right perspective views of a directional solidification furnace (DSF) useful in many preferred invention embodiments.
Figure 45:
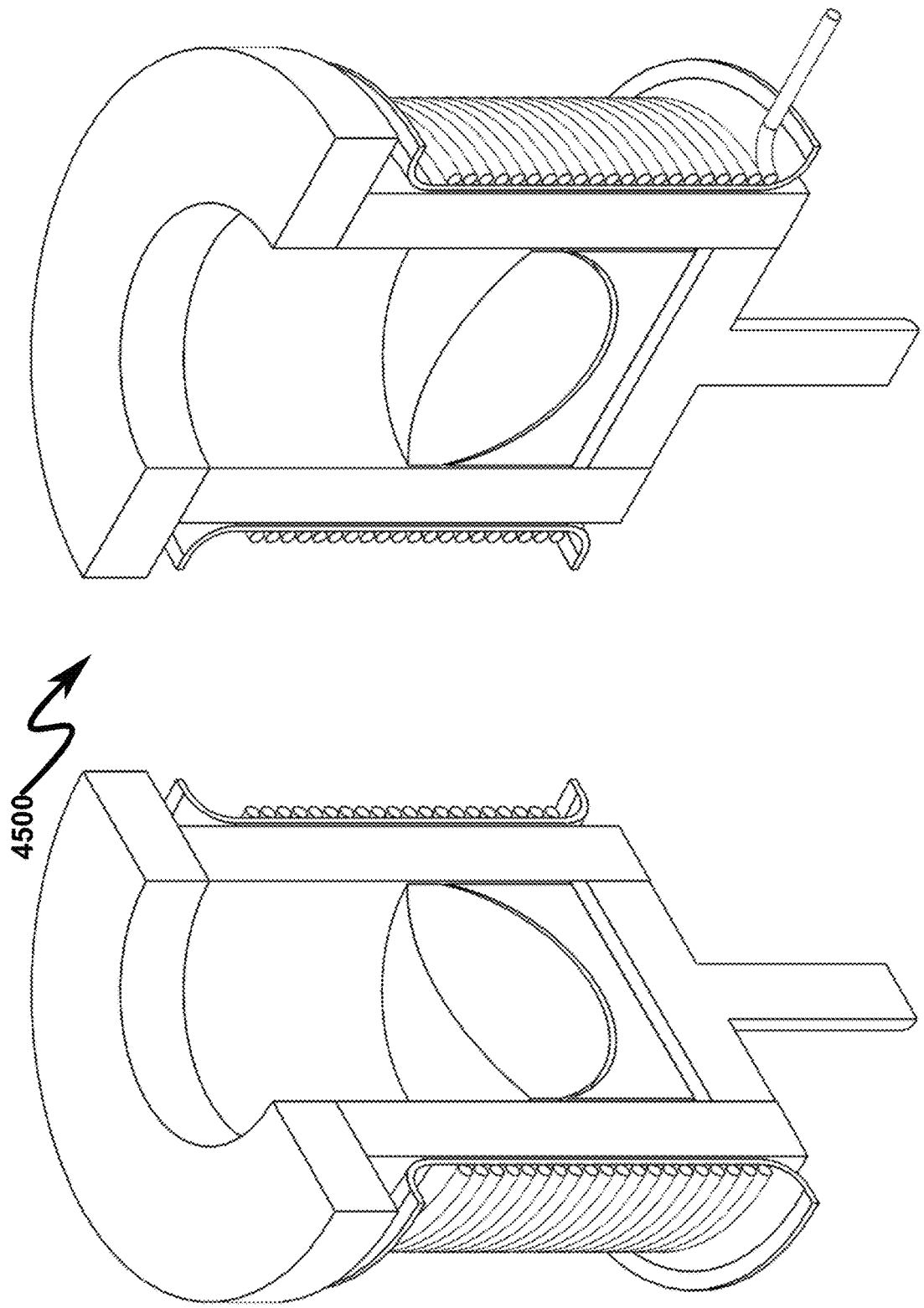
FIG. 45 illustrates top front and top right sectional perspective views of a directional solidification furnace (DSF) useful in many preferred invention embodiments depicting initial creation of a cast ingot.
Figure 47:
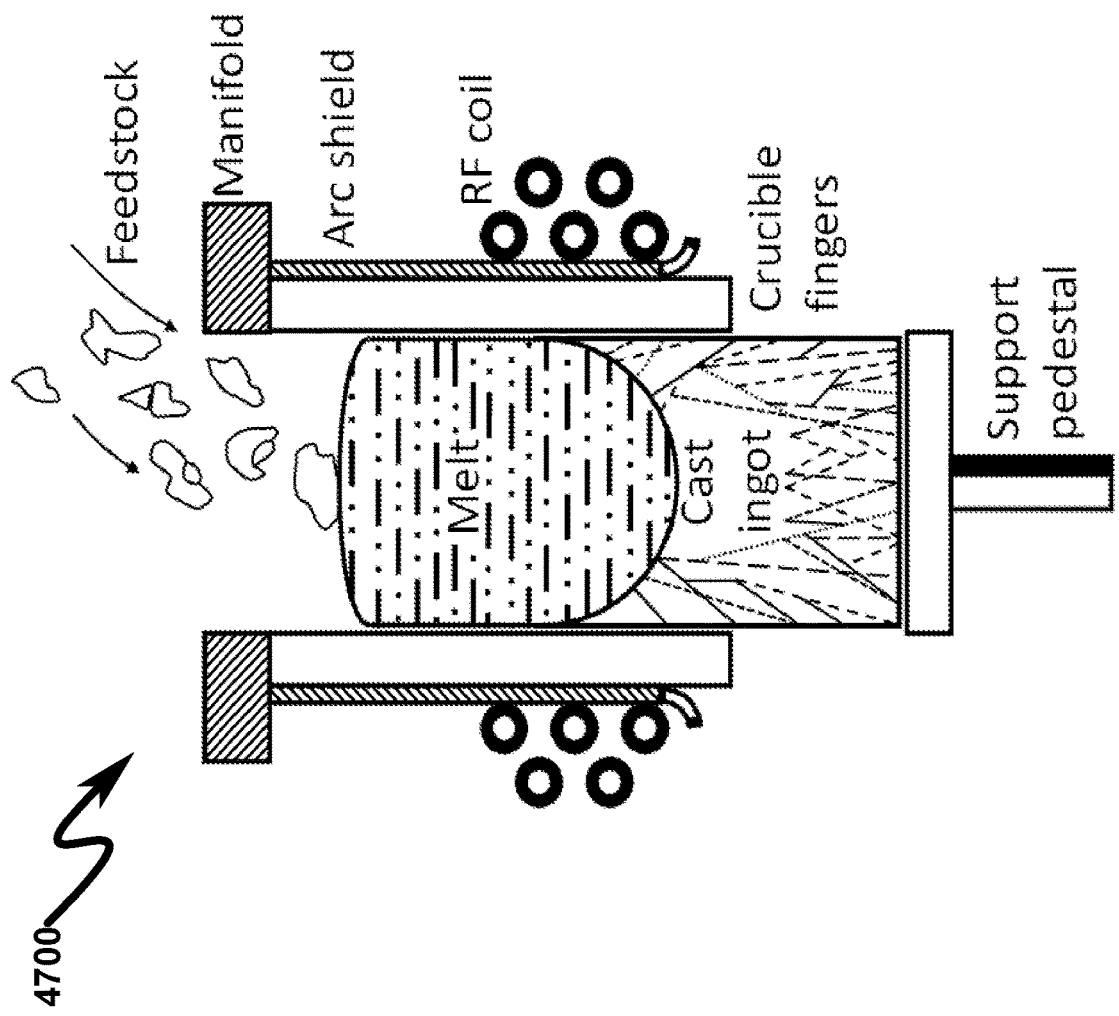
FIG. 47 illustrates a side sectional view of a directional furnace useful in some preferred invention embodiments.

The type mold shape, cooling type and directional solidification will influence the material's crystal orientation and thus can contribute to the isotropy or anisotropy of the material piece. Raw ingot production may incorporate the following criterion:

- Mold Shape—Cylindrical Bar, Square/Rectangular Bar, Button, Puck, Plate, Angle
- Cooling Type—The cooling type changes the materials cooling rate that will influence the phases present and the crystal orientation. Slow Cooling, Furnace Cooling, Air Cooling, Oil Quenching, and Water Quenching are non-exclusively anticipated for the cooling type.
- Directional Solidification—As cast materials solidify, a solid-liquid interface moves across the melt to produce a solid. The direction this interface moves influences the crystal orientation of the grains inside the material and thus can be used to tailor the thermal expansion coefficient. This is true for all cast materials. The mold material, shape, and cooling type influence the cooling direction and can be controlled to create a desired crystal orientation. Directional solidification furnaces carefully control the direction, shape, and speed of the solid-liquid interface and can create initial crystal orientations desirable for achieving a tailored thermal expansion response. FIG. 44 (4400)-FIG. 48 (4800) depict a typical directional solidification process that involves slowly cooling a melt as a solid ingot is removed from a heated zone in a furnace. Additional material may be added to the melt as the ingot is removed to achieve an ingot of a desired size. The slow cooling and directional removal of the ingot produces crystals with a preferred orientation. This process can be used to provide an initial orientation of crystals that may or may not exhibit thermal expansion coefficients that are tailored. The final macroscopic thermal expansion coefficient magnitude and sign discussed above may or may not be achieved using this directional solidification process alone. The mechanical deformation described previously may or may not be required to further tailor the thermal expansion coefficient to the specified value. Additionally, directional solidification may be necessary to achieving specified thermal expansion values in certain materials and can be applied to crystalline ceramics as well as alloys.

Resulting Ingot

The ingot resulting from this material preparation is a unique material having the characteristics of:
- Tailorable CTE potential;
- Specified other material properties; and
- Certain distribution of grain orientations.

CTE Tailoring Process (4900)-(6200)

Potential Heat Treatment Selection

The potential heat treatment selection is based on the following processing parameters:

Heat Treatment Temperature

The heat treatment temperature will influence the phases that can be created at a given material composition. Is can be adjusted to accelerate or change the volume fraction of phases and the time it takes to reach a tailorable thermal expansion coefficient phase or phases.

Heat Treatment Time

The heat treatment time will influence the relative size, shape, volume fraction and of phases present in the material. Selecting and refining the time can influence the tailored thermal expansion properties as well as the other material properties. The temperature is selected based on the temperature.

Phase Diagram Database

Figure 61:
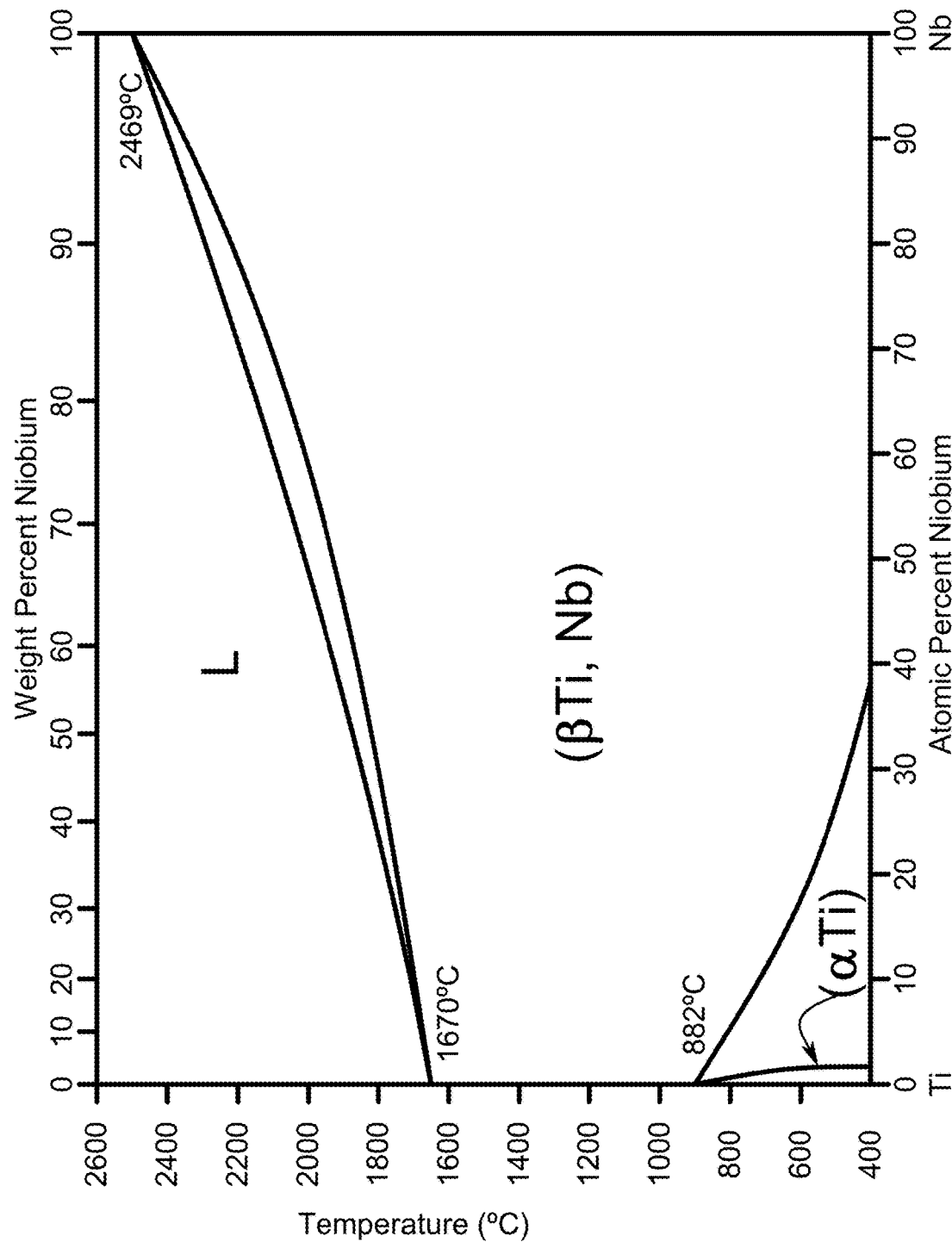
FIG. 61 illustrates a Ti—Nb phase diagram showing the alpha, beta, and liquid transitions as a function of relative composition.

Phase diagrams consisting of the composition and temperature dependence of phases in a material provide input for heat treatment selection. FIG. 61 (6100) provides an example of a Ti—Nb phase diagram showing the alpha, beta, and liquid phase transitions as a function of relative composition.

Tailorable Phases (6100)

Different phases of a single material chemistry and composition will exhibit different thermal expansion magnitudes and signs at the atomic level in different crystal directions. To achieve a tailored thermal expansion response, the tailorable phase must be present. For example, the beta phase of the TiNb material is the precursor to the tailorable martensitic phase. The TiNb phase diagram depicted in FIG. 61 (6100) shows the temperature where the beta phase is stable and will result in a tailorable thermal expansion material. Additionally, there may be multiple tailorable phases that exist.

The tailorable phase or phases may be mixed with other phases that cannot be tailored to produce a multi-phase material. The tailorable phase would allow tailored thermal expansion to be created while the other phases would change or improve the Other Material Properties. For example, a 20% atomic Nb content TiNb material could be heat treated at 500 C to produce a mixture of phases. The alpha phase would strengthen the material while the beta phase would allow the tailored thermal expansion processing.

Initial Deformation

Prior to heat treating, the material may be rolled to between 0% and 90% reduction at room temperature or at an elevated temperature. Rolling reduction percentage is described elsewhere in this document.

Conduct Heat Treatment

The heat treatment is designed to create a material whose thermal expansion coefficient can be tailored to a specific value via mechanical deformation.

Heat Treatment Time and Temperature

The heat treatment time and temperature will influence the type, relative size, shape, volume fraction and of phases present in the material. Selecting and refining the time and temperature can influence the tailored thermal expansion properties as well as the other material properties.

Raw Ingot Preparation

Cleaning/Surface Preparation—Removing an existing oxide layer or passivation layer (oil or polymer) may be required using acid etching, mechanical grinding, organic solvents or any combination of these three prior to melting. Additionally, surfaces may be planed or machined to specific dimensions prior to processing.

Coating/Inert Atmosphere—Coating the ingot with a glass coating or sealing it in an inert atmosphere to prevent corrosion and oxidation may or may not be necessary.

Recursive Heat Treatment Development

After the heat treatment process, the oxidation, thermal expansion coefficients and other material properties can be evaluated to ensure they are within specified parameters. If the measured thermal expansion coefficients, oxidation or other material properties do not meet requirements, different alloy processing parameters are selected. This can be done until all thermal expansion coefficient and other material properties are achieved.

Deformation Process Selection (6200)-(12000)

The deformation process will influence the thermal expansion coefficient, thermal expansion coefficient anisotropy, other material properties, and form factor. For clarification, these deformation processing are confined to the production and processing of materials to produce simple shapes and geometries that include, but are not limited to bars, rods, tubes, pipes, squares, angles, rounds, wires, beams, plates, sheets, pucks, and buttons. More complex geometries and shapes are discussed in the component fabrication section.

Deformation Process Database

The degree or percentage of deformation is proportional to the thermal expansion magnitude while the direction of the force (tensile or compressive) will influence the sign of the thermal expansion coefficient. Multiple passes and combinations of different deformation processes can be performed in series to produce a unique thermal expansion coefficients and thermal expansion coefficient anisotropy for all of the mechanical deformation processes described below.

Figure 62:
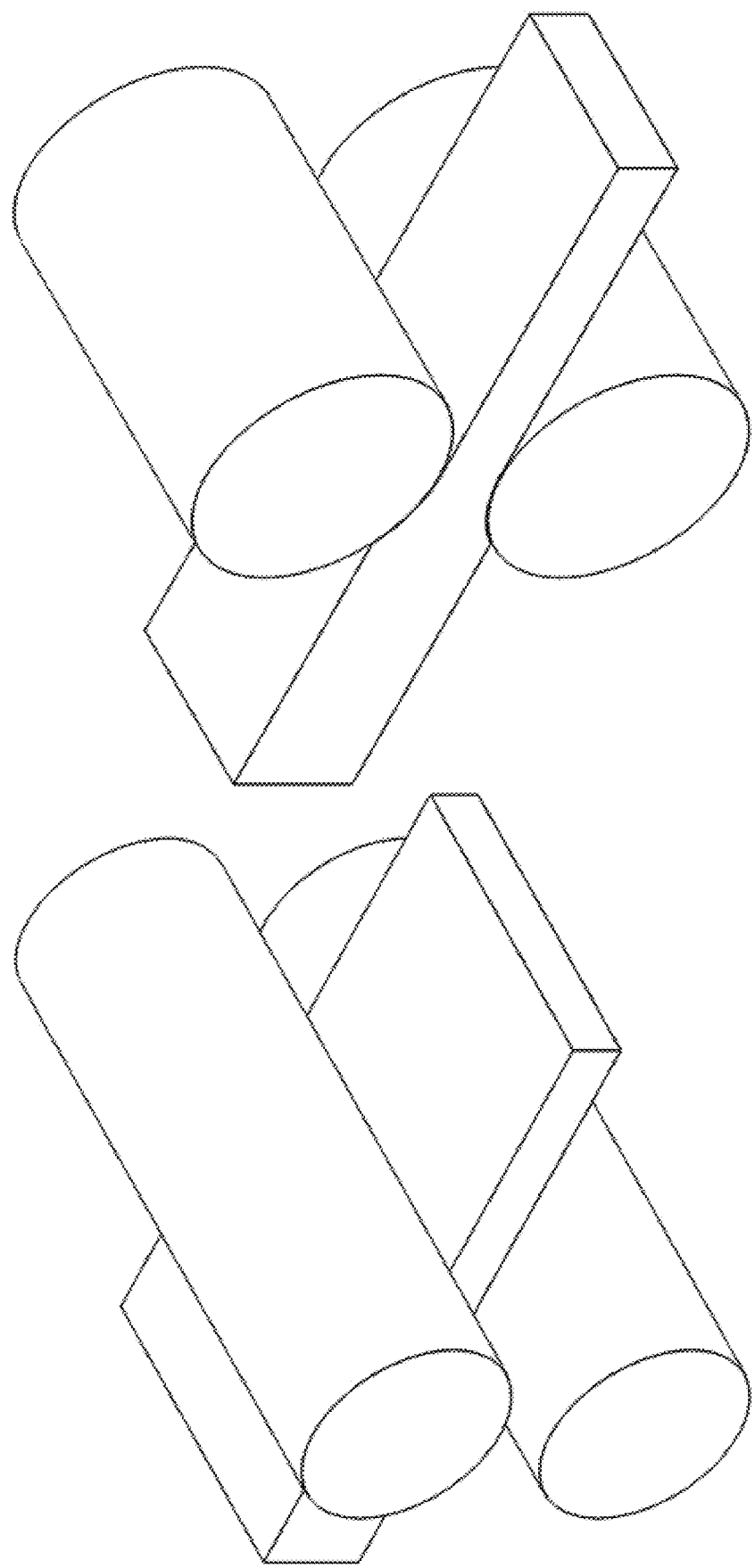
FIG. 62 illustrates a top right front perspective and top left perspective sectional views depicting a typical rolling deformation process.

Rolling (6200)-(6400). As generally depicted in FIG. 62 (6200)-FIG. 64 (6400), rolling is a process of reducing a material's thickness by passing it through rollers whose distance is smaller than the material's thickness. The amount of deformation is measured in percent (%) and is equal to the change in thickness divided by the original thickness. Below is an equation relating to FIG. 62 (6200)-FIG. 64 (6400) that represents the rolling process and deformation percentage with $t_i$ representing the initial material thickness and $t_f$ representing the final material thickness after rolling:

$$RollingDeformation\ (\%) = 100 \times \frac{t_i - t_f}{t_i} \quad (10)$$

Figure 64:
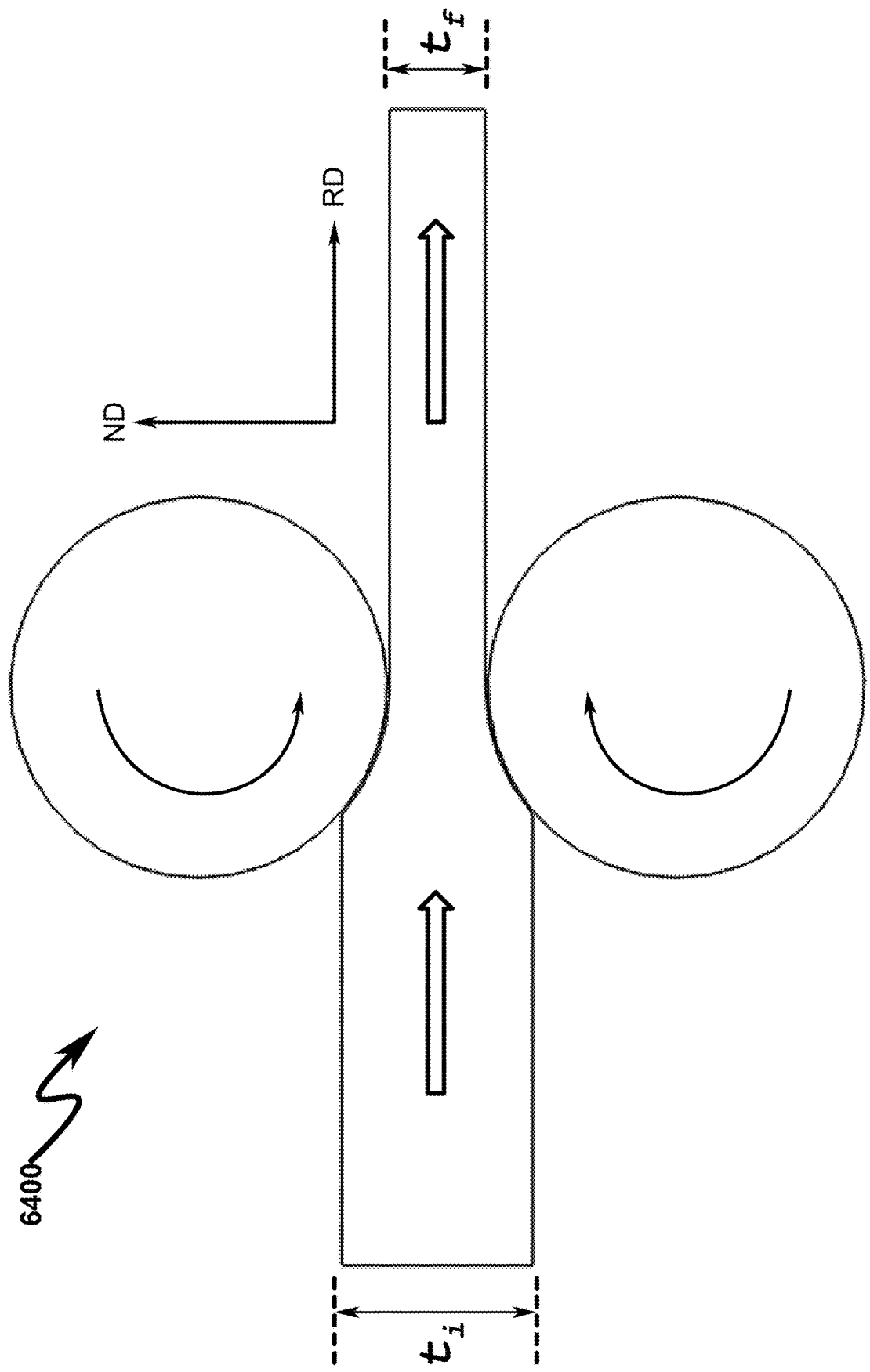
FIG. 64 illustrates front view depicting a typical rolling deformation process.

As depicted in FIG. 64 (6400), the rolling direction (RD) and normal direction (ND) are in the plane of the image while the transverse direction (TD) is perpendicular to the image. Co-Rolling is the process of rolling two different materials together so they fuse and create a bi-metal or multi-layered strip of different materials. This co-rolling process can be used to combine other materials that change or improve the Other Material Properties with tailored thermal expansion alloys.

Figure 65:
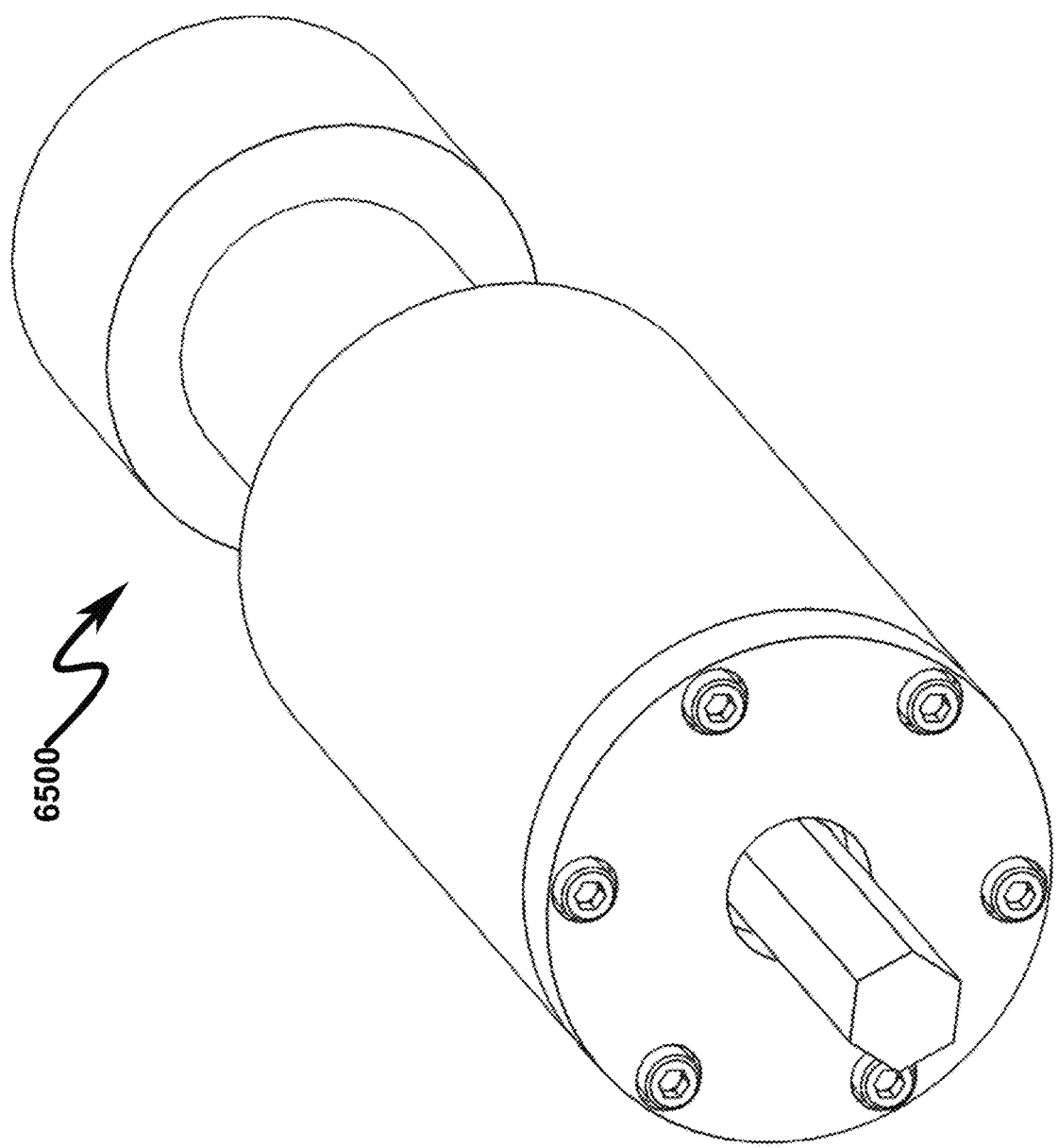
FIG. 65 illustrates a top left front perspective view of a direct extrusion system useful in some preferred invention embodiments.
Figure 66:
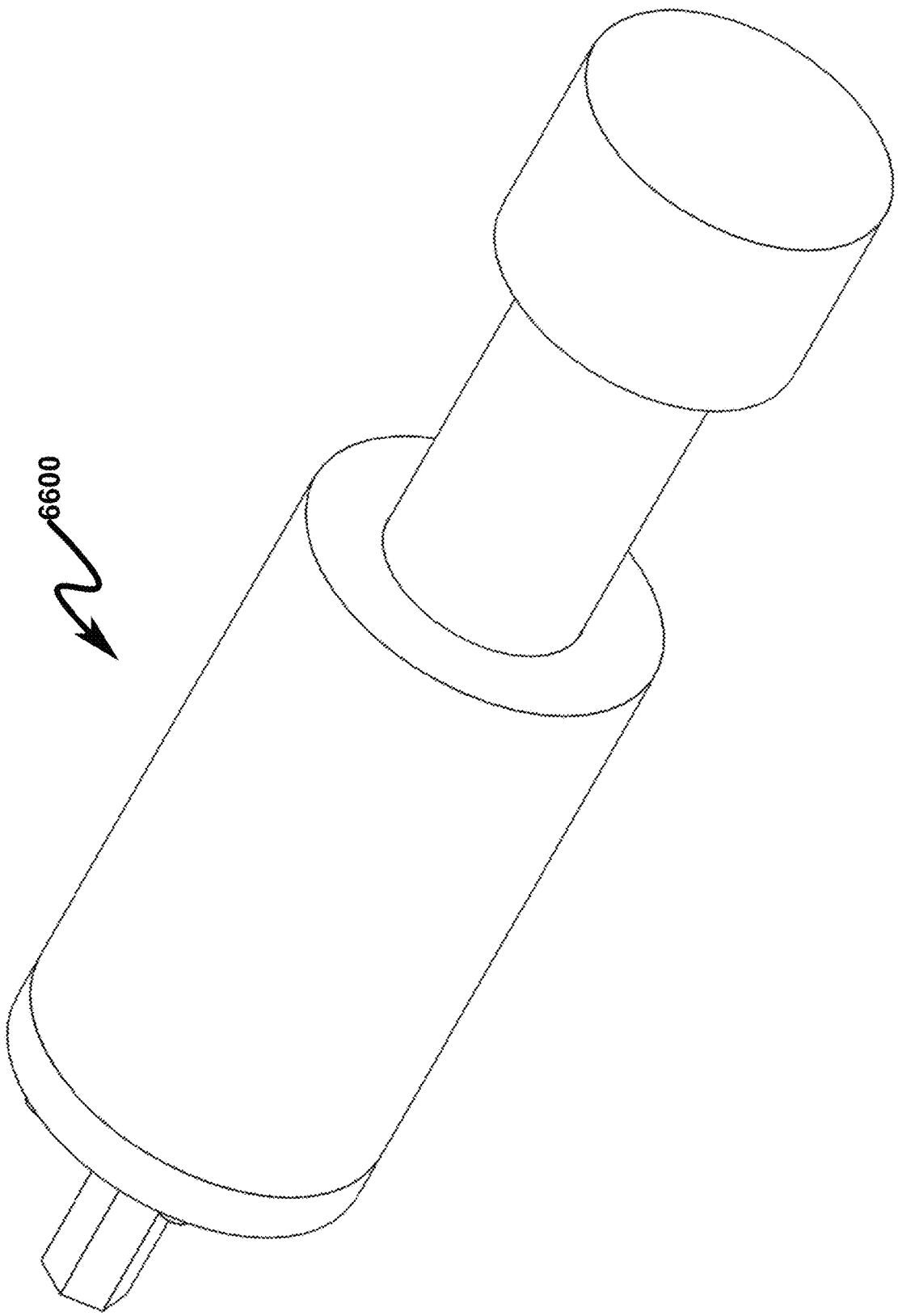
FIG. 66 illustrates a top right front perspective view of a direct extrusion system useful in some preferred invention embodiments.
Figure 67:
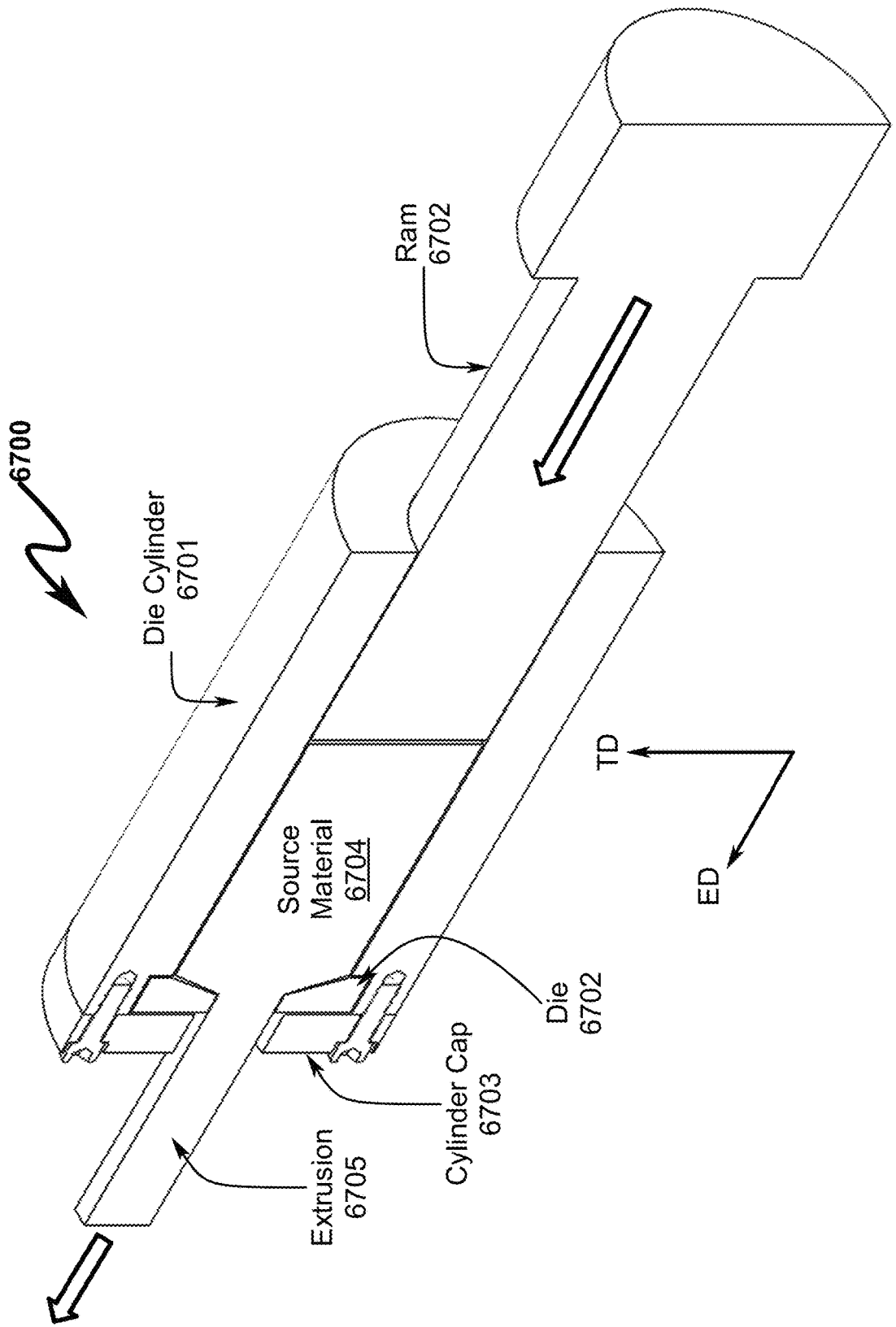
FIG. 67 illustrates a top right front perspective front section view of a direct extrusion system useful in some preferred invention embodiments.
Figure 68:
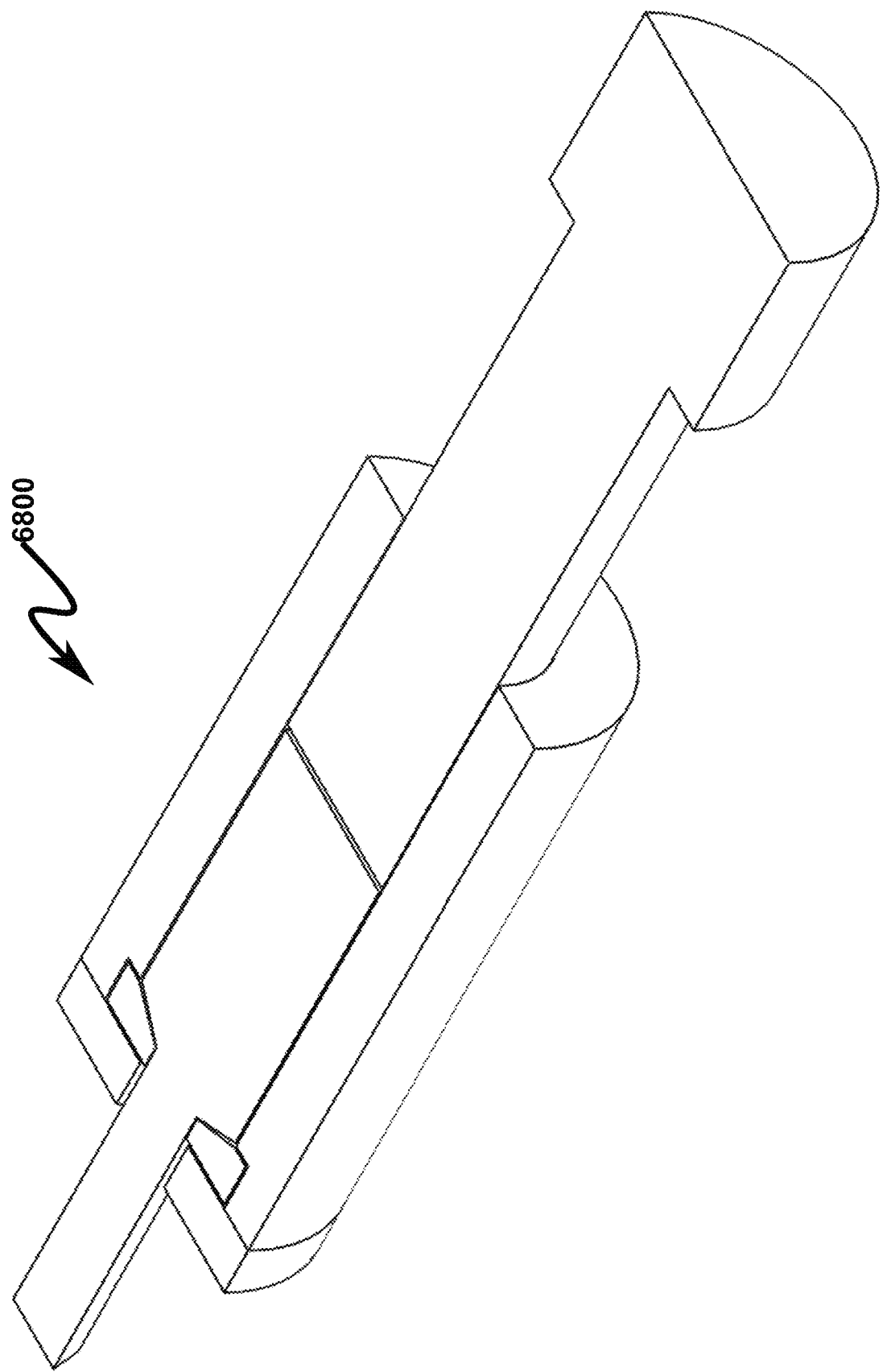
FIG. 68 illustrates a top right front perspective top section view of a direct extrusion system useful in some preferred invention embodiments.
Figure 69:
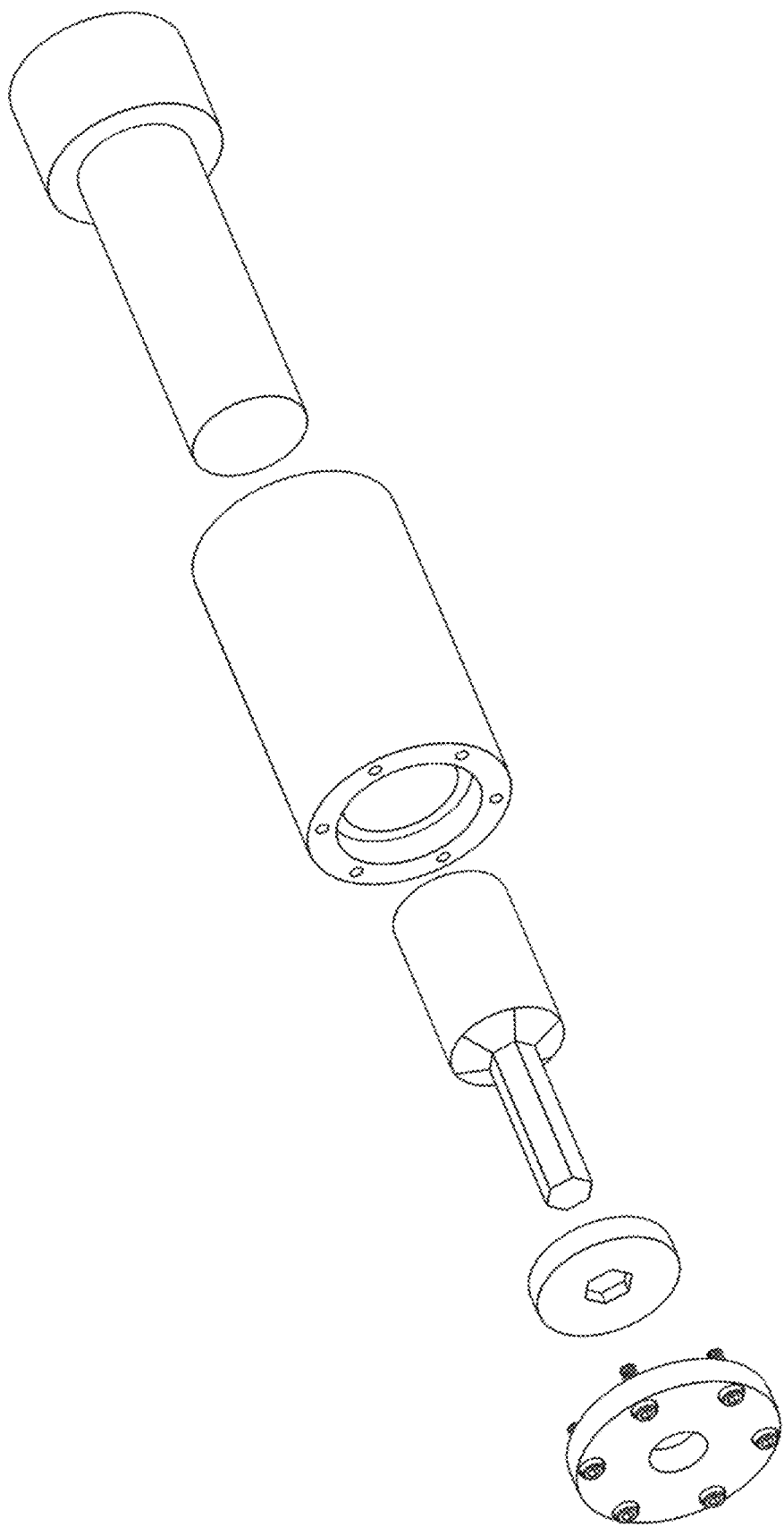
FIG. 69 illustrates a top left front perspective assembly view of a direct extrusion system useful in some preferred invention embodiments.
Figure 71:
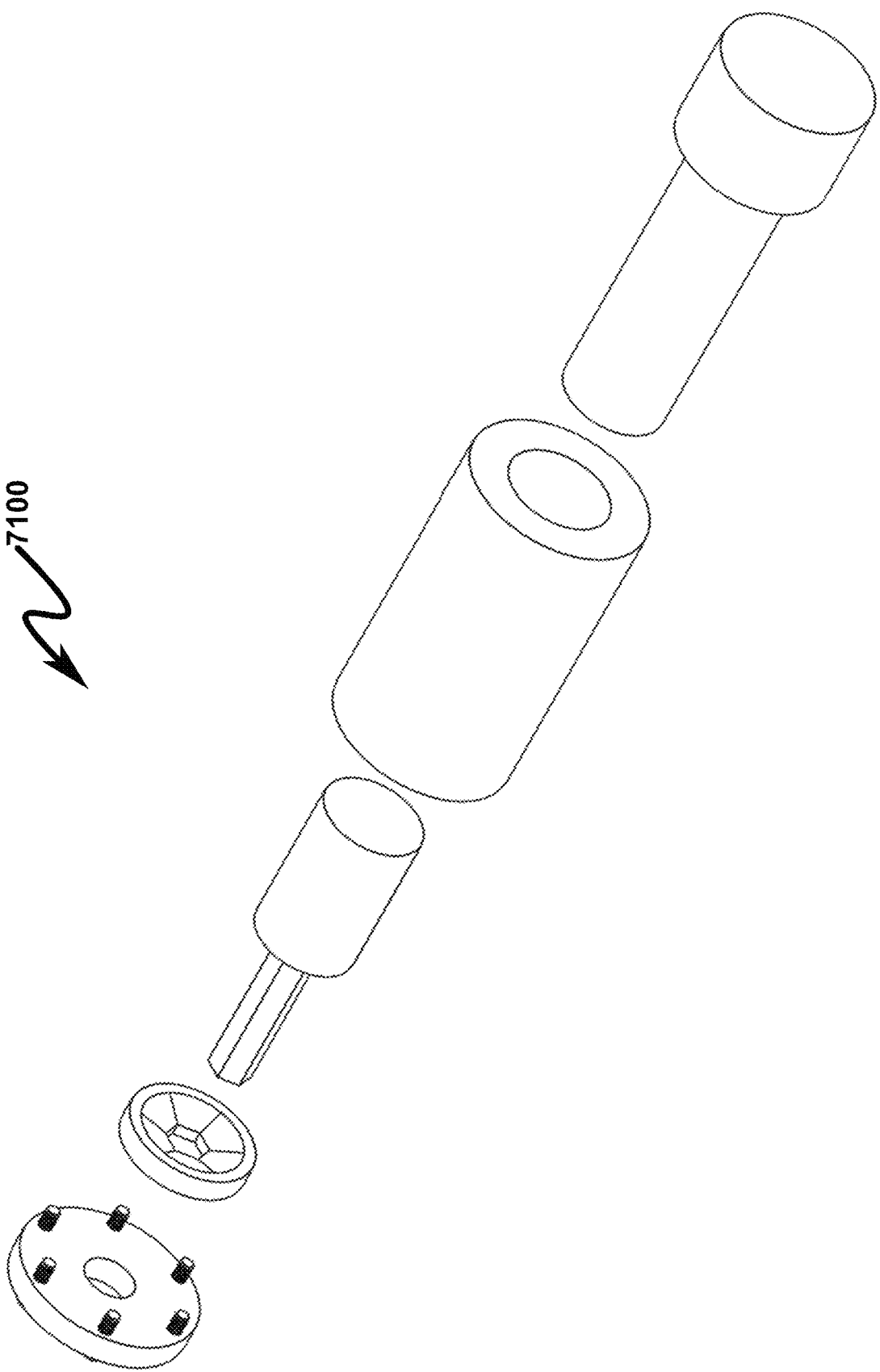
FIG. 71 illustrates a top right front perspective assembly view of a direct extrusion system useful in some preferred invention embodiments.
Figure 80:
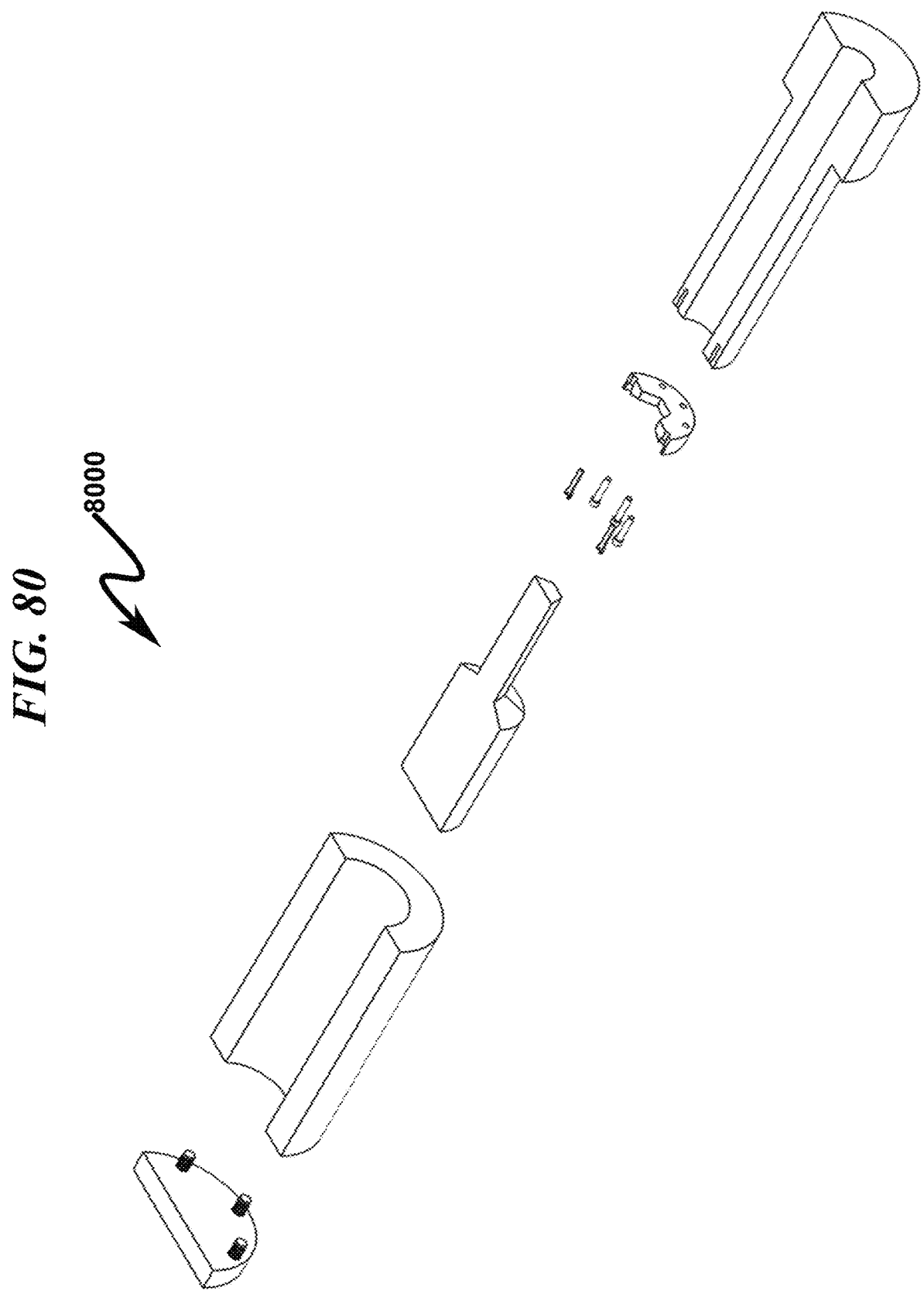
FIG. 80 illustrates a top right front perspective top section assembly view of an indirect extrusion system useful in some preferred invention embodiments.

Extruding (6500)-(8000). As generally depicted in FIG. 65 (6500)-FIG. 80 (8000), extrusion is the process of pushing a large piece of material through a die with a smaller cross-sectional area using a ram. The force for extruding is applied to the ram the squeezes the material through the die. The initial shape of the material is simple and the die's cross-sectional shape can be simple or complex. The images in FIG. 65 (6500)-FIG. 80 (8000) show the process of extrusion with the arrows showing the extrusion direction (ED) along the direction the material exits the die. The transverse direction (TD) is perpendicular to the ED. The deformation percent may be determined by comparing the initial and final cross-sectional areas with $A_i$ representing the initial area prior to extrusion and $A_f$ representing the final area after extrusion.

$$ExtrusionDeformation\ (\%) = 100 \times \frac{A_i - A_f}{A_i} \quad (11)$$

Figure 72:
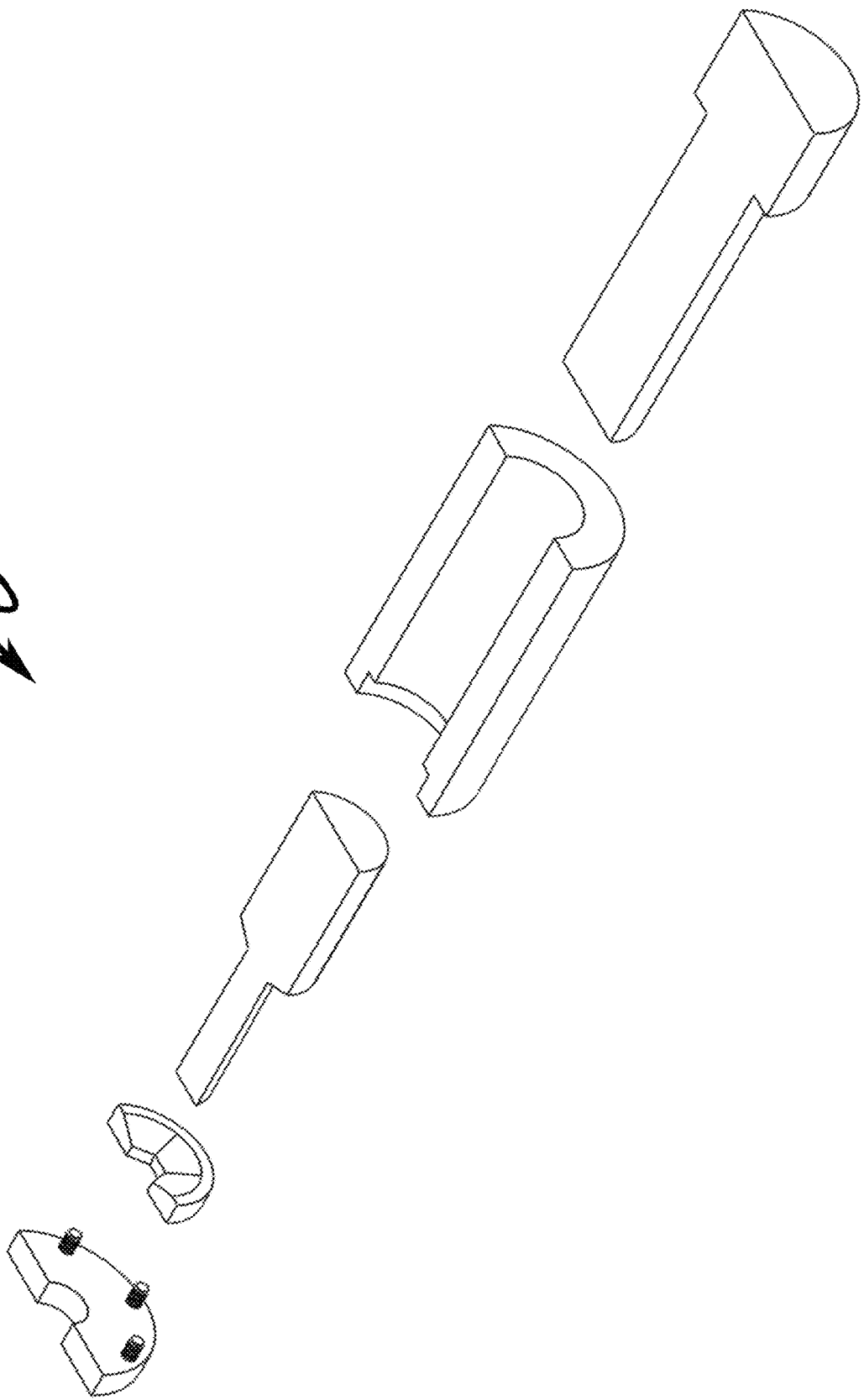
FIG. 72 illustrates a top right front perspective top section assembly view of a direct extrusion system useful in some preferred invention embodiments.
Figure 73:
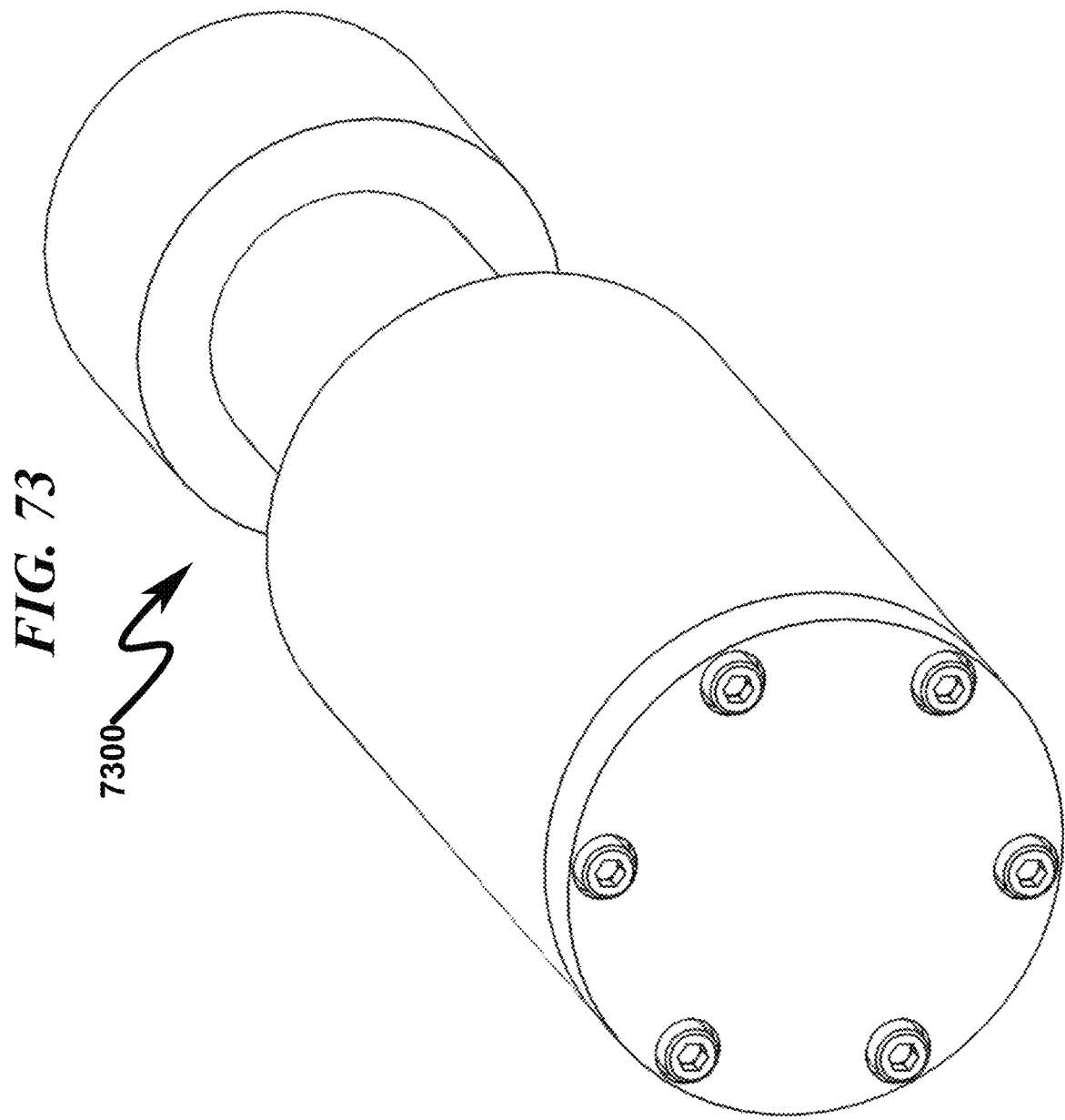
FIG. 73 illustrates a top left front perspective view of an indirect extrusion system useful in some preferred invention embodiments.
Figure 74:
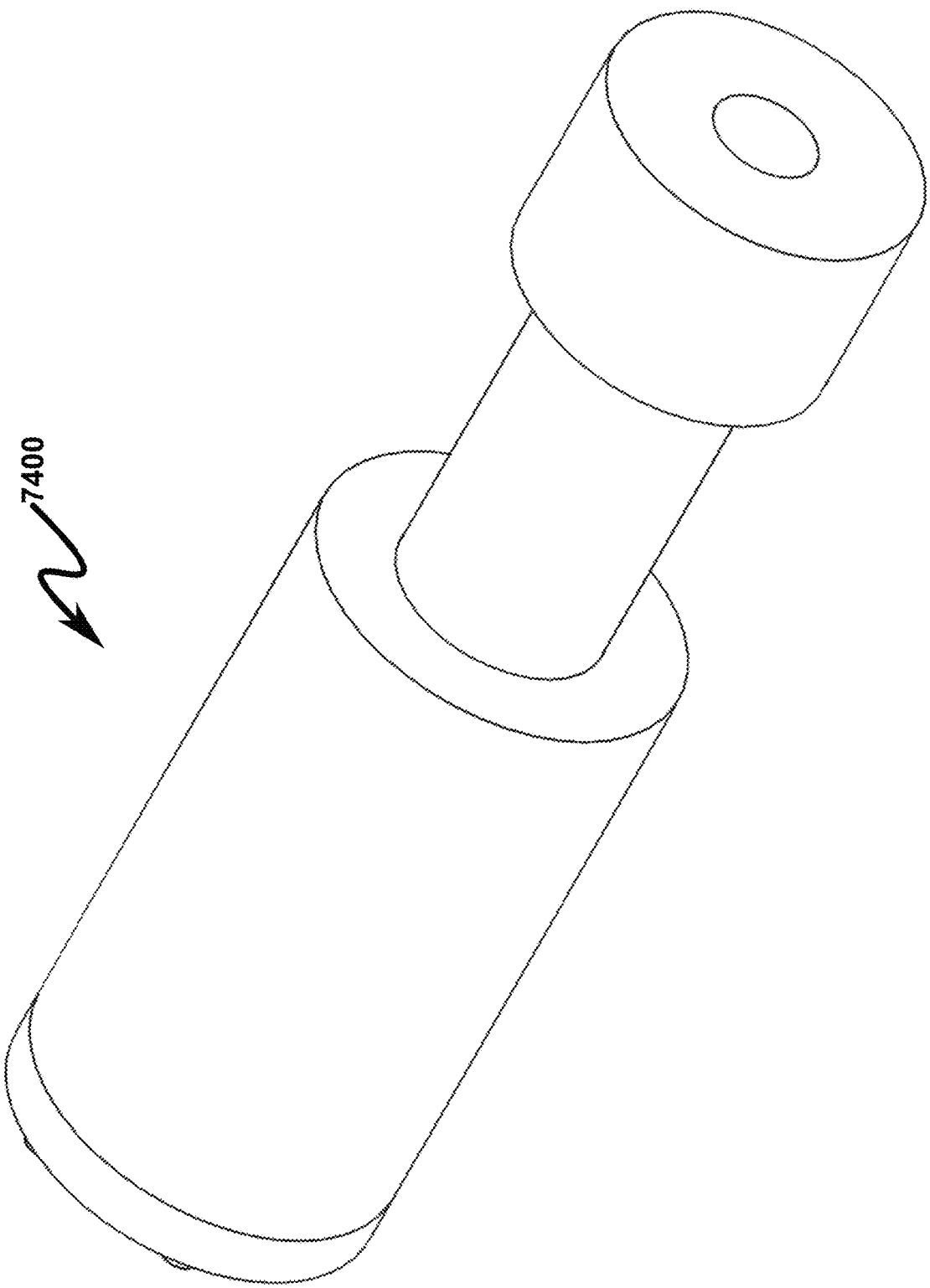
FIG. 74 illustrates a top right front perspective view of an indirect extrusion system useful in some preferred invention embodiments.
Figure 75:
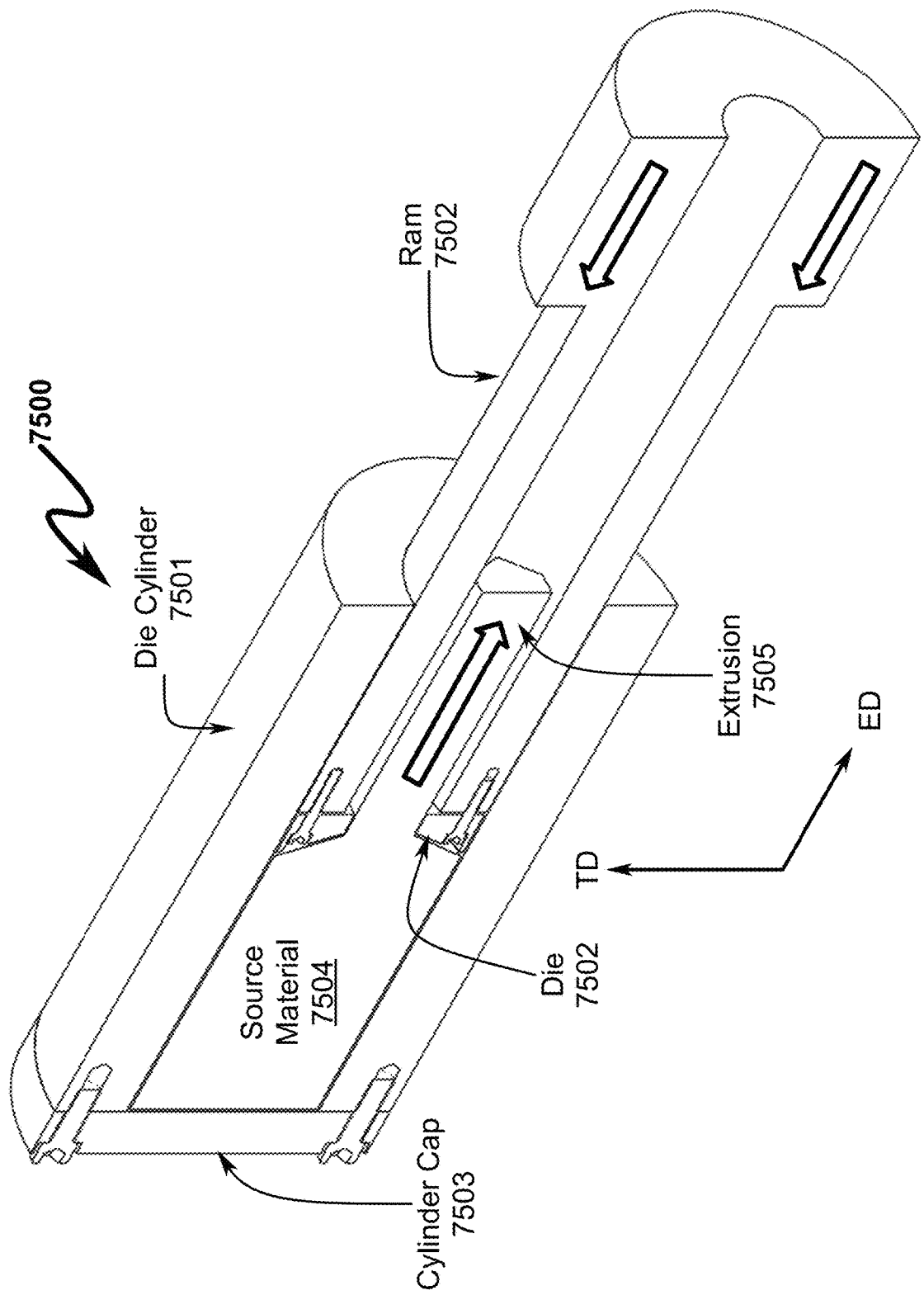
FIG. 75 illustrates a top right front perspective front section view of an indirect extrusion system useful in some preferred invention embodiments.
Figure 76:
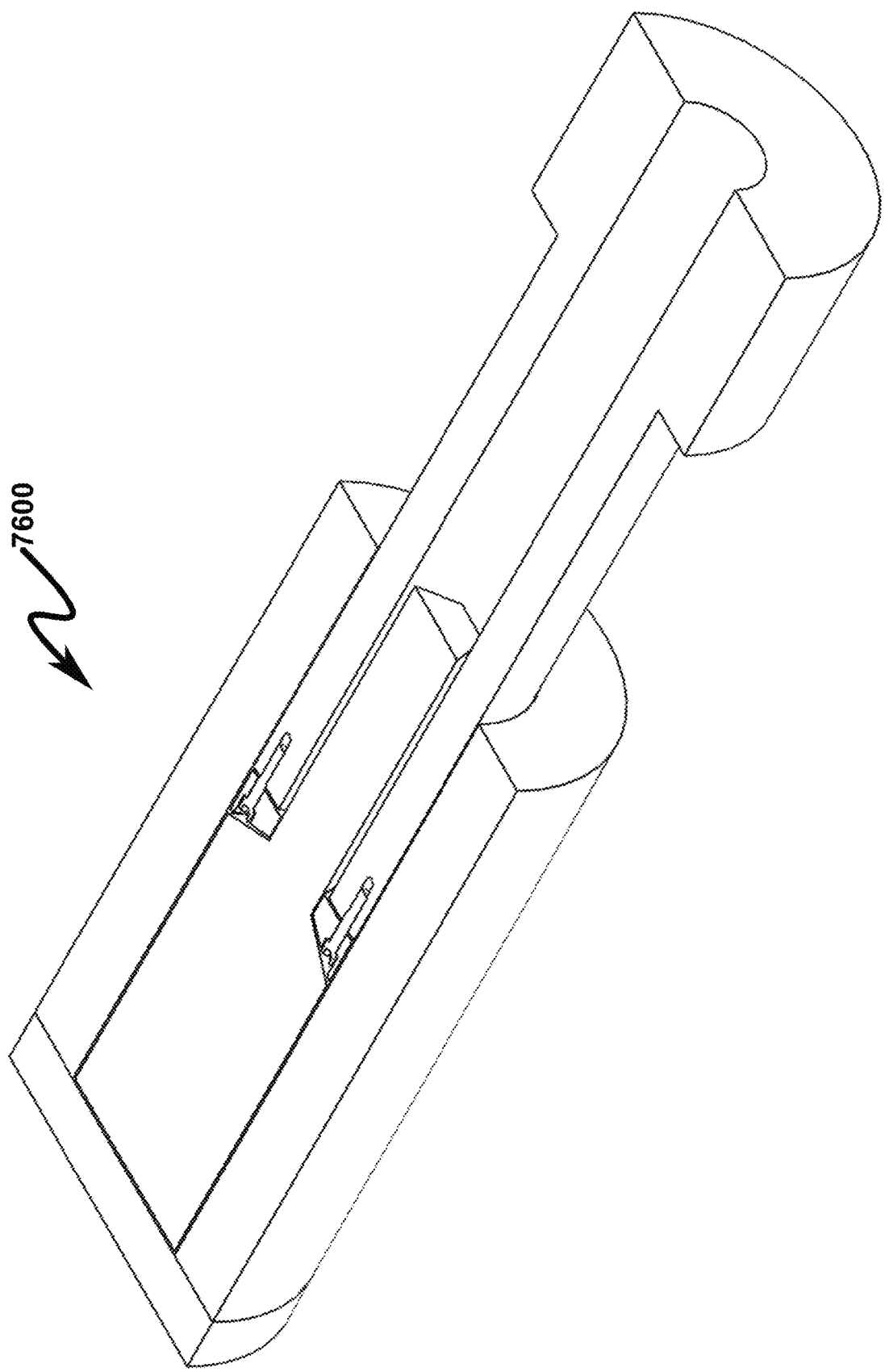
FIG. 76 illustrates a top right front perspective top section view of an indirect extrusion system useful in some preferred invention embodiments.
Figure 77:
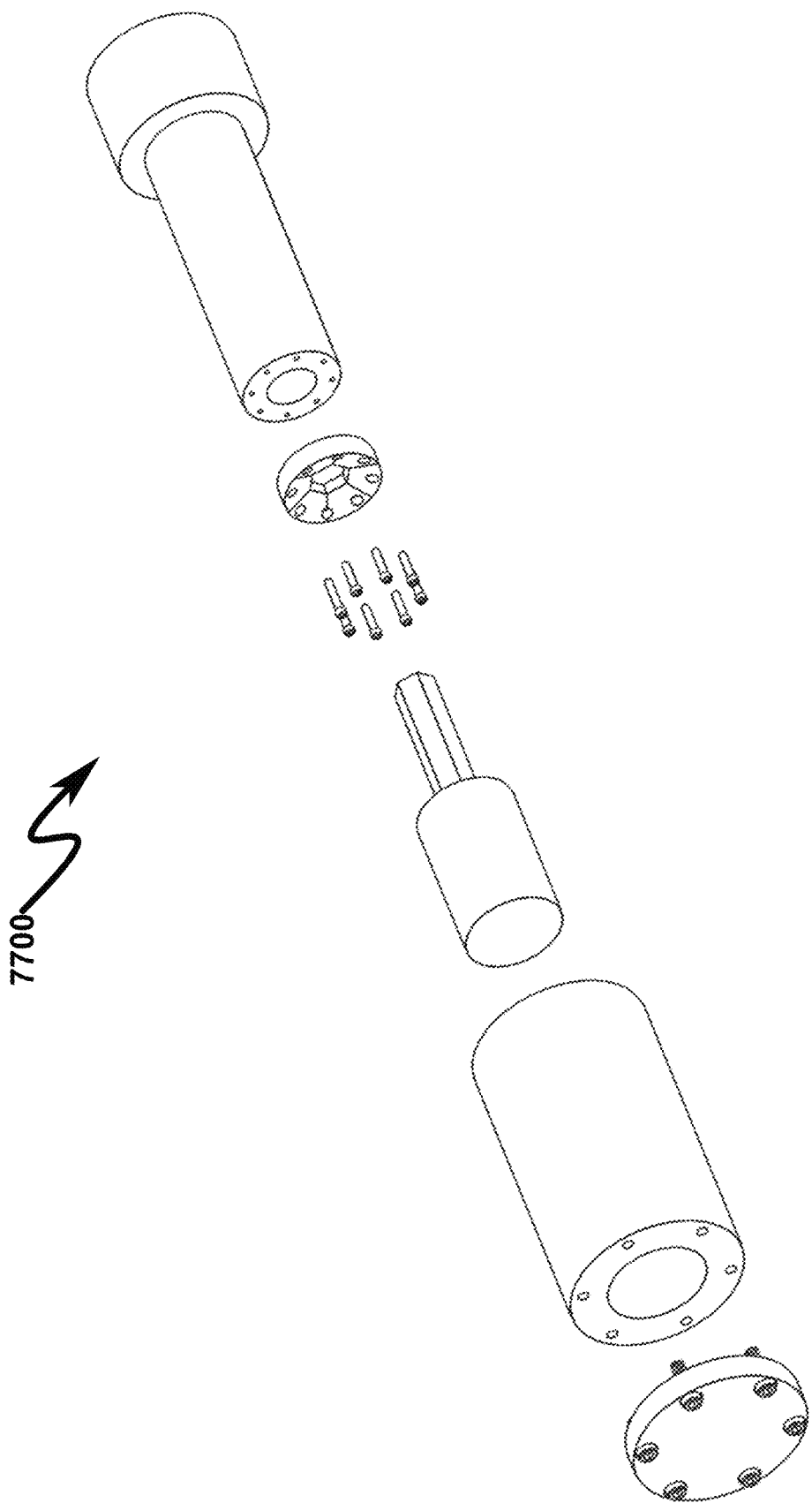
FIG. 77 illustrates a top left front perspective assembly view of an indirect extrusion system useful in some preferred invention embodiments.
Figure 78:
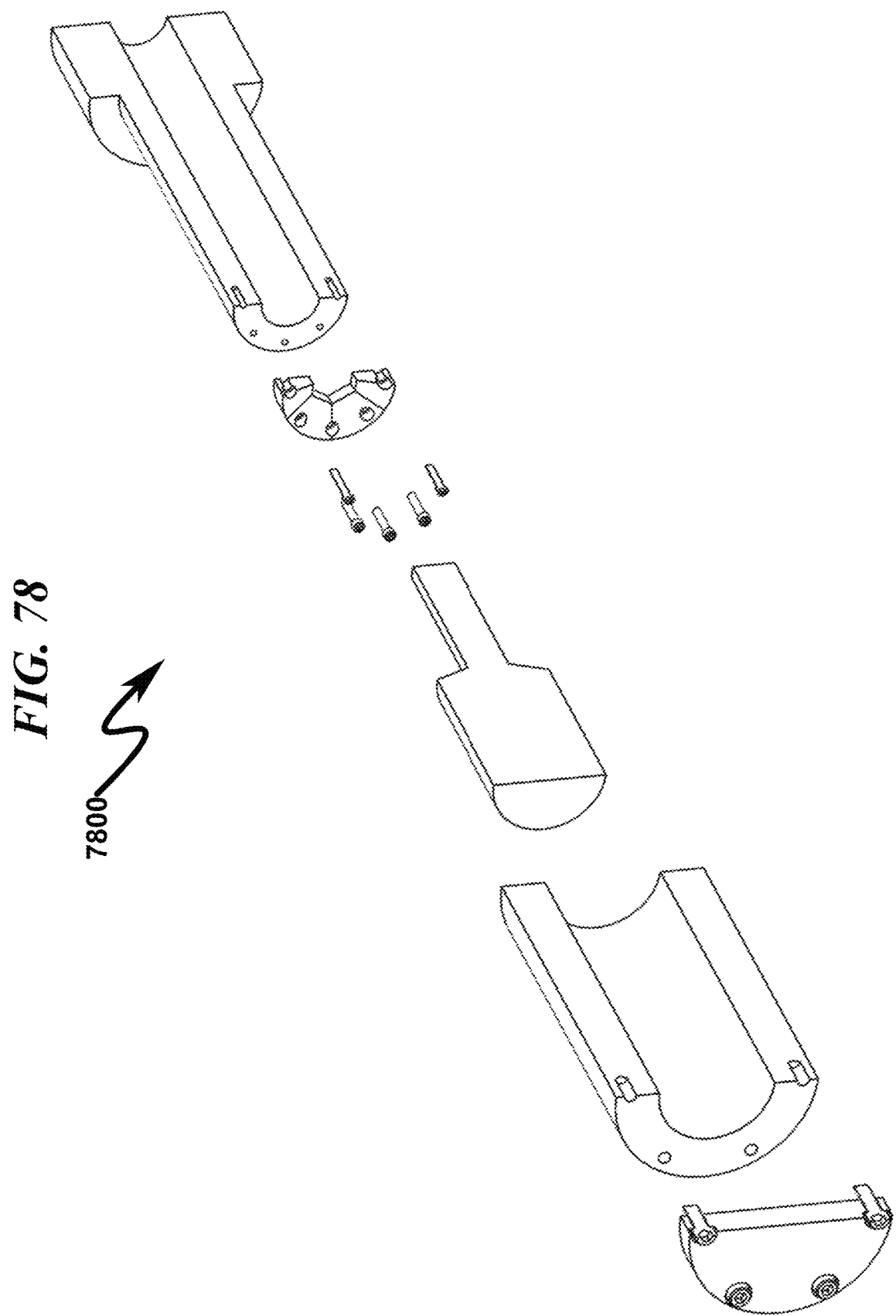
FIG. 78 illustrates a top left front perspective front section assembly view of an indirect extrusion system useful in some preferred invention embodiments.
Figure 79:
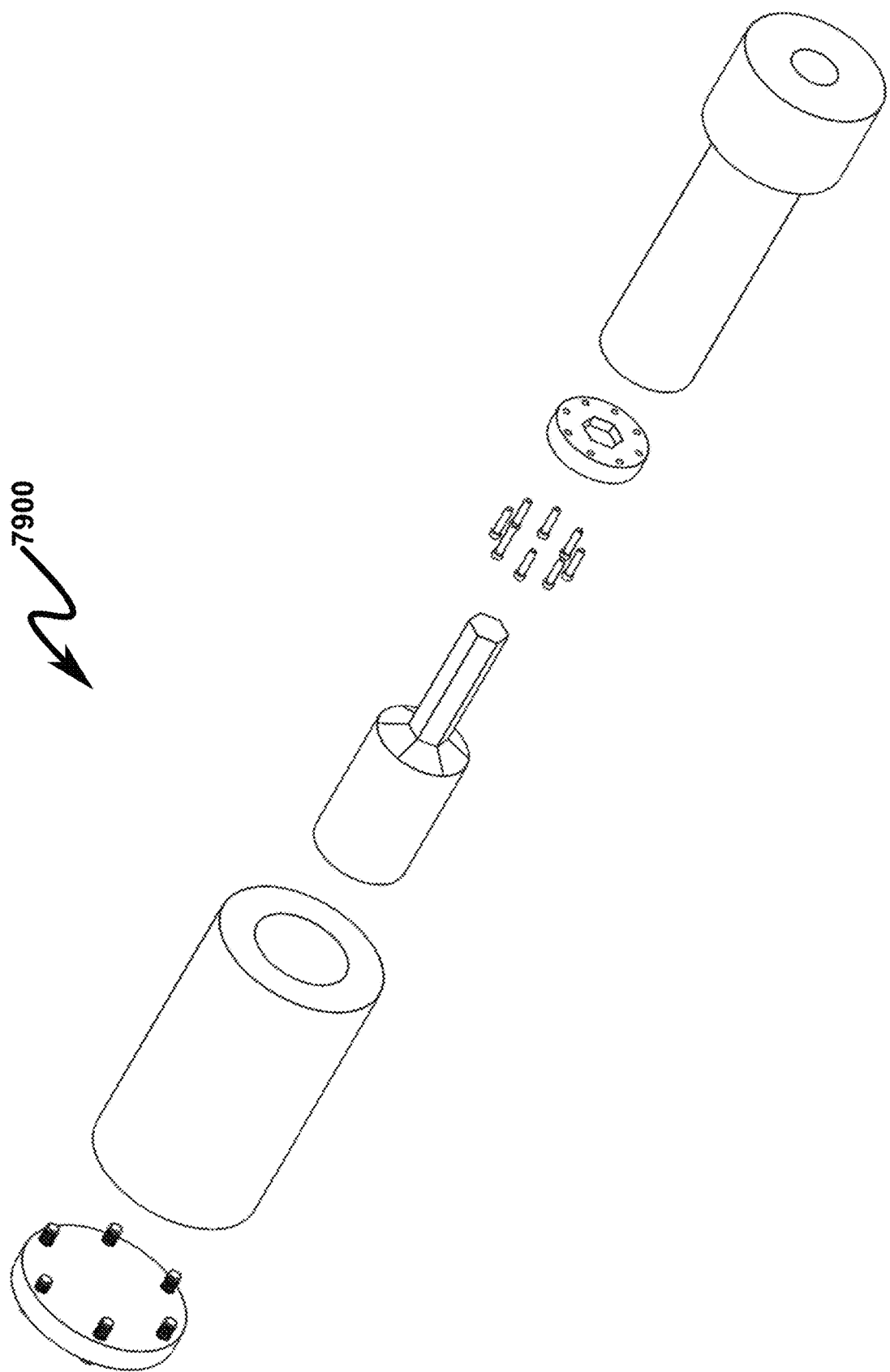
FIG. 79 illustrates a top right front perspective assembly view of an indirect extrusion system useful in some preferred invention embodiments.

The deformation process orients or textures the crystals in a particular direction creating a tailored thermal expansion response. This deformation process may be accomplished using direct extrusion as depicted in FIG. 65 (6500)-FIG. 72 (7200) or indirect extrusion as depicted in FIG. 73 (7300)-FIG. 80 (8000). The dies illustrated depict a hexagonal extrusion profile as an example but any die extrusion profile may be used with these processes. Additionally, the ram cylinders are depicted as cylindrical but may be of any peripheral shape.

Co-Extruding refers to the process of wrapping or coating the un-deformed material with another material whose thermal expansion coefficient may or may not be tailorable and then extruding the material through a die. This co-extruding process can be used to combine other materials that change or improve the Other Material Properties with tailored thermal expansion alloys. If the other material is placed on the outside, it is called a can and if it is placed on the inside, it is called a mandrel. The mandrel may be left as part of the final material or removed to create a hollow tube. The can may also be left as part of the final material or removed.

Figure 81:
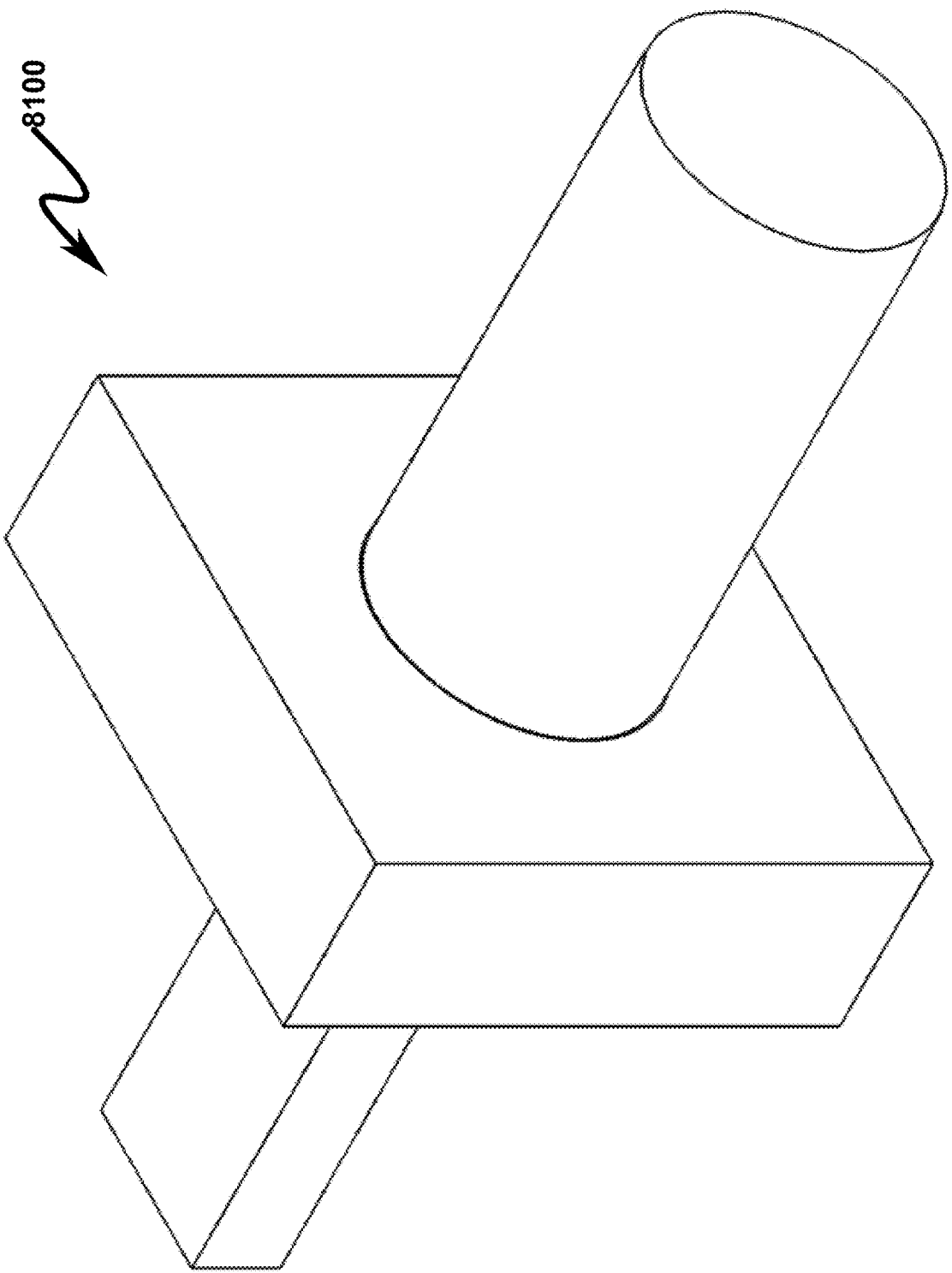
FIG. 81 illustrates a top right front perspective view of a drawing system useful in some preferred invention embodiments.
Figure 82:
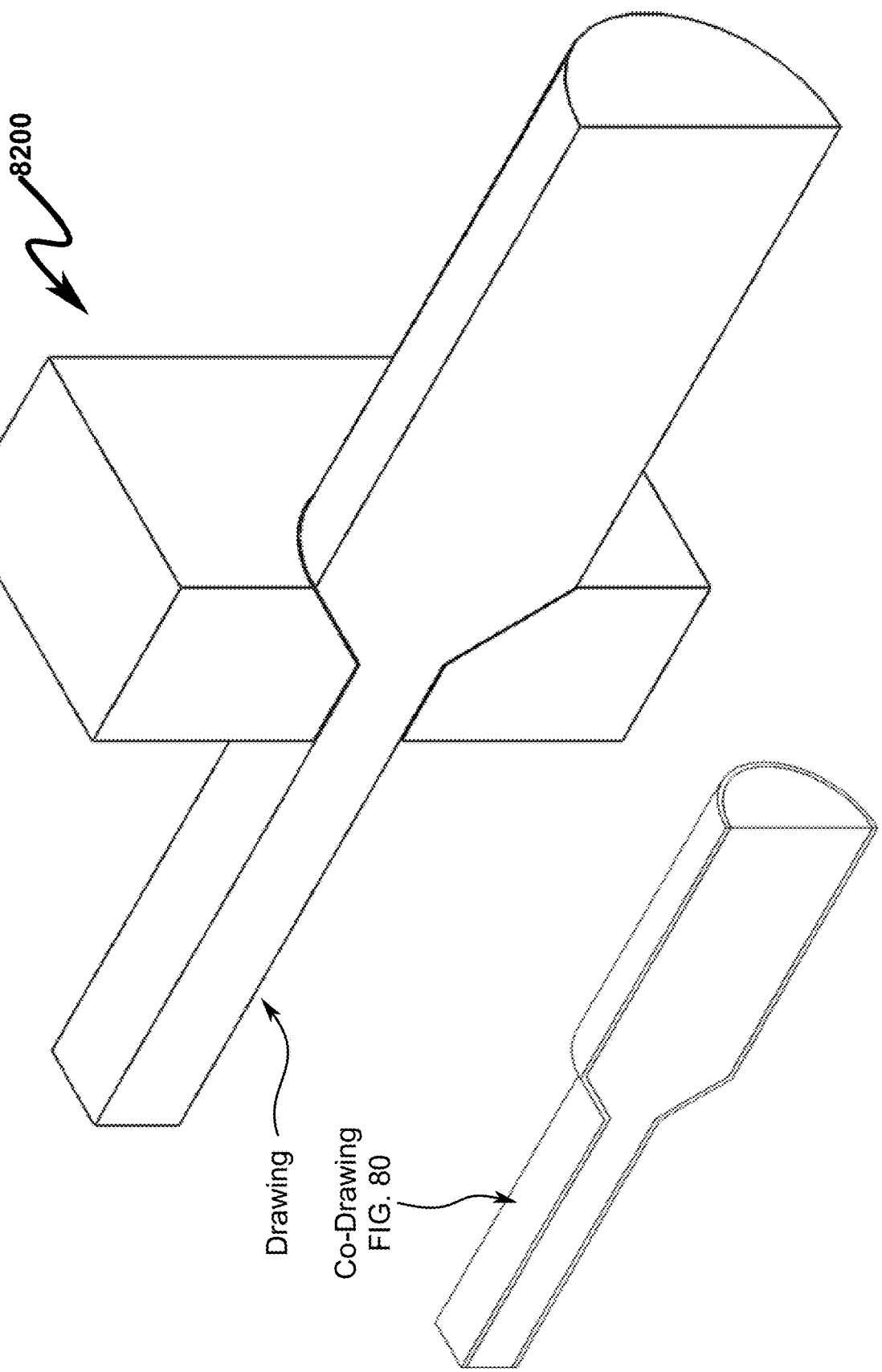
FIG. 82 illustrates a top right front perspective front section view of a drawing system useful in some preferred invention embodiments.
Figure 83:
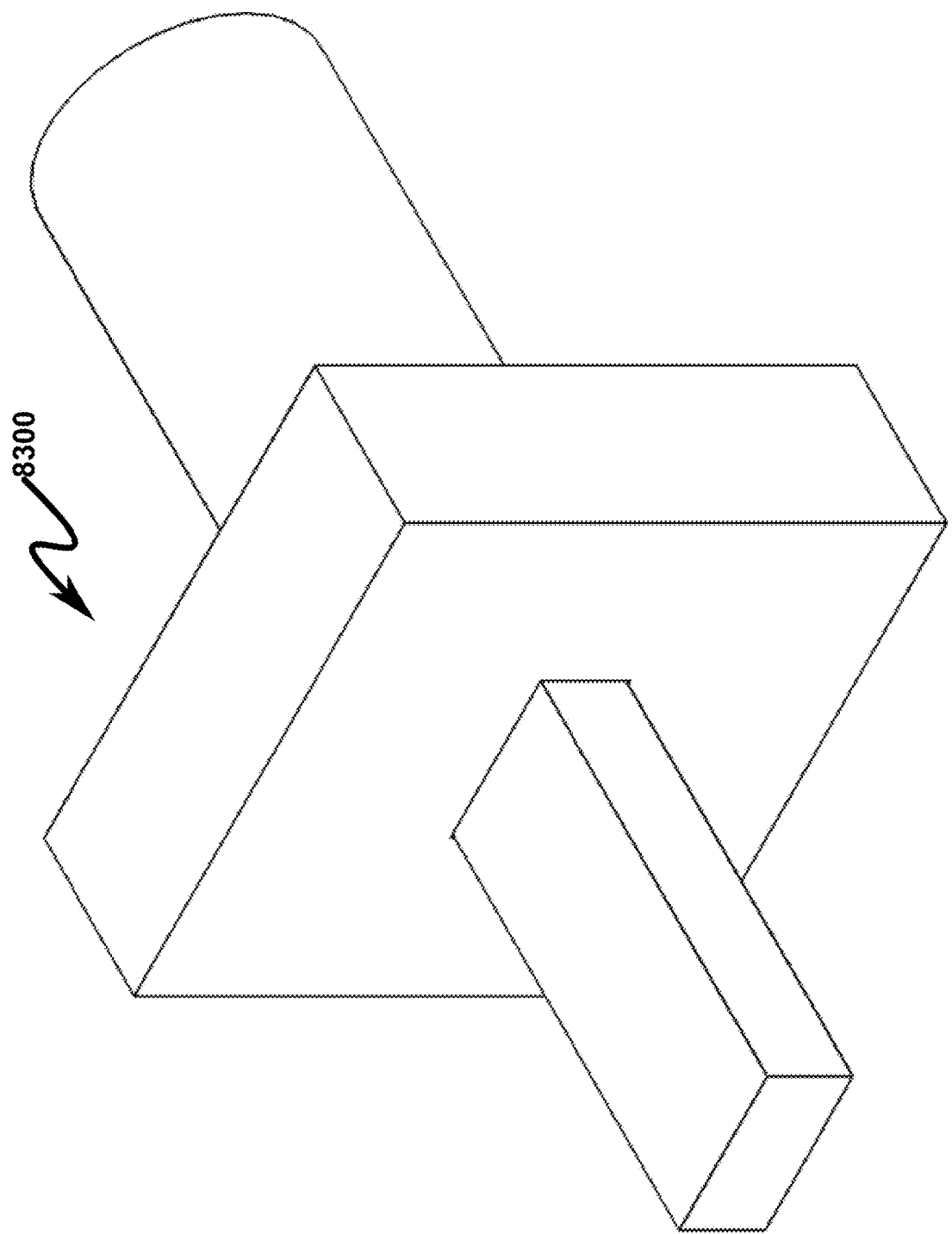
FIG. 83 illustrates a top left front perspective view of a drawing system useful in some preferred invention embodiments.
Figure 84:
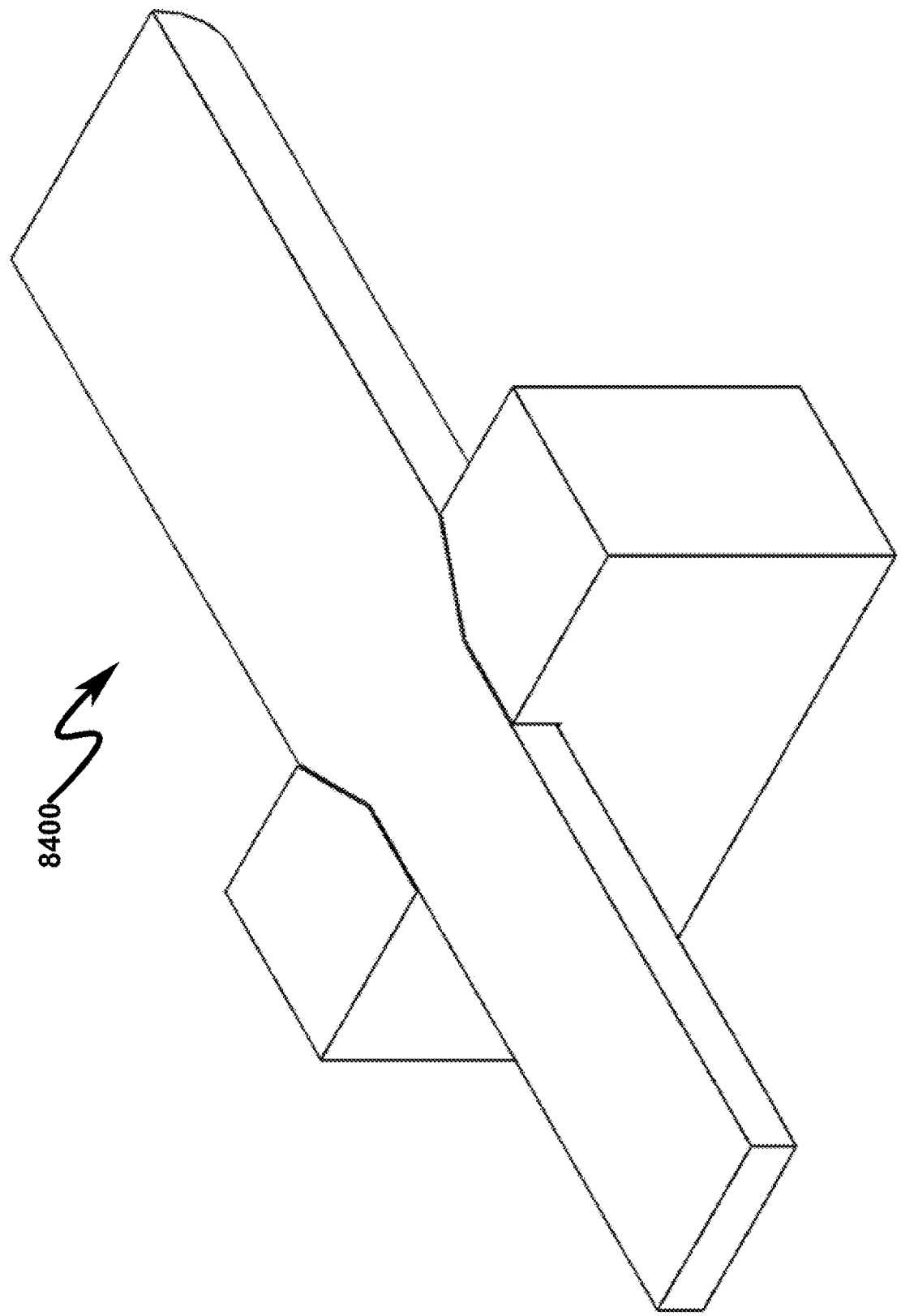
FIG. 84 illustrates a top left front perspective top section view of a drawing system useful in some preferred invention embodiments.
Figure 85:
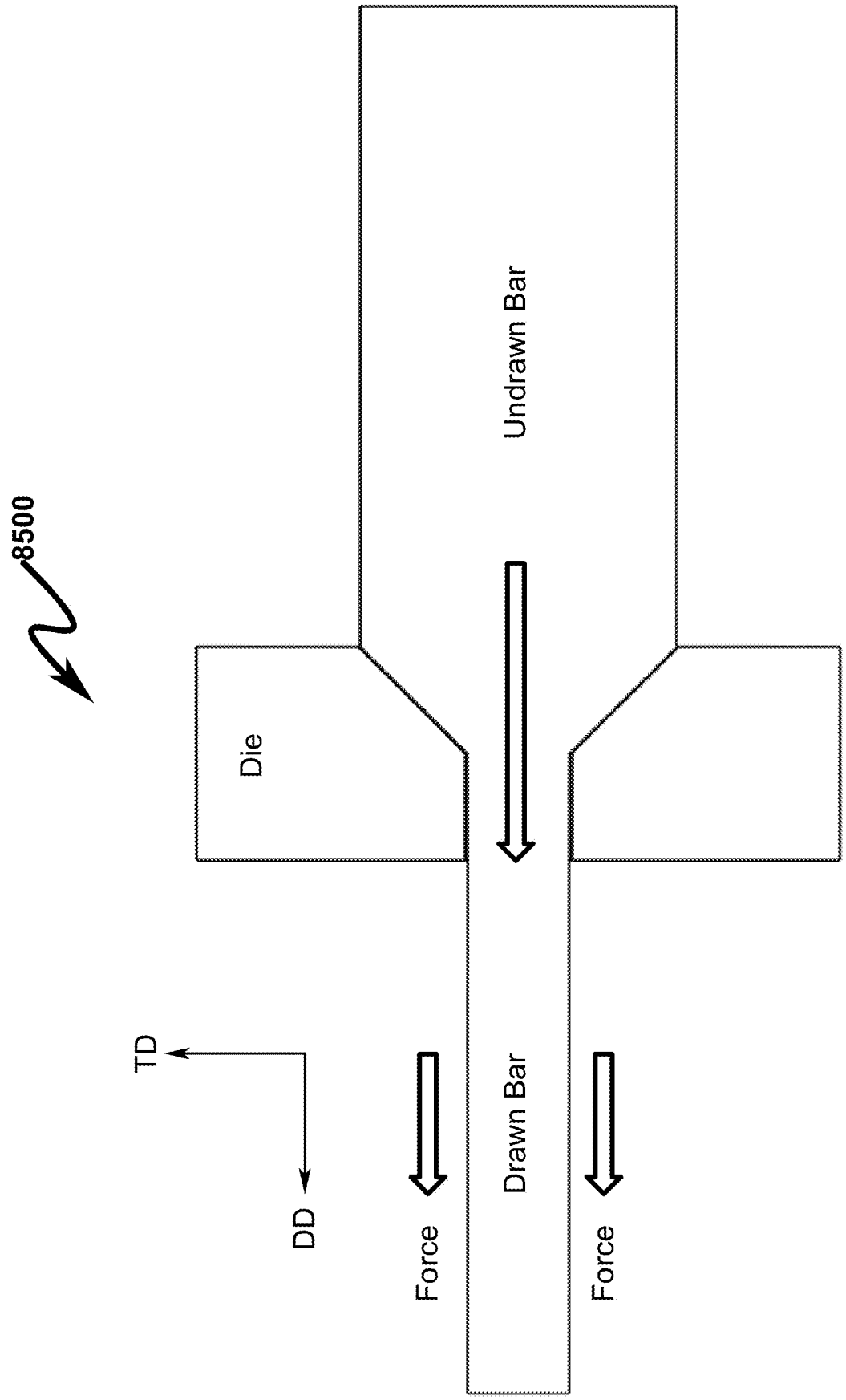
FIG. 85 illustrates a front section view of a drawing system useful in some preferred invention embodiments.
Figure 86:
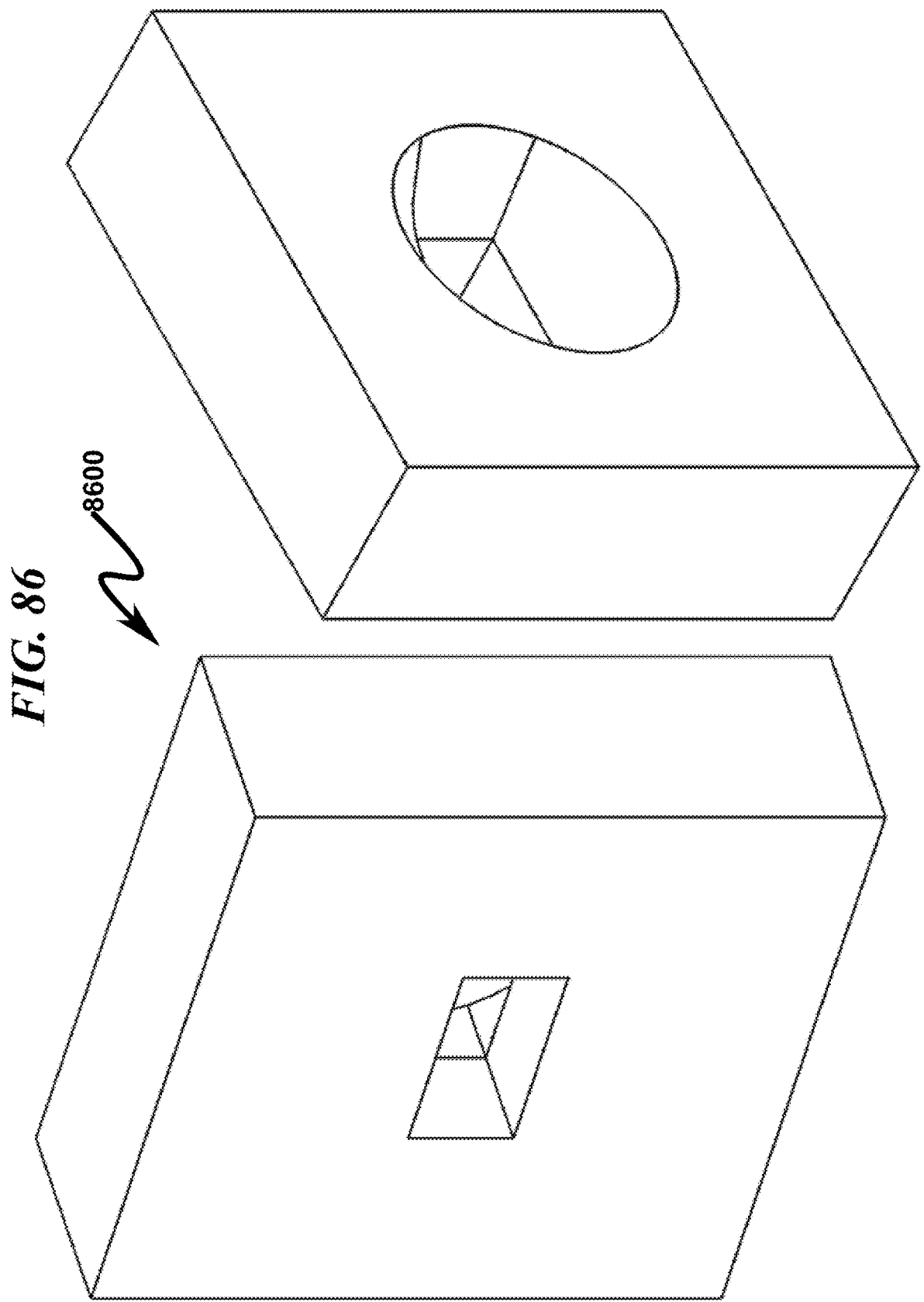
FIG. 86 illustrates a front left perspective and front right perspective views of a die from a drawing system useful in some preferred invention embodiments.

Drawing (8100)-(8700). As generally depicted in FIG. 81 (8100)-FIG. 87 (8700), drawing is the process of pulling a material through a die with a smaller cross-sectional area that the original material piece. It differs from extrusion by the pulling action that places the original material piece in tension rather than a pressing action that places the material in compression. The transverse direction (TD) is perpendicular to the drawing direction (DD). The deformation percent may be determined by comparing the initial and final cross-sectional areas with $A_i$ representing the initial area prior to extrusion and $A_f$ representing the final area after extrusion.

$$ExtrusionDeformation\ (\%) = 100 \times \frac{A_i - A_f}{A_i} \quad (12)$$

The deformation process orients or textures the crystals in a particular direction creating a tailored thermal expansion response.

Figure 88:
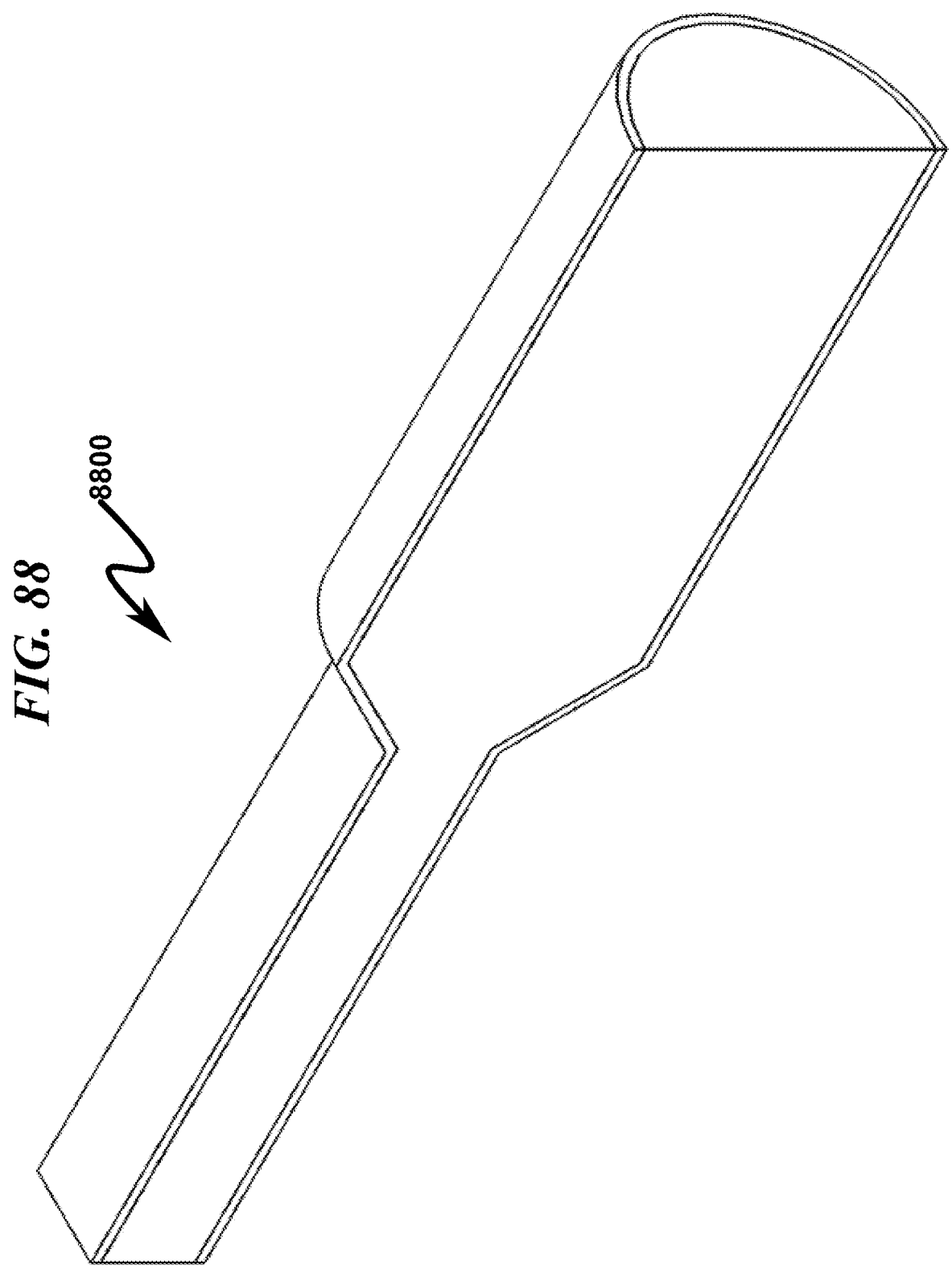
FIG. 88 illustrates a top right front perspective front section view of a drawn material operated on by a drawing system useful in some preferred invention embodiments.

Co-Drawing (8800) as generally depicted in the front sectional view of FIG. 88 (8800) refers to the process of wrapping or coating the un-deformed material with another material whose thermal expansion coefficient may or may not be tailorable and then drawing the material through a die. This co-drawing process can be used to combine other materials that change or improve the Other Material Properties with tailored thermal expansion alloys. If the other material is placed on the outside, it is called a can and if it is placed on the inside, it is called a mandrel. The mandrel may be left as part of the final material or removed to create a hollow tube. The can may also be left as part of the final material or removed.

Figure 89:
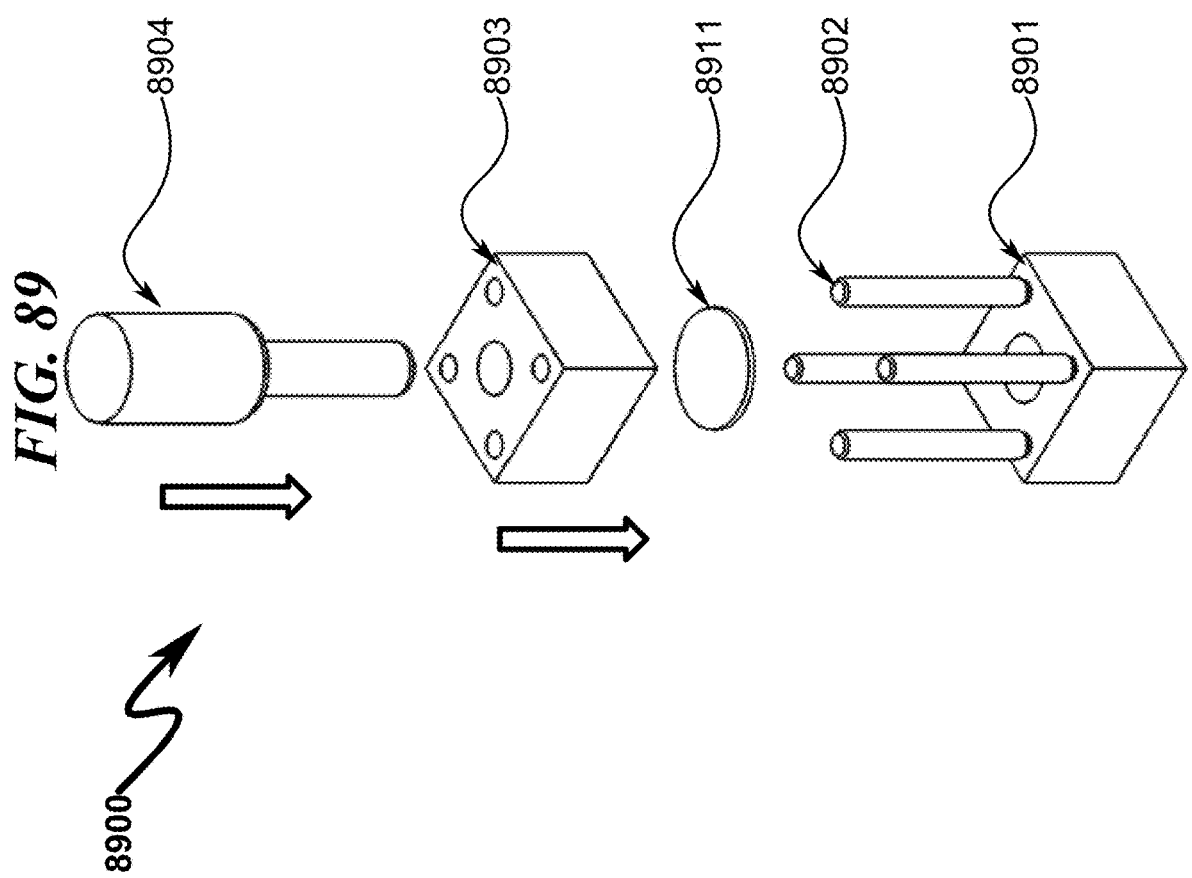
FIG. 89 illustrates a top right front perspective exploded view of a deep drawing system useful in some preferred invention embodiments.
Figure 90:
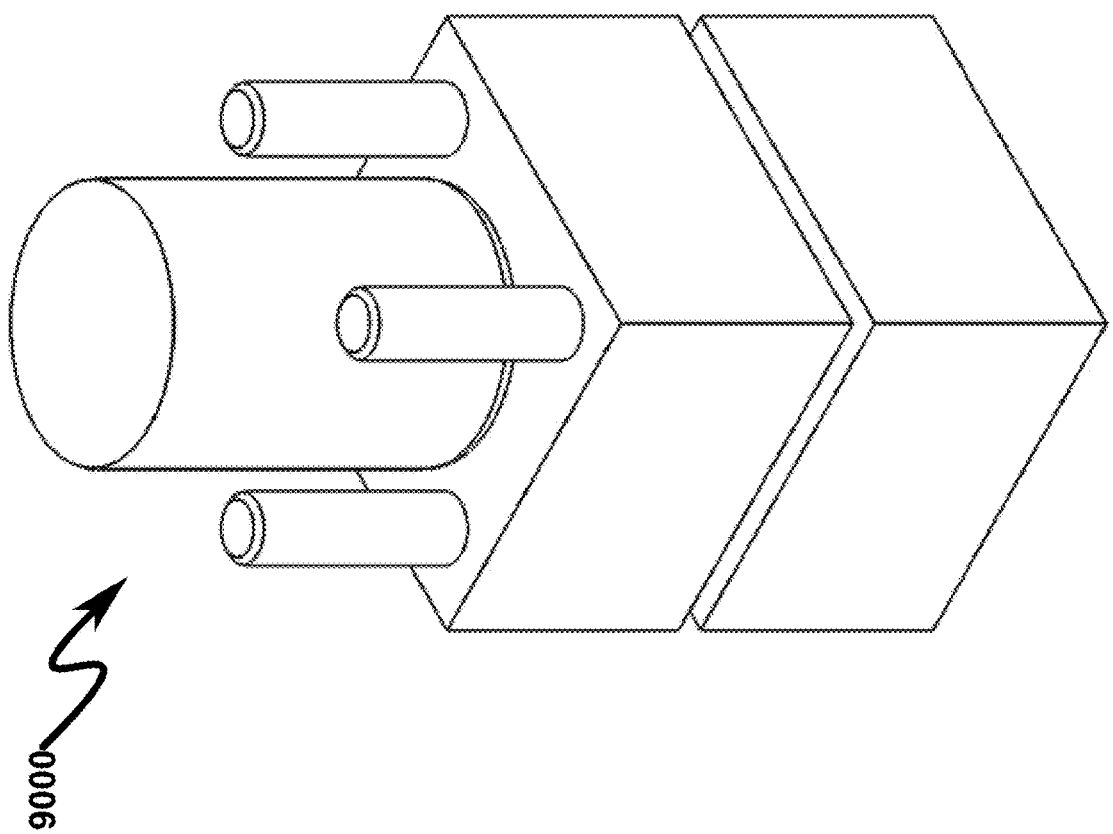
FIG. 90 illustrates a top right front perspective front view of an assembled deep drawing system useful in some preferred invention embodiments.
Figure 91:
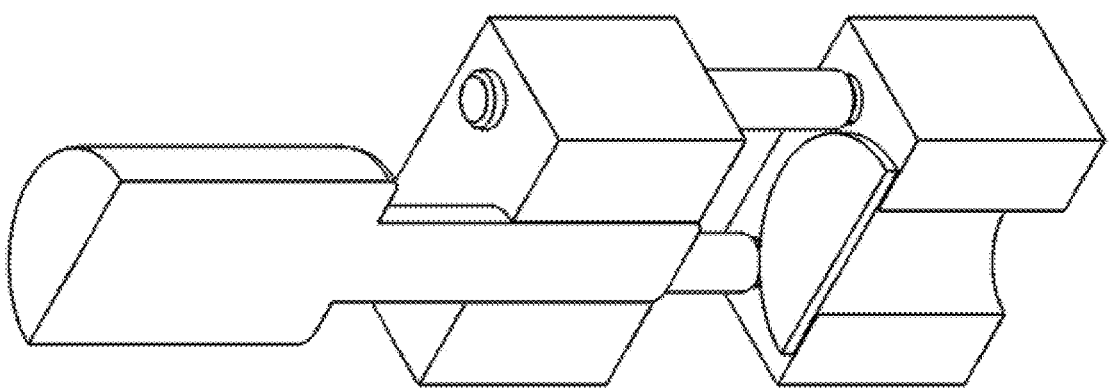
FIG. 91 illustrates a top right front perspective front section view of a deep drawn material operated on by a drawing system useful in some preferred invention embodiments (drawing position 1/6—blank retained by blank holder)
Figure 92:
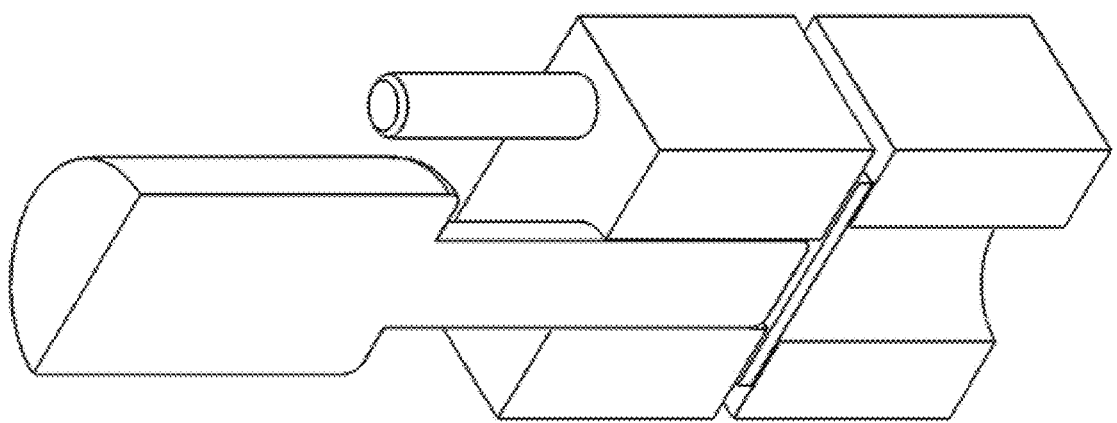
FIG. 92 illustrates a top right front perspective front section view of a deep drawn material operated on by a drawing system useful in some preferred invention embodiments (drawing position 2/6)
Figure 93:
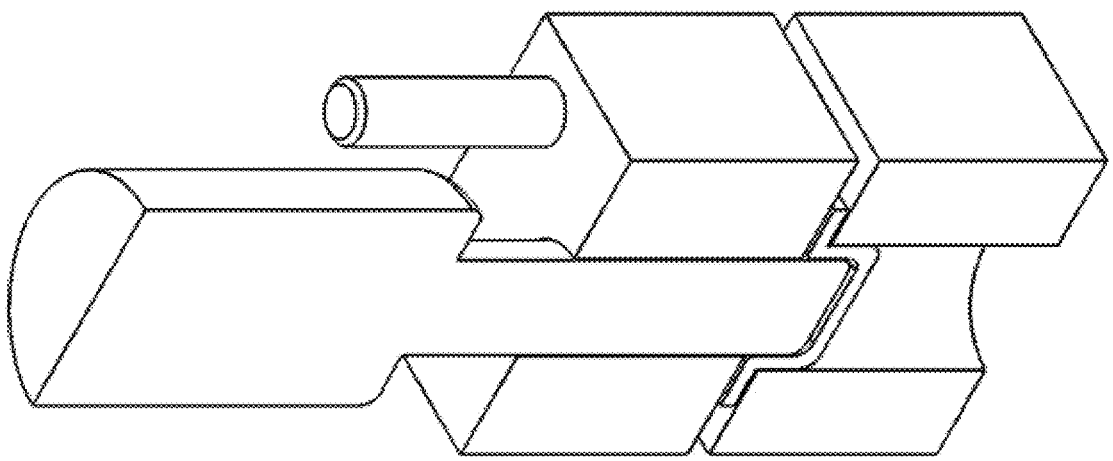
FIG. 93 illustrates a top right front perspective front section view of a deep drawn material operated on by a drawing system useful in some preferred invention embodiments (drawing position 3/6)
Figure 94:
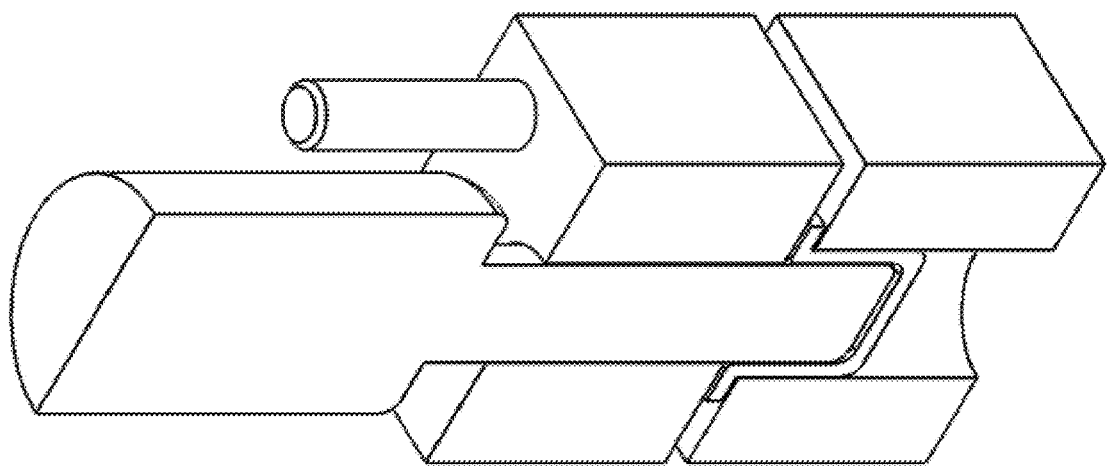
FIG. 94 illustrates a top right front perspective front section view of a deep drawn material operated on by a drawing system useful in some preferred invention embodiments (drawing position 4/6)
Figure 95:
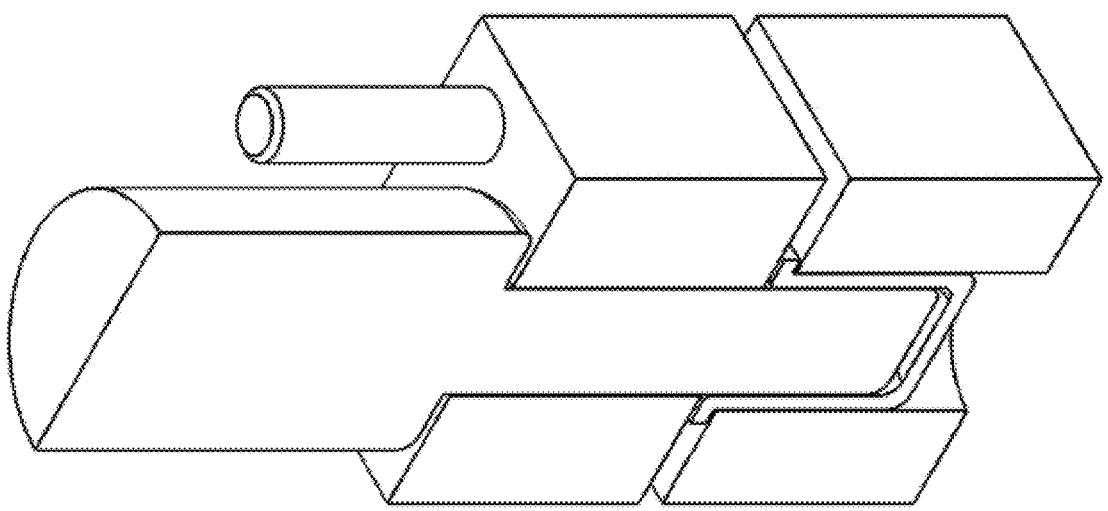
FIG. 95 illustrates a top right front perspective front section view of a deep drawn material operated on by a drawing system useful in some preferred invention embodiments (drawing position 5/6)
Figure 96:
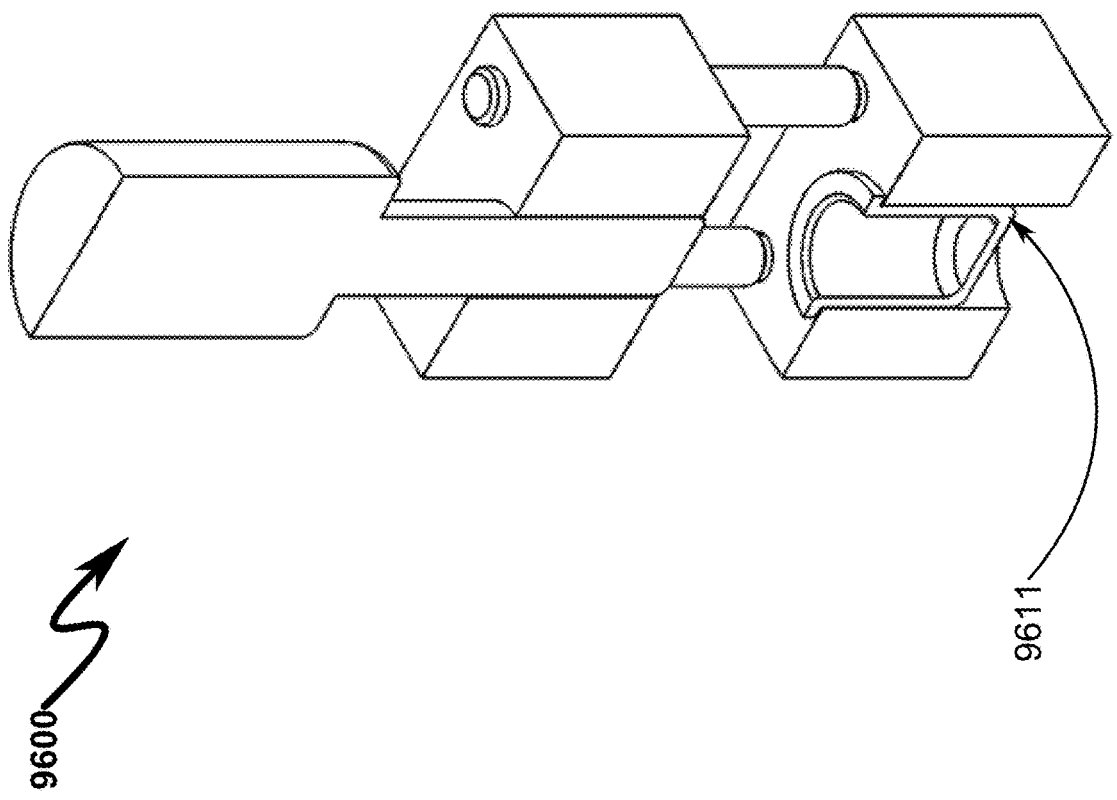
FIG. 96 illustrates a top right front perspective front section view of a deep drawn material operated on by a drawing system useful in some preferred invention embodiments (drawing position 6/6—fully formed blank)

Deep Drawing (8900)-(9600). As generally depicted in FIG. 89 (8900)-FIG. 96 (9600), deep drawing is the process of using a punch to press a flat material blank through a die to create a hollowed cup or structure. Here the die base (8901) is coupled to a number of die guides (8902) that mate with a blank holder (8903) that traverses through and guides a die (8904) to form a blank (8911) that is retained by the blank holder (8903) as generally depicted in the sequence of FIG. 91 (9100)-FIG. 96 (9600). The blank (8911) takes on the shape (9611) of the punch (8904) as it is forced through the die (8901). The deformation process orients or textures the crystals in a particular direction creating a tailored thermal expansion response. Due to the complex shape change, it is difficult to calculate percent deformation, but mathematical engineering tools can be used to determine the deformation and thus the changes to the thermal expansion coefficient.

Figure 97:
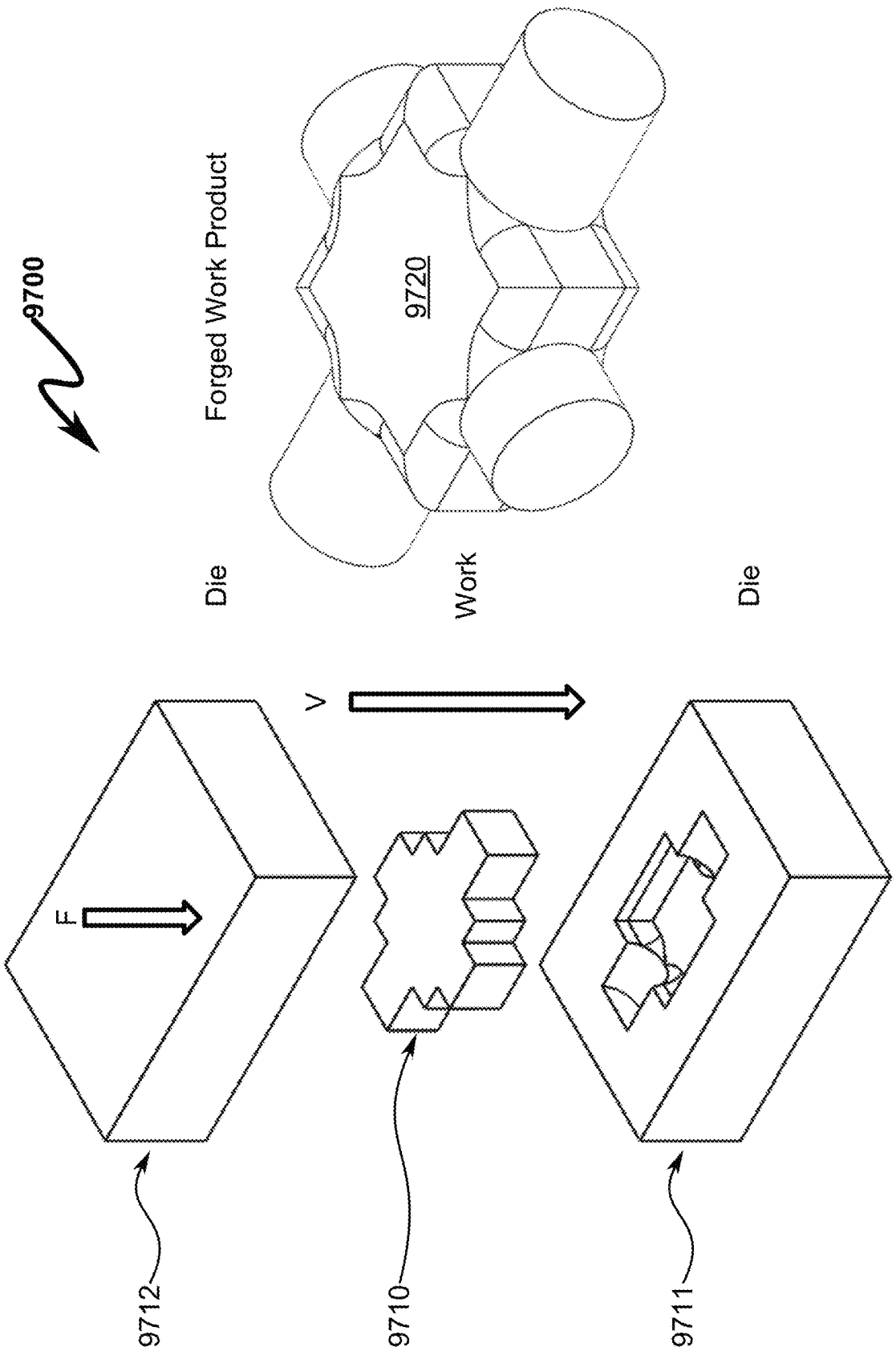
FIG. 97 illustrates a top right front perspective view of a forging system and resulting exemplary work product useful in some preferred invention embodiments.
Figure 100:
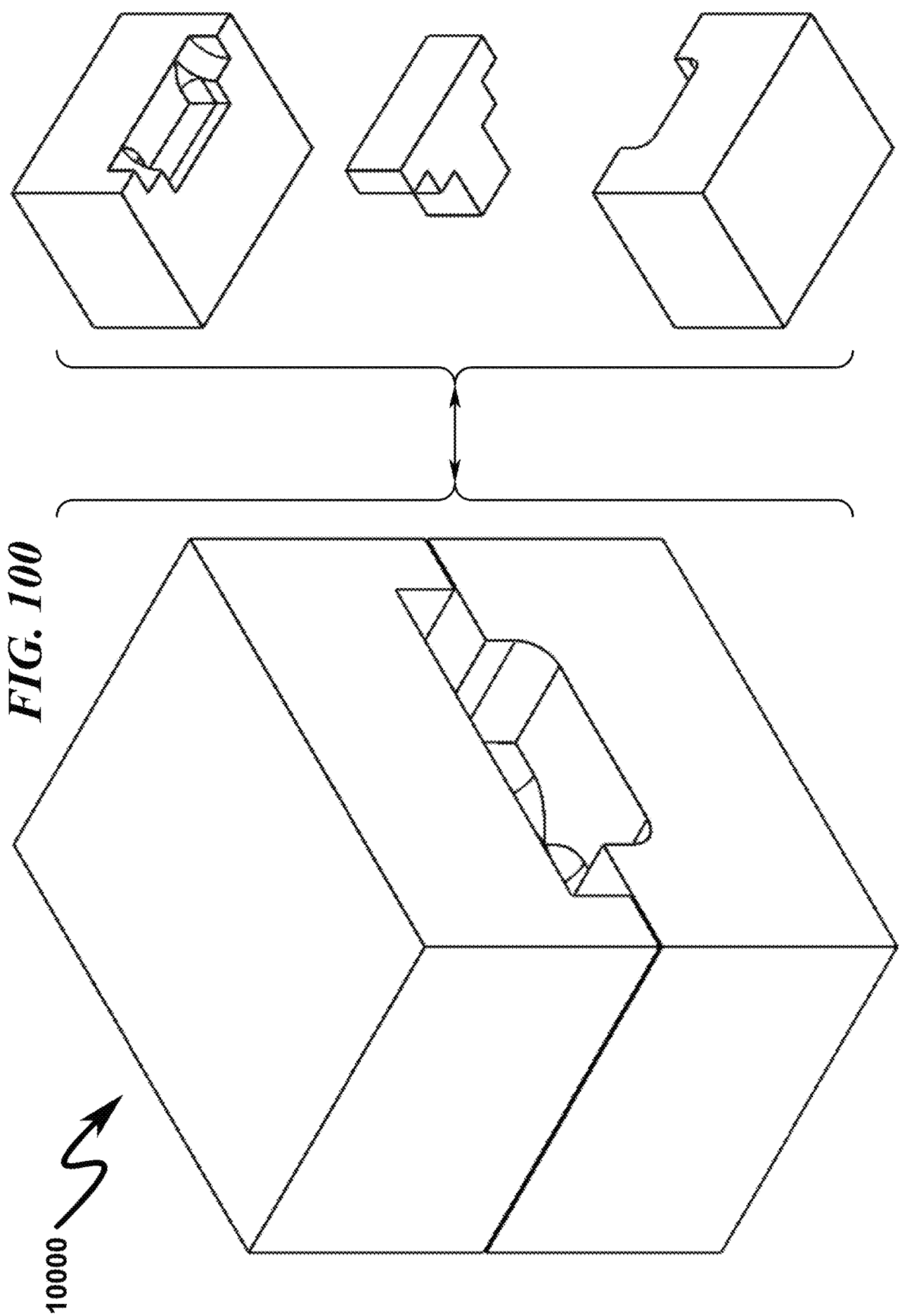
FIG. 100 illustrates a bottom right front perspective top section view of a forging system useful in some preferred invention embodiments.

Forging (9700)-(10000). As generally depicted in FIG. 97 (9700)-FIG. 100 (10000), forging is the process of pressing a work material (9710, 9910) between two dies (9711, 9712, 9911, 9912). A force F is applied between the two dies (9711, 9712, 9911, 9912) as the dies (9711, 9712, 9911, 9912) are impressed together with a given velocity V to form the work material (9710, 9910) into a work product (9720, 9920). Open-die forging is between two flat dies while impression-die forging is between dies with a pre-defined shape. The material takes on the shape of the impression during impression-die forging. The deformation process orients or textures the crystals in a particular direction creating a tailored thermal expansion response. Due to the complex shape change, it is difficult to calculate percent deformation, but mathematical engineering tools can be used to determine the deformation and thus the changes to the thermal expansion coefficient. Co-Forging refers to the process of wrapping or coating the un-deformed material with another material whose thermal expansion coefficient may or may not be tailorable and then drawing the material through a die. This co-forging process can be used to combine other materials that change or improve the Other Material Properties with tailored thermal expansion alloys.

Figure 101:
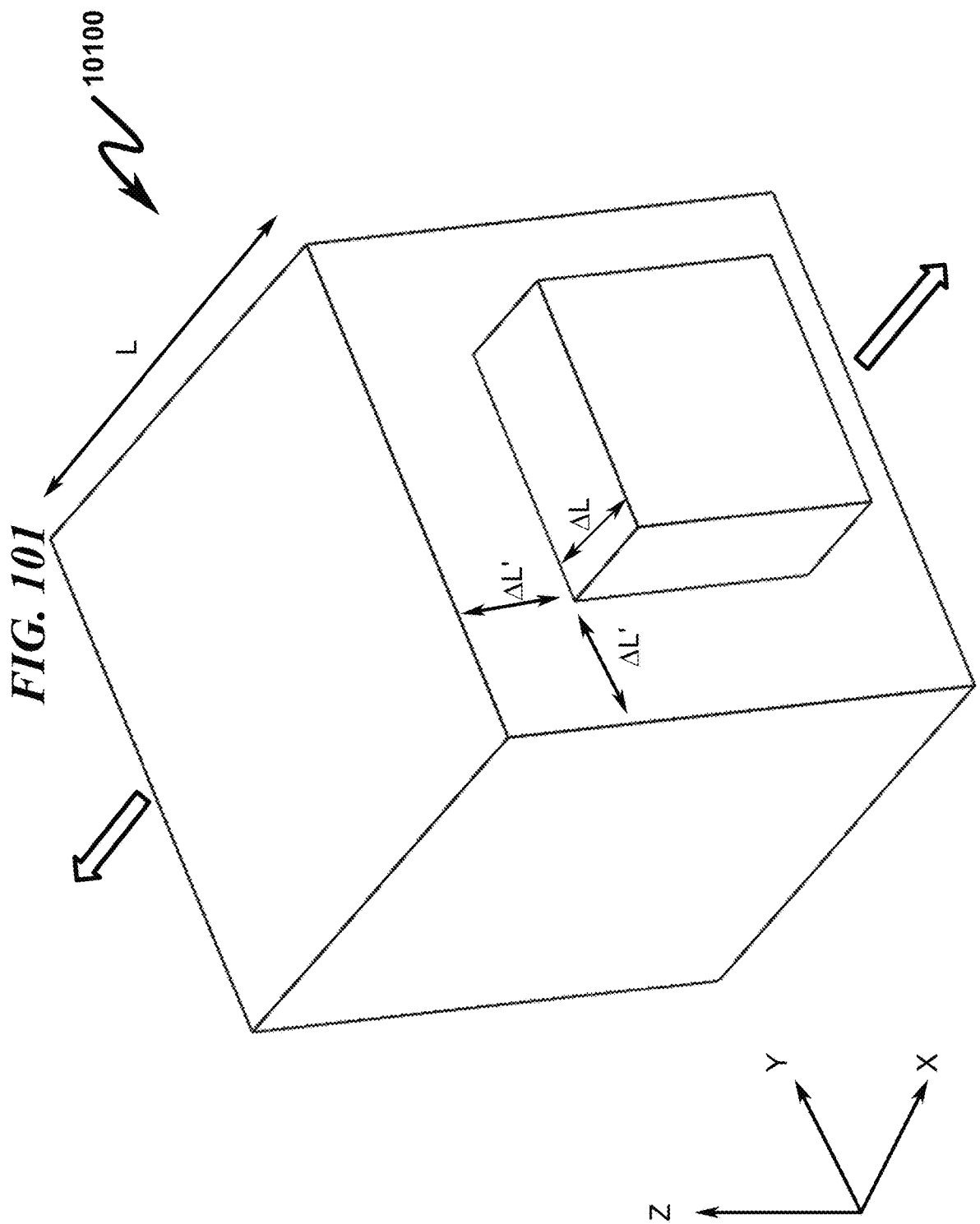
FIG. 101 illustrates a top right front perspective view of tensile deformation useful in some preferred invention embodiments.
Figure 102:
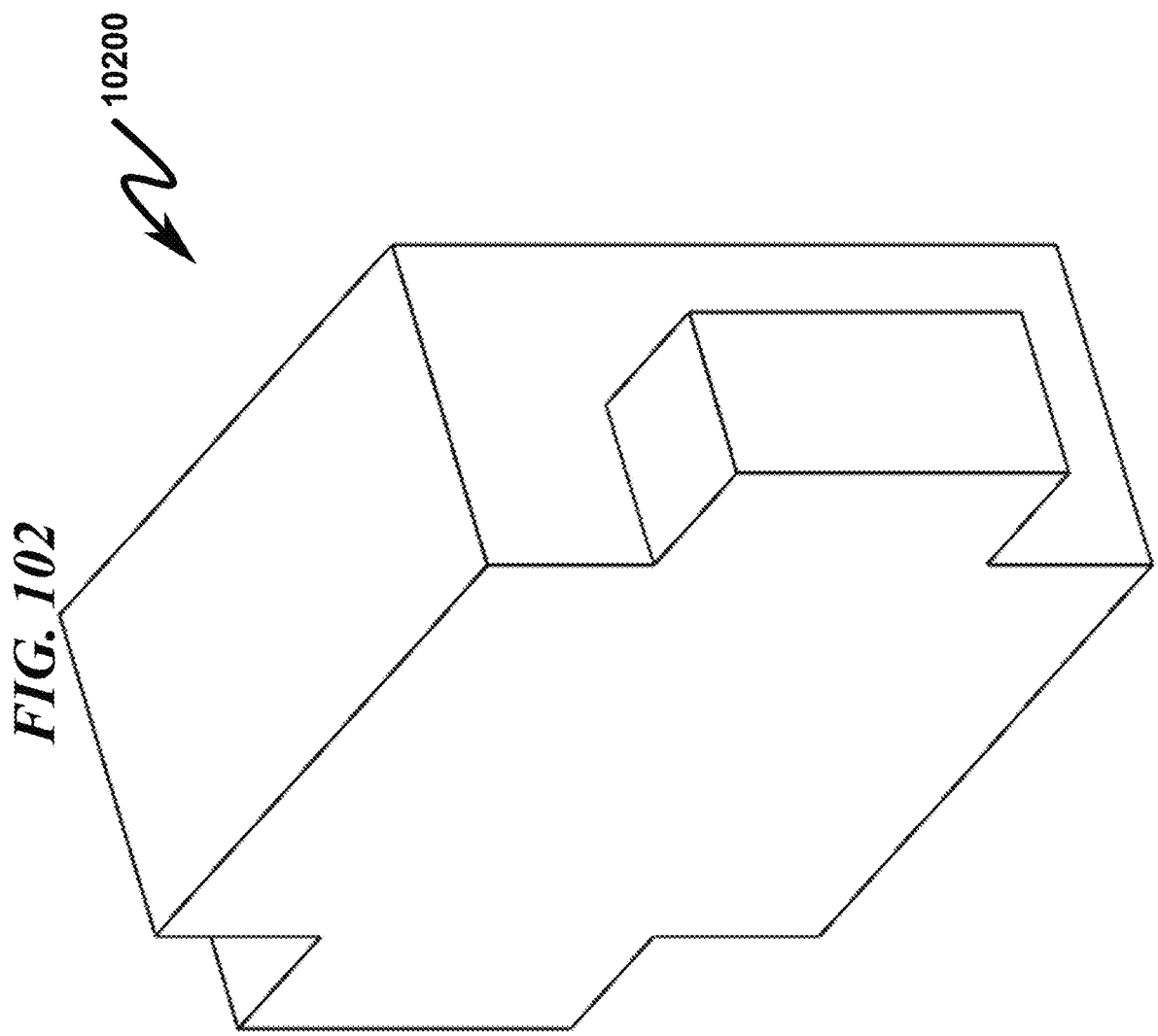
FIG. 102 illustrates a top right front perspective front section view of tensile deformation useful in some preferred invention embodiments.
Figure 103:
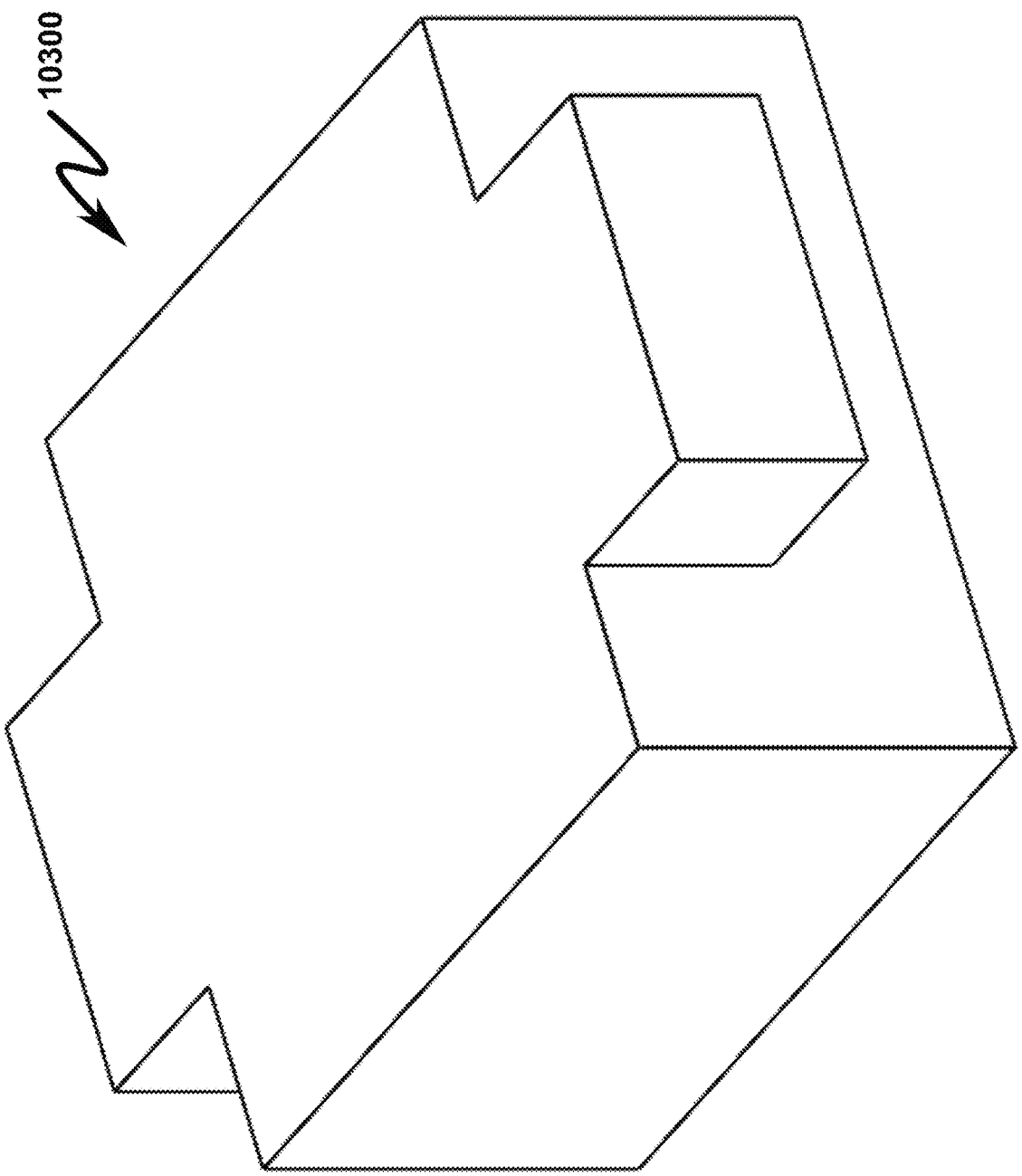
FIG. 103 illustrates a top right front perspective top section view of tensile deformation useful in some preferred invention embodiments.
Figure 104:
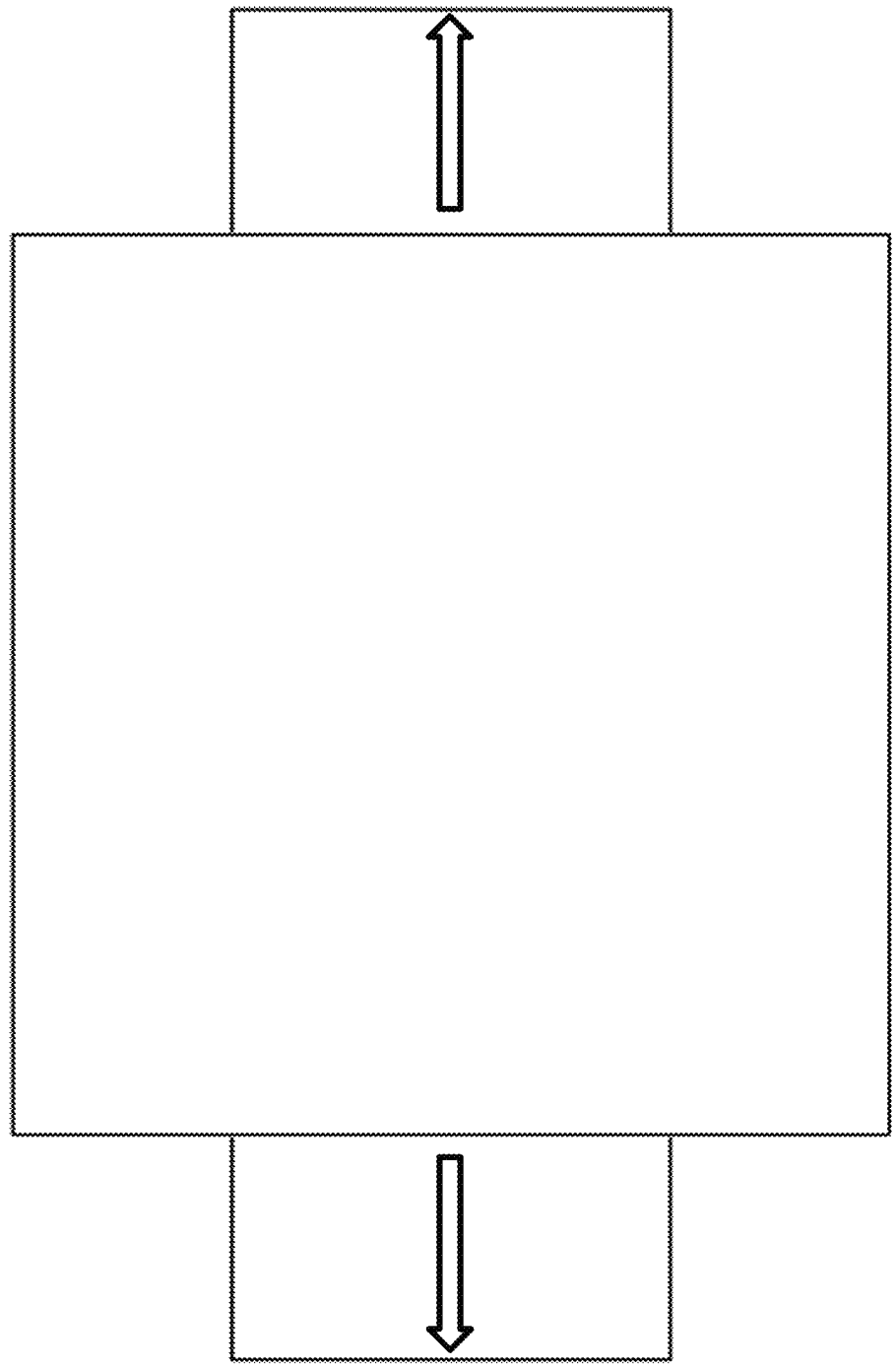
FIG. 104 illustrates a front section view of tensile deformation useful in some preferred invention embodiments.

Tensile Deformation (10100)-(10400). As generally depicted in FIG. 101 (10100)-FIG. 104 (10400), tensile deformation is achieved by pulling on a material along a certain direction. As the material becomes plastically deformed (i.e., permanently deformed even after the force is removed), the material becomes longer along tensile direction and thinner along the perpendicular directions. The deformation process orients or textures the crystals in a particular direction creating a tailored thermal expansion response. Below is an image with the tensile loading direction along the x-axis and the perpendicular directions along the y- and z-axes. The equation for determining deformation percent is given by the final material length $L_f$ minus the initial material length $L_i$ divided by the initial material length $L_i$.

$$TensileDeformation\ (\%) = 100 \times \frac{L_f - L_i}{L_i} \qquad (13)$$
$$= 100 \times \frac{\Delta L}{L}$$

Figure 105:
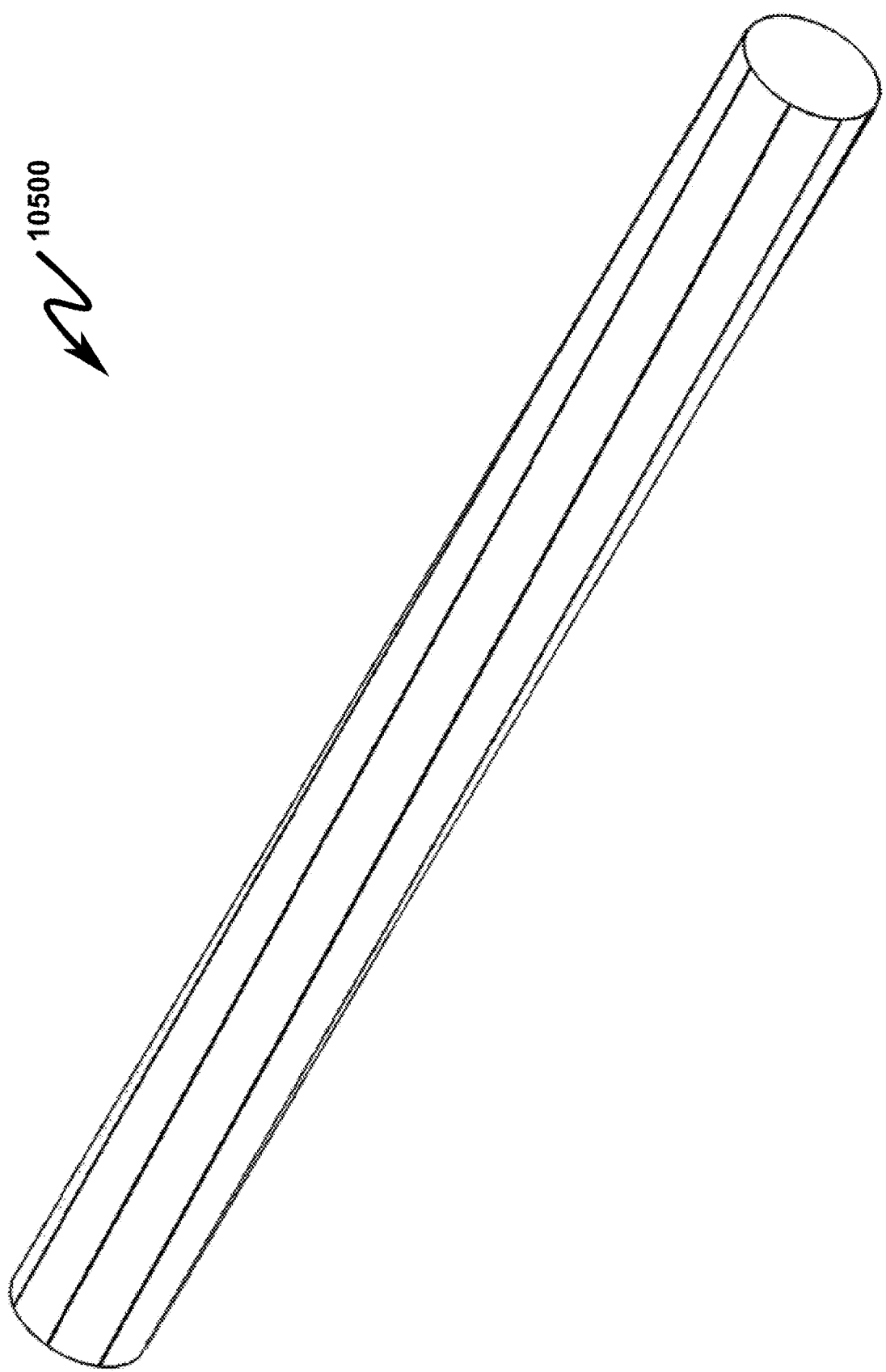
FIG. 105 illustrates a top right front perspective view of torsional deformation useful in some preferred invention embodiments.
Figure 106:
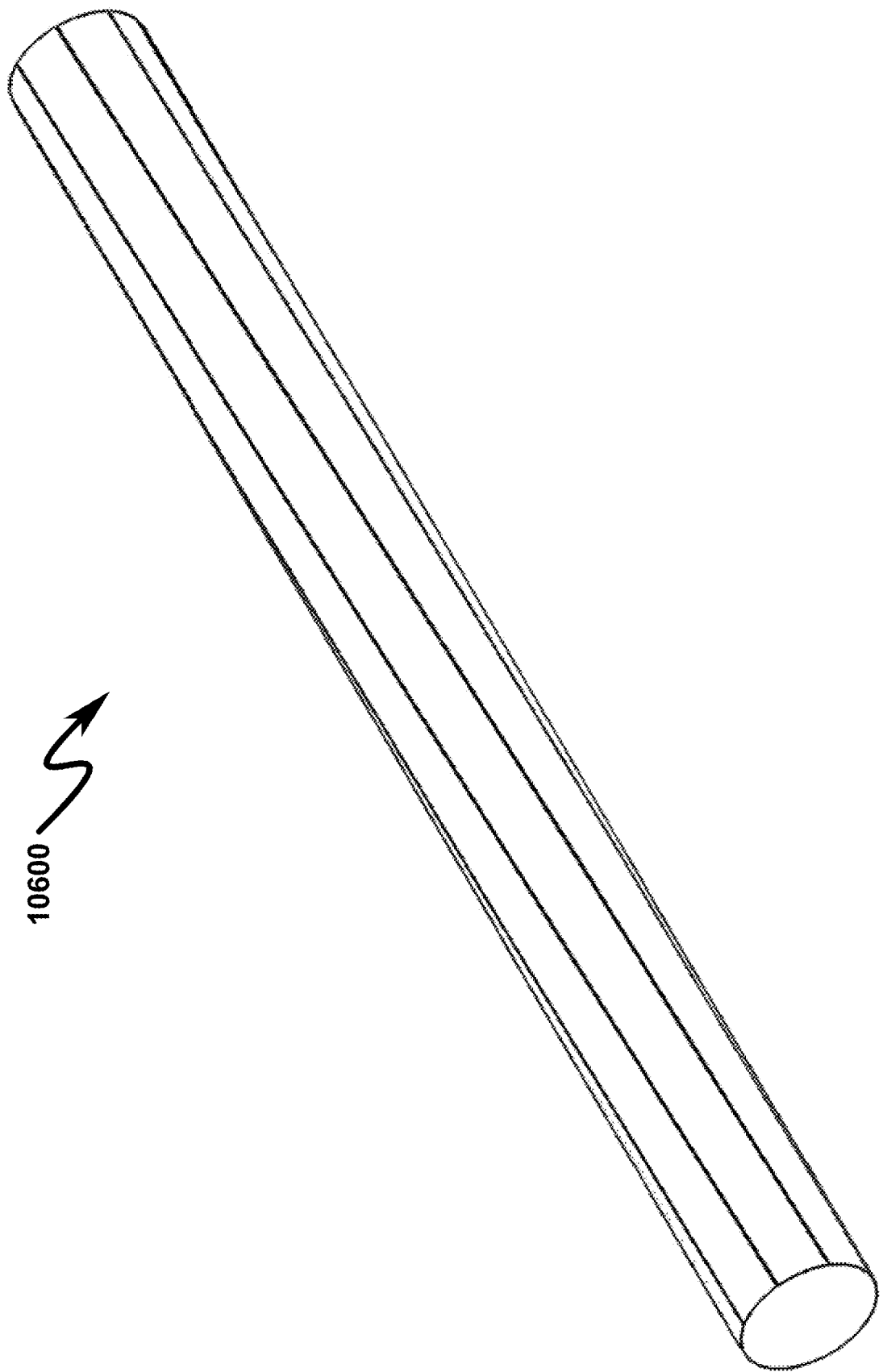
FIG. 106 illustrates a top left front perspective front view of torsional deformation useful in some preferred invention embodiments.
Figure 107:
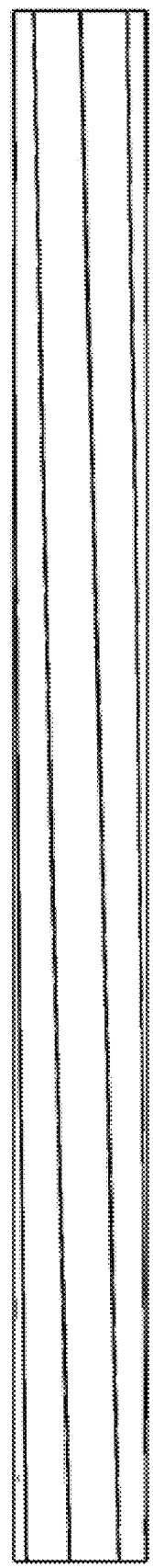
FIG. 107 illustrates a top view of torsional deformation useful in some preferred invention embodiments.
Figure 108:
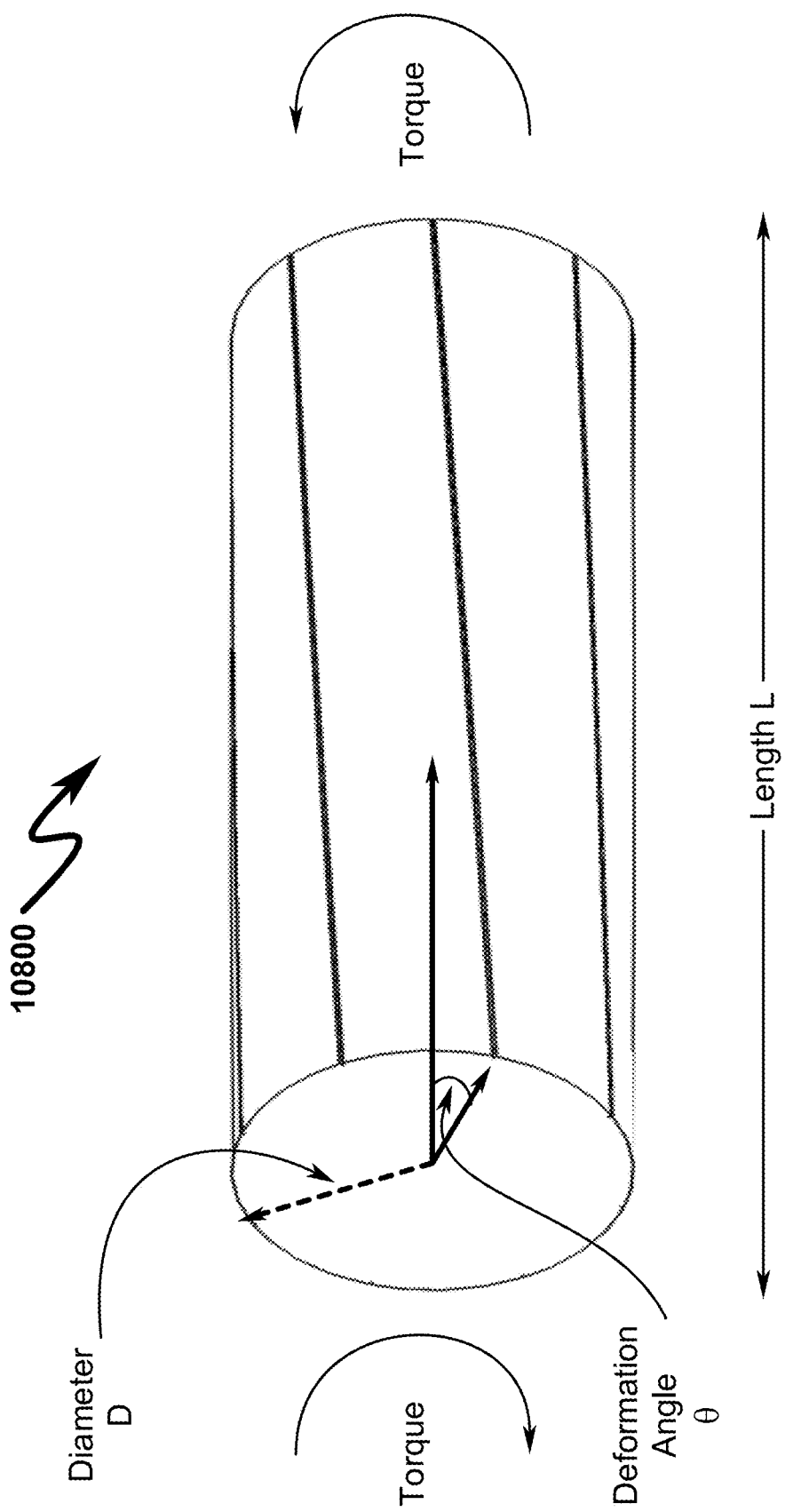
FIG. 108 illustrates a front perspective section view of torsional deformation useful in some preferred invention embodiments.

Torsional Deformation (10500)-(10800). As generally depicted in FIG. 105 (10500)-FIG. 108 (10800), torsional deformation is the permanent deformation by a torque applied to a solid or hollow structure. The deformation process orients or textures the crystals in a particular direction creating a tailored thermal expansion response. The deformation percent is a function of the rotational angle θ, the distance from the center of rotation D, and the material length L.

$$TorsionalDeformation\ (\%) = 100 \times \frac{\theta D}{2L} \qquad (14)$$

Figure 109:
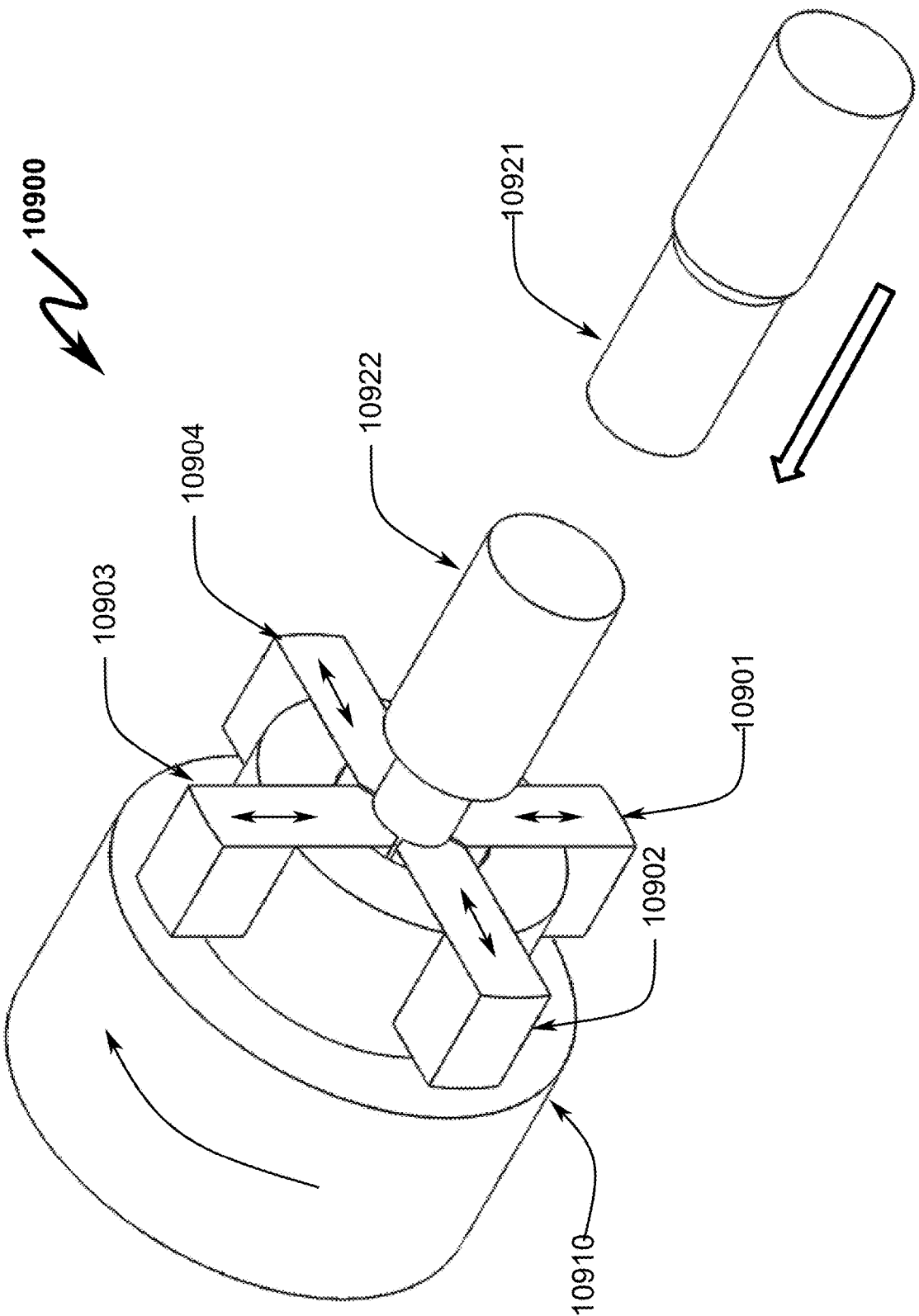
FIG. 109 illustrates a top right front perspective view of swaging deformation useful in some preferred invention embodiments.
Figure 110:
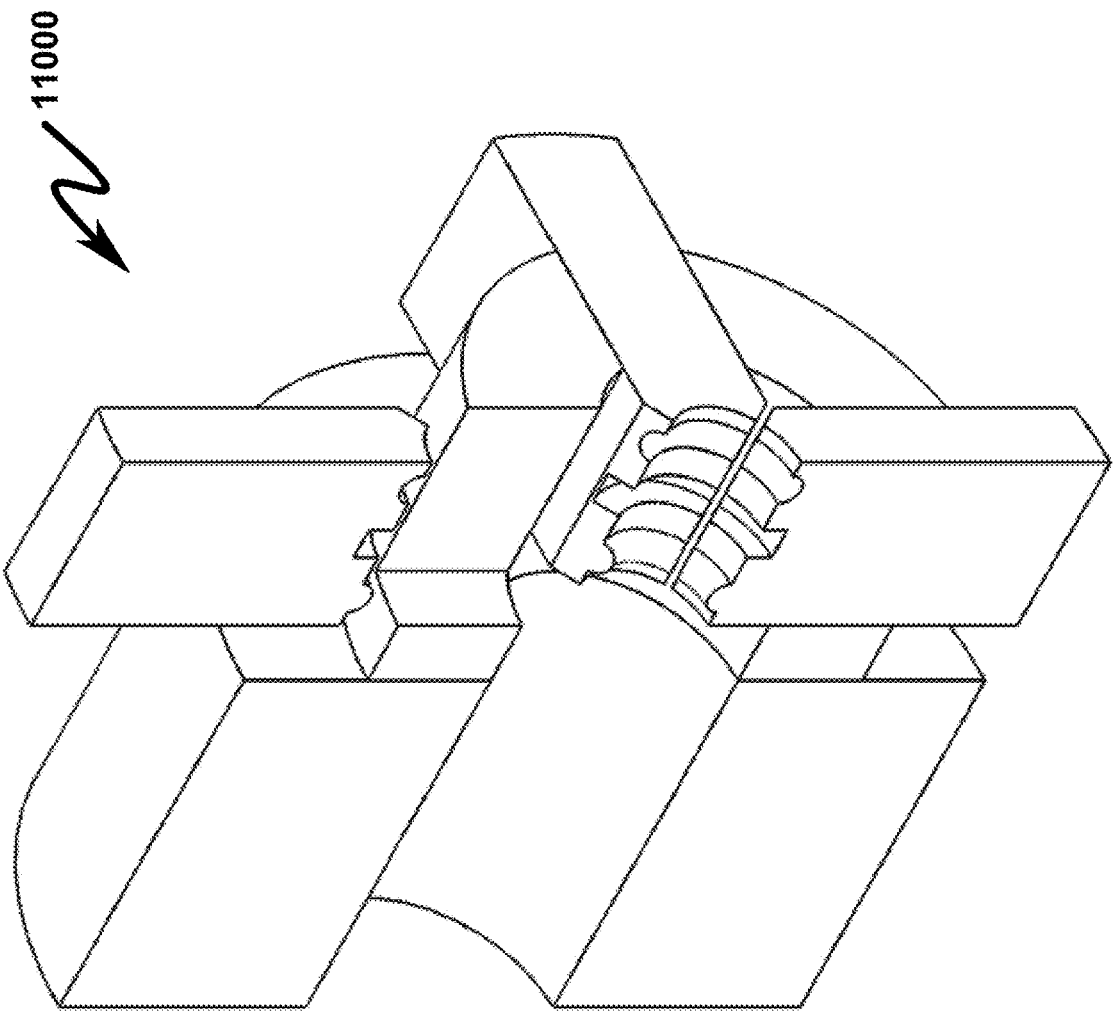
FIG. 110 illustrates a top right front perspective front section view of swaging deformation useful in some preferred invention embodiments.
Figure 111:
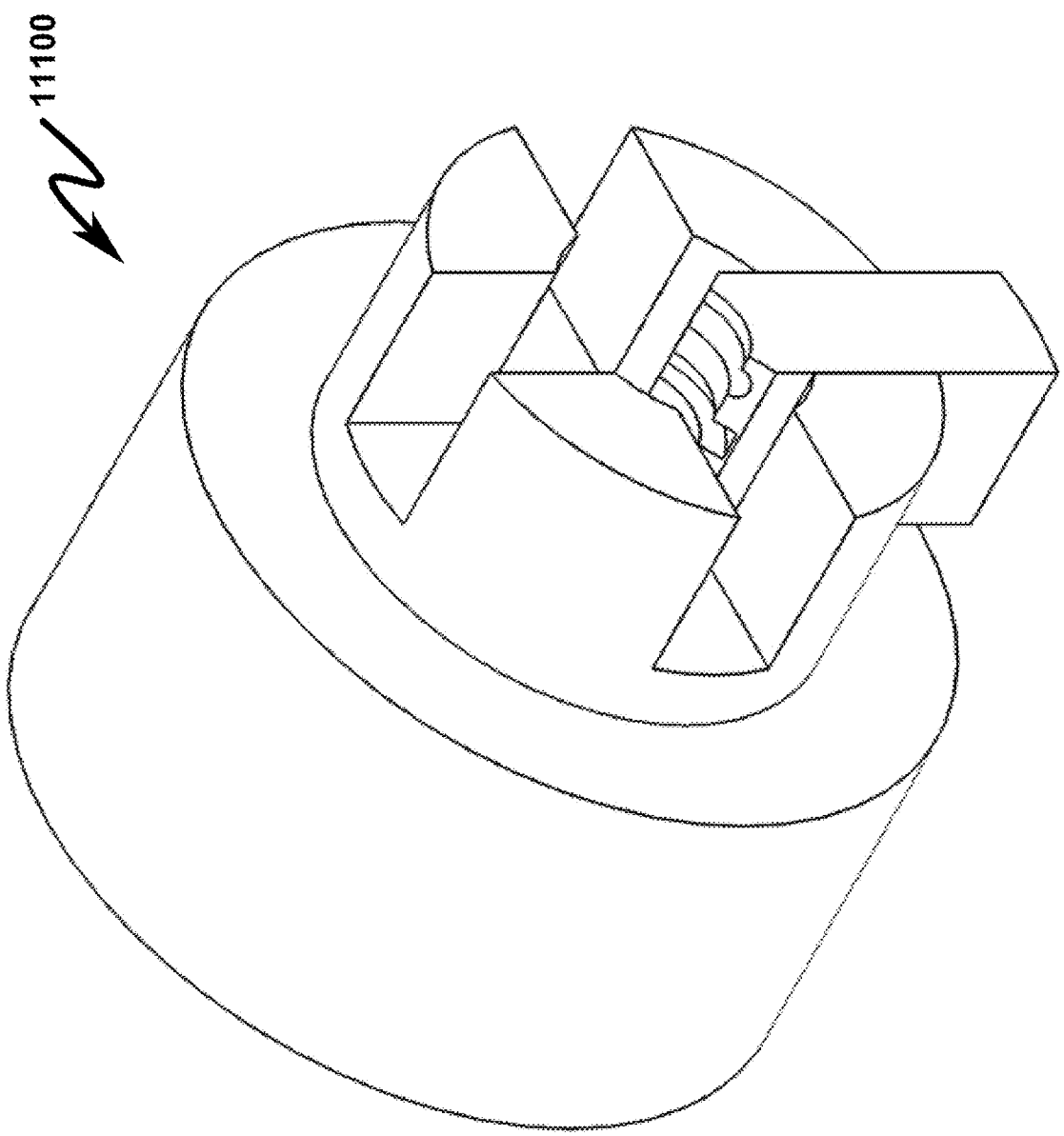
FIG. 111 illustrates a top right front perspective top view of swaging deformation useful in some preferred invention embodiments (with several swaging bars removed)
Figure 112:
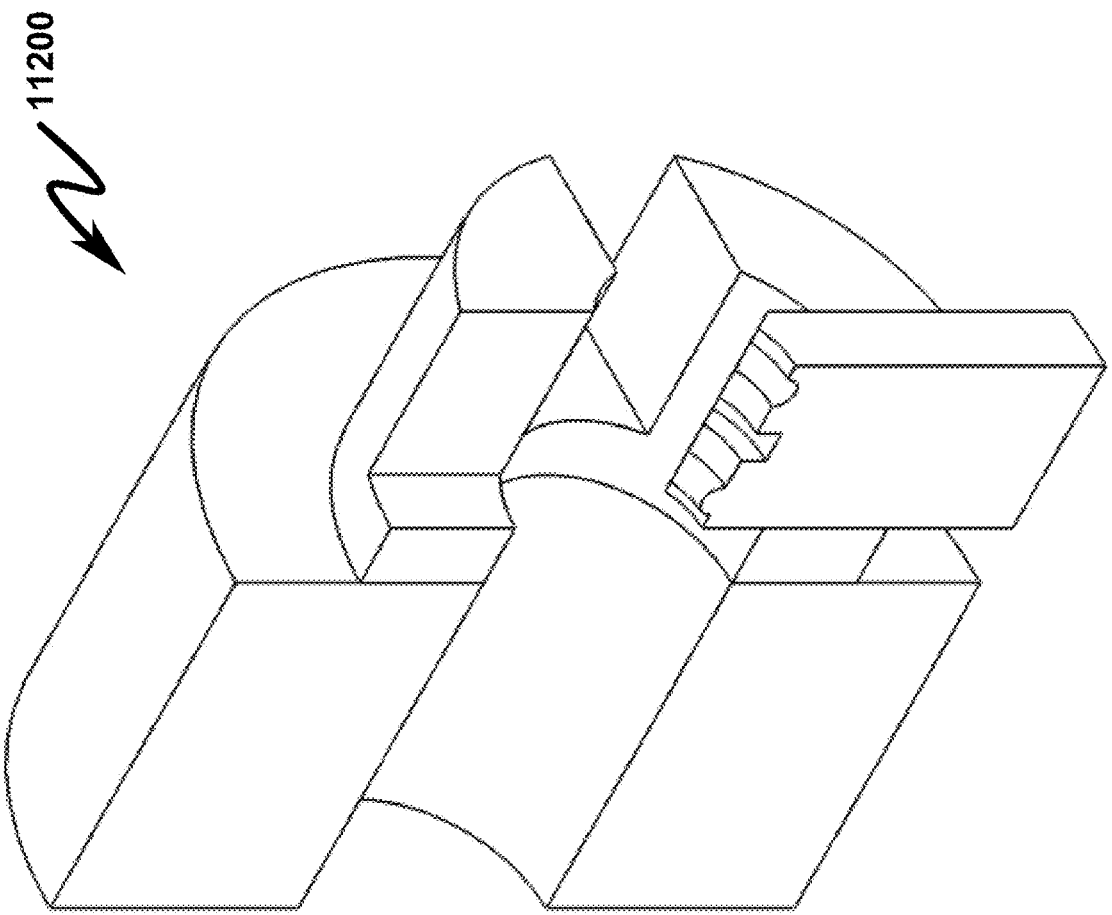
FIG. 112 illustrates a top right front perspective top section view of swaging deformation useful in some preferred invention embodiments (with several swaging bars removed)
Figure 113:
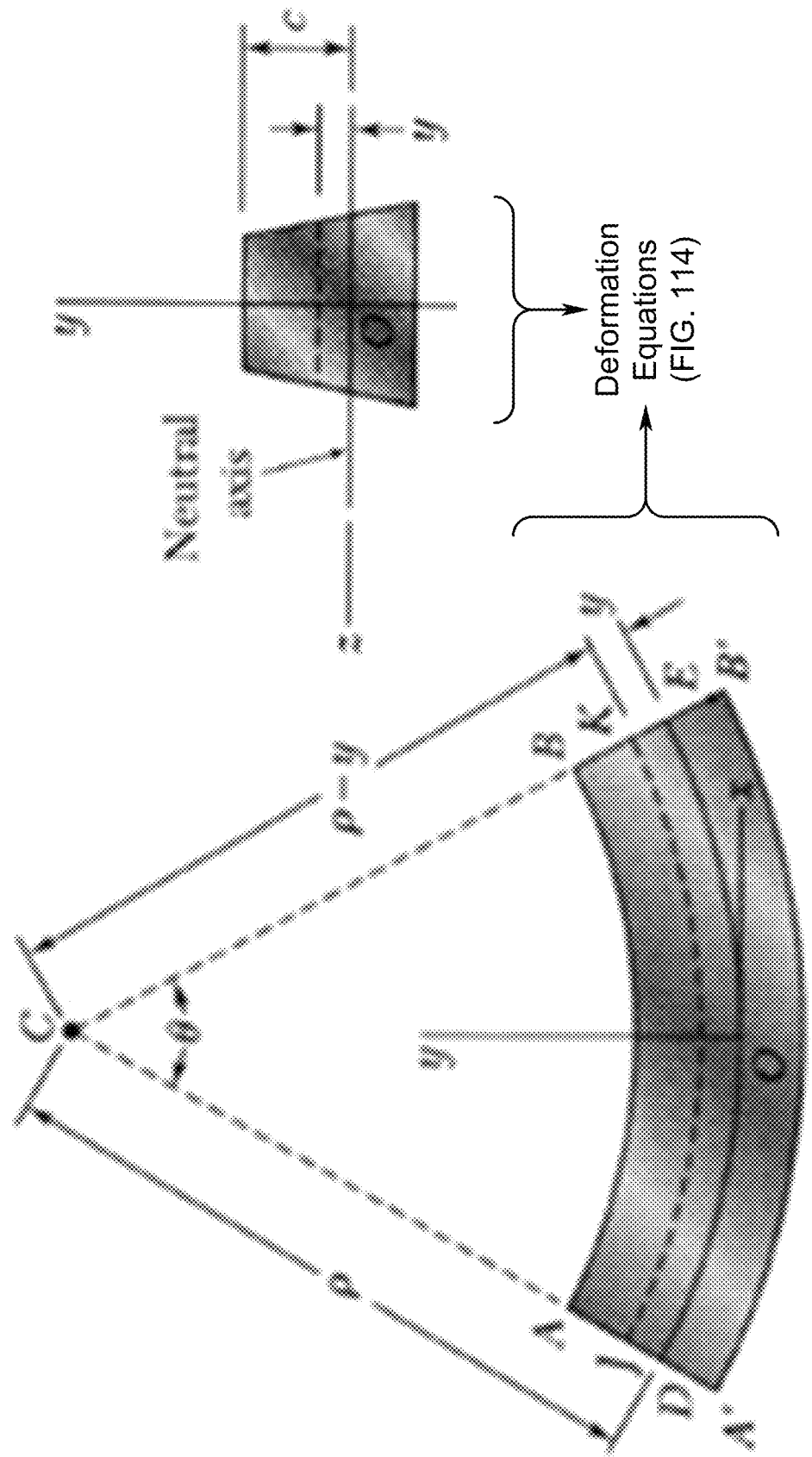
FIG. 113 illustrates the use of bending material deformation that may be used with some preferred invention embodiments.
Figure 115:
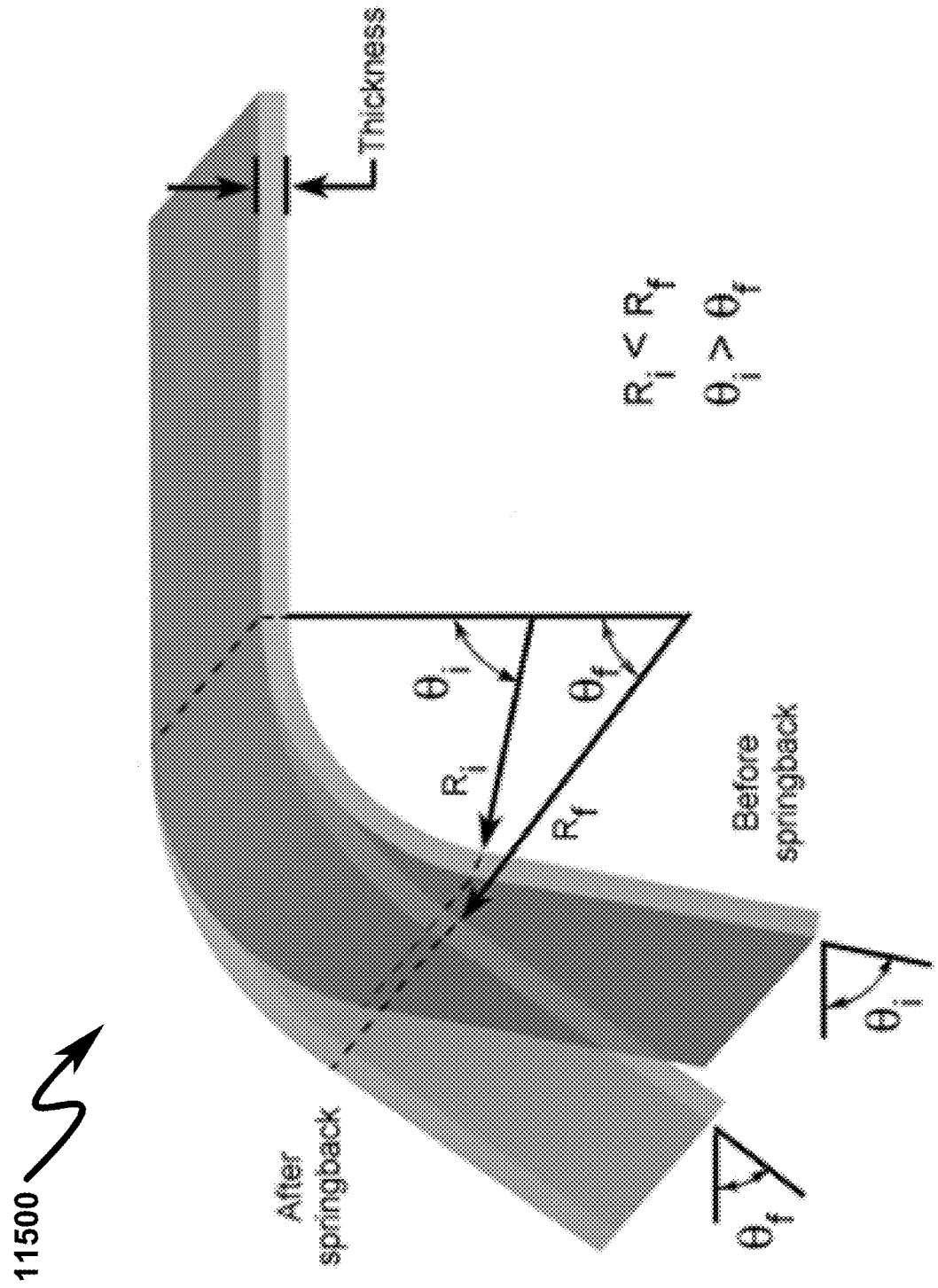
FIG. 115 illustrates the use of bending material deformation that may be used with some preferred invention embodiments and associated material spring-back characteristics.
Figure 116:
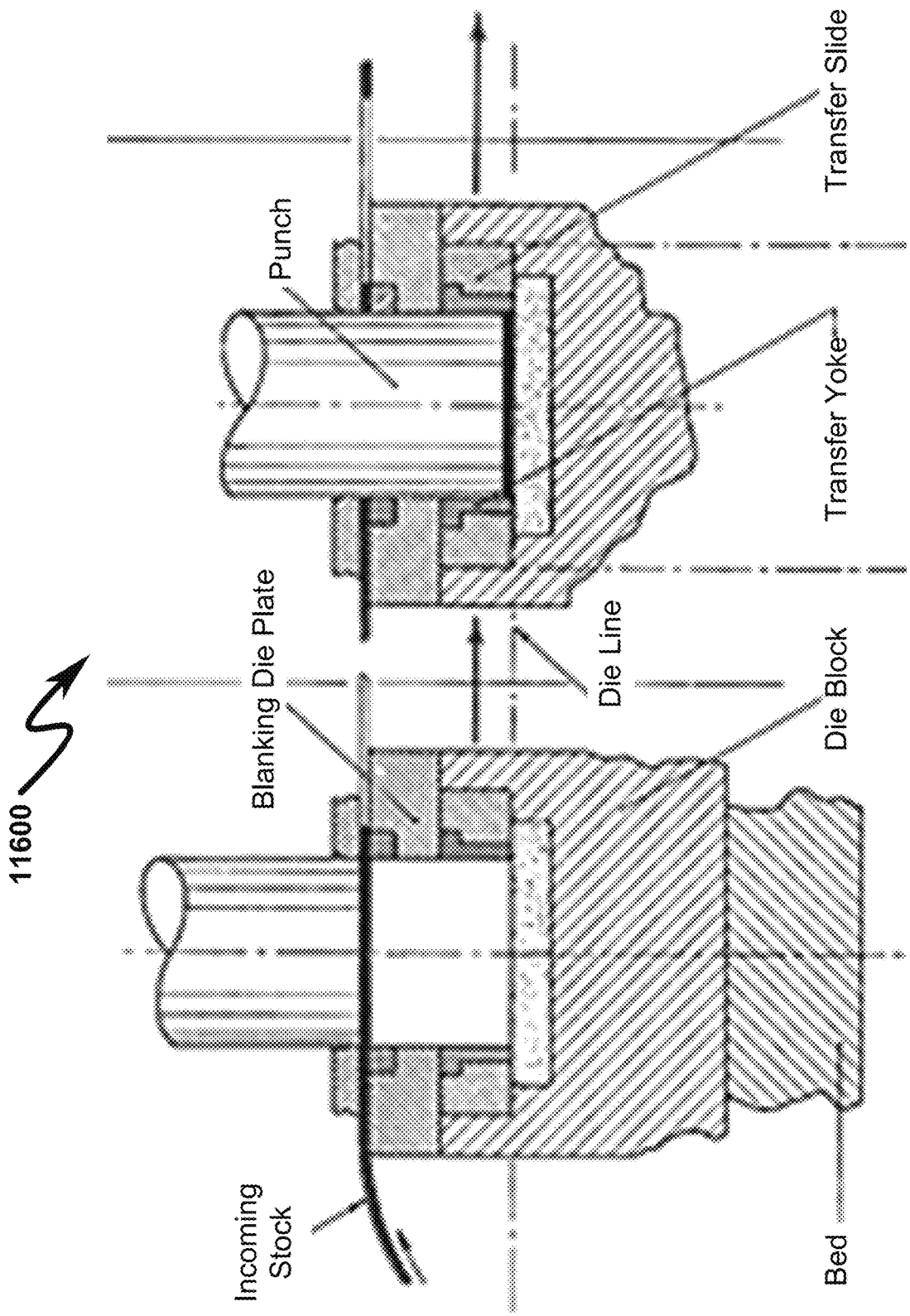
FIG. 116 illustrates stamping material deformation using a stamping press that may be used with some preferred invention embodiments.

Other Deformation Processes. Other deformation processes that deform the tailorable thermal expansion material will tailor the thermal expansion magnitude, sign, and anisotropy. These include, but are not limited to:

Swaging (generally depicted in FIG. 109 (10900)-FIG. 112 (11200)) (here the rotating chuck (10910) is fitted with movable die jaws (10901, 10902, 10903, 10904) that open and close to operate on a swaging blank (feed bar or tube) (10921) to produce a manufactured product (10922));

Pounding/Hammering;

Bending (generally depicted in FIG. 113 (11300)-FIG. 115 (11500)); and Stamping (generally depicted in FIG. 116 (11600) using a stamping press to perform the deformation).

Figure 117:
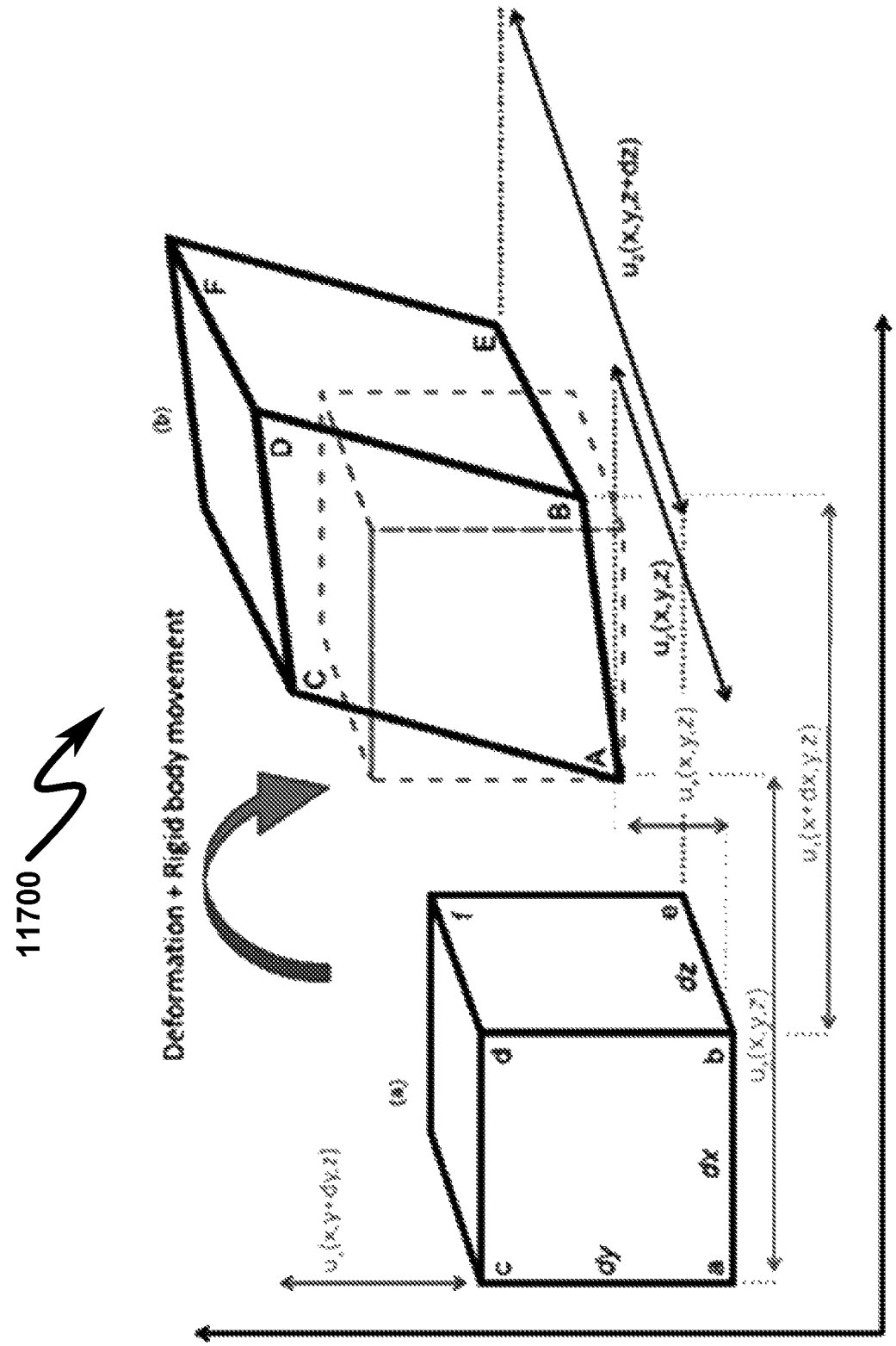
FIG. 117 illustrates deformation in three directions of a material represented by displacements $u_x$, $u_y$, and $u_z$ in the three principle material directions using Cartesian coordinates x, y and z.

Any force applied by any method that results in a preferred crystal orientation after the force is applied will tailor the thermal expansion coefficient of tailorable thermal expansion materials. As generally depicted in FIG. 117 (11700), for solids, the deformation in three directions can be represented by displacements $u_x$, $u_y$, and $u_z$ in the three principle material directions using Cartesian coordinates x, y and z.

The level or degree of deformation can be represented using solid mechanics by the three dimensional Grin tensor $\bar{\varepsilon}$ given by the equation:

$$\bar{\varepsilon} = \begin{bmatrix} \frac{\partial u_x}{\partial x} & \frac{1}{2}\left(\frac{\partial u_x}{\partial y} + \frac{\partial u_y}{\partial x}\right) & \frac{1}{2}\left(\frac{\partial u_x}{\partial z} + \frac{\partial u_z}{\partial x}\right) \\ \frac{1}{2}\left(\frac{\partial u_y}{\partial x} + \frac{\partial u_x}{\partial y}\right) & \frac{\partial u_y}{\partial y} & \frac{1}{2}\left(\frac{\partial u_y}{\partial z} + \frac{\partial u_z}{\partial y}\right) \\ \frac{1}{2}\left(\frac{\partial u_z}{\partial x} + \frac{\partial u_x}{\partial z}\right) & \frac{1}{2}\left(\frac{\partial u_z}{\partial y} + \frac{\partial u_y}{\partial z}\right) & \frac{\partial u_z}{\partial z} \end{bmatrix} \qquad (15)$$

where $$\frac{\partial u_x}{\partial x}, \qquad (16)$$

$$\frac{\partial u_y}{\partial y}, \qquad (17)$$

and

-continued $$\frac{\partial u_z}{\partial z} \quad (18)$$

represent the strain in the x, y and z directions, respectively, and $$\frac{1}{2}\left(\frac{\partial u_x}{\partial y} + \frac{\partial u_y}{\partial x}\right), \quad (19)$$

$$\frac{1}{2}\left(\frac{\partial u_x}{\partial z} + \frac{\partial u_z}{\partial x}\right), \quad (20)$$

and $$\frac{1}{2}\left(\frac{\partial u_y}{\partial z} + \frac{\partial u_z}{\partial y}\right) \quad (21)$$

represent the shear strain in the x-y plane, x-z plane and y-z plane, respectively.

Isotropy Requirements

Isotropy refers to the material specification that requires the specified thermal expansion coefficient to be in one, two or three material directions. The mechanical deformation processes from the deformation database orient crystals. The degree of crystal orientation in a material is called "texture" and depends on the material's initial texture from casting and the deformation type.

Deformation Direction Dependence. The isotropy is determined by the way the material is deformed. Permanent shape change such as shear from shear stress, elongation from tensile stress, and thinning from compressive stress will produce a change in the thermal expansion coefficient of the tailorable thermal expansion materials.

Deformation Type Isotropy. Different thermal expansion coefficients in three material directions. The following deformation processes are used produce tailored thermal expansion if the requires three dimensional anisotropy.

Figure 118:
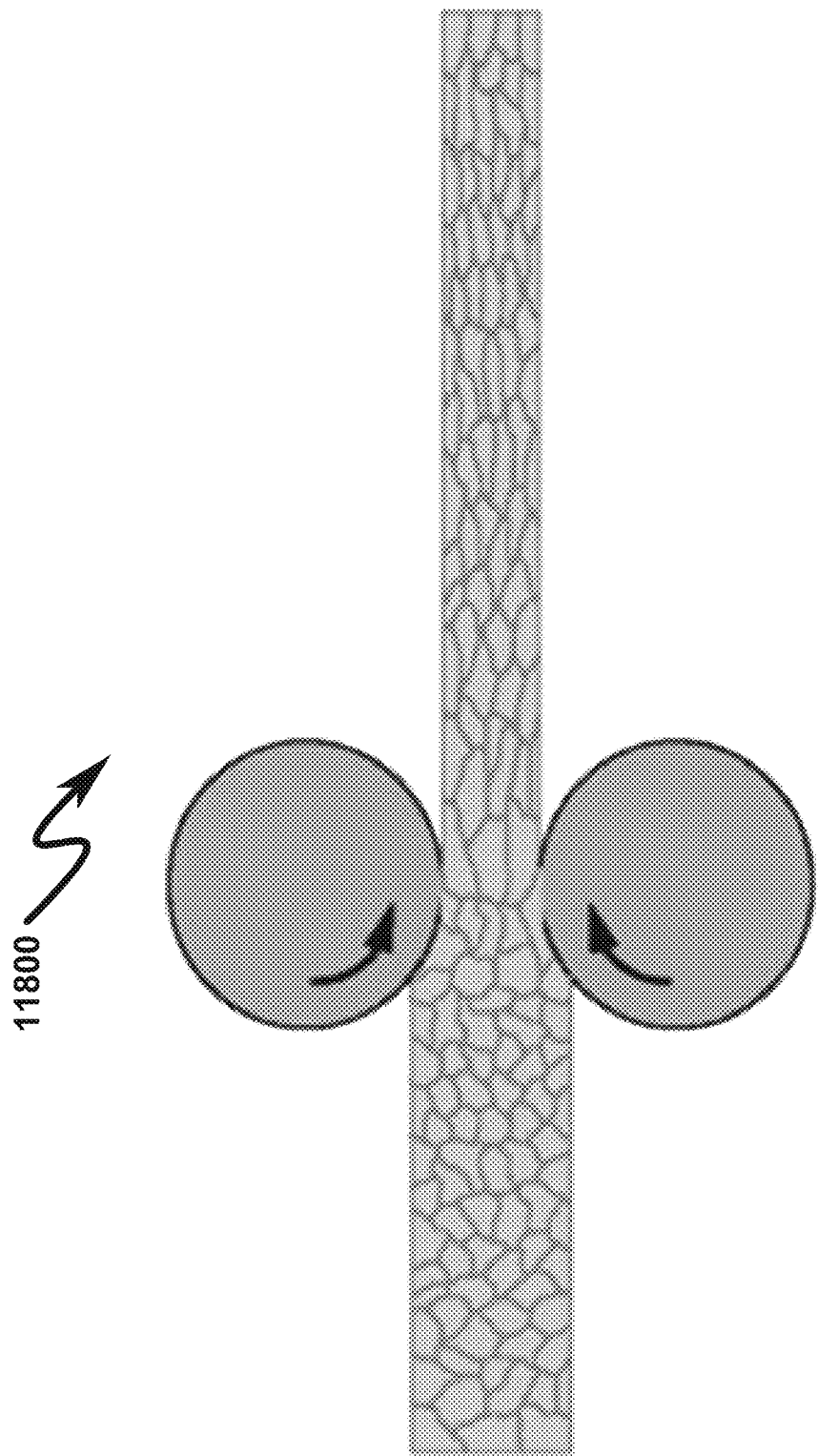
FIG. 118 illustrates the effects of rolling on the crystal structure of a material.

Rolling. Rolling produces elongation along RD, elongation along TD and thinning along ND. The elongation is larger along the RD than the TD resulting in different thermal expansion coefficients in each material direction. The elongation and thinning orient the material's crystals along the direction of rolling resulting in the different thermal expansion coefficients. The FIG. 118 (11800) schematically shows the difference in crystals before and after rolling. The degree of crystal orientation in a material is called "texture."

Extruding and Drawing. Extruding and drawing complex shapes that have asymmetric cross-sectional shapes elongate material along the ED and thin material in the TD plane. The degree of thinning deformation is dependent upon the die shape and will produce different thermal expansion coefficients in each material direction.

Forging. Forging using dies that are asymmetric in the plane perpendicular to the applied force produce non-uniform elongation in the plane perpendicular to the force and thinning parallel to the force. The degree of thinning and elongation is depending upon the die shape and force applied and will produce thermal expansion coefficients that are different in each material direction.

Pounding and Hammering. Pounding or hammering that produces non-uniform deformation in three material directions will produce different crystal orientations and thus different thermal expansion coefficients in three material directions.

Uniform thermal expansion coefficients in two material directions and a different thermal expansion coefficient in the third material direction. The following deformation processes are used produce tailored thermal expansion if the material requirement is two dimensional isotropy.

Extruding, Drawing and Swaging. Extruding and wire drawing produce the same deformation profile provided the initial material, final material and dies are the same size and shape. Extruding and drawing simple shapes such as round rods, bars, and wires are elongated along the ED/DD and thinned along TD. This results in the thermal expansion coefficient being isotropic in the TD plane, but different in the ED/DD direction (i.e., CTE isotropy in the TD plane and anisotropy along the bar's length).

Forging. Forging using open-dies and dies that are symmetric in the plane perpendicular to the applied force produce uniform elongation in the plane perpendicular to the force and thinning parallel to the force. The degree of thinning and elongation is depending upon the die shape and force applied and will produce uniform thermal expansion coefficients in the plane perpendicular to the force and a different thermal expansion coefficient that is parallel to the force.

Pounding and Hammering. Pounding or hammering that produces uniform deformation in two material directions will create isotropic thermal expansion coefficients in two directions and a different thermal expansion in the third direction.

Deep Drawing. Deep drawing that produces uniform deformation in two material directions will create isotropic thermal expansion coefficients in two directions and a different thermal expansion in the third direction.

Tensile Deformation. Tensile deformation of a material with a uniform cross section causes elongation along the loaded direction and uniform thinning perpendicular to the loaded direction. This deformation will create isotropic thermal expansion coefficients in the two directions perpendicular to the load and a different thermal expansion in the third direction.

Other Isotropy. Other isotropy can be created based on the type and complexity of the deformation. The following deformation processes are used produce tailored thermal expansion if the specification requires "internal material location dependent." These deformations create different levels or degrees of deformation in different locations within the material. The deformation degree represented by the strain tensor $\bar{\varepsilon}$ is different at all points in the material. Thus the thermal expansion coefficients will not only be different in different material directions, but different locations in the material.

Figure 119:
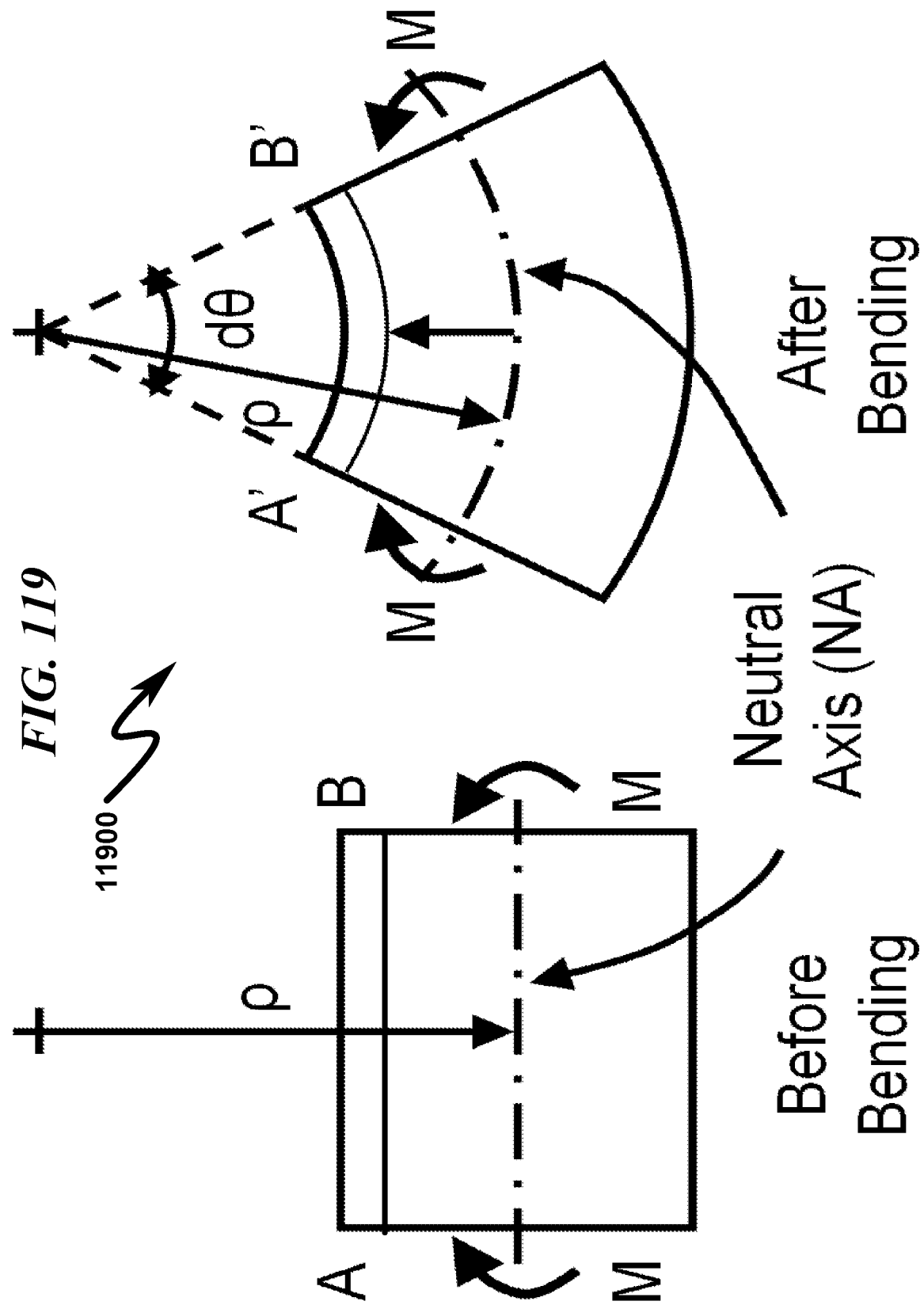
Figure 120:
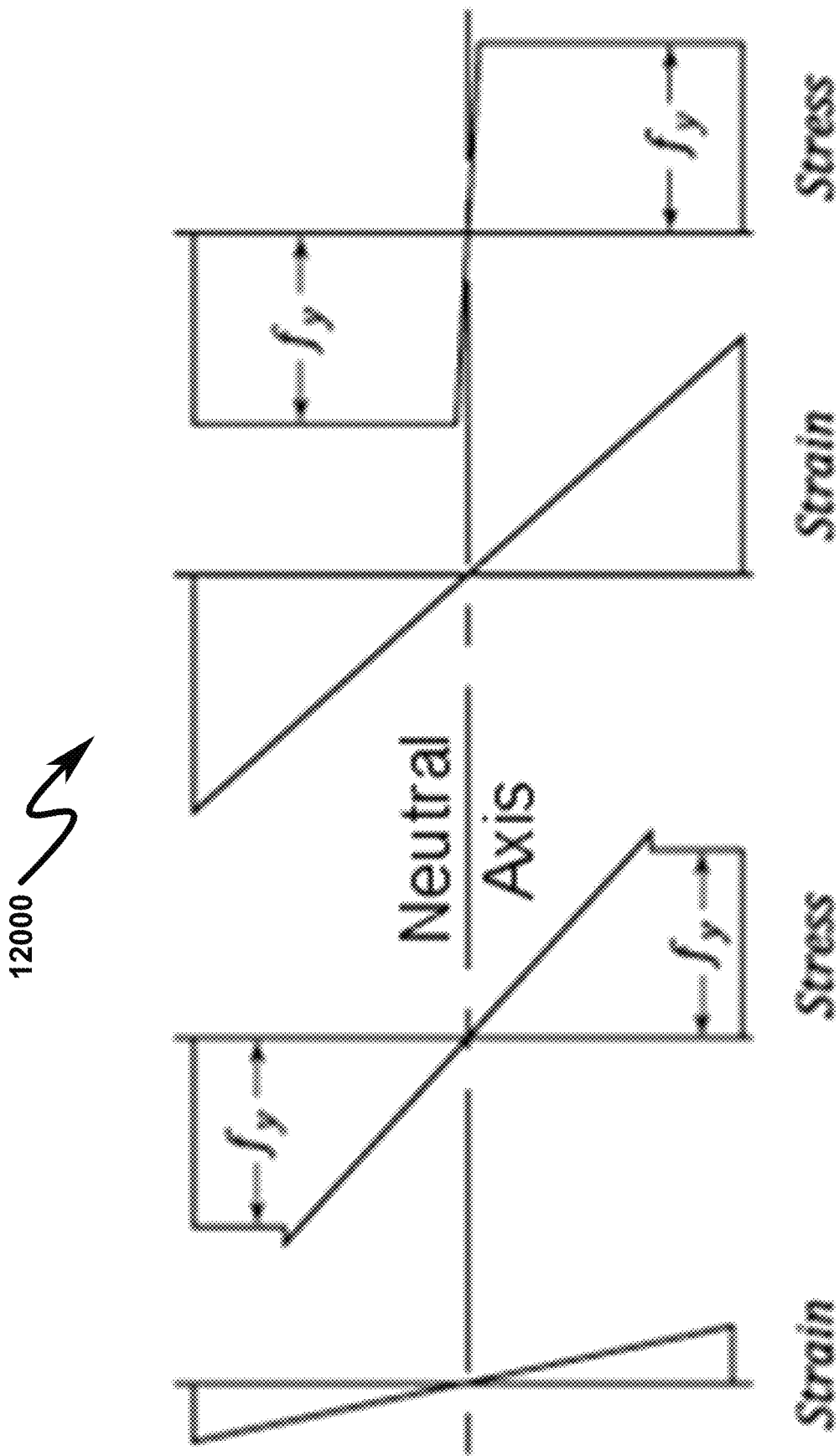

Bending. As generally depicted in FIG. 119 (11900)-FIG. 120 (12000), bending causes non-uniform deformation along the bending radius. Larger deformation magnitudes are experienced in material locations that are further away from the neutral axis. Additionally, the outer material experiences elongation while the inner material experiences compression. This shape change will orient crystals and change the thermal expansion coefficient of the material at different locations within the piece. This will result in a unique material that will curl and uncurl with changes in temperature.

Torsional Deformation. Torsion causes non-uniform deformation outward from the center of the torque. Larger deformation magnitudes are experienced in material locations that are further away from the rotation axis. Additionally, the material experiences shear deformation around the rotation. This shape change will orient crystals and change the thermal expansion coefficient of the material at different locations within the piece.

Form Factor Requirements

The various form factor parametric requirements can be summarized as follows:

Plate and Sheet—can be produced by rolling;

Round Wire, bar, and rod—can be produced by drawing, extrusion and swaging;

Square wire, bar, and rod—can be produced by drawing, extrusion and rolling;

Tubes—can be produced by drawing, extrusion and swaging with or without a mandrel;

Cups and Hollow Structures—can be produced by deep drawing;

Curved beams—can be produced by bending;

Beams with complex cross-sections—can be produced by drawing; and

Other Shapes—all shapes described above and complex shapes can be produced using machining.

Processing Variables

Initial Crystal Orientation. The initial orientations of crystals will influence the final orientation of crystals and thus the thermal expansion coefficients that can be achieved.

Final Deformation Percent. As stated previously, the deformation level, degree or percentage will influence the amount of crystal orientation and thus influence the thermal expansion coefficients that can be achieved. This is described mathematically elsewhere in this document for all the deformation methods described.

Material Temperature. The material's temperature will naturally increase during deformation. Various methods can be used to control this temperature including water cooling and lubricant. Additionally, the material may be heated or cooled to a specific temperature and held for a specific time prior to or after the deformation process.

Deforming Equipment Temperature. The deforming equipment may be heated or cooled to a specific temperature and held there for a specific amount of time prior to material processing.

Quenching Type. After processing, the material may or may not be quenched in water, oil, air, or held at a specific temperature again.

Ingot Preparation

Ingot preparation may involve any of the following processes:

Surface Preparation—Cleaning, Coating, Lubricating, Planing, Grinding, Brushing, Plating, Canning;

Material Temperature—Time to heat, furnace type; and/or

Material Dimensions.

The ingot is then typically deformed per an initially selected process after it is prepared as described above.

Recursive Processing

Any combination of variables and deformation processes can be conducted in series to create a specific form factor and specified CTE profile. After the processing, the thermal expansion coefficients and other material properties can be evaluated to ensure they are within specified parameters. If the measured thermal expansion coefficients, oxidation or other material properties do not meet requirements, different alloy processing parameters are selected and the material is re-worked. Additionally, the original heat treatment can be performed to reset the crystal orientation distribution. This can be performed recursively until all thermal expansion coefficient and other material properties are achieved.

Multiple Passes

Step Size—Material processing from an initial dimension to a final dimension taken in one step or may be broken into any number of smaller step sizes. Each step requires a single pass through the material process. Smaller step sizes provide additional control while larger step sizes bring the material to the final dimension more quickly. The step size can be the same or different from each pass.

The processed material may be re-oriented between steps to create a desired thermal expansion coefficient magnitude, sign and isotropy. For example, a rolled sheet may be rotated between each pass to achieve a uniform thermal expansion coefficient in the rolled plane.

Resulting Material

The end result of this processing produces a unique material with:

specified CTE values;

specified CTE isotropy;

specified other material properties; and specified form factor.

Component Fabrication

Fabrication Process Selection

Component fabrication generally requires the following data and process definitions:

Fabrication Process Database

Component Form Factor Requirements specified by engineering diagrams with physical dimensions and tolerances specified.

Fabrication Process Changes to CTE—any and all fabrication processes that deform the material may change the thermal expansion coefficient. These changes may or may not be designed to achieve a specific function.

Conduct Fabrication Process

The component fabrication process may include any combination of the following process flows:

Tailored CTE Material Preparation:

Surface Preparation—Coating, Lubricating (fluid and solid), Planing, Grinding, Brushing, Plating, Canning;

Material Temperature—Time to heat, furnace type;

Material Dimensions—Rough Cutting, Blank Preparation;

Optional Heat Treatment;

Material Removal—Milling, Lathing, Cutting, Parting, Punching, Drawing, Pressing, Shearing, Polishing, Grinding, Bending, Rolling, Sawing, Electro-discharge machining (wire, ram, others);

Material Addition—Plating, Coating, 3-D Printing, additive manufacturing; and/or Material Joining—Welding (various types), Gluing (various types), Mechanical Fasteners (various types).

Recursive Component Fabrication

Any combination of variables and component fabrication processes can be conducted in series to create a specific form factor and specified CTE profile. These fabrication processes can also be combined with material forming processes to produce a unique product. After the fabrication, the thermal expansion coefficients and other material properties can be evaluated to ensure they are within specified parameters. If the measured form factor, thermal expansion coefficients, or other material properties do not meet requirements, different alloy processing and/or component fabrication parameters are selected and the material is re-worked. This can be performed recursively until all thermal expansion coefficient and other material properties are achieved.

Resulting Component

The described process results in a unique component with:
- specified CTE values;
- specified CTE isotropy;
- specified other material properties; and
- specified physical dimensions within tolerances.

Application Example—High Precision Laser

One example of a present invention application is in the area of high precision lasers. Solid state lasers used in the telecommunications industry are currently limited in their ability to transmit a number of wavelengths along a fiber optic cable due to thermal mechanical characteristics of the laser packaging and associated solid state substrate supports. Generally speaking, lasers used in this environment are limited in their data-rate performance by uncontrolled thermal expansion of mechanical elements associated with the laser.

A reduction of the thermal coefficient of expansion (or equivalently a complementary matching of coefficients of thermal expansion within the laser subsystem so as to achieve an overall zero temperature coefficient of expansion) within mechanical portions of the laser can result in an increase in the number of data channels that can be supported within a given fiber optic cable. The goal of the telecommunications industry has always been to increase the number of effective data channels within a given fiber-optic cable, as the cost of laying additional strands of fiber-optic cable to increase overall network data capacity is typically on the order of USD$50000/mile and in some extreme circumstances can approach USD$1000000/mile. By increasing the number of effective data channels in a given fiber optic cable, the telecommunications industry can address the need for increased overall data bandwidth without incurring the cost of laying additional cable. Given the USD$50000/mile of laying new fiber optic cable, there is an extremely high incentive within the telecommunication industry to achieve higher bandwidth per cable using the existing fiber optic cable infrastructure. This can typically occur by replacing the laser transmission subsystems within this fiber optic cable infrastructure with laser subsystems having higher data bandwidth capabilities.

Exemplary System Construction (12100)-(12800)

Figure 121:
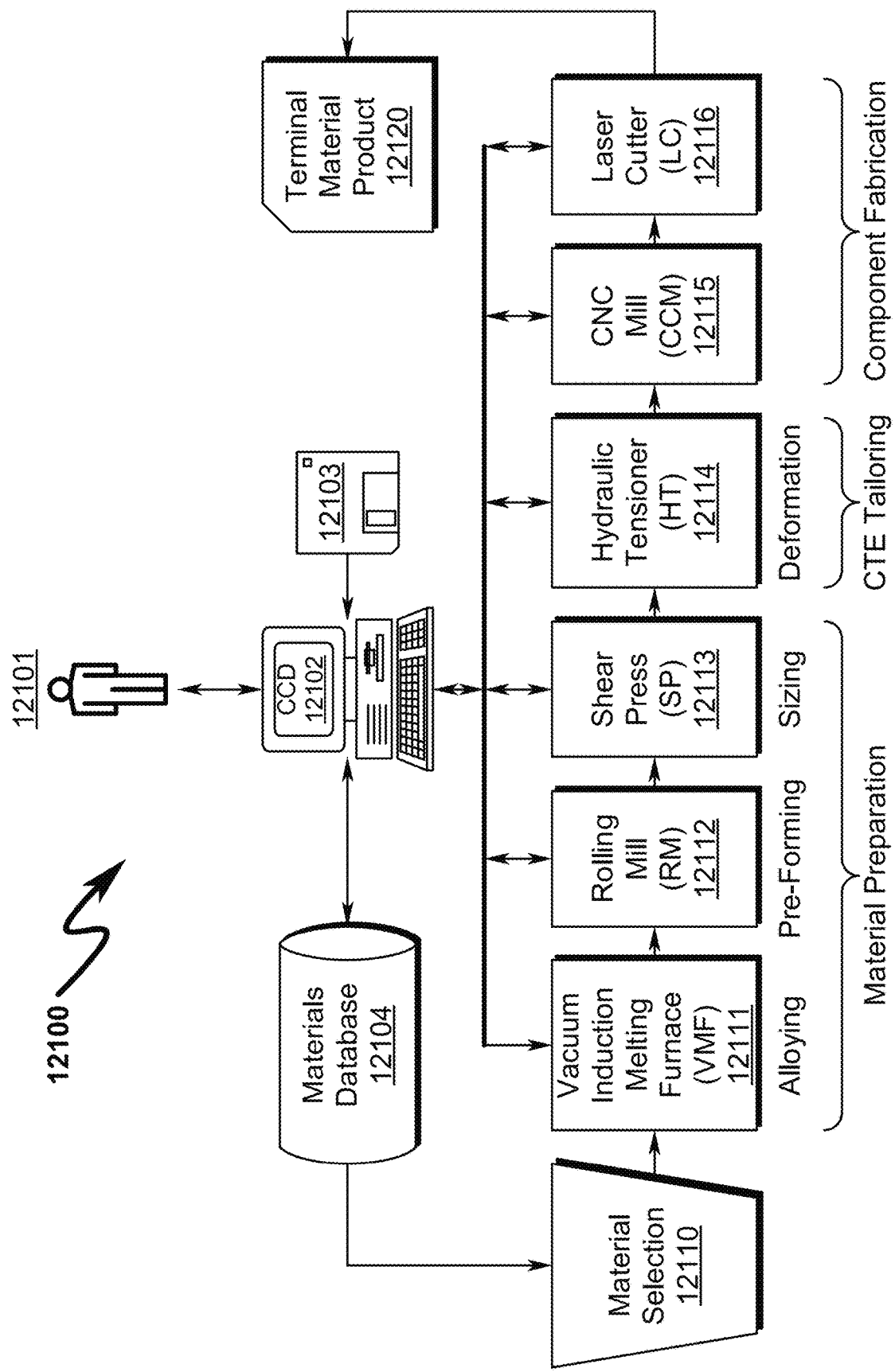
Figure 128:
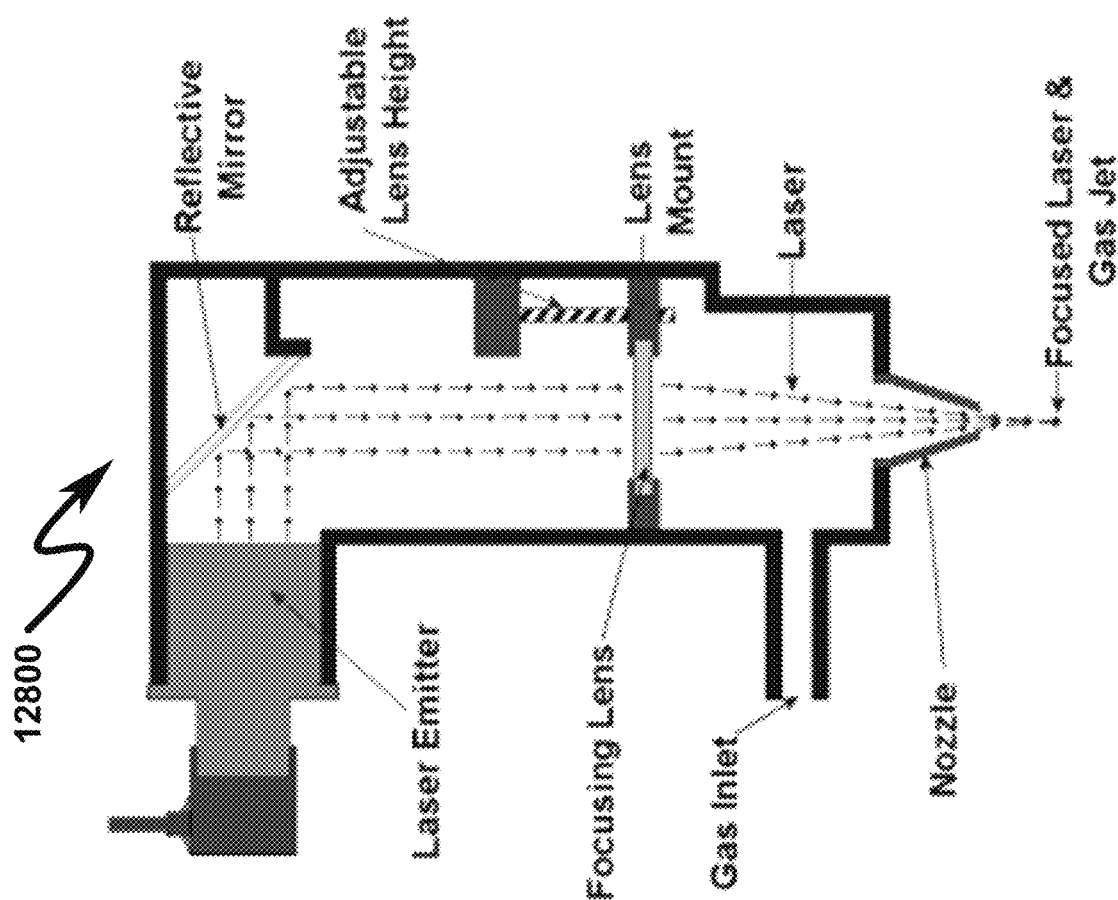

A preferred exemplary system embodiment is generally depicted in FIG. 121 (12100)-FIG. 128 (12800).

Exemplary System (12100)

Referencing FIG. 121 (12100), a general system diagram depicting an exemplary automated system for fabricating product materials having controlled thermal coefficient characteristics is depicted. Within this exemplary manufacturing system context, an operator (12101) interacts with a computing control device (CCD) (12102) typically utilizing a graphical user interface (GUI) implemented on the CCD (12102) via execution of machine instructions read from a computer readable medium (12103). Within this context a source materials database (SMD) (12104) is utilized to select appropriate materials for fabrication and define the desired thermal coefficient characteristics of the terminally manufactured product (12120). A wide variety of material characteristics may be selected during this process and may include without limitation properties such as desired coefficient of thermal expansion (CTE), corrosion resistance, ductility, etc.

At this point the material is selected (12110) and sent through a number of automated processing steps controlled by the CCD (12102) under control of machine instructions read from the computer readable medium (12103). These computer-controlled processing steps may include processing by the following components:

- Vacuum Induction Melting Furnace (12111), responsible for loading raw elemental material into furnace at correct ratios, pulling vacuum using rouging pump and turbo pump, inductively melting material elements, pouring molten material into a mold;
- Rolling Mill (12112), responsible for pre-forming plate using hot rolling, heating a material billet to a designated temperature, rolling heated ingot in a rolling mill to a desired thickness;
- Shear Press (12113), responsible for placing rolled plate material in a shear press, rough cutting to desired pre-CTE-tailoring dimensions (this system component may take many forms and will by necessity be application specific in nature, but are known in the art);
- Hydraulic Tensioner (12114), responsible for loading rough cut plate into a tensioner, pulling the plate along a predetermined axis to desired displacement to create a predetermined CTE, and using strain gauges and computer control to ensure a desired material deformation;
- CNC Mill (12115), responsible for machining sides of the CTE tailored material to desired dimensions and tolerances;
- Laser Cutter (12116), responsible for loading plate into a laser cutter, and cutting the material to final form to form the terminal material product (12120).

The resulting terminal material product (TMP) (12120) may be defined by solid modeling application software running under control of the CCD (12102) under direction of the operator (12101). In this application context, the terminal material product (TMP) (12120) may be manufactured with a uniform thermal expansion coefficient or regions of different thermal expansion coefficient as dictated by the solid modeling software in conjunction with operation of the system components described above.

Exemplary System Operation (12200)

Figure 122:
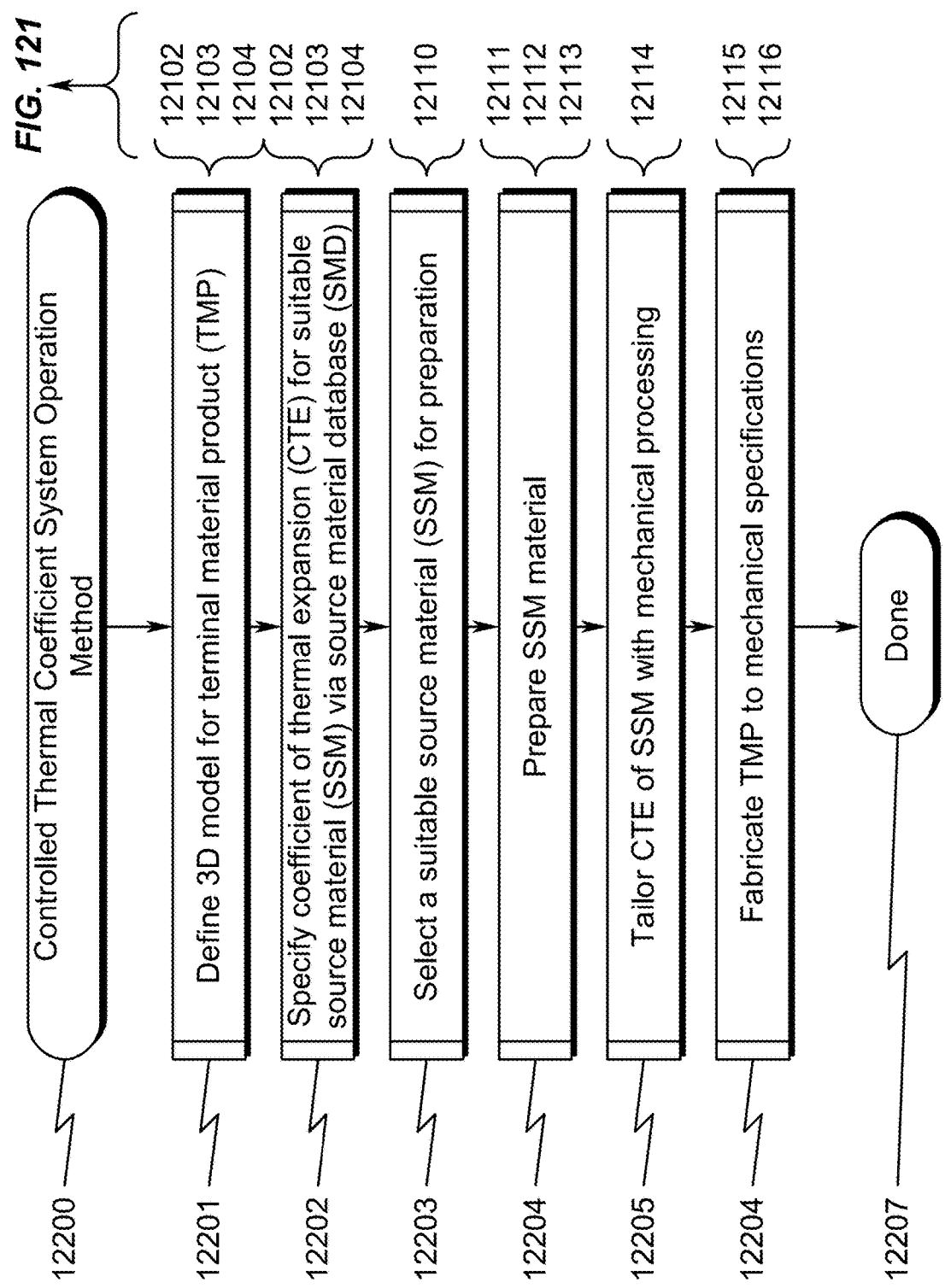

A flowchart depicting the operation of the system depicted in FIG. 121 (12100) is generally provided in FIG. 122 (12200) and includes the following method steps:

(1) With the CCD, defining a 3D model of the terminal material product (TMP) (12201);

(2) With the CCD, specifying the coefficient of thermal expansion (CTE) for a suitable source material (SSM) via inspection of the source material database (SMD) (12202);

(3) Based on results provided by the CCD interaction with the SMD, selecting a suitable source material (SSM) for preparation (12203);

(4) Under control of the CCD, preparing the SSM using computer control of the vacuum induction melting furnace (VMF), rolling mill (RM), and shear press (SP) (12204);

(5) Under control of the CCD, deforming the prepared SSM material with a hydraulic tensioner (HT) to produce the desired CTE performance in the SSM material (12205); and (6) Under control of the CCD, fabricating the TMP using a CNC mill (CCM) and laser cutter (LC) to transform the SSM after CTE transformation into the final TMP physical form (12207).

This operational flow may be modified in a variety of application contexts but illustrates how a TMP may be designed and fabricated using an automated system in which the processing is tightly controlled throughout the manufacturing process to enable the CTE of the TMP to be specified within narrow windows of control. Furthermore, the operation as described above while illustrating only a single CTE that is controlled may be modified in some applications to provide for a TMP having numerous 2D areas or 3D regions of differing CTE characteristics. Thus, the 3D model generated by the CCD may be used to specify a variety of areas/regions having different CTE characteristics within the same unitary fabricated TMP.

Exemplary System Components (12300)-(12800)

Figure 123:
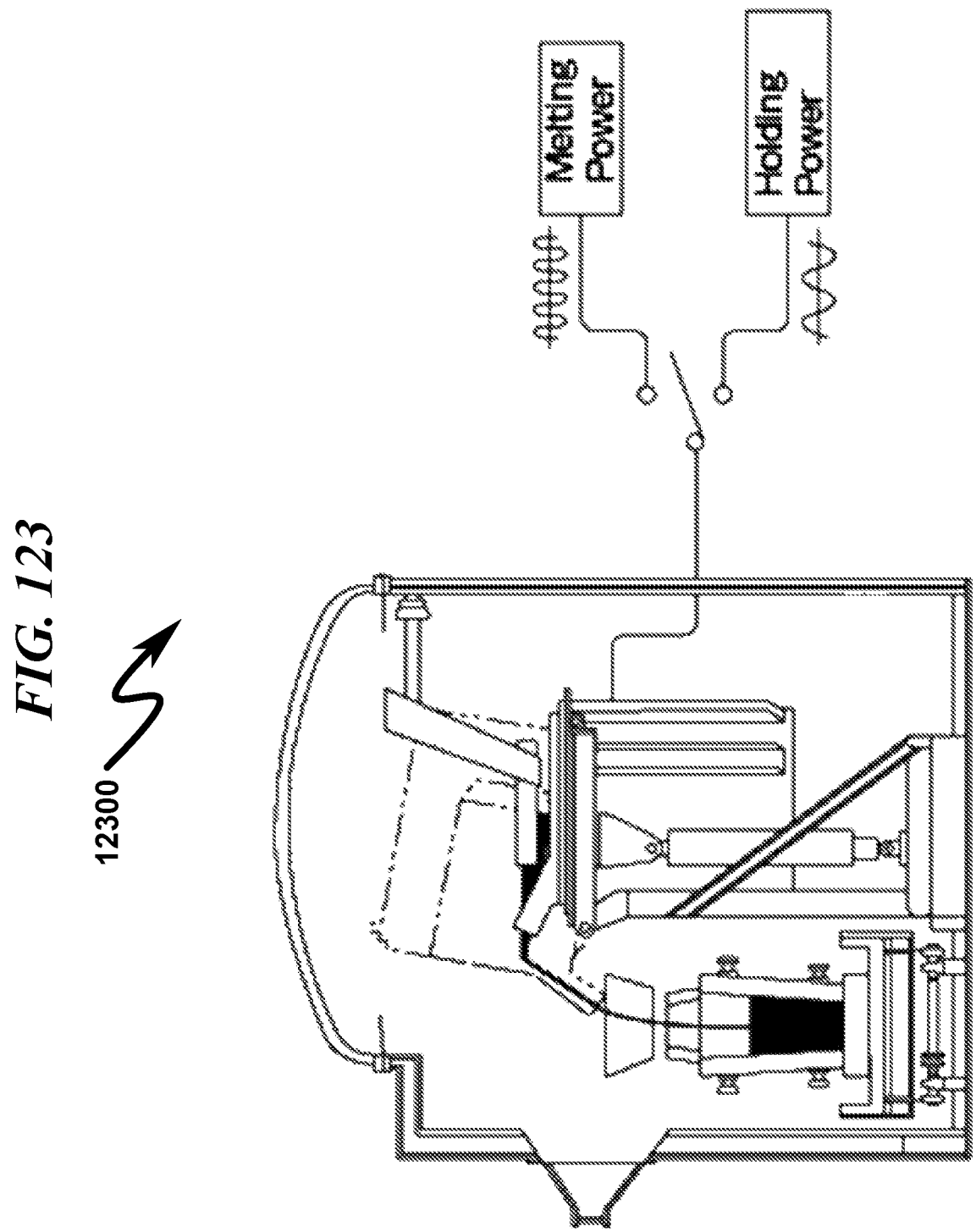
Figure 124:
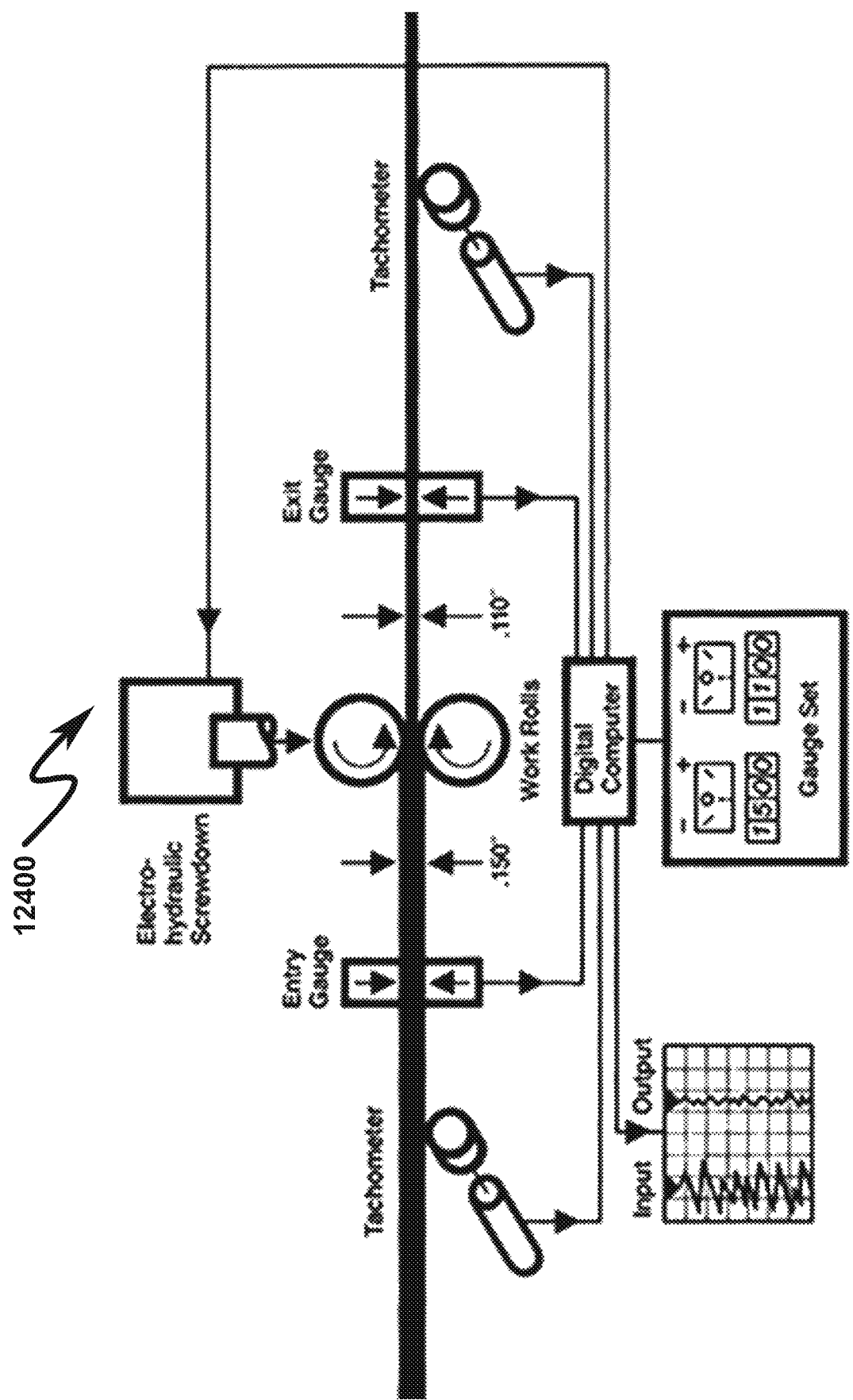
Figure 126:
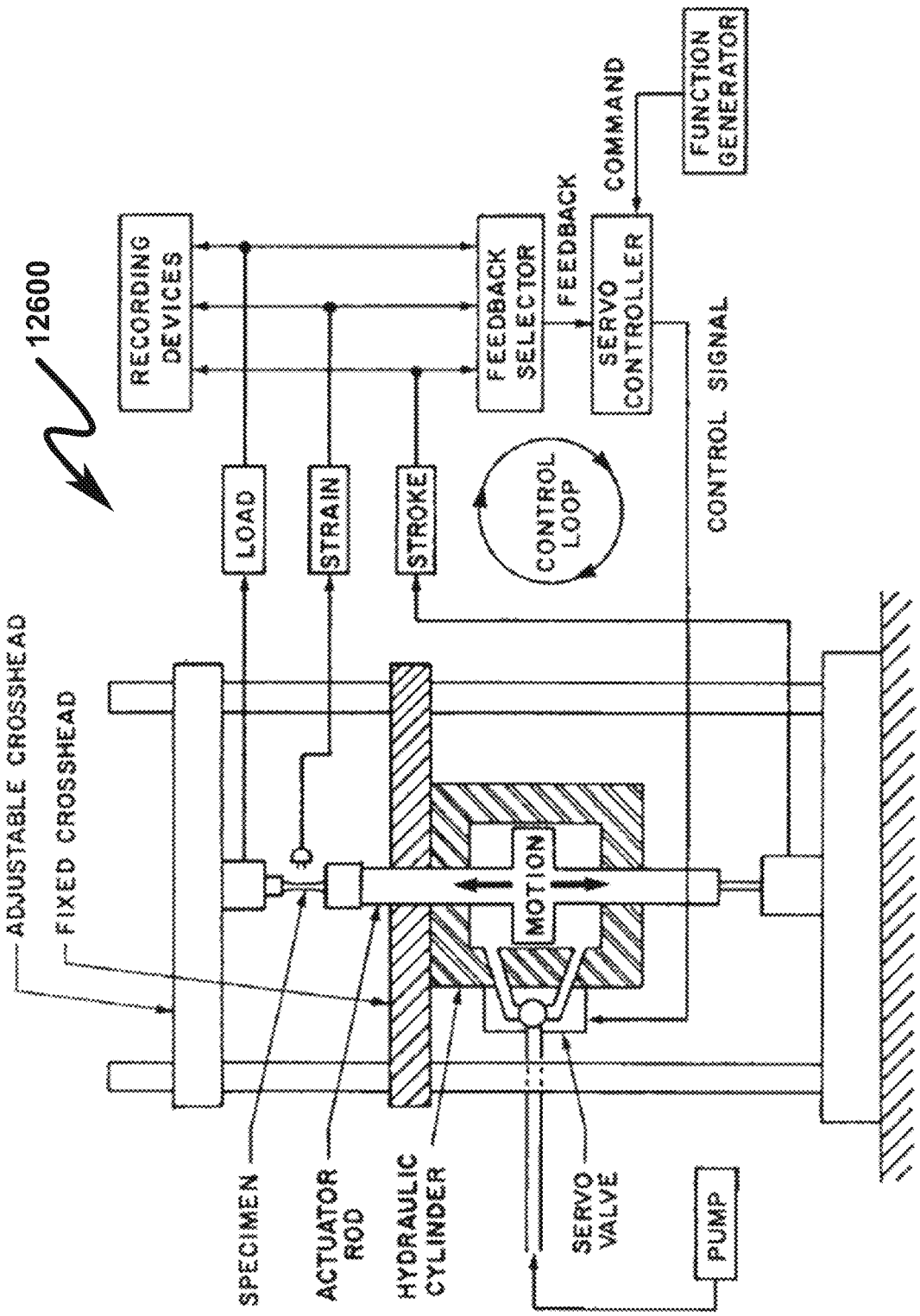
Figure 127:
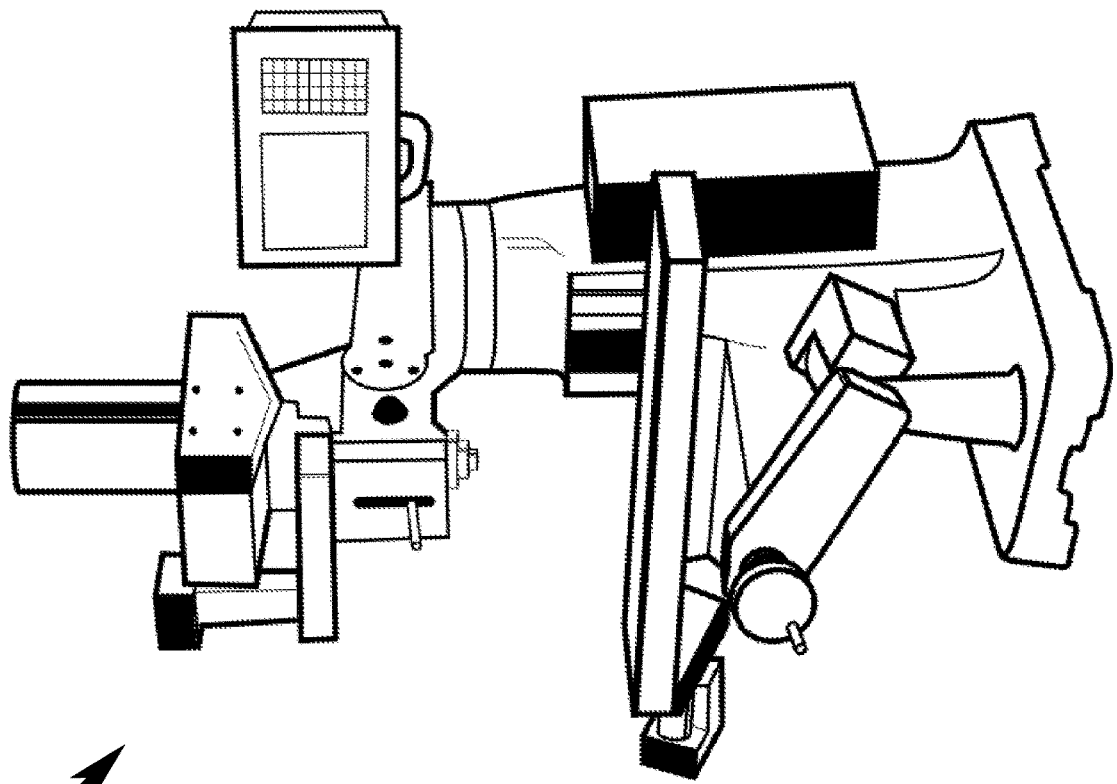

Various system components useful in the creation of the manufacturing system described above are depicted in FIG. 123 (12300)-FIG. 128 (12800), including the Vacuum Induction Melting Furnace (VMF) (FIG. 123 (12300)), Rolling Mill (RM) (FIG. 124 (12400)), Shear Press (SP) (FIG. 125 (12500)), Hydraulic Tensioner (HT) (FIG. 125 (12500), FIG. 126 (12600)), CNC Mill (CCM) (FIG. 127 (12700)), and Laser Cutter (LC) (FIG. 128 (12800)).

System Summary

The present invention system may be broadly generalized as a controlled thermal coefficient product manufacturing system comprising:
  (a) computing control device (CCD);
  (b) source materials database (SMD);
  (c) vacuum induction melting furnace (VMF);
  (d) rolling mill (RM);
  (e) shear press (SP);
  (f) hydraulic tensioner (HT);
  (g) CNC mill (CCM); and
  (h) laser cutter (LC);
  wherein:
    the CCD is configured to interact with an operator to define a terminal material product (TMP) using a graphical user interface (GUI);
    the GUI is configured to define the TMP in terms of terminal material dimensions (TMD) and thermal coefficient of expansion (TEC);
    the CCD is configured to communicate with the SMD to select a suitable source material (SSM) in response to the interaction with the operator and source material properties stored in the SMD;
    the CCD is electrically coupled to and configured to control the VMF, the RM, the SP, the HT, the CCM, and the LC;
    the SSM is a metallic material;
    the VMF is configured to load raw elemental SSM into a furnace at determined ratios by the CCD, pulling vacuum using a rouging pump and turbo pump, inductively melting elements of the SSM, pouring the molten SSM into a graphite crucible, and pre-forming plate using hot rolling of the molten SSM;
    the RM is configured to heating a billet of the SSM formed by the VMF to a designated temperature in a box furnace, rolling the heated SSM billet in a rolling mill to a desired thickness, and cutting the rolled and heated SSM billet to size;
    the SP is configured to place rolled SSM plate in a shear press and rough cutting the SSM plate to desired pre-CTE-tailoring dimensions;
    the HT is configured to load the rough cut SSM plate into a tensioner, pulling the rough cut SSM plate along an axis to desired displacement to create a first and second thermal expansion characteristic corresponding to a first and second predetermined range of coefficient of thermal expansion in a drawn SSM material by deforming the SSM material, and using strain gauges under control of the CCD to ensure a desired predetermined deformation;
    the CCM is configured to machine sides of the drawn SSM material to predetermined dimensions and tolerances to form a CTE-tailored SSM plate; and
    the LC is configured to load the CTE-tailored plate into a laser cutter and cutting the CTE-tailored plate to a final form of the TMP.

This general system summary may be augmented by the various elements described herein to produce a wide variety of invention embodiments consistent with this overall design description.

Method #1 Embodiment Summary

A first exemplary embodiment of the present invention method may be broadly generalized as a controlled thermal coefficient product manufacturing method comprising:
  (1) deforming a metallic material comprising a first phase and a first thermal expansion characteristic having a first thermal expansion coefficient;
  (2) transforming, in response to the deforming, at least some of the first phase into a second phase having a second thermal expansion coefficient; and
  (3) orienting the metallic material in at least one predetermined orientation;
  wherein:
    the second phase comprises martensite;
    the metallic material, subsequent to deformation, comprises a second thermal expansion characteristic having a second thermal expansion coefficient;
    the second thermal expansion coefficient is within a predetermined range; and
    the second thermal expansion characteristic is in at least one predetermined direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Method #2 Embodiment Summary

A second exemplary embodiment of the present invention method may be broadly generalized as a controlled thermal coefficient product manufacturing method comprising:
  (1) deforming a metallic material substantially comprising a first phase by applying tension in a first direction; and
  (2) transforming the metallic material via application of the tension from the first phase into a second phase;
  wherein:
    the metallic material, subsequent to deformation, exhibits a negative thermal expansion characteristic having a negative coefficient of thermal expansion within a predetermined range; and
    the negative coefficient of thermal expansion is in at least the first direction.

This general method may be modified heavily depending on a number of factors, with rearrangement and/or addition/ deletion of steps anticipated by the scope of the present invention. Integration of this and other preferred exemplary embodiment methods in conjunction with a variety of preferred exemplary embodiment systems described herein is anticipated by the overall scope of the present invention.

Method #3 Embodiment Summary

A third exemplary embodiment of the present invention method may be broadly generalized as a controlled thermal coefficient product manufacturing method comprising:
(1) deforming a metallic material substantially comprising a first phase; and
(2) transforming at least some of the metallic material from the first phase to a second phase using a compressive force in a first direction;
wherein:
the metallic material, subsequent to the deformation, comprises a negative thermal expansion characteristic having a negative coefficient of thermal expansion within a predetermined range; and
the negative thermal expansion characteristic, subsequent to the deformation, is in at least a second direction, wherein the second direction is perpendicular to the first direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Method #4 Embodiment Summary

A fourth exemplary embodiment of the present invention method may be broadly generalized as a controlled thermal coefficient product manufacturing method comprising:
(1) deforming a metallic material; and
(2) orienting the metallic material in at least one predetermined orientation in response to the deforming;
wherein:
the metallic material comprises a martensitic phase;
the metallic material exhibits a first thermal expansion characteristic having a first thermal expansion coefficient prior to the deformation;
the metallic material, subsequent to deformation, exhibits a second thermal expansion characteristic having a second thermal expansion coefficient;
the second thermal expansion coefficient is within a predetermined range; and
the second thermal expansion characteristic is in at least one predetermined direction.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:

An embodiment wherein the metallic material comprises a material selected from a group consisting of:
(1) a material characterized by a general formula $Ti_{100-A}X_A$, wherein X is at least one of Ni, Nb, Mo, Ta, Pd, Pt, or combinations thereof, and A is in a range from 0 to 75 atomic percent composition;
(2) a material characterized by a general formula $Ti_{100-A-B}Ni_AX_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;
(3) a material characterized by a general formula $Ti_{100-A-B}Nb_AX_B$, wherein X is at least one of Al, Sn, Ta, Hf, Zr, Al, Au, Pt, Fe, Co, Cr, Mo, V, O, or combinations thereof, and A is in a range from 0 to 55 atomic percent composition, and B is in a range from 0 to 75 atomic percent composition such that A plus B is less than 100;
(4) a material characterized by a general formula $Ti_{100-A-B}Ta_AX_B$, wherein X is at least one of Al, Sn, Nb, Zr, Mo, Al, Au, Pt, Fe, Co, Cr, Hf, V, O, or combinations thereof, and A is in a range from 0 to 55 atomic percent composition, and B is in a range from 0 to 75 atomic percent composition such that A plus B is less than 100;
(5) a material characterized by a general formula $Ni_{100-A-B}Mn_AX_B$, wherein X is at least one of Ga, In, Sn, Al, Sb, Co, or combinations thereof, and A is in a range from 0 to 50 atomic percent composition, and B is in a range from 0 to 50 atomic percent composition such that A plus B is less than 100;
(6) a material characterized by a general formula $Ni_{100-A-B-C}Mn_ACo_BX_C$, wherein X is at least one of Ga, In, Sn, Al, Sb, or combinations thereof, and A is in a range from 0 to 50 atomic percent composition, B is in a range from 0 to 50 atomic percent composition, and C is in a range from 0 to 50 atomic percent composition such that A plus B plus C is less than 100;
(7) a material characterized by a general formula $Ni_{100-A-B}Fe_AGa_B$ wherein A is in a range from 0 to 50 atomic percent composition, and B is in a range from 0 to 50 atomic percent composition such that A plus B is less than 100;
(8) a material characterized by a general formula $Cu_{100-A}X_A$, wherein X is at least one of Zn, Ni, Mn, Al, Be, or combinations thereof, and A is in a range from 0 to 75 atomic percent composition;
(9) a material characterized by a general formula $Cu_{100-A-B}Al_AX_B$, wherein X is at least one of Zn, Ni, Mn, Be, or combinations thereof, and A is in a range from 0 to 50 atomic percent composition, and B is in a range from 0 to 50 atomic percent composition such that A plus B is less than 100;
(10) a material characterized by a general formula $Cu^{100-A-B-C}Mn_AAl_BX_C$, wherein X is at least one of Zn, Ni, Be, or combinations thereof, and A is in a range from 0 to 50 atomic percent composition, B is in a range from 0 to 50 atomic percent composition, and C is in a range from 0 to 50 atomic percent composition such that A plus B plus C is less than 100;

(11) a material characterized by a general formula $Co_{100-A-B}Ni_AX_B$, wherein X is at least one of Al, Ga, Sn, Sb, In, or combinations thereof, and A is in a range from 0 to 50 atomic percent composition, and B is in a range from 0 to 50 atomic percent composition such that A plus B is less than 100;

(12) a material characterized by a general formula $Fe_{100-A-B}Mn_AX_B$, wherein X is at least one of Ga, Ni, Co, Al, Ta, Si, or combinations thereof, and A is in a range from 0 to 50 atomic percent composition, and B is in a range from 0 to 50 atomic percent composition such that A plus B is less than 100;

(13) a material characterized by a general formula $Fe_{100-A-B}Ni_AX_B$, wherein X is at least one of Ga, Mn, Co, Al, Ta, Si, or combinations thereof, and A is in a range from 0 to 50 atomic percent composition, and B is in a range from 0 to 50 atomic percent composition such that A plus B is less than 100;

(14) a material characterized by a general formula $Fe_{100-A-B-C}Ni_ACo_BAl_CX_D$, wherein X is at least one of Ti, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;

(15) a material characterized by a general formula $Fe_{100-A-B-C}Ni_ACo_BTi_CX_D$, wherein X is at least one of Al, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;

An embodiment wherein the deforming is achieved by at least one of:
(1) hot-rolling;
(2) cold-rolling;
(3) wire drawing;
(4) plain strain compression;
(5) bi-axial tension;
(6) conform processing;
(7) bending;
(8) drawing;
(9) wire-drawing;
(10) swaging;
(11) conventional extrusion;
(12) equal channel angular extrusion;
(13) precipitation heat treatment under stress;
(14) tempering;
(15) annealing;
(16) sintering;
(17) tension processing;
(18) compression processing;
(19) torsion processing;
(20) cyclic thermal training under stress; and
(21) combinations thereof.

An embodiment wherein the predetermined range of the coefficient of thermal expansion ranges from $-150 \times 10^{-6}K^{-1}$ to $+500 \times 10^{-6}K^{-1}$.

An embodiment wherein the deforming of the metallic material further comprises texturing the metallic material in a direction comprising at least one of a [111], a [100], or a [001] direction.

An embodiment wherein the second thermal expansion coefficient is negative.

An embodiment wherein the sum of the first thermal expansion coefficient and the second thermal expansion coefficient is zero.

An embodiment wherein:
the deforming the metallic material comprises applying tension in at least one direction; and
the second thermal expansion characteristic subsequent to the deformation is in the at least one direction.

An embodiment wherein:
the deforming the metallic material comprises applying compression in a first direction;
the second thermal expansion characteristic subsequent to the deformation is in at least one predetermined direction; and
the at least one predetermined direction is perpendicular to the first direction.

An embodiment wherein:
the deforming the metallic material comprises applying shear in a first direction;
the second thermal expansion characteristic subsequent to deformation is in at least one predetermined direction; and
the at least one predetermined direction is 45° to the first direction.

One skilled in the art will recognize that other embodiments are possible based on combinations of elements taught within the above invention description.

Product-By-Process

The above described system and method may be applied to produce a product-by-process material that has a controlled thermal coefficient of expansion such that the material is superior to conventional compositions or alloys in which the thermal coefficient of expansion is not controlled or known to be undesirable in certain application contexts. For this reason the present invention encompasses the product-by-process of the disclosed system and method in part because the material characteristics of the product-by-process produced by the disclosed system and/or method are significantly superior to (having more tightly controlled thermal expansion coefficients) and different from that of materials known in the prior art.

CONCLUSION

A controlled thermal coefficient product manufacturing system and method is disclosed. The disclosed product relates to the manufacture of metallic material product (MMP) having a thermal expansion coefficient (TEC) in a predetermined range. The disclosed system and method provides for a first material deformation (FMD) of the MMP that comprises at least some of a first material phase (FMP) wherein the FMP comprises martensite randomly oriented and a first thermal expansion coefficient (FTC). In response to the FMD at least some of the FMP is oriented in at least one predetermined orientation. Subsequent to deformation, the MMP comprises a second thermal expansion coefficient (STC) that is within a predetermined range and wherein the thermal expansion of the MMP is in at least one predetermined direction. The MMP may be comprised of a second material phase (SMP) that may or may not transform to the FMP in response to the FMD.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A controlled thermal coefficient product manufacturing method comprising:
   (1) plastically deforming a metallic material; and
   (2) texturing said metallic material in at least one selected material direction in response to said plastic deforming;
   wherein:
   said metallic material comprises a material selected from a group consisting of:
      (1) a material characterized by a general formula $Fe_{100-A-B}Mn_AX_B$, wherein X is at least one of Ga, Ni, Co, Al, Ta, Si, or combinations thereof, and A is in a range from 0 to 50 atomic percent composition, and B is in a range from 0 to 50 atomic percent composition such that A plus B is less than 100;
      (2) a material characterized by a general formula $Fe_{100-A-B}Ni_AX_B$, wherein X is at least one of Ga, Mn, Co, Al, Ta, Si, or combinations thereof, and A is in a range from 0 to 50 atomic percent composition, and B is in a range from 0 to 50 atomic percent composition such that A plus B is less than 100;
      (3) a material characterized by a general formula $Fe_{100-A-B-c}Ni_ACo_BAl_CX_D$, wherein X is at least one of Ti, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100; and
      (4) a material characterized by a general formula $Fe_{100-A-B-c}Ni_ACo_BTi_CX_D$, wherein X is at least one of Al, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;
   said metallic material prior to said plastic deformation and said texturing comprises a martensitic phase exhibiting different thermal expansion coefficients in different crystallographic directions;
   said texturing comprises texturing of said martensitic phase;
   said metallic material exhibits a first bulk thermal expansion characteristic having a first thermal expansion coefficient prior to said plastic deformation;
   said metallic material, subsequent to said plastic deformation, exhibits a second bulk thermal expansion characteristic having a second thermal expansion coefficient;
   said second thermal expansion coefficient is within a selected range; and
   said second bulk thermal expansion characteristic is in said at least one selected material direction due to said texturing of said martensitic phase.

2. The controlled thermal coefficient product manufacturing method of claim 1 wherein said plastic deforming is achieved by at least one of:
   (1) hot-rolling;
   (2) cold-rolling;
   (3) plain strain compression;

(4) bi-axial tension;
(5) conform processing;
(6) bending;
(7) drawing;
(8) wire-drawing;
(9) swaging;
(10) extrusion;
(11) equal channel angular extrusion;
(12) precipitation heat treatment under stress;
(13) annealing;
(14) sintering;
(15) monotonic tension processing;
(16) monotonic compression processing;
(17) monotonic torsion processing;
(18) cyclic thermal training under stress; and
(19) combinations thereof.

3. The controlled thermal coefficient product manufacturing method of claim 1 wherein said selected range of said second thermal expansion coefficient ranges from $-150 \times 10^{-6} K^{-1}$ to $+500 \times 10^{-6} K^{-1}$.

4. The controlled thermal coefficient product manufacturing method of claim 1 wherein said plastic deforming of said metallic material further comprises texturing said metallic material in a direction comprising at least one of a [111], a [100], or a [001] direction.

* * * * *